(12) United States Patent  
Miyawaki et al.

(10) Patent No.: US 8,220,929 B2  
(45) Date of Patent: Jul. 17, 2012

(54) THREE-DIMENSIONAL IMAGE DISPLAY APPARATUS

(75) Inventors: Tetsuyuki Miyawaki, Kanagawa (JP); Kyohei Iwamoto, Tokyo (JP); Yoshio Suzuki, Kanagawa (JP)

(73) Assignee: Sony Corporation, Tokyo (JP)

( * ) Notice: Subject to any disclaimer, the term of this patent is extended or adjusted under 35 U.S.C. 154(b) by 438 days.

(21) Appl. No.: 12/476,837

(22) Filed: Jun. 2, 2009

(65) Prior Publication Data

US 2009/0303597 A1 Dec. 10, 2009

(30) Foreign Application Priority Data

Jun. 6, 2008 (JP) ................ 2008-149170

(51) Int. Cl.  
*G03B 21/00* (2006.01)  
*G02B 27/22* (2006.01)  
*G02B 27/24* (2006.01)  
*H04N 13/04* (2006.01)

(52) U.S. Cl. ............... 353/7; 359/462; 359/471; 348/51

(58) Field of Classification Search .................. 353/7–9; 348/42–43, 51, 54–55; 359/462, 466, 475, 359/477, 471  
See application file for complete search history.

(56) References Cited

U.S. PATENT DOCUMENTS

| | | | |
|---|---|---|---|
| 6,907,124 B1* | 6/2005 | Gluckstad | 380/205 |
| 7,016,116 B2* | 3/2006 | Dolgoff | 359/630 |
| 7,760,229 B2* | 7/2010 | White | 348/14.16 |
| 7,843,636 B2* | 11/2010 | Iwamoto et al. | 359/462 |
| 2004/0233489 A1* | 11/2004 | Lee | 359/23 |
| 2006/0050374 A1* | 3/2006 | Slinger | 359/385 |
| 2006/0290777 A1* | 12/2006 | Iwamoto et al. | 348/49 |
| 2008/0192343 A1* | 8/2008 | Miyawaki et al. | 359/462 |
| 2009/0015917 A1* | 1/2009 | Iwamoto et al. | 359/462 |
| 2011/0043909 A1* | 2/2011 | Miyawaki et al. | 359/462 |

FOREIGN PATENT DOCUMENTS

| | | |
|---|---|---|
| JP | 05-033118 | 2/1993 |
| JP | 06-347723 | 12/1994 |
| JP | 2000-111834 | 4/2000 |
| JP | 2001-56450 | 2/2001 |

(Continued)

OTHER PUBLICATIONS

Japanese Office Action dated Apr. 5, 2011 for corresponding Japanese Application No. 2008-149170.

(Continued)

*Primary Examiner* — Tony Ko  
*Assistant Examiner* — Jori S Reilly-Diakun  
(74) *Attorney, Agent, or Firm* — K&L Gates LLP

(57) ABSTRACT

A three-dimensional image display apparatus includes a light source and an optical system including a light modulation unit having pixels for generating a two-dimensional image by modulating light from the light source by the respective pixels and emitting a spatial frequency in the generated two-dimensional image along a diffraction angle corresponding to diffraction orders generated from the respective pixels, a Fourier transform image formation unit for performing Fourier transform on the spatial frequency in the two-dimensional image to generate Fourier transform images corresponding to the diffraction orders, a Fourier transform image selection unit for selecting a Fourier transform image corresponding to a desired diffraction order among the Fourier transform images, and a conjugate image formation unit for forming a conjugate image of the selected Fourier transform image, and further includes a semi-transmissive mirror for changing a light ray travelling direction emitted from the optical system.

11 Claims, 52 Drawing Sheets

FOREIGN PATENT DOCUMENTS

| | | |
|---|---|---|
| JP | 2002-072135 | 3/2002 |
| JP | 2003-075771 | 3/2003 |
| JP | 2003-161912 | 6/2003 |
| JP | 2003-173128 | 6/2003 |
| JP | 2003-295114 | 10/2003 |
| JP | 2003-333623 | 11/2003 |
| JP | 3523605 | 2/2004 |
| JP | 2005-070255 | 3/2005 |
| JP | 2007-041504 | 2/2007 |
| JP | 2007-41504 | 2/2007 |

OTHER PUBLICATIONS

Japanese Office Action for corresponding JP 2008-149170, issued on Apr. 6, 2010.

* cited by examiner

FIG. 6

| | (-3, 4) | (-1, 4) | | (1, 4) | | (3, 4) | |
|---|---|---|---|---|---|---|---|
| (-4, 4) | | (-2, 4) | (0, 4) | | (2, 4) | | (4, 4) |
| | (-3, 3) | (-1, 3) | | (1, 3) | | (3, 3) | |
| (-4, 3) | | (-2, 3) | (0, 3) | | (2, 3) | | (4, 3) |
| | (-3, 2) | (-1, 2) | | (1, 2) | | (3, 2) | |
| (-4, 2) | | (-2, 2) | (0, 2) | | (2, 2) | | (4, 2) |
| | (-3, 1) | (-1, 1) | | (1, 1) | | (3, 1) | |
| (-4, 1) | | (-2, 1) | (0, 1) | | (2, 1) | | (4, 1) |
| | (-3, 0) | (-1, 0) | | (1, 0) | | (3, 0) | |
| (-4, 0) | | (-2, 0) | (0, 0) | | (2, 0) | | (4, 0) |
| | (-3,-1) | (-1,-1) | | (1,-1) | | (3,-1) | |
| (-4,-1) | | (-2,-1) | (0,-1) | | (2,-1) | | (4,-1) |
| | (-3,-2) | (-1,-2) | | (1,-2) | | (3,-2) | |
| (-4,-2) | | (-2,-2) | (0,-2) | | (2,-2) | | (4,-2) |
| | (-3,-3) | (-1,-3) | | (1,-3) | | (3,-3) | |
| (-4,-3) | | (-2,-3) | (0,-3) | | (2,-3) | | (4,-3) |
| | (-3,-4) | (-1,-4) | | (1,-4) | | (3,-4) | |
| (-4,-4) | | (-2,-4) | (0,-4) | | (2,-4) | | (4,-4) |

| | SF | 50 | | | 51 | |
|---|---|---|---|---|---|---|
| (4, -4) | (3, -4) (2, -4) | (1, -4) (0, -4) | (-1, -4) (-2, -4) | (-3, -4) | (-4, -4) | |
| (4, -3) | (3, -3) (2, -3) | (1, -3) (0, -3) | (-1, -3) (-2, -3) | (-3, -3) | (-4, -3) | |
| (4, -2) | (3, -2) (2, -2) | (1, -2) (0, -2) | (-1, -2) (-2, -2) | (-3, -2) | (-4, -2) | |
| (4, -1) | (3, -1) (2, -1) | (1, -1) (0, -1) | (-1, -1) (-2, -1) | (-3, -1) | (-4, -1) | |
| (4, 0) | (3, 0) (2, 0) | (1, 0) (0, 0) | (-1, 0) (-2, 0) | (-3, 0) | (-4, 0) | |
| (4, 1) | (3, 1) (2, 1) | (1, 1) (0, 1) | (-1, 1) (-2, 1) | (-3, 1) | (-4, 1) | |
| (4, 2) | (3, 2) (2, 2) | (1, 2) (0, 2) | (-1, 2) (-2, 2) | (-3, 2) | (-4, 2) | |
| (4, 3) | (3, 3) (2, 3) | (1, 3) (0, 3) | (-1, 3) (-2, 3) | (-3, 3) | (-4, 3) | |
| (4, 4) | (3, 4) (2, 4) | (1, 4) (0, 4) | (-1, 4) (-2, 4) | (-3, 4) | (-4, 4) | |

Y DIRECTION

Y DIRECTION

X DIRECTION

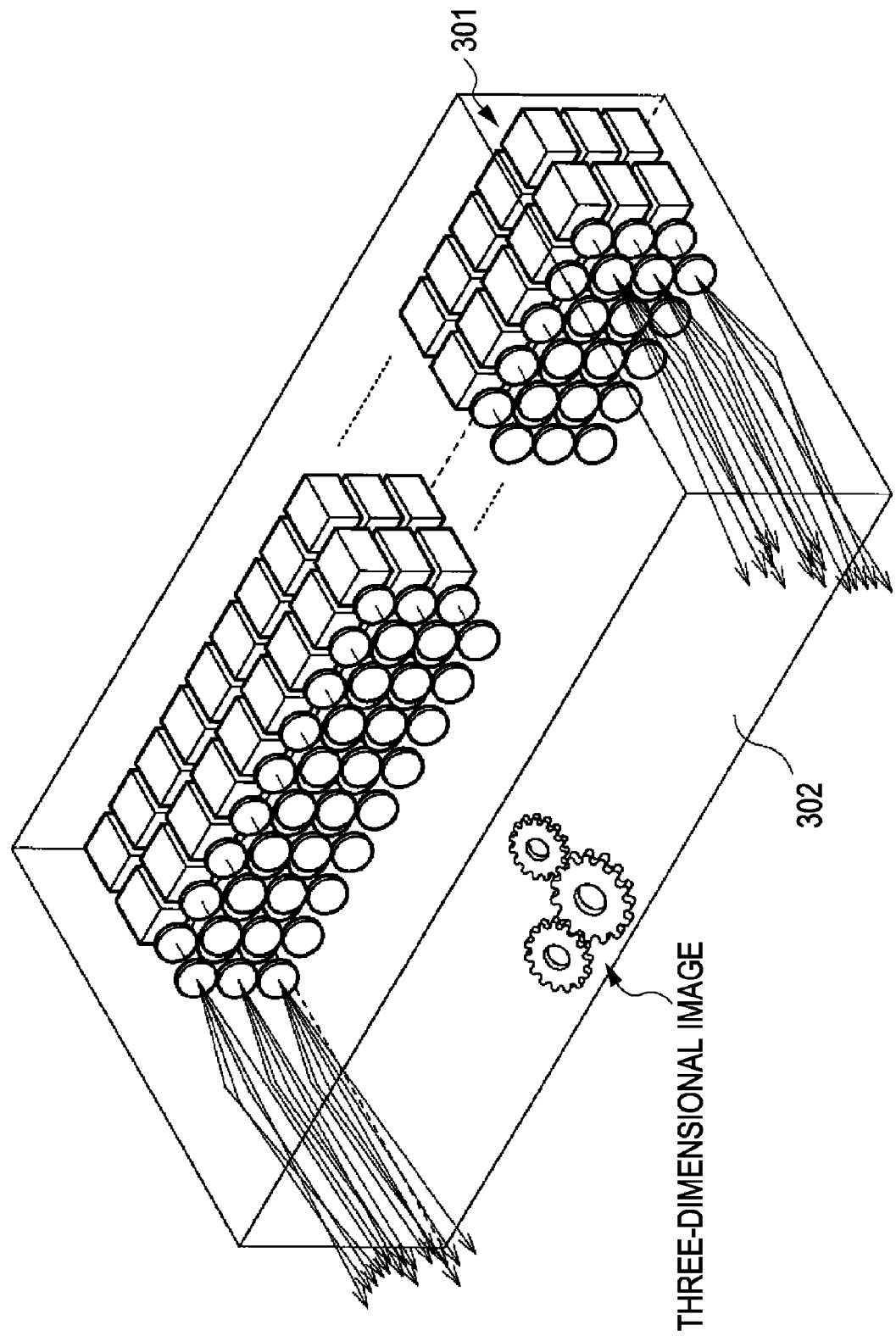

THREE-DIMENSIONAL IMAGE DISPLAY APPARATUS

CROSS REFERENCES TO RELATED APPLICATIONS

The present application claims priority to Japanese Priority Patent Application JP 2008-149170 filed in the Japan Patent Office on Jun. 6, 2008, the entire content of which is hereby incorporated by reference.

BACKGROUND

The present application relates to a three-dimensional image display apparatus capable of displaying a three-dimensional image.

A two-eye three-dimensional image technology for obtaining a three-dimensional image while both eyes of an observer respectively observe different images called parallax images and a multiple-eye three-dimensional image technology for obtaining a plurality of three-dimensional images from different points of view by preparing a plurality of sets of parallax images are proposed, and a large number of technologies related to the above-mentioned technologies are developed. However, according to the two-eye three-dimensional image technology or the multiple-eye three-dimensional image technology, a three-dimensional image is not located at an intended space as a three-dimensional image, but the three-dimensional image exists on a two-dimensional display surface, for example, and is regularly located at a fixed position. Therefore, convergence and accommodation, in particular, which are ocular system physiological responses do not operate simultaneously, and eye fatigue accompanied by the phenomenon causes a problem.

On the other hand, in the real world, information on an object surface propagates to eye balls of the observer with a medium of light rays. Then, as a technology for artificially reconstructing the light rays from the object surface physically existing in the real world, a holography technology is proposed. A three-dimensional image utilizing the holography technology uses an interference fringe generated on the basis of an interference of light and uses a diffraction wave surface itself which is generated when the interference fringe is irradiated as image information medium. Therefore, the ocular system physiological responses such as the convergence and the accommodation similar to those generated when the observer observes the object in the real world are generated, and it is possible to obtain an image with little eye fatigue. Furthermore, the reconstruction of the light ray surface from the object means that continuity is secured with respect to a direction in which the image information is transmitted. Therefore, even when the point of view of the observer is moved, an appropriate image from a different angle in accordance with the movement can be continuously presented, and kinematic parallax is continuously presented.

However, according to the holography technology, the three-dimensional spatial information of the object is recorded as the interference fringe in the two-dimensional space, and the information amount is extremely large as compared with the information amount on the two-dimensional space such as a photograph capturing the same object. This is because it can be considered that the information is converted into the density on the two-dimensional space when the three-dimensional spatial information is converted into the two-dimensional spatial information. For that reason, the spatial resolution used by a display apparatus which displays the interference fringe based on CGH (Computer Generated Hologram) is extremely high, and also the enormous information amount is demanded. Thus, it is technically difficult to realize the three-dimensional image on the basis of a real time hologram.

According to the holography technology, the light rays which can be regarded as the continuous information is used as the information medium, and the information from the object is transmitted. On the other hand, as a technology for generating a three-dimensional image by reproducing with discrete light rays a situation theoretically substantially equivalent to a location composed of light rays in the real world, a light ray reconstruction method (which is also called integral photography method) is proposed. According to the light ray reconstruction method, a light ray group composed of a large number of light rays propagating in many directions are scattered in advance in a space by way of optical means. Next, the light ray propagating from the surface of the virtual object located at an arbitrary position is selected from the light ray group. By modifying the intensity and phase of the selected light ray, an image composed of the light ray is generated in the space. The observer thus can observe this image as a three-dimensional image. The three-dimensional image based on the light ray reconstruction method is obtained through multiple imaging of images from a plurality of directions at an arbitrary point. Similarly to the case of observing the three-dimensional image in the real world, at an arbitrary point, the appearance varies depending on observation positions.

As an apparatus for realizing the light ray reconstruction method described above, an apparatus prepared by combining a flat display apparatus such as a liquid crystal display apparatus or a plasma display apparatus with a micro lens array or a pin hole array is proposed (for example, see Japanese Unexamined Patent Application Publication No. 2003-173128, Japanese Unexamined Patent Application Publication No. 2003-161912, Japanese Unexamined Patent Application Publication No. 2003-295114, Japanese Unexamined Patent Application Publication No. 2003-75771, Japanese Unexamined Patent Application Publication No. 2002-72135, Japanese Unexamined Patent Application Publication No. 2001-56450, and Japanese Patent No. 3523605). In addition, an apparatus in which a large number of projector units are disposed. FIG. 52 shows a configuration example of a three-dimensional image display apparatus using the projector units to realize the light ray reconstruction method. In this apparatus, a large number of projector units 301 are arranged in parallel in a horizontal direction and a vertical direction, light rays different in angles are emitted from the respective projector units 301. With this configuration, through multiple reproduction of a multi view angle image at an arbitrary point in a certain cross section 302, the three-dimensional image is realized.

In addition, Japanese Unexamined Patent Application Publication No. 2007-041504 discloses a three-dimensional image display apparatus including:

(A) light modulation means provided with a plurality of pixels and configured to generate a two-dimensional image by modulating light from a light source by the respective pixels and to emit a spatial frequency in the generated two-dimensional image along diffraction angles corresponding to a plurality of diffraction orders generated from the respective pixels, (B) Fourier transform image formation means configured to perform Fourier transform on the spatial frequency in the two-dimensional image emitted from the light modulation means to generate a number of a Fourier transform images corresponding to the plurality of diffraction orders, (C) Fourier transform image selection means configured to select a Fourier transform image corresponding to a desired diffraction order among the number of Fourier transform images as generated corresponding to the plurality of diffraction orders, and (D) conjugate image formation means configured to form a conjugate image of the Fourier transform image selected by the Fourier transform image selection means.

SUMMARY

According to the above-mentioned light ray reconstruction method, an image is generated by way of a light ray at a level effectively working on the focal adjustment and the both-eye convergence angle adjustment as the visual functions which are difficult to realize with the two-eye three-dimensional image technology or the multiple-eye three-dimensional image technology, it is possible to provide a three-dimensional image with extremely low eye fatigue. In addition, as the light rays are continuously emitted from the same element on the virtual object in a plurality of directions, it is possible to provide the change in the image accompanying the shift of the view position.

However, the image generated by the current light ray reconstruction method lacks sense of presence as compared with the object in the real world. This may be because the three-dimensional image based on the current light ray reconstruction method is generated by using extremely little information as compared with the amount of information obtained by the observer from the object in the real world, that is, the three-dimensional image is generated by using a small number of light rays. In general, it is discussed that human visibility limit is about 1 minute in angle resolution, and the three-dimensional image based on the current light ray reconstruction method is generated by using insufficient light rays with respect to the human visual perception. Therefore, in order to generate a three-dimensional image having the high sense of presence or reality which the object in the real world has, an image is generated by using at least a large number of light rays.

Then, to realize the above-mentioned image, a technology with which a light ray group is generated at a spatially high density is to be used, and it is conceivable that the display density of the display apparatus such as a liquid crystal display apparatus is to be increased. Alternatively, in the case of the apparatus prepared by arranging the large number of projector units 301 shown in FIG. 52, it is conceivable that the size of the respective projector units 301 is reduced as much as possible, and the projector units 301 are disposed at a spatially high density. However, a significant improvement in the display density in the current display apparatus is difficult due to problems in light use efficiency and diffraction limit. In addition, in the case of the apparatus shown in FIG. 52, a limit exists in size reduction of the respective projector units 301, and it is considered that the disposal of the projector units at a spatially high density is difficult. In either case, to generate the light ray group at the high density, a plurality of devices are to be used, which leads to size increase in the entire apparatus.

In the three-dimensional image display apparatus disclosed in Japanese Unexamined Patent Application Publication No. 2007-041504, the size of the three-dimensional image display apparatus is not increased, and it is possible to generate and scatter the light ray group used for displaying a three-dimensional image at a spatially high density. Thus, it is possible to obtain the three-dimensional image based on the light rays having a quality similar to that of the object in the real world. However, in the three-dimensional image display apparatus disclosed in Japanese Unexamined Patent Application Publication No. 2007-041504, when the Fourier transform image (the three-dimensional image) selected by the Fourier transform image selection means is observed, the light source or the optical system constituting the three-dimensional image display apparatus is located within the field of view of the observer, and a problem occurs that the light source or the optical system is overlapped with the three-dimensional image, and observation of the three-dimensional image becomes difficult.

Also, from the viewpoint of the load reduction of the image data system in the three-dimensional image display apparatus, a strong demand exists for a technology with which the three-dimensional image based on light rays having a quality similar to that of the object in the real world can be obtained even when the light ray group used for the three-dimensional image display is generated and scattered at a spatially lower density.

Therefore, it is desirable to provide a three-dimensional image display apparatus capable of certainly avoiding generation of a problem that a light source or an optical system is overlapped with a three-dimensional image, and observation of the three-dimensional image becomes difficult. In addition, it is desirable to provide a three-dimensional image display apparatus having a configuration and a construction capable of reducing a load of the image data processing system.

To achieve the above-mentioned first three-dimensional image display apparatus, a three-dimensional image display apparatus according to an embodiment mode 1A includes a light source and an optical system, the optical system including (A) light modulation means provided with a plurality of pixels and configured to generate a two-dimensional image by modulating light from the light source by the respective pixels and to emit a spatial frequency in the generated two-dimensional image along diffraction angles corresponding to a plurality of diffraction orders generated from the respective pixels, (B) Fourier transform image formation means configured to perform Fourier transform on the spatial frequency in the two-dimensional image emitted from the light modulation means to generate a number of a Fourier transform images corresponding to the plurality of diffraction orders, (C) Fourier transform image selection means configured to select a Fourier transform image corresponding to a desired diffraction order among the number of Fourier transform images as generated corresponding to the plurality of diffraction orders, and (D) conjugate image formation means configured to form a conjugate image of the Fourier transform image selected by the Fourier transform image selection means.

To achieve the above-mentioned first three-dimensional image display apparatus, a three-dimensional image display apparatus according to an embodiment mode 2A includes a light source and an optical system, the optical system including (A) a two-dimensional image formation apparatus provided with P×Q openings (where P and Q are arbitrary positive integers) disposed in a two-dimensional matrix manner along an X direction and a Y direction and configured to generate a two-dimensional image by controlling passage, reflection, or diffraction of light from the light source for each opening and to generate total M×N sets of diffraction lights on the basis of the two-dimensional image for each opening with M sets from an m-th order to an m'-th order along the X direction (where m and m' are integers, and M is a positive integer) and N sets from an n-th order to an n'-th order along the Y direction (where n and n' are integers, and N is a positive integer), (B) a first lens in which a two-dimensional image formation apparatus is arranged on a front-side focal surface, (C) a spatial filter arranged on a rear-side focal surface of the first lens and provided with total M×N closing/opening controllable opening sections with M opening sections arranged in the X direction and N opening sections arranged in the Y direction, (D) a second lens in which the spatial filter is arranged on a front-side focal surface, and (E) a third lens whose front-side focus is located at a rear-side focus of the second lens.

To achieve the above-mentioned first three-dimensional image display apparatus, a three-dimensional image display apparatus according to an embodiment mode 3A includes a light source and an optical system, the optical system including (A) a two-dimensional image formation apparatus composed of a one-dimensional spatial light modulator provided with P pixels arranged along an X direction and configured to generate a one-dimensional image; a scan optical system configured to generate a two-dimensional image by two-dimensionally developing the one-dimensional image generated by the one-dimensional spatial light modulator; and diffraction light generation means arranged on a generation surface of the two-dimensional image and configured to generate M sets of diffraction lights from an m-th order to an m'-th order for each pixel (where m and m' are integers, and M is a positive integer), (B) a first lens in which the diffraction light generation mean is arranged on a front-side focal surface, (C) a spatial filter arranged on a rear-side focal surface of the first lens and provided with total M×N closing/opening controllable opening sections with M opening sections arranged in the X direction and N opening sections (where N is a positive integer) arranged in the Y direction, (D) a second lens in which the spatial filter is arranged on a front-side focal surface, and (E) a third lens whose front-side focus is located at a rear-side focus of the second lens.

To achieve the above-mentioned first three-dimensional image display apparatus, a three-dimensional image display apparatus according to an embodiment mode 4A includes a light source and an optical system, the optical system including (A) light modulation means provided with a plurality of pixels and configured to generate a two-dimensional image by modulating light from the light source by the respective pixels and to emit a spatial frequency in the generated two-dimensional image along diffraction angles corresponding to a plurality of diffraction orders generated from the respective pixels, (B) image restriction and generation means configured to perform Fourier transform on a spatial frequency in the two-dimensional image emitted from the light modulation means to generate a number of Fourier transform images corresponding to the plurality of diffraction orders generated from the respective pixels and only select a predetermined Fourier transform image among the Fourier transform images, and to perform inverse Fourier transform on the selected Fourier transform image to form a conjugate image of the two-dimensional image generated by the light modulation means, (C) an oversampling filter provided with a plurality of opening regions and configured to emit a spatial frequency in the conjugate image of the two-dimensional image along diffraction angles corresponding to a plurality of diffraction orders generated from the respective opening regions, (D) Fourier transform image formation means configured to perform Fourier transform on the spatial frequency in the conjugate image of the two-dimensional image emitted from the oversampling filter to generate a number of Fourier transform images corresponding to the plurality of diffraction orders generated from the respective opening regions, (E) Fourier transform image selection means configured to select a Fourier transform image corresponding to a desired diffraction order among the number of Fourier transform images as generated corresponding to the plurality of diffraction orders generated from the respective opening regions, and (F) conjugate image formation means configured to form a conjugate image of the Fourier transform image selected by the Fourier transform image selection means.

To achieve the above-mentioned first three-dimensional image display apparatus, a three-dimensional image display apparatus according to an embodiment mode 5A includes a light source and an optical system, the optical system including (A) a two-dimensional image formation apparatus provided with openings disposed in a two-dimensional matrix manner along an X direction and a Y direction and configured to generate a two-dimensional image by controlling passage, reflection, or diffraction of light from the light source for each opening and to generate diffraction lights of a plurality of diffraction orders on the basis of the two-dimensional image for each opening, (B) a first lens in which a two-dimensional image formation apparatus is arranged on a front-side focal surface, (C) a scattering diffraction restricting opening section arranged on a rear-side focal surface of the first lens and configured to allow only diffraction light of a predetermined diffraction order to pass, (D) a second lens in which the scattering diffraction restriction opening section is arranged on a front-side focal surface, (E) an oversampling filter arranged on a rear-side focal surface of the second lens, provided with $P_{OSF} \times Q_{OSF}$ opening regions (where $P_{OSF}$ and $Q_{OSF}$ are arbitrary positive integers) which are disposed in a two-dimensional matrix manner along the X direction and the Y direction, and configured to generate M×N sets of diffraction lights with M sets from an m-th order to an m'-th order along the X direction (where m and m' are integers, and M is a positive integer) and N sets from an n-th order to an n'-th order along the Y direction (where n and n' are integers, and N is a positive integer) on the basis of a conjugate image of the two-dimensional image generated by the second lens for each opening region, (F) a third lens in which the oversampling filter is arranged on a front-side focal surface, (G) a spatial filter arranged on a rear-side focal surface of the third lens and provided with total M×N closing/opening controllable opening sections with M opening sections arranged in the X direction and N opening sections arranged in the Y direction, (H) a fourth lens in which the spatial filter is arranged on a front-side focal surface, and (I) a fifth lens whose front-side focus is located on a rear-side focus of the fourth lens.

To achieve the above-mentioned first three-dimensional image display apparatus, a three-dimensional image display apparatus according to an embodiment mode 6A includes a light source and an optical system, the optical system including (A) a two-dimensional image formation apparatus composed of a one-dimensional spatial light modulator configured to generate a one-dimensional image; a scan optical system configured to generate a two-dimensional image by two-dimensionally developing the one-dimensional image generated by the one-dimensional spatial light modulator; and diffraction light generation means arranged on a generation surface of the two-dimensional image and configured to generate diffraction lights of a plurality of diffraction orders for each pixel, (B) a first lens in which the diffraction light generation mean is arranged on a front-side focal surface, (C) a scattering diffraction restricting opening section arranged on a rear-side focal surface of the first lens and configured to allow only diffraction light of a predetermined diffraction order to pass, (D) a second lens in which the scattering diffraction restriction opening section is arranged on a front-side focal surface, (E) an oversampling filter arranged on a rear-side focal surface of the second lens, provided with $P_{OSF} \times Q_{OSF}$ opening regions (where $P_{OSF}$ and $Q_{OSF}$ are arbitrary positive integers) which are disposed in a two-dimensional matrix manner along the X direction and the Y direction, and configured to generate M×N sets of diffraction lights with M sets from an m-th order to an m'-th order along the X direction (where m and m' are integers, and M is a positive integer) and N sets from an n-th order to an n'-th order along the Y direction (where n and n' are integers, and N is a positive integer) on the basis of a conjugate image of the two-dimensional image generated by the second lens for each opening region, (F) a third lens in which the oversampling filter is arranged on a front-side focal surface, (G) a spatial filter arranged on a rear-side focal surface of the third lens and provided with total M×N closing/opening controllable opening sections with M opening sections arranged in the X direction and N opening sections arranged in the Y direction, (H) a fourth lens in which the spatial filter is arranged on a front-side focal surface, and (I) a fifth lens whose front-side focus is located on a rear-side focus of the fourth lens.

To achieve the above-mentioned first three-dimensional image display apparatus, a three-dimensional image display apparatus according to an embodiment mode 7A includes a light source and an optical system, the optical system including (A) a two-dimensional image formation apparatus provided with a plurality of pixels and configured to generate a two-dimensional image on the basis of light from the light source, (B) an optical apparatus composed by disposing optical elements having optical power for refracting incident light to converge substantially at one point in a two-dimensional matrix manner, provided with a function as a phase grating for modulating a phase of transmitting light, and configured to emit a spatial frequency in an incident two-dimensional image at diffraction angles corresponding to a plurality of diffraction orders, (C) Fourier transform image formation means configured to perform Fourier transform on the spatial frequency in the two-dimensional image emitted from the optical apparatus to generate a number of Fourier transform images corresponding to the plurality of diffraction orders, (D) Fourier transform image selection means configured to select a Fourier transform image corresponding to a desired diffraction order among the number of Fourier transform images as generated corresponding to the plurality of diffraction orders, and (E) conjugate image formation means configured to form a conjugate image of the Fourier transform image selected by the Fourier transform image selection means.

To achieve the above-mentioned first three-dimensional image display apparatus, a three-dimensional image display apparatus according to an embodiment mode 8A includes a light source and an optical system, the optical system including (A) a two-dimensional image formation apparatus provided with a plurality of pixels and configured to generate a two-dimensional image on the basis of light from the light source, (B) an optical apparatus composed by disposing $P_{OD} \times Q_{OD}$ optical elements (where $P_{OD}$ and $Q_{OD}$ are arbitrary positive integers) having optical power for refracting incident light to converge substantially at one point in a two-dimensional matrix manner along an X direction and a Y direction, provided with a function as a phase grating for modulating a phase of transmitting light, and configured to emit a spatial frequency in an incident two-dimensional image at diffraction angles corresponding to a plurality of diffraction orders, (C) a first lens in which a focus of the optical elements constituting the optical apparatus is located on a front-side focal surface, (D) a spatial filter arranged on a rear-side focal surface of the first lens and provided with total M×N closing/opening controllable opening sections with M opening sections arranged in the X direction and N opening sections arranged in the Y direction, (E) a second lens in which the spatial filter is arranged on a front-side focal surface, and (F) a third lens whose front-side focus is located at a rear-side focus of the second lens.

To achieve the above-mentioned first three-dimensional image display apparatus, a three-dimensional image display apparatus according to an embodiment mode 9A includes a light source and an optical system, the optical system including (A) light modulation means provided with a plurality of pixels and configured to generate a two-dimensional image by modulating light from the light source by the respective pixels and to emit a spatial frequency in the generated two-dimensional image along diffraction angles corresponding to a plurality of diffraction orders generated from the respective pixels, (B) image restriction and generation means configured to perform Fourier transform on a spatial frequency in the two-dimensional image emitted from the light modulation means to generate a number of Fourier transform images corresponding to the plurality of diffraction orders generated from the respective pixels and only select a predetermined Fourier transform image among the Fourier transform images, and to perform inverse Fourier transform on the selected Fourier transform image to form a conjugate image of the two-dimensional image generated by the light modulation means, (C) light ray travelling direction change means configured to change a travelling direction of a light ray emitted from the image restriction and generation means, and (D) imaging means configured to form an image of a light ray emitted from the light ray travelling direction change means.

To achieve the above-mentioned first three-dimensional image display apparatus, a three-dimensional image display apparatus according to an embodiment mode 10A includes a light source and an optical system, the optical system including (A) a two-dimensional image formation apparatus provided with openings disposed in a two-dimensional matrix manner along an X direction and a Y direction and configured to generate a two-dimensional image by controlling passage, reflection, or diffraction of light from the light source for each opening and to generate diffraction lights of a plurality of diffraction orders on the basis of the two-dimensional image for each opening, (B) a first lens in which a two-dimensional image formation apparatus is arranged on a front-side focal surface, (C) a scattering diffraction restricting opening section arranged on a rear-side focal surface of the first lens and configured to allow only diffraction light of a predetermined diffraction order to pass, (D) a second lens in which the scattering diffraction restriction opening section is arranged on a front-side focal surface, (E) light ray travelling direction change means arranged behind the second lens and configured to change a travelling direction of a light ray emitted from the second lens, and (F) a third lens configured to form an image of a light ray emitted from the light ray travelling direction change means.

To achieve the above-mentioned first three-dimensional image display apparatus, a three-dimensional image display apparatus according to an embodiment mode 11A includes a light source and an optical system, the optical system including (A) a two-dimensional image formation apparatus composed of a one-dimensional spatial light modulator configured to generate a one-dimensional image; a scan optical system configured to generate a two-dimensional image by two-dimensional dimensionally developing the one-dimensional image generated by the one-dimensionally spatial light modulator; and diffraction light generation means arranged on a generation surface of the two-dimensional image and configured to generate diffraction lights of a plurality of diffraction orders for each pixel, (B) a first lens in which the diffraction light generation mean is arranged on a front-side focal surface, (C) a scattering diffraction restricting opening section arranged on a rear-side focal surface of the first lens and configured to allow only diffraction light of a predetermined diffraction order to pass, (D) a second lens in which the scattering diffraction restriction opening section is arranged on a front-side focal surface, (E) light ray travelling direction change means arranged behind the second lens and configured to change a travelling direction of a light ray emitted from the second lens, and (F) a third lens configured to form an image of a light ray emitted from the light ray travelling direction change means.

To achieve the above-mentioned first three-dimensional image display apparatus, a three-dimensional image display apparatus according to an embodiment mode 12A includes a light source configured to emit lights from a plurality of discretely arranged light emitting positions and an optical system, the optical system including (A) light modulation means provided with a plurality of pixels and configured to generate a two-dimensional image by modulating lights which are sequentially emitted from different light emitting positions of the light source and are different in incident directions by the respective pixels and to emit a spatial frequency in the generated two-dimensional image along diffraction angles corresponding to a plurality of diffraction orders generated from the respective pixels, and (B) Fourier transform image formation means configured to perform Fourier transform on the spatial frequency in the two-dimensional image emitted from the light modulation means to generate a number of Fourier transform images corresponding to the plurality of diffraction orders and to form the Fourier transform image.

To achieve the above-mentioned first three-dimensional image display apparatus, a three-dimensional image display apparatus according to an embodiment mode 13A includes a light source configured to emit lights from a plurality of discretely arranged light emitting positions and an optical system, the optical system including (A) a two-dimensional image formation apparatus provided with openings disposed in a two-dimensional matrix manner along an X direction and a Y direction and configured to generate a two-dimensional image by controlling passage, reflection, or diffraction of lights which are sequentially emitted from different light emitting positions of the light source and are different in incident directions for each opening and to generate diffraction lights of a plurality of diffraction orders on the basis of the two-dimensional image for each opening, (B) a first lens in which a two-dimensional image formation apparatus is arranged on a front-side focal surface, (C) a second lens whose front-side focal surface is located on a rear-side focal surface of the first lens, and (D) a third lens whose front-side focal surface is located on a rear-side focal surface of the second lens.

Then, the three-dimensional image display apparatus according to the embodiment mode 1A to 13A further includes a semi-transmissive mirror configured to change (vary) a travelling direction of a light ray emitted from the optical system. It should be noted that the semi-transmissive mirror may be a planar mirror whose reflection surface is planar or a concave mirror whose reflection surface is like a concave surface.

Herein, the semi-transmissive mirror can be obtained as a dielectric multilayer film, a dielectric high-reflectivity film, a cut filter, a dichroic filter, a thin metallic film, or the like is affixed on a plate-like, sheet-like, or film-like substrate which is transparent or translucent to the light ray emitted from the optical system or a dielectric multilayer film, a dielectric high-reflectivity film, a cut filter, a dichroic filter, a thin metallic film, or the like is formed on the substrate. As the substrate, a glass substrate, a plastic substrate, a plastic sheet, and a plastic film can be exemplified. As a plastic material constituting the plastic film, a polyethersulfone (PES) film, a polyethylene naphthalate (PEN) film, a polyimide (PI) film, a polyethylene terephthalate (PET) film can be exemplified. As a material constituting the plastic substrate and the plastic sheet, poly(methyl methacrylate) resin (PMMA), polycarbonate resin (PC), polyarylate resin (PAR), polyethylene terephthalate resin (PET), acrylic resin, and ABS resin can be exemplified. Furthermore, as the substrate, a substrate obtained by affixing the above-mentioned various films on a glass substrate, and a substrate obtained by forming a polyimide resin layer, an acrylic resin layer, a polystyrene resin layer, or a silicone rubber layer on a glass substrate can be exemplified. Alternatively, as the substrate, front glass on various vehicles such as an automobile or window glass for a cockpit of a plane can be exemplified. According to such an embodiment mode, it is possible to construct a head up display (HUD) which may display a three-dimensional image.

In the three-dimensional image display apparatus according to the embodiment modes 1A to 13A, it is desirable to adopt such a configuration that the light source and the optical system do not exist on an extension of a path of the light ray whose travelling direction is changed by the semi-transmissive mirror. Herein, a path of the light ray emitted from the optical system before colliding with the semi-transmissive mirror is referred to as "path-1", and a path of the light ray colliding with the semi-transmissive mirror to be reflected and heading to the observer is referred to as "path-2". An "extension of the path of the light ray" refers to a path extending from the observer side along the path-2 and penetrating the semi-transmissive mirror in a straight line manner to be extended to the behind of the semi-transmissive mirror. Alternatively, it is desirable to adopt such a configuration that an image of the light source does not exist on an extension of a path of the light ray whose travelling direction is changed by the semi-transmissive mirror (that is, a configuration where the image of the light source is hidden from the observer). In order to achieve such a configuration, the arrangement of the semi-transmissive mirror may be optimized, or a shielding member (for example, a partition) composed of an opaque material may be arranged on the extension of the path of the light ray.

Each of the three-dimensional image display apparatuses according to the embodiment modes 1A to 13A can further include light ray control means configured to change the travelling direction of the light ray emitted from the optical system and control a collecting state of the light ray emitted from the optical system at an observation spot instead of the semi-transmissive mirror configured to change the travelling direction of the light ray emitted from the optical system. With this configuration, the above-mentioned second three-dimensional image display apparatus can be realized. It should be noted that the three-dimensional image display apparatus of such an embodiment mode is referred to as a three-dimensional image display apparatus according to embodiment modes 1B to 13B.

In the three-dimensional image display apparatus according to the embodiment modes 1B to 13B, light ray control means can be composed of a concave mirror whose reflection surface is like a concave surface (a total reflection mirror or the semi-transmissive mirror). Alternatively, in the three-dimensional image display apparatus according to the embodiment modes 1B to 13B, the light ray control means can be composed of a lens which the light ray emitted from the optical system enters and a mirror which the light ray emitted from the lens (composed of a planar mirror or a concave mirror and also a total reflection mirror or a semi-transmissive mirror). Alternatively, a configuration can be adopted in which the light ray control means can be composed of a mirror (composed of a planar mirror or a concave mirror and also a total reflection mirror or a semi-transmissive mirror), and the light ray control means further include the detection means configured to detect the observation spot to control the mirror position on the basis of the observation spot detection result by the detection means. That is, in a case where the observer is moved, while following (in synchronization with) the movement of the observer, the mirror position may be controlled. Alternatively, a configuration can be adopted in which the light ray control means can be composed of a lens which the light ray emitted from the optical system enters and a mirror which the light ray emitted from the lens (composed of a planar mirror or a concave mirror and also a total reflection mirror or a semi-transmissive mirror), and the light ray control means further includes the detection means configured to detect the observation spot to control the collecting state of the lens on the basis of the observation spot detection result by the detection means. That is, in a case where the observer is moved, while following (in synchronization with) the movement of the observer, the collecting state of the lens may be controlled. It should be noted that on the basis of the observation spot detection result by the detection means, the control on the light ray that should be emitted from the optical system may be performed. That is, in a case where the observer is moved, while following (in synchronization with) the movement of the observer, the control on the light ray that should be emitted from the optical system may be performed. The lens can be composed, for example, of any one of a biconvex lens, a plano-convex lens, and a meniscus convex lens, or may be composed of a Fresnel lens. In addition, the lens can be composed by combining these various convex lenses with each other and further can be composed by combining a concave lens with these various convex lenses. The detection means can be composed, for example, of a camera provided with a CCD element. As long as the observation spot can be detected, (specifically, for example, as long as the face and eyes of the observer can be detected, the detection means may be basically arranged at any location, for example, in the vicinity of the three-dimensional image display apparatus or inside the optical system.

The three-dimensional image display apparatus according to the embodiment mode 1A and the three-dimensional image display apparatus according to the embodiment mode 1B which include the above-mentioned preferable modes and configurations are collectively referred to as "three-dimensional image display apparatus according to an embodiment mode 1" for the sake of convenience. Similarly, the three-dimensional image display apparatus according to the embodiment mode jA (where j=2, 3 . . . 13) and the three-dimensional image display apparatus according to the embodiment mode jB which include the above-mentioned preferable modes and configurations are collectively referred to as "three-dimensional image display apparatus according to an embodiment mode j" for the sake of convenience.

In the three-dimensional image display apparatus according to the embodiment mode 1, it is desirable to adopt a configuration that the conjugate image formation means includes inverse Fourier transform means configured to generate a real image of the two-dimensional image generated by the light modulation means, by performing inverse Fourier transform on the Fourier transform image selected by the Fourier transform image selection means.

In the three-dimensional image display apparatus according to the embodiment mode 1 including the above-mentioned preferable configuration, a mode can be made in which the light modulation means is composed of a two-dimensional spatial light modulator having a plurality of pixels two-dimensionally disposed, and the respective pixels have an opening. In this case, the two-dimensional spatial light modulator preferably is composed of a liquid crystal display apparatus (to be more specific, a transmissive or reflective liquid crystal display apparatus) or preferably has a configuration in which a movable mirror is provided in the respective openings of the two-dimensional spatial light modulator (a configuration made of a two-dimensional type MEMS in which the movable mirrors are disposed in a two-dimensional matrix manner). Herein, the planar shape of the opening is desirably rectangle. When the planar shape of the opening is set as rectangle, Fraunhofer diffraction is generated, and as will be described below, M×N sets of diffraction lights are generated. That is, with the openings, the amplitude grating is formed with which the amplitude (intensity) of the incident light wave is periodically modulated, and the light amount distribution matching with the light transmission distribution of the grating can be obtained.

Alternatively, in the three-dimensional image display apparatus according to the embodiment mode 1 including the above-mentioned preferable configuration and mode, the light modulation means can have a configuration including (A-1) a one-dimensional spatial light modulator configured to generate a one-dimensional image, (A-2) a scan optical system configured to generate a two-dimensional image by developing the one-dimensional image generated by the one-dimensional spatial light modulator, and (A-3) a grating filter configured to emit a spatial frequency in the generated two-dimensional image which is arranged on a generation surface of the two-dimensional image along diffraction angles according to a plurality of diffraction orders. It should be noted that the grating filter may be composed of an amplitude grating or a phase grating configured to modulate the phase of the transmissive light amount, that is, to modulate the phase while keeping the light amplitude (intensity) as it is.

Furthermore, in the three-dimensional image display apparatus according to the embodiment mode 1 including the above-mentioned preferable configuration and mode, a configuration can be adopted in which the Fourier transform image formation means is composed of a lens, the light modulation means is arranged on the front-side focal surface of this lens, and the Fourier transform image selection means is arranged on the rear-side focal surface of this lens.

Also, in the three-dimensional image display apparatus according to the embodiment mode 1 including the above-mentioned preferable configuration and mode, a configuration can be adopted in which the Fourier transform image selection means has a number of opening/closing controllable opening sections corresponding to the plurality of diffraction orders. In this case, the Fourier transform image selection means can be composed of (to be more specific, a transmissive or reflective liquid crystal display apparatus), or can be composed of a two-dimensional type MEMS in which the movable mirrors are disposed in a two-dimensional matrix manner. In addition, in the Fourier transform image selection means, a configuration can be adopted in which as a desired opening section is set in an opening state in synchronization with the generation timing of the two-dimensional image by the light modulation means, the Fourier transform image corresponding to the desired diffraction order is selected.

Furthermore, in the three-dimensional image display apparatus according to the embodiment mode 1 including the above-mentioned preferable configuration and mode, a configuration can be adopted that the spatial frequency in the two-dimensional image is comparable to the image information in which the spatial frequency of the pixel structure is set as a carrier frequency.

In the three-dimensional image display apparatus according to the embodiment mode 2, a mode can be made in which the two-dimensional image formation apparatus is composed of a liquid crystal display apparatus having two-dimensionally disposed P×Q pixels (to be more specific, a transmissive or reflective liquid crystal display apparatus), and the respective pixels have an opening, or it is preferable to adopt a configuration in which a movable mirror is provided in the respective openings of the two-dimensional image formation apparatus (a configuration made of a two-dimensional type MEMS in which the movable mirrors are respectively arranged in the openings disposed in a two-dimensional matrix manner). Herein, the planar shape of the opening is desirably rectangle. When the planar shape of the opening is set as rectangle, Fraunhofer diffraction is generated, and M×N sets of diffraction lights are generated. That is, with the openings, the amplitude grating is formed.

In the three-dimensional image display apparatus including the above-mentioned preferable configuration and the mode according to the embodiment mode 2, the spatial filter can have a configuration of being composed of a liquid crystal display apparatus having M×N pixels (to be more specific, a transmissive or reflective liquid crystal display apparatus), and also have a configuration of being composed of a two-dimensional type MEMS in which the movable mirrors are disposed in a two-dimensional matrix manner. In addition, in the spatial filter, a configuration can be adopted that a desired opening section is set in an opening state in synchronization with the generation timing of the two-dimensional image by the two-dimensional image formation apparatus.

In the three-dimensional image display apparatus according to the embodiment mode 3, a configuration can be adopted in which the one-dimensional spatial light modulator generates a one-dimensional by diffracting the light from the light source.

In the three-dimensional image display apparatus including the above-mentioned preferable configuration according to the embodiment mode 3, the spatial filter can have a configuration of being composed of a liquid crystal display apparatus having M×N pixels (to be more specific, a transmissive or reflective liquid crystal display apparatus) and also have a configuration of being composed of a two-dimensional type MEMS in which the movable mirrors are disposed in a two-dimensional matrix manner. In addition, in the spatial filter, a configuration can be adopted that a desired opening section is set in an opening state in synchronization with the generation timing of the two-dimensional image.

Furthermore, in the three-dimensional image display apparatus including the above-mentioned preferable configuration and the mode according to the embodiment mode 3, a mode can be adopted that on a rear side of the third lens, a member configured to generate anisotropic light diffusion (an anisotropic diffusion filter, an anisotropic diffusion sheet, or an anisotropic diffusion film) is further arranged.

In the three-dimensional image display apparatus according to the embodiment mode 4, it is desirable to adopt a configuration that the conjugate image formation means includes inverse Fourier transform means configured to generate a real image of the two-dimensional image generated by the image restriction and generation means, by performing inverse Fourier transform on the Fourier transform image selected by the Fourier transform image selection means.

In the three-dimensional image display apparatus including the above-mentioned preferable configuration according to the embodiment mode 4, a mode can be made in which the light modulation means is composed of a two-dimensional spatial light modulator having a plurality of pixels two-dimensionally disposed, and the respective pixels have an opening. In this case, the two-dimensional spatial light modulator preferably is composed of a liquid crystal display apparatus (to be more specific, a transmissive or reflective liquid crystal display apparatus) or preferably has a configuration in which a movable mirror is provided in the respective openings of the two-dimensional spatial light modulator (a configuration made of a two-dimensional type MEMS in which the movable mirrors are disposed in a two-dimensional matrix manner). Herein, the planar shape of the opening is desirably rectangle. When the planar shape of the opening is set as rectangle, Fraunhofer diffraction is generated, and $M_0 \times N_0$ sets of diffraction lights are generated. That is, with the openings, the amplitude grating is formed with which the amplitude (intensity) of the incident light wave is periodically modulated, and the light amount distribution matching with the light transmission distribution of the grating can be obtained.

Alternatively, in the three-dimensional image display apparatus including the above-mentioned preferable configuration and the mode according to the embodiment mode 4, the light modulation means can have a configuration including (A-1) a one-dimensional spatial light modulator configured to generate a one-dimensional image, (A-2) a scan optical system configured to generate a two-dimensional image by developing the one-dimensional image generated by the one-dimensional spatial light modulator, and (A-3) a grating filter configured to emit a spatial frequency in the generated two-dimensional image which is arranged on a generation surface of the two-dimensional image along diffraction angles according to a plurality of diffraction orders. It should be noted that the grating filter may be composed of an amplitude grating or a phase grating configured to modulate the phase of the transmissive light amount, that is, to modulate the phase while keeping the light amplitude (intensity) as it is.

Furthermore, in the three-dimensional image display apparatus including the above-mentioned preferable configuration and the mode according to the embodiment mode 4, a mode can be adopted in which the image restriction and generation means is composed of (B-1) two sheets of lens, and (B-2) a scattering diffraction restricting opening section 33 arranged between the two sheets of lens and configured to only allow the predetermined the Fourier transform image to pass.

Also, in the three-dimensional image display apparatus including the above-mentioned preferable configuration and the mode according to the embodiment mode 4, a mode can be adopted that the oversampling filter is composed of a diffraction light generation member, to be more specific, for example, a grating filter. It should be noted that the grating filter may be composed of an amplitude grating or a phase grating.

Furthermore, in the three-dimensional image display apparatus including the above-mentioned preferable configuration and the mode according to the embodiment mode 4, a configuration can be adopted in which the Fourier transform image formation means is composed of a lens, an oversampling filter is arranged on a front-side focal surface of this lens, and the Fourier transform image selection means is arranged on the rear-side focal surface of this lens.

Also, in the three-dimensional image display apparatus including the above-mentioned preferable configuration and the mode according to the embodiment mode 4, a configuration can be adopted in which the Fourier transform image selection means has a number of opening/closing controllable opening sections corresponding to a plurality of diffraction orders generated from the respective opening regions. In this case, the Fourier transform image selection means can adopt a configuration of being composed of a liquid crystal display apparatus (to be more specific, a transmissive or reflective liquid crystal display apparatus) and also adopt a configuration of being composed of a two-dimensional type MEMS in which the movable mirrors are disposed in a two-dimensional matrix manner. In addition, in the Fourier transform image selection means, a configuration can be adopted in which as a desired opening section is set in an opening state in synchronization with the generation timing of the two-dimensional image by the light modulation means, the Fourier transform image corresponding to the desired diffraction order is selected.

Furthermore, in the three-dimensional image display apparatus including the above-mentioned preferable configuration and the mode according to the embodiment mode 4, a configuration can be adopted that the spatial frequency in the two-dimensional image is comparable to the image information in which the spatial frequency of the pixel structure is set as a carrier frequency, and further the spatial frequency in the conjugate image of the two-dimensional image is a spatial frequency obtained by removing a spatial frequency of the pixel structure from the spatial frequency in the two-dimensional image. That is, the spatial frequency which is obtained as the first-order diffraction in which the zero-order diffraction of the plane wave component is set as the carrier frequency and is equal to or lower than the half of the spatial frequency for the pixel structure (opening construction) of the light modulation means is selected by the image restriction and generation means or alternatively passes through the scattering diffraction restricting opening section 33. The spatial frequency displayed by the light modulation means or a two-dimensional image formation apparatus described below is all transmitted.

In the three-dimensional image display apparatus according to the embodiment mode 5, a mode can be made in which the two-dimensional image formation apparatus is composed of a liquid crystal display apparatus having two-dimensionally disposed P×Q pixels (to be more specific, a transmissive or reflective liquid crystal display apparatus), the respective pixels have an opening, and $P_{OSF}>P$ and $Q_{OSF}>Q$ are satisfied, or the two-dimensional image formation apparatus is provided with P×Q openings, a movable mirror is provided in the respective openings (a configuration made of a two-dimensional type MEMS in which the movable mirrors are respectively arranged in the openings disposed in a two-dimensional matrix manner), and $P_{OSF}>P$ and $Q_{OSF}>Q$ are satisfied. the planar shape of the opening is desirably rectangle. When the planar shape of the opening is set as rectangle, Fraunhofer diffraction is generated, and $M_0 \times N_0$ sets of diffraction lights are generated. That is, with the openings, the amplitude grating is formed. In addition, a mode can be adopted that the oversampling filter is composed of a diffraction light generation member, to be more specific, for example, a grating filter. It should be noted that the grating filter may be composed of an amplitude grating or a phase grating.

In the three-dimensional image display apparatus including the above-mentioned preferable configuration and the mode according to the embodiment mode 5, a mode can be made in which the spatial filter is composed of a liquid crystal display apparatus having M×N pixels (to be more specific, a transmissive or reflective liquid crystal display apparatus), and also the spatial filter can adopt a configuration composed of a two-dimensional type MEMS in which the movable mirrors are disposed in a two-dimensional matrix manner. In addition, in the spatial filter, a configuration can be adopted that a desired opening section is set in an opening state in synchronization with the generation timing of the two-dimensional image by the two-dimensional image formation apparatus.

In the three-dimensional image display apparatus according to the embodiment mode 6, a mode can be adopted in which the one-dimensional spatial light modulator has P pixels along the X direction and generates a one-dimensional by diffracting the light from the light source, and $P_{OSF}>P$ is satisfied. a mode can be adopted that the oversampling filter is composed of a diffraction light generation member, to be more specific, for example, a grating filter. It should be noted that the grating filter may be composed of an amplitude grating or a phase grating.

In the three-dimensional image display apparatus including the above-mentioned preferable configuration and the mode according to the embodiment mode 6, a mode can be made in which the spatial filter is composed of a liquid crystal display apparatus having M×N pixels (to be more specific, a transmissive or reflective liquid crystal display apparatus), and also the spatial filter can adopt a configuration composed of a two-dimensional type MEMS in which the movable mirrors are disposed in a two-dimensional matrix manner. In addition, in the spatial filter, a configuration can be adopted that a desired opening section is set in an opening state in synchronization with the generation timing of the two-dimensional image.

In the three-dimensional image display apparatus including the above-mentioned various preferable configurations and modes according to the embodiment modes 4 to 6, as a construction of the grating filter constituting the oversampling filter, $P_{OSF} \times Q_{OSF}$ concave sections are formed on planar glass in a two-dimensional matrix manner (phase grating type) can be exemplified. Herein, these concave sections are equivalent to the opening region. When a planer shape of the opening region (concave section) is set, for example, as rectangular, Fraunhofer diffraction is generated, and M×N sets of diffraction lights are generated. In addition, as described above, $P_{OSF} > P$ and $Q_{OSF} > Q$ are preferably satisfied, but to be more specific, $1 < P_{OSF}/P \leq 4$ and $1 < Q_{OSF}/Q \leq 4$ can be exemplified.

In the three-dimensional image display apparatus according to the embodiment mode 7, it is desirable to adopt a configuration that the conjugate image formation means includes inverse Fourier transform means configured to generate a real image of the two-dimensional image generated by the two-dimensional image formation apparatus, by performing inverse Fourier transform on the Fourier transform image selected by the Fourier transform image selection means.

In the three-dimensional image display apparatus including the above-mentioned preferable configuration according to the embodiment mode 7, the two-dimensional image formation apparatus is preferably composed of a liquid crystal display apparatus (to be more specific, a transmissive or reflective liquid crystal display apparatus).

Alternatively, in the three-dimensional image display apparatus including the above-mentioned preferable configuration according to the embodiment mode 7, the two-dimensional image formation apparatus can have a configuration including (A-1) a one-dimensional image formation apparatus configured to generate a one-dimensional image, and (A-2) a scan optical system configured to two-dimensionally developing the one-dimensional image generated by the one-dimensional image formation apparatus to generate a two-dimensional image.

Furthermore, in the three-dimensional image display apparatus including the above-mentioned preferable configuration and the mode according to the embodiment mode 7, a configuration can be adopted in which the Fourier transform image formation means is composed of a lens; a focus of the optical element constituting the optical apparatus is located on a front-side focal surface of the lens; and the Fourier transform image selection means is arranged on a rear-side focal surface of the lens.

Also, in the three-dimensional image display apparatus including the above-mentioned preferable configuration and the mode according to the embodiment mode 7, a configuration can be adopted in which the Fourier transform image selection means has a number of opening/closing controllable opening sections corresponding to the plurality of diffraction orders. In this case, a mode can be made in which the Fourier transform image selection means is composed of a liquid crystal display apparatus having M×N pixels (to be more specific, a transmissive or reflective liquid crystal display apparatus), and also the Fourier transform image selection means can adopt a configuration composed of a two-dimensional type MEMS in which the movable mirrors are disposed in a two-dimensional matrix manner. In addition, in the Fourier transform image selection means, a configuration can be adopted that as a desired opening section is set in an opening state in synchronization with the generation timing of the two-dimensional image by the two-dimensional image formation apparatus, the Fourier transform image corresponding to the desired diffraction order is selected.

Furthermore, in the three-dimensional image display apparatus including the above-mentioned preferable configuration and the mode according to the embodiment mode 7, a configuration can be adopted that the spatial frequency in the two-dimensional image is comparable to the image information in which the spatial frequency of the pixel structure in the two-dimensional image formation apparatus is set as the carrier frequency.

In the three-dimensional image display apparatus according to the embodiment mode 8, a configuration can be adopted that the two-dimensional image formation apparatus is composed of a liquid crystal display apparatus having two-dimensionally disposed P×Q pixels (where $P_{OD} \geq P$, $Q_{OD} \geq Q$) (to be more specific, a transmissive or reflective liquid crystal display apparatus). It should be noted that as more specific relations between $P_{OD}$ and P and between $Q_{OD}$ and Q, $1 \leq P_{OD}/P \leq 4$ and $1 \leq Q_{OD}/Q \leq 4$ can be exemplified.

Alternatively, in the three-dimensional image display apparatus according to the embodiment mode 8, the two-dimensional image formation apparatus can have a configuration including (A-1) a one-dimensional image formation apparatus configured to generate a one-dimensional image, and (A-2) a scan optical system configured to two-dimensionally developing the one-dimensional image generated by the one-dimensional image formation apparatus to generate a two-dimensional image. Then, in this case, a configuration can be adopted in which the one-dimensional image formation apparatus generates a one-dimensional by diffracting the light from the light source.

Furthermore, a mode can be adopted that on a rear side of the third lens, a member configured to generate anisotropic light diffusion (an anisotropic diffusion filter, an anisotropic diffusion sheet, or an anisotropic diffusion film) is further arranged.

In the three-dimensional image display apparatus including the above-mentioned preferable configuration and the mode according to the embodiment mode 8, a mode can be made in which the spatial filter is composed of a liquid crystal display apparatus having M×N pixels (to be more specific, a transmissive or reflective liquid crystal display apparatus), and also the spatial filter can adopt a two-dimensional type MEMS in which the movable mirrors are disposed in a two-dimensional matrix manner. In addition, in the spatial filter, a configuration can be adopted that a desired opening section is set in an opening state in synchronization with the generation timing of the two-dimensional image by the two-dimensional image formation apparatus.

In the three-dimensional image display apparatus including the above-mentioned various preferable configurations and modes according to the embodiment modes 7 and 8, the respective pixels of the two-dimensional image formation apparatus have an opening whose planar shape is rectangular. Then, as a specific configuration of the three-dimensional image display apparatus according to the embodiment modes 7 and 8, the following configuration can be exemplified. That is, the planar shape of the optical element is preferably set identical or analogous to the planar shape of the opening of the corresponding pixel. In addition, each of the optical elements is desirably composed of a convex lens having a positive optical power, or alternatively, composed of a concave lens having a negative optical power, or alternatively, composed of a Fresnel lens having a positive optical power, or alternatively, composed of a Fresnel lens having a negative optical power. In other words, each of the optical elements is composed of a refracting grating-like element. Then, the optical apparatus is composed of a type of a micro lens array. As a material constituting the optical apparatus, glass or plastic can be exemplified. The optical apparatus can be manufactured on the basis of a related art method of producing the micro lens array. It should be noted that the optical apparatus is adjacently arranged behind the two-dimensional image formation apparatus. In this manner, as the optical apparatus is adjacently arranged behind the two-dimensional image formation apparatus, an influence of a diffraction phenomenon derived from the two-dimensional image formation apparatus can be ignored. Alternatively, for example, two sheets of convex lenses are arranged between the two-dimensional image formation apparatus and the optical apparatus. The two-dimensional image formation apparatus is arranged on a front-side focal surface of one convex lens, and a front-side focus of the one convex lens is located on a rear-side focus of the other convex lens. A configuration can also be adopted that the optical apparatus is arranged on the rear-side focal surface of the other convex lens. In general, when the diffraction grating is sorted out into two categories, it is possible to sort out the diffraction grating into an amplitude grating in which the amplitude (intensity) of the incident light wave is periodically modulated, and the light amount distribution matched with the light transmission distribution of the grating can be obtained and a phase grating in which the phase of the transmissive light amount is modulated, that is, the amplitude (intensity) of the light is unchanged, and the phase is modulated, but in the three-dimensional image display apparatus according to the embodiment modes 7 and 8, the optical apparatus functions as the latter phase grating.

In the three-dimensional image display apparatus according to the embodiment mode 9, a mode can be made in which the light modulation means is composed of a two-dimensional spatial light modulator having a plurality of pixels two-dimensionally disposed, and the respective pixels have an opening. In this case, the two-dimensional spatial light modulator preferably is composed of a liquid crystal display apparatus (to be more specific, a transmissive or reflective liquid crystal display apparatus) or preferably has a configuration in which a movable mirror is provided in the respective openings of the two-dimensional spatial light modulator (a configuration made of a two-dimensional type MEMS in which the movable mirrors are disposed in a two-dimensional matrix manner). Herein, the planar shape of the opening is desirably rectangle. When the planar shape of the opening is set as rectangle, Fraunhofer diffraction is generated, and $M_0 \times N_0$ sets of diffraction lights are generated. That is, with the openings, the amplitude grating is formed with which the amplitude (intensity) of the incident light wave is periodically modulated, and the light amount distribution matching with the light transmission distribution of the grating can be obtained.

Alternatively, in the three-dimensional image display apparatus including the above-mentioned preferable configuration and the mode according to the embodiment mode 9, the light modulation means can have a configuration including (A-1) a one-dimensional spatial light modulator configured to generate a one-dimensional image, (A-2) a scan optical system configured to generate a two-dimensional image by developing the one-dimensional image generated by the one-dimensional spatial light modulator, and (A-3) a grating filter configured to emit a spatial frequency in the generated two-dimensional image which is arranged on a generation surface of the two-dimensional image along diffraction angles according to a plurality of diffraction orders. It should be noted that the grating filter may be composed of an amplitude grating or a phase grating configured to modulate the phase of the transmissive light amount, that is, to modulate the phase while keeping the light amplitude (intensity) as it is.

Furthermore, the three-dimensional image display apparatus including the above-mentioned preferable configuration and the mode according to the embodiment mode 9, the image restriction and generation means is composed of (B-1) a first lens configured to perform Fourier transform on a spatial frequency in a two-dimensional image emitted from the light modulation means to generate a number of Fourier transform images corresponding to a plurality of diffraction orders generated from the respective pixels, (B-2) a scattering diffraction restricting opening section 33 arranged on a side of light ray travelling direction change means than the first lens and configured to only select a predetermined Fourier transform image among the Fourier transform images, and (B-3) a second lens arranged on the side of the light ray travelling direction change means than the scattering diffraction restricting opening section 33 and configured to perform inverse Fourier transform on the selected Fourier transform image to form a conjugate image of the two-dimensional image generated by the light modulation means.

Also, a mode can be adopted in which the scattering diffraction restricting opening section 33 is arranged on a rear-side focal surface of the first lens and on a front-side focal surface of the second lens.

Also, in the three-dimensional image display apparatus including the above-mentioned various preferable configurations and modes according to the embodiment mode 9, the light ray travelling direction change means can be composed of reflectance optical means capable of changing (varying) an angle of the emitted light ray with respect to the incident light ray, to be specific, for example, a mirror, or alternatively, transmissive optical means capable of changing (varying) an angle of the emitted light ray with respect to the incident light ray, to be specific, for example, a prism.

Furthermore, in the three-dimensional image display apparatus including the above-mentioned various preferable configurations and modes according to the embodiment mode 9, a configuration can be adopted that the spatial frequency in the two-dimensional image is comparable to the image information in which the spatial frequency of the pixel structure is set as a carrier frequency, and further the spatial frequency in the conjugate image of the two-dimensional image is a spatial frequency obtained by removing a spatial frequency of the pixel structure from the spatial frequency in the two-dimensional image. That is, the spatial frequency which is obtained as the first-order diffraction in which the zero-order diffraction of the plane wave component is set as the carrier frequency and is equal to or lower than the half of the spatial frequency for the pixel structure (opening construction) of the light modulation means is selected by the image restriction and generation means or alternatively passes through the scattering diffraction restricting opening section 33. The spatial frequency displayed by the light modulation means or a two-dimensional image formation apparatus described below is all transmitted.

In the three-dimensional image display apparatus according to the embodiment mode 10, a mode can be made in which the two-dimensional image formation apparatus is composed of a liquid crystal display apparatus having two-dimensionally disposed P×Q pixels (to be more specific, a transmissive or reflective liquid crystal display apparatus) and the respective pixels have an opening, or P×Q openings are provided in the two-dimensional image formation apparatus, and a movable mirror is provided in the respective openings (composed of a configuration made of a two-dimensional type MEMS in which the movable mirrors are respectively arranged in the openings disposed in a two-dimensional matrix manner). the planar shape of the opening is desirably rectangle. When the planar shape of the opening is set as rectangle, Fraunhofer diffraction is generated, and M×N sets of diffraction lights are generated. That is, with the openings, the amplitude grating is formed.

In the three-dimensional image display apparatus according to the embodiment mode 11, a mode can be adopted in which the one-dimensional spatial light modulator has P pixels along the X direction and generates a one-dimensional by diffracting the light from the light source.

In the three-dimensional image display apparatus including the above-mentioned preferable configuration and the mode according to the embodiment modes 10 and 11, a configuration can be adopted in which the light ray travelling direction change means is composed of reflectance optical means capable of changing (varying) an angle of the emitted light ray with respect to the incident light ray, to be specific, for example, a mirror, or alternatively, transmissive optical means capable of changing (varying) an angle of the emitted light ray with respect to the incident light ray, to be specific, for example, a prism.

In the description of the three-dimensional image display apparatus according to the embodiment modes 9 to 11, a part of an optical axis up to the light ray travelling direction change means is set as a z axis, orthogonal coordinates in a plane orthogonal to the z axis are set as an x axis and a y axis, a direction parallel to the x axis is set as an X direction, and a direction parallel to the y axis is set as a Y direction. The X direction is set, for example, as a horizontal direction, and the Y direction is set, for example, as a vertical direction in the image display apparatus. In addition, a part of the optical axis subsequent to the light ray travelling direction change means is set as a z' axis, orthogonal coordinates in a plane orthogonal to the z' axis are set as an x' axis and a y' axis, a direction parallel to the x' axis is set as an X' direction, and a direction parallel to the y' axis is set as a Y' direction. The X' direction is set, for example, as a horizontal direction in the image display apparatus, and Y' direction is set, for example, as a vertical direction in the image display apparatus.

In the three-dimensional image display apparatus according to the embodiment modes 9 to 11, the change in the travelling direction of the light ray by the light ray travelling direction change means should be in synchronization with the generation of the two-dimensional image based on the light modulation means (the two-dimensional image formation apparatus). Herein, after a certain image is formed by the light ray travelling direction change means on an imaging surface which will be described below, the position of the light ray travelling direction change means is changed (varied). Until a next image is formed on the imaging surface by the light ray travelling direction change means, an operation of the light source is interrupted, and the two-dimensional image should not be generated by the light modulation means (the two-dimensional image formation apparatus).

In this manner, in order to set the imaging position on the imaging surface as a position disposed in a two-dimensional matrix manner at $S_0 \times T_0$ locations, in a case where a mirror is adopted as the light ray travelling direction change means, for example, the mirror is composed of a polygon mirror, and the inclination angle of the rotation axis is controlled while the polygon mirror is rotated about the rotational axis. In addition, in a case where a prism is adopted as the light ray travelling direction change means, for example, a configuration may be adopted that the prism is rotated (varied) in a desired direction about the z axis. As the prism, in addition to a related art prism, for example, a prism composed of a liquid crystal lens can also be used. It should be noted that the mirror in which the movable mirrors are disposed in a two-dimensional matrix manner has a pixel structure and therefore is not used as the light ray travelling direction change means because the pixel structure functions as a carrier and a new diffraction image is generated.

In the three-dimensional image display apparatus according to the embodiment modes 9 to 11, when the light ray emitted from the light ray travelling direction change means is imaged by the imaging means or the third lens, a position where the image is formed (which is a position in an X'Y' plane) is preferably set as a position disposed in a two-dimensional matrix manner of $S_0 \times T_0$ locations. Herein, the numerals of $S_0$ and $T_0$ are not particularly limited, but $4 \leq S_0 \leq 11$, or preferably for example, $7 \leq S_0 \leq 9$ can be exemplified. Also, $4 \leq T_0 \leq 11$, or preferably for example, $7 \leq T_0 \leq 9$ can be exemplified. The value of $S_0$ and the value of $T_0$ may be equal to each other or different from each other. It should be noted that an X'Y' plane where the light ray emitted from the light ray travelling direction change means is imaged by the imaging means or the third lens will be hereinafter referred to as imaging surface.

The three-dimensional image display apparatus according to the embodiment mode 12 preferably further includes (C) conjugate image formation means configured to form a conjugate image of the Fourier transform image imaged by the Fourier transform image formation means.

In the three-dimensional image display apparatus according to the embodiment modes 12 and 13, when the number of discretely arranged light emitting positions is set as $LEP_{Total}$, the number of Fourier transform images generated by light which are emitted from the respective light emitting positions and are different in incident directions to the light modulation means or the two-dimensional image formation apparatus (hereinafter, which may be referred as illumination light) is (plural diffraction orders)$\times LEP_{Total}$. In addition, the Fourier transform images obtained on the basis of the illumination light are imaged in a spot manner at discrete positions while corresponding to the respective light emitting positions by the Fourier transform image formation means or the first lens. It should be noted that when the Fourier transform image selection means described below or the spatial filter is arranged, the number of Fourier transform images generated on the basis of the illumination light is eventually, for example, $LEP_{Total}$. It should be noted that in a case where the plurality of discretely arranged light emitting positions are discretely disposed in a two-dimensional matrix manner, the number of light emitting positions is represented as "$U_0 \times V_0$". Herein, $U_0 \times V_0 = \text{LEP}_{Total}$ is established.

In the three-dimensional image display apparatus according to the embodiment modes 12 and 13, a configuration can be adopted that the light source is provided with a plurality of light emitting elements disposed in a two-dimensional matrix manner. It should be noted that in this case, when the number of the plurality of light emitting elements disposed in a two-dimensional matrix manner is set as $U_0' \times V_0'$, depending on a specification of the light source, a case where $U_0' = U_0$ and $V_0' = V_0$ exists, and for example, a case where $U_0'/3 = U_0$ and $V_0'/3 = V_0$ also exists. Then, in this case, it is preferable that a lens (for example, a collimator lens) is arranged between the light source and the light modulation means or the two-dimensional image formation apparatus, and the light source is located on a front-side focal surface of this lens (or in the vicinity of the front-side focal surface), so that the light (illumination light) emitted from the lens becomes parallel light (substantially parallel light). Alternatively, in the three-dimensional image display apparatus according to the embodiment modes 12 and 13, a configuration can be adopted in which the light source is provided with a light emitting element and light ray travelling direction change means configured to change the incident direction of light which is the light emitted from the light emitting element and incident on the light modulation means or the two-dimensional image formation apparatus. Then, in this case, as the light ray travelling direction change means, a refractive optical means capable of changing (varying) the angle of the emitted light ray with respect to the incident light ray (for example, a lens, to be more specific, for example, a collimator lens or a micro lens array), or alternatively, reflective optical means capable of changing (varying) the position and the angle of the emitted light ray with respect to the incident light ray (specifically, for example, a mirror, to be more specific, for example, a polygon mirror, or a combination of a polygon mirror and a mirror, a convex mirror composed of a curved surface, a concave mirror composed of a curved surface, a convex mirror composed of a polyhedron, or a concave mirror composed of a polyhedron) can be exemplified.

As described above, in the three-dimensional image display apparatus according to the embodiment modes 12 and 13, in a case where the light source has a configuration of being provided with a plurality of light emitting elements disposed in a two-dimensional matrix manner, it is desirable that the emitting directions of the light emitted from the respective light emitting elements are different from each other, the respective light emitting elements are arranged so that the incident directions to the light modulation means or the two-dimensional image formation apparatus are varied. In addition, as described above, in a case where the refractive optical means is adopted as the light ray travelling direction change means, a configuration of including the plurality of light emitting elements disposed in a two-dimensional matrix manner is preferable. In this case, as a result of changing the emitting direction of the lights by the refractive optical means when being sequentially emitted from the respective light emitting elements to be incident on the refractive optical means and output from the refractive optical means, it is possible to change the incident direction of the light incident on the light modulation means or the two-dimensional image formation apparatus. It should be noted that in this case, the emitting directions of the light emitted from the respective light emitting elements may be the same or different from each other. On the other hand, as described above, in a case where the reflective optical means is adopted as the light ray travelling direction change means, the number of the light emitting elements may be one, or for example, $U_0$. Then, the number of light emitting positions when being emitted from the reflective optical means may be set as $U_0 \times V_0 = \text{LEP}_{Total}$ by performing a control on the positions or the like of the reflective optical means. To be specific, for example, the inclination angle of the rotation axis may be controlled while the polygon mirror is rotated about the rotational axis, or alternatively, the position of the light incident from the light emitting element to the mirror may be controlled, or alternatively, the position of the illumination light emitted from the mirror may be controlled, or alternatively, a state of the illumination light emitted from the mirror (for example, passage or interruption of the illumination light) may be controlled. Then, with this configuration, it is possible to change the incident direction of the light incident on the light modulation means or the two-dimensional image formation apparatus.

Furthermore, in the three-dimensional image display apparatus including the above-mentioned preferable configuration according to the embodiment mode 12, a configuration can be adopted in which the Fourier transform image formation means is composed of a lens (first lens), and the light modulation means is arranged on a front-side focal surface of this lens (the first lens).

In the three-dimensional image display apparatus according to the embodiment mode 12, the image generated and formed by the Fourier transform image formation means corresponds to a plurality of diffraction orders, but as the image obtained on the basis of a low-order diffraction order is bright and the image obtained on the basis of a high-order diffraction order is dark, it is possible to obtain the image (three-dimensional image) with a satisfactory image quality. It should be noted that for further improvement in the image quality, the configuration further includes (D) Fourier transform image selection means configured to select a Fourier transform image corresponding to a desired diffraction order among the number of Fourier transform images as generated corresponding to the plurality of diffraction orders.

This Fourier transform image selection means preferably has a configuration of being arranged at a position where the Fourier transform image is formed.

Alternatively, also in the three-dimensional image display apparatus according to the embodiment mode 13, the image generated and formed by the first lens corresponds to a plurality of diffraction orders, but as the image obtained on the basis of a low-order diffraction order is bright and the image obtained on the basis of a high-order diffraction order is dark, it is possible to obtain the image (three-dimensional image) with a satisfactory image quality. It should be noted that for further improvement in the image quality, it is preferable that the configuration further includes (E) a spatial filter located at a rear-side focal surface of the first lens and provided with a number of opening/closing controllable opening sections corresponding to the number of light emitting positions.

Then, in this case, in the spatial filter, it is desirable that a desired opening section is set in an opening state in synchronization with the generation timing of the two-dimensional image by the two-dimensional image formation apparatus. Alternatively, it is preferable that the configuration further includes (E) a scattering diffraction restricting member provided a number of with opening sections corresponding to a number of light emitting positions and located on a rear-side focal surface of the first lens.

With the provision of the spatial filter or the scattering diffraction restricting member, only a desired diffraction light can be passed among the generated diffraction lights of the plurality of diffraction orders.

Then, in these cases, the Fourier transform image selection means or the spatial filter desirably has a number (which is $LEP_{Total}$, for example, $U_0 \times V_0$) of opening sections corresponding to the number of light emitting positions (which is $LEP_{Total}$, for example, $U_0 \times V_0$). In the opening sections, opening/closing may be controlled, or the opening sections may be regularly in the opening state. Alternatively, as the Fourier transform image selection means having the opening/closing controllable opening sections, a liquid crystal display apparatus (to be more specific, a transmissive or reflective liquid crystal display apparatus) can be exemplified, and a two-dimensional type MEMS in which the movable mirrors are disposed in a two-dimensional matrix manner can also be exemplified. In addition, in the Fourier transform image selection means having the opening/closing controllable opening sections, a configuration can be adopted that as a desired opening section is set in an opening state in synchronization with the generation timing of the two-dimensional image by the light modulation means (the two-dimensional image formation apparatus), the Fourier transform image corresponding to the desired diffraction order is selected. The position of the opening section may be at a position where a desired Fourier transform image (or a diffraction light) is imaged among the Fourier transform images (or diffraction lights) obtained by the Fourier transform image selection means or the first lens, and the relevant position of the opening section corresponds to the discretely arranged light emitting positions.

The three-dimensional image display apparatus including the above-mentioned preferable configuration according to the embodiment mode 12 desirably further includes inverse Fourier transform means configured to generate a real image of the two-dimensional image generated by the light modulation means, by performing inverse Fourier transform on the Fourier transform image imaged by the Fourier transform image formation means.

Also, the three-dimensional image display apparatus including the above-mentioned preferable configuration according to the embodiment mode 12, a mode can be made in which the light modulation means is composed of a two-dimensional spatial light modulator having a plurality (P×Q pieces) of pixels two-dimensionally disposed, and the respective pixels have an opening. In this case, the two-dimensional spatial light modulator preferably is composed of a liquid crystal display apparatus (to be more specific, a transmissive or reflective liquid crystal display apparatus) or preferably has a configuration in which a movable mirror is provided in the respective openings of the two-dimensional spatial light modulator (a configuration made of a two-dimensional type MEMS in which the movable mirrors are disposed in a two-dimensional matrix manner). In addition, in the three-dimensional image display apparatus including the above-mentioned preferable configuration according to the embodiment mode 13, a mode can be made in which the two-dimensional image formation apparatus is composed of a liquid crystal display apparatus having a plurality (P×Q pieces) of two-dimensionally disposed pixels (to be more specific, a transmissive or reflective liquid crystal display apparatus), and the respective pixels have an opening, or alternatively, a plurality (P×Q pieces) of openings are provided in the two-dimensional image formation apparatus, and a movable mirror is provided in the respective openings (composed of a two-dimensional type MEMS in which the movable mirrors are respectively arranged in the openings disposed in a two-dimensional matrix manner). Herein, the planar shape of the opening is desirably rectangle. When the planar shape of the opening is set as rectangle, Fraunhofer diffraction is generated, and M×N sets of diffraction lights are generated. That is, with the openings, the amplitude grating is formed with which the amplitude (intensity) of the incident light wave is periodically modulated, and the light amount distribution matching with the light transmission distribution of the grating can be obtained.

Furthermore, in the three-dimensional image display apparatus including the above-mentioned preferable configuration and the mode according to the embodiment mode 12, a configuration can be adopted that the spatial frequency in the two-dimensional image is comparable to the image information in which the spatial frequency of the pixel structure is set as a carrier frequency, and further, a spatial frequency in a conjugate image of the two-dimensional image described below is a spatial frequency obtained by removing a spatial frequency of the pixel structure from the spatial frequency in the two-dimensional image. That is, as being obtained as a first-order diffraction in which a zero-order diffraction of the plane wave component is set as a carrier frequency, the spatial frequency equal to or less than the half of the spatial frequency of the pixel structure (opening structure) for the light modulation means is selected by the Fourier transform image selection means or the spatial filter or alternatively passes through the Fourier transform image selection means or the spatial filter. The spatial frequencies displayed on the light modulation means or the two-dimensional image formation apparatus are all transmitted.

In the three-dimensional image display apparatus including the above-mentioned preferable configuration and the mode according to the embodiment mode 12 or 13, numerals of $U_0$ and $V_0$ are not particularly limited, but $4 \leq U_0 \leq 12$, or preferably for example, $9 \leq U_0 \leq 11$ can be exemplified. Also, $4 \leq V_0 \leq 12$, or preferably for example, $9 \leq V_0 \leq 11$ can be exemplified. The value of $U_0$ and the value of $V_0$ may be equal to each other or different from each other. It should be noted that a plane on which the Fourier transform image is formed by the Fourier transform image formation means (XY plane) may be hereinafter referred to as imaging surface in some cases.

In the three-dimensional image display apparatus according to the embodiment mode 12 or 13, the Fourier transform image corresponding to the desired diffraction order is selected by the Fourier transform image selection means or the spatial filter or alternatively passes through the Fourier transform image selection means or the spatial filter. Herein, the desired diffraction order is not particularly limited, but zero-order diffraction order can be exemplified.

In the three-dimensional image display apparatus including the above-mentioned preferable configuration and the mode according to the embodiment mode 12 or 13, as the light source in the image display apparatus, a laser, a light emitting diode (LED), or a white light source can be exemplified. An illumination optical system configured to shape the illumination light may be arranged between the light source and the light modulation means or the two-dimensional image formation apparatus. Depending on a specification of the image display apparatus, monochromatic light or while light may be emitted from the light source in some cases. Alternatively, the light source includes a red light emitting element, a green light emitting element, and a blue light emitting element, and by sequentially driving these emitting elements, lights may be emitted from the light source (red light, green light, and blue light). With this configuration too, it is possible to obtain the illumination lights which are emitted from a plurality of discretely arranged light emitting positions and are different in the incident directions to the light modulation means or the two-dimensional image formation apparatus.

The three-dimensional image display apparatus according to the embodiment mode 12 or 13 may include optical means configured to project a conjugate image formed by the conjugate image formation means or optical means arranged behind the third lens and configured to project an image formed by the third lens.

In the three-dimensional image display apparatus according to the embodiment modes 2 and 3 or the embodiment modes 5 and 6, m and m' are integers, and M is a positive integer, but relations among m, m', and M are m≦m' and also M=m'−m+1. In addition, n and n' are integers, and N is a positive integer, but relations among n, n', and N are n≦n' and also N=n'−n+1. In addition, the numerals of M and N equivalent to the total number of the diffraction orders are not limited, but the following can be exemplified.

$$0 \leq M(=m'-m+1) \leq 21$$

Preferably, for example, $$5 \leq M(=m'-m+1) \leq 21$$

Also, $$0 \leq N(=n'-n+1) \leq 21$$

Preferably, for example, $$5 \leq N(=n'-n+1) \leq 21$$

The value of M and the value of N may be equal to each other or different from each other, the value of |m'| and the value of |m| may be equal to each other or different from each other, and the value of |n'| and the value of |n| may be equal to each other or different from each other.

Also, in the three-dimensional image display apparatus according to the embodiment modes 7 and 8, in the optical apparatus, the spatial frequency in the incident two-dimensional image is emitted along diffraction angles corresponding to a plurality of diffraction orders (total M×N). Herein, when total M×N sets of diffraction lights are generated with M sets from m-th to m'-th along the X direction (where m and m' are integers, and M is a positive integer) and N sets from n-th to n'-th along the Y direction (where n and n' are integers, and N is a positive integer), the relations among m, m', and M and the relations among n, n', and N can be set as described above.

As the light source in the three-dimensional image display apparatus including the above-mentioned various preferable configurations and modes according to the embodiment modes 1 to 8, a laser, a light emitting diode (LED), or a white light source can be exemplified. An illumination optical system configured to shape the light from the light source may be arranged between the light source 10 and between the light source and the light modulation means or the two-dimensional image formation apparatus.

In the liquid crystal display apparatus constituting the two-dimensional spatial light modulator or the two-dimensional image formation apparatus, for example, a region which is an overlapping region of a transparent first electrode and a transparent second electrode and provided with a liquid crystal cell which will be described next is equivalent to one pixel. Then, by causing the liquid crystal cell to function as a type of a light shutter (light valve), that is, by controlling the transmittance of the respective pixels, the transmittance of the light (illumination light) emitted from the light source is controlled, and as a whole, it is possible to obtain the two-dimensional image. By providing a rectangular opening in an overlapping region of the transparent first electrode and the transparent second electrode, the light (illumination light) emitted from the light source passes through the relevant opening. For each pixel, Fraunhofer diffraction is generated, and for example, M×N sets of diffraction lights are generated.

The liquid crystal display apparatus is composed, for example, of a front panel provided with the transparent first electrode, a rear panel provided with the transparent second electrode, and a liquid crystal material arranged between the front panel and the rear panel. The front panel is composed, to be more specific, for example, of a first substrate made of a glass substrate or a silicon substrate, a transparent first electrode provided on an inner surface of a first substrate (which is also referred to as common electrode, for example, made of ITO), and a polarizing film provided on an external surface of the first substrate. Furthermore, an oriented film is formed on the transparent first electrode. On the other hand, the rear panel is composed, to be more specific, for example, of a second substrate made of a glass substrate or a silicon substrate, a switching element formed on an inner surface of the second electrode, a transparent second electrode (which is also referred to as pixel electrode, for example, made of ITO) whose continuity/non-continuity is controlled by the switching element, and a polarizing film formed on an outer surface of the second electrode. An oriented film is formed on a whole surface including the transparent second electrode. These various members and liquid crystal materials constituting the transmissive liquid crystal display apparatus can be made of members and materials used in a related art. It should be noted that as the switching element, a three-terminal element such as an MOS FET or a thin film transistor (TFT) formed on a monocrystalline silicon semiconductor substrate, or a two-terminal element such as an MIM element, a varistor element, or a diode can be exemplified. Alternatively, a liquid crystal display apparatus including so-called matrix electrode structure where a plurality of scan electrodes extend in a first direction and a plurality of data electrodes extend in a second direction can also be used. In the transmissive liquid crystal display apparatus, the light (illumination light) from the light source enters from the second substrate and exits from the first substrate. On the other hand, in the reflective liquid crystal display apparatus, the light (illumination light) from the light source enters from the first substrate and is reflected, for example, by the second substrate (pixel electrode) formed on the inner surface of the second substrate and again exits from the first substrate. The opening can be obtained, for example, by forming an insulating material layer opaque to the light (illumination light) from the light source between the transparent second substrate and the oriented film and forming an opening in this insulating material layer. It should be noted that as the reflective liquid crystal display apparatus, in addition, a LCoS (Liquid Crystal on Silicon) type can also be used.

For example, in a case where a liquid crystal display apparatus composed of ferroelectric liquid crystal is used as the light modulation means (the two-dimensional image formation apparatus), upon application of a drive voltage, the voltage should approach to plus/minus 0 in a DC manner. That is, in a case where a plus potential or a minus potential is applied for a certain period of time (herein, the applied voltage×time is set as V×t), a voltage cancelling the same amount of V×t should be applied for a certain period of time. In the ferroelectric liquid crystal, if such an operation is not carried out, charges are accumulated inside the ferroelectric liquid crystal, and a sort of burning is generated. Therefore, in a case where a sequence of generating the two-dimensional image by the light modulation means or the two-dimensional image formation apparatus and then not generating the two-dimensional image is to be continued, or alternatively, in a case where such a sequence can be adopted, it is preferable to use the liquid crystal display apparatus composed of the ferroelectric liquid crystal capable of performing the high-speed operation.

Also, as the one-dimensional spatial light modulator (one-dimensional image formation apparatus), to be more specific, an apparatus in which diffraction grating-light modulation elements (GLV: Grating Light Valve) are one-dimensionally arranged in an array manner (hereinafter, which may be referred to as diffraction grating-light modulation apparatus) can be exemplified.

The three-dimensional image display apparatus according to the embodiment modes 1 to 8, 12, and 13 may include optical means configured to project a conjugate image formed by the conjugate image formation means or optical means arranged behind the third lens or the fifth lens and configured to project an image formed by the third lens or the fifth lens. In addition, the three-dimensional image display apparatus according to the embodiment modes 9 and 10 may include optical means configured to project the image formed by the imaging means or optical means configured to project, behind the third lens, the image formed by the third lens.

In the three-dimensional image display apparatus according to the embodiment modes 1 to 13, when the number of pixels P×Q of the two-dimensional image is denoted by (P, Q), as values for (P, Q), to be specific, several image display resolutions such as VGA (640, 480), S-VGA (800, 600), XGA (1024, 768), aPRC (1152, 900), S-XGA (1280, 1024), U-XGA (1600, 1200), HD-TV (1920, 1080), and Q-XGA (2048, 1536) as well as (1920, 1035), (720, 480), and (1280, 960) can be exemplified, but the values are not limited to the above-mentioned values.

In the three-dimensional image display apparatus according to the embodiment modes 1A to 13A, the semi-transmissive mirror configured to change the travelling direction of the light ray emitted from the optical system (specifically, the light ray emitted from the conjugate image formation means, the third lens, the fifth lens, the imaging means, or the Fourier transform image formation means) is provided. Therefore, when the image displayed on the semi-transmissive mirror is observed, the light source or the optical system constituting the three-dimensional image display apparatus is not located within the view angle of the observer, and a problem that the light source or the optical system is overlapped with the three-dimensional image, and the observation of the three-dimensional image becomes difficult is not caused. In addition, the view point is easily guided to the reproduced three-dimensional image, and recognition of the three-dimensional image is facilitated. Furthermore, fusion of the three-dimensional image and the background can be achieved.

On the other hand, in the three-dimensional image display apparatus according to the embodiment modes 1B to 13B, the light ray control means configured to change the travelling direction of the light ray emitted from the optical system and controlling the collecting state at the observation spot of the light rays emitted from the optical system is provided. Therefore, even when all the light ray group used for displaying the three-dimensional image (the light ray group having parallax information) is not spatially generated and scattered, that is, when the light ray group used for the three-dimensional image display is spatially generated and scattered at a lower density, it is possible to obtain the three-dimensional image based on the light rays having a quality similar to that of the object in the real world, and the loads of the image data processing system in the three-dimensional image display apparatus can be reduced.

In the three-dimensional image display apparatus according to the embodiment modes 1 to 3, the following operations are sequentially repeatedly carried out in a time-series manner that the two-dimensional image is generated by the light modulation means, the two-dimensional image formation apparatus, or the like, and also the spatial frequency in the generated two-dimensional image is emitted along diffraction angles corresponding to a plurality of diffraction orders generated by the respective pixels or the diffraction light generation means, the spatial frequency is subjected to Fourier transform by the Fourier transform image formation means or the first lens, the number of the generated Fourier transform images are generated corresponding to the plurality of diffraction orders, the Fourier transform image corresponding to the desired diffraction order is selected by the Fourier transform image selection means or the spatial filter in synchronization with the generation timing of the two-dimensional image among the number of the generated Fourier transform images corresponding to the plurality of diffraction orders, and the conjugate image of the Fourier transform image selected on the basis of the Fourier transform image selection means or the spatial filter is formed by the conjugate image formation means (the second lens and the third lens) to eventually reach the observer. Thus, as a result that the light ray group equivalent to the plurality of diffraction orders can be generated and scattered at a high density in terms of space and further in a state of being distributed in the plurality of directions, with the above-mentioned light ray group, unlike the related art, on the basis of the light ray reconstruction method effectively utilizing the light diffraction phenomenon, without increasing the size of the image display apparatus as a whole, it is possible to obtain the three-dimensional image having a quality similar to that of the object in the real world.

Also, in the three-dimensional image display apparatus according to the embodiment modes 4 to 6, the two-dimensional image is generated by the light modulation means (the two-dimensional image formation apparatus), and also, the spatial frequency in the generated two-dimensional image is emitted along the diffraction angles corresponding to the plurality of diffraction orders generated from the respective pixels or the like, the number of the Fourier transform images corresponding to the diffraction orders are generated while the spatial frequency is subjected to Fourier transform by the image restriction and generation means (the first lens), only the predetermined Fourier transform image among the images is selected by the image restriction and generation means (the scattering diffraction restricting opening section 33), and the conjugate image of the two-dimensional image is generated by the image restriction and generation means (the second lens). Then, the spatial frequency in the relevant conjugate image of the two-dimensional image is emitted along diffraction angles corresponding to a plurality of diffraction orders generated from the respective opening regions from the oversampling filter, and the number of the Fourier transform images corresponding to the diffraction orders generated from the respective opening regions are generated while the spatial frequency is subjected to Fourier transform by the Fourier transform image formation means (the third lens). Next, the Fourier transform image corresponding to the desired diffraction order is selected by the Fourier transform image selection means (the spatial filter) in synchronization with the generation timing of the two-dimensional image among the number of the generated Fourier transform images corresponding to the plurality of diffraction orders generated from the respective opening regions, and the conjugate image of the Fourier transform image selected on the basis of the Fourier transform image selection means (the spatial filter) or the spatial filter is formed by the conjugate image formation means (the second lens and the third lens) to eventually reach the observer. Then, while such operations are sequentially repeatedly carried out in a time-series manner, as a result that the light ray group equivalent to the plurality of diffraction orders generated from the respective opening regions in the oversampling filter can be generated and scattered at a high density in terms of space and further in a state of being distributed in the plurality of directions, with the above-mentioned light ray group, unlike the related art, on the basis of the light ray reconstruction method effectively utilizing the light diffraction phenomenon, without increasing the size of the image display apparatus as a whole, it is possible to obtain the image (three-dimensional image) having a quality similar to that of the object in the real world. Furthermore, in the three-dimensional image display apparatus according to the embodiment modes 4 to 6, with the provision of the oversampling filter, that is, independent from the light modulation means (the two-dimensional image formation apparatus), the read image (the conjugate image of the two-dimensional image) is newly sampled in terms of space, and it is therefore possible to independently control the size of the image eventually obtained and the view angle. Therefore, while the region of the image to be observed (the three-dimensional image) is widened, the scale (size) of the image to be displayed (the three-dimensional image) can be increased.

In the three-dimensional image display apparatus according to the embodiment modes 7 and 8, the following operations are sequentially repeatedly carried out in a time-series manner that the two-dimensional image is generated by the two-dimensional image formation apparatus, the spatial frequency in the generated two-dimensional image is emitted along diffraction angles corresponding to a plurality of diffraction orders by the optical apparatus which is the collective entity of the optical elements composed of the refractive grating-like elements, the spatial frequency is subjected to Fourier transform by the Fourier transform image formation means or the first lens, the number of the Fourier transform images corresponding to the diffraction orders are generated, the Fourier transform image corresponding to the desired diffraction order is selected by the Fourier transform image selection means or the spatial filter in synchronization with the generation timing of the two-dimensional image among the number of the generated Fourier transform images corresponding to the plurality of diffraction orders, and the conjugate image of the Fourier transform image selected on the basis of the Fourier transform image selection means or the spatial filter is formed by the conjugate image formation means (the second lens and the third lens) to eventually reach the observer. As a result that the light ray group equivalent to the plurality of diffraction orders can be generated and scattered at a high density in terms of space and further in a state of being distributed in the plurality of directions, with the above-mentioned light ray group, unlike the related art, on the basis of the light ray reconstruction method effectively utilizing the light diffraction phenomenon, without increasing the size of the image display apparatus as a whole, it is possible to obtain the image (three-dimensional image) having a quality similar to that of the object in the real world.

In a case where the spatial frequency in the two-dimensional image generated by the two-dimensional image formation apparatus is emitted along diffraction angles corresponding to a plurality of diffraction orders by the amplitude grating provided with the rectangular opening and configured to generate Fraunhofer diffraction on the basis of the above-mentioned rectangular opening, a case exists in which manufacturing the amplitude grating having a high numerical aperture is difficult. Then, the light use efficiency depends on the numerical aperture of the opening, and it may be difficult to achieve the high light use efficiency. On the other hand, when the spatial frequency in the two-dimensional image is subjected to Fourier transform to generate the Fourier transform image, uniformity among the Fourier transform images corresponding to the plurality of diffraction orders (uniformity in the light intensity among the diffraction orders) is more improved as the opening is smaller. In the three-dimensional image display apparatus according to the embodiment modes 7 and 8, as the optical apparatus which is the collective entity of the optical elements composed of the refractive grating-like elements is adopted instead of the amplitude grating, it is possible to provide the high numerical aperture to the optical element itself. Thus, not only the improvement in the light use efficiency can be realized, but also the high uniformity among the Fourier transform images corresponding to the plurality of diffraction orders can be achieved as the lights incident on the optical element converge substantially at one point, which is equivalent to attainment of a small opening. Furthermore, by realizing the optimization of the optical apparatus, it is possible to distribute much energy to the high-order diffraction. It should be noted that when a phase grating in which a large number of concave sections are formed on a glass flat plate is adopted, the light use efficiency can be increased. However, in a case of a pattern generation based on the phase modulation, it is possible to perform an arbitrary pattern generation within a particular plane, but in a system for generating an image by way of light rays within an arbitrary plane, it is extremely difficult to generate a particular pattern in an arbitrary plane. In the three-dimensional image display apparatus according to the embodiment modes 7 and 8, as an optical apparatus which is a collective entity of optical elements composed of refractive grating-like elements is adopted instead of the phase grating, it is possible to solve the above-mentioned problem in the phase grating.

In the three-dimensional image display apparatus according to the embodiment modes 9 to 11, the two-dimensional image is generated by the light modulation means (the two-dimensional image formation apparatus), and also the spatial frequency in the generated two-dimensional image is emitted along the diffraction angles corresponding to the plurality of diffraction orders generated from the respective pixels or the like, the number of the Fourier transform images corresponding to the diffraction orders are generated while the spatial frequency is subjected to Fourier transform by the image restriction and generation means (the first lens), only the predetermined Fourier transform image among the images is selected by the image restriction and generation means (the scattering diffraction restricting opening section 33), and the conjugate image of the two-dimensional image is generated by the image restriction and generation means (the second lens). Then, the spatial frequency in the relevant conjugate image of the two-dimensional image is emitted from the light ray travelling direction change means at a desired angle with respect to the z' axis which is the optical axis. Then, furthermore, the conjugate image of the Fourier transform image emitted from the light ray travelling direction change means is formed by the imaging means (the third lens) to eventually reach the observer. Then, while such operations are sequentially repeatedly carried out in a time-series manner, as a result that the light group emitted from the light ray travelling direction change means can be generated and scattered at a high density in terms of space and further in a state of being distributed in a plurality of directions, with the above-mentioned light ray group, unlike the related art, on the basis of the light ray reconstruction method of efficiently controlling the directional components of the light rays constituting the image (three-dimensional image), without increasing the size of the image display apparatus as a whole, it is possible to obtain the image (three-dimensional image) having a quality similar to that of the object in the real world. Furthermore, in the three-dimensional image display apparatus according to the embodiment modes 9 to 11, the loss of the light amount in the light ray travelling direction change means is sufficiently small to be ignored, the contrast of the image eventually arriving at the observer is not reduced, and it is possible to observe the clear image (three-dimensional image) without blur.

In the three-dimensional image display apparatus according to the embodiment modes 12 and 13, the two-dimensional image is formed on the basis of the light (illumination light) sequentially emitted from the light emitting positions of different light sources which are different in incident directions by the light modulation means (the two-dimensional image formation apparatus), and also the spatial frequency in the generated two-dimensional image is emitted along the diffraction angles corresponding to the plurality of diffraction orders generated from the respective pixels or the like, and while spatial frequency is subjected to Fourier transform, the number of the Fourier transform images (diffraction lights) corresponding to the plurality of diffraction orders are generated and formed by the Fourier transform image formation means (the first lens) to eventually reach the observer. The image reaching the observer includes components in the incident direction of the light (illumination light) to the light modulation means (the two-dimensional image formation apparatus). Then, while such operations are sequentially repeatedly carried out in a time-series manner, as a result that the light ray group emitted from the Fourier transform image formation means (the first lens) (for example, $LEP_{Total}$ streaks of light rays) can be generated and scattered at a high density in terms of space and further in a state of being distributed in a plurality of directions, with the above-mentioned light ray group, unlike the related art, on the basis of the light ray reconstruction method of efficiently controlling the directional components of the light rays constituting the image (three-dimensional image), without increasing the size of the image display apparatus as a whole, it is possible to obtain the image (three-dimensional image) having a quality similar to that of the object in the real world. Furthermore, in the three-dimensional image display apparatus according to the embodiment modes 12 and 13, for example, when the image (three-dimensional image) is constructed on the basis of the zero-order diffraction light, the bright, clear, and high-quality image (three-dimensional image) can be obtained.

Additional features and advantages are described in, and will be apparent from, the following Detailed Description and the figures.

BRIEF DESCRIPTION OF THE FIGURES

FIG. 6 is a schematic front view of an example of Fourier transform image selection means (a spatial filter);

FIG. 33 is a schematic front view of a light source in the three-dimensional image display apparatus according to Embodiment 10;

FIG. 34 is a schematic front view of a spatial filter in the three-dimensional image display apparatus according to Embodiment 10;

FIG. 52 shows a configuration example of a three-dimensional image display apparatus in a related art.

DETAILED DESCRIPTION

The present application will be described below in greater detail with reference to the drawings.

Embodiment 1

Embodiment 1 relates to a three-dimensional image display apparatus according to embodiment modes 1A and 2A.

Figure 3:
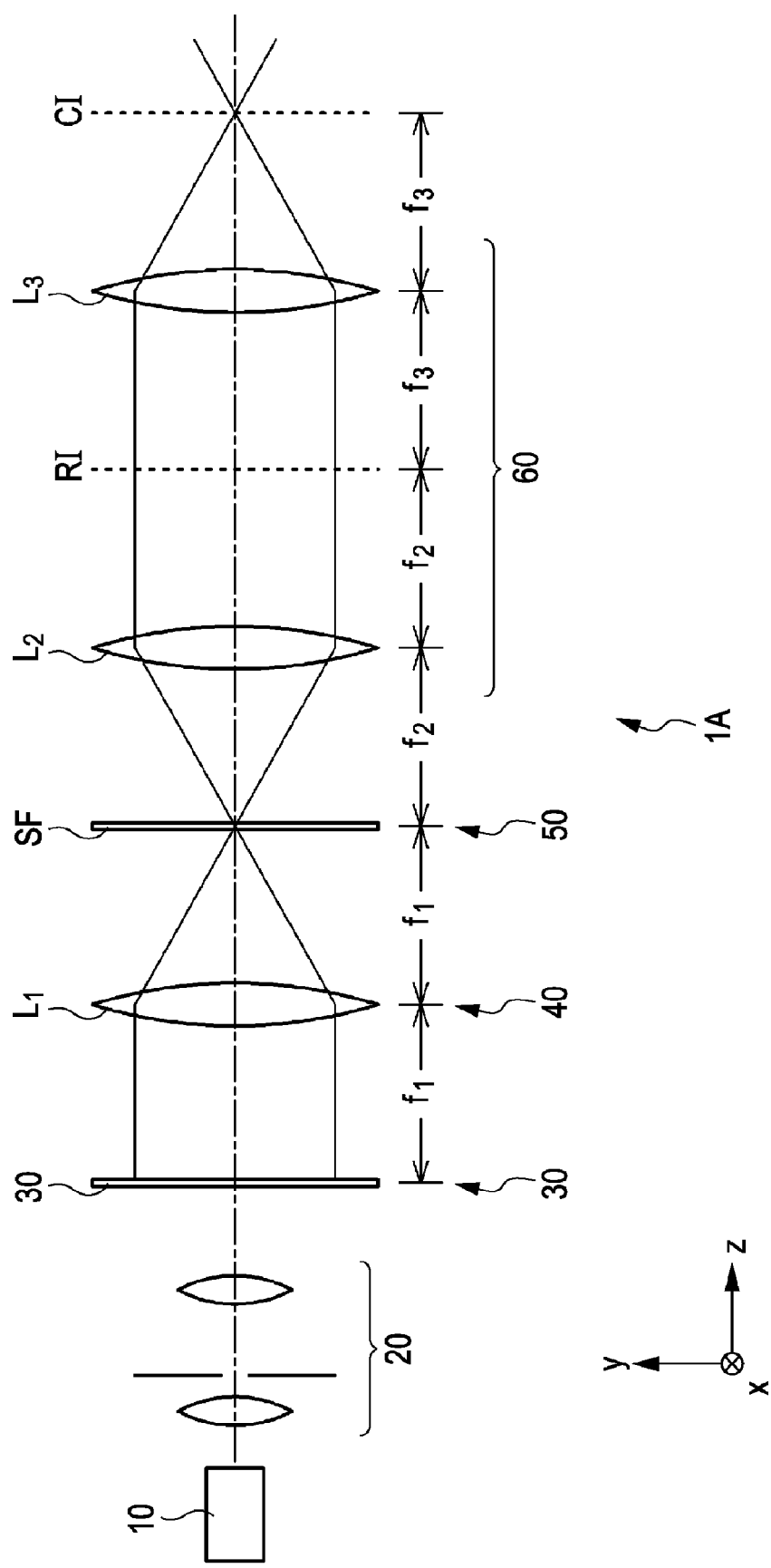
FIG. 3 is a conceptual diagram of a three-dimensional image display apparatus in a yz plane according to Embodiment 1.
Figure 4:
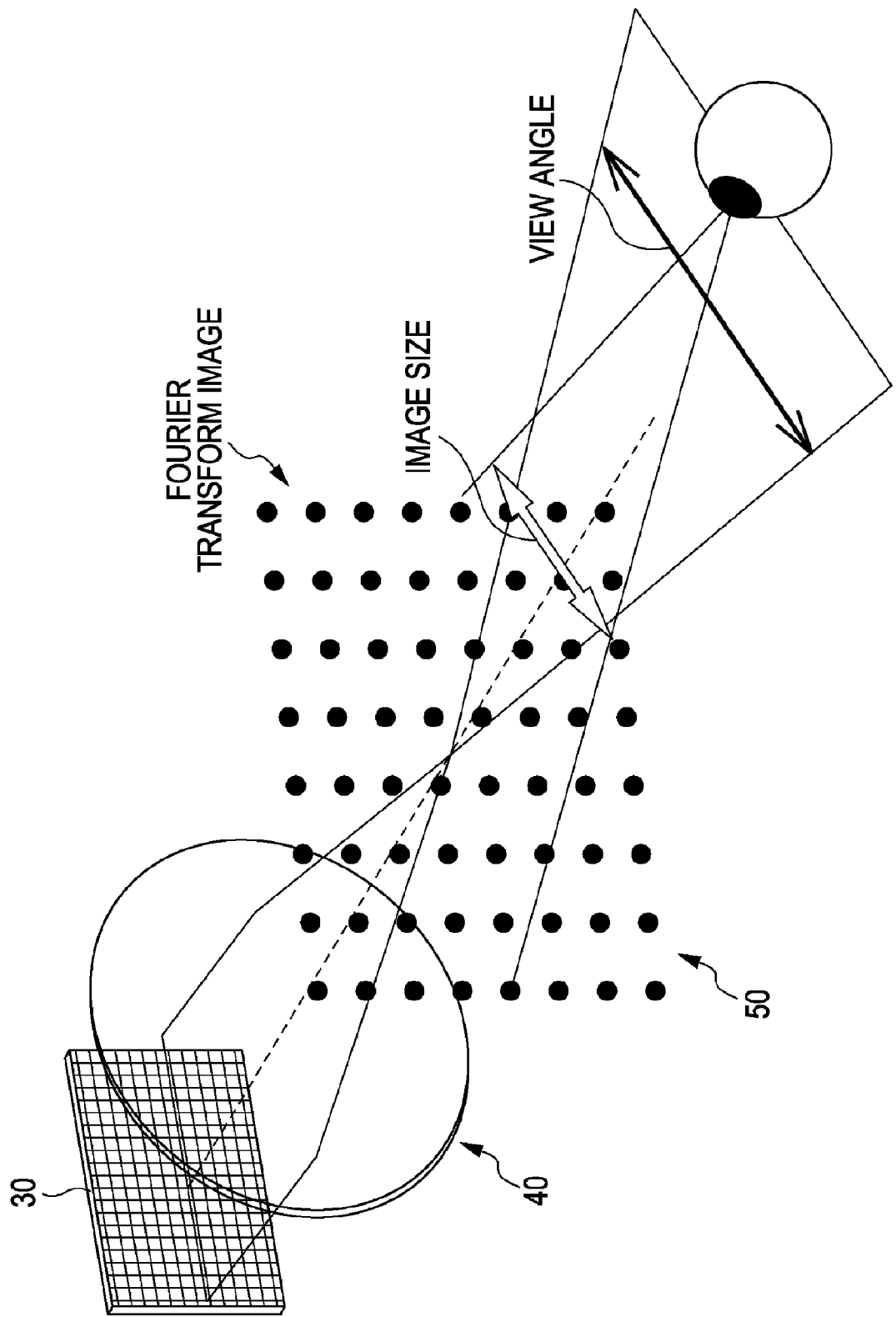
FIG. 4 is a conceptual diagram of the three-dimensional image display apparatus as obliquely viewed according to Embodiment 1.
Figure 5:
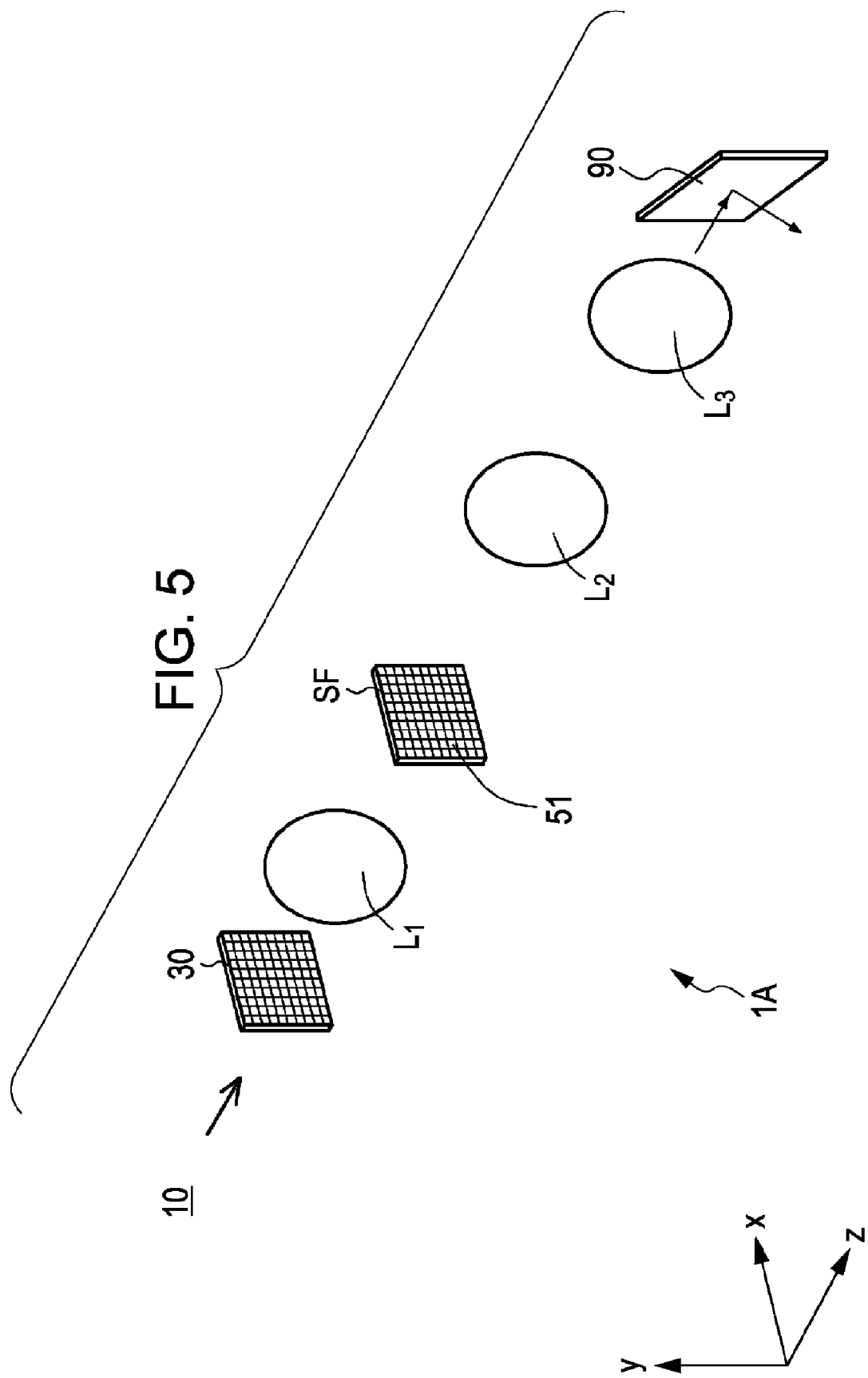
FIG. 5 is a conceptual diagram of the three-dimensional image display apparatus as obliquely viewed according to Embodiment 1.

FIGS. 1A, 3, 4, and 5 are conceptual diagrams of the monochromatic-display three-dimensional image display apparatus according to Embodiment 1. It should be noted that in FIG. 3, the optical axis is set as z axis, orthogonal coordinates in a plane orthogonal to the z axis are set as x axis and y axis, a direction parallel to the x axis is set as X direction, and a direction parallel to the y axis is set as Y direction. The X direction is set, for example, as a horizontal direction in the three-dimensional image display apparatus, and the Y direction is set, for example, as a vertical direction in the three-dimensional image display apparatus. Herein, FIG. 3 is a conceptual diagram of the three-dimensional image display apparatus according to Embodiment 1 in a yz plane. A conceptual diagram of the three-dimensional image display apparatus according to Embodiment 1 in an xy plane is also substantially similar to FIG. 3. In addition, FIG. 4 is a conceptual diagram of the three-dimensional image display apparatus according to Embodiment 1 as obliquely viewed, and FIG. 5 schematically shows an arrangement of components of the three-dimensional image display apparatus according to Embodiment 1. It should be noted that the z axis (equivalent to the optical axis) passes through the center of the respective components constituting the three-dimensional image display apparatus according to the respective embodiments and further is orthogonal to the respective components constituting the three-dimensional image display apparatus.

In the display of a three-dimensional image by a light ray reconstruction method in a related art, with an aim of emitting a plurality of light rays while a virtual object surface existing at an arbitrary position is set as a virtual origin, an apparatus capable of providing light rays emitted in various angles should be prepared in advance. That is, for example, in the apparatus shown in FIG. 52, a large number (for example, M×N pieces) of the projector units 301 should be arranged in the horizontal direction and the vertical direction in a parallel manner.

Figure 51:
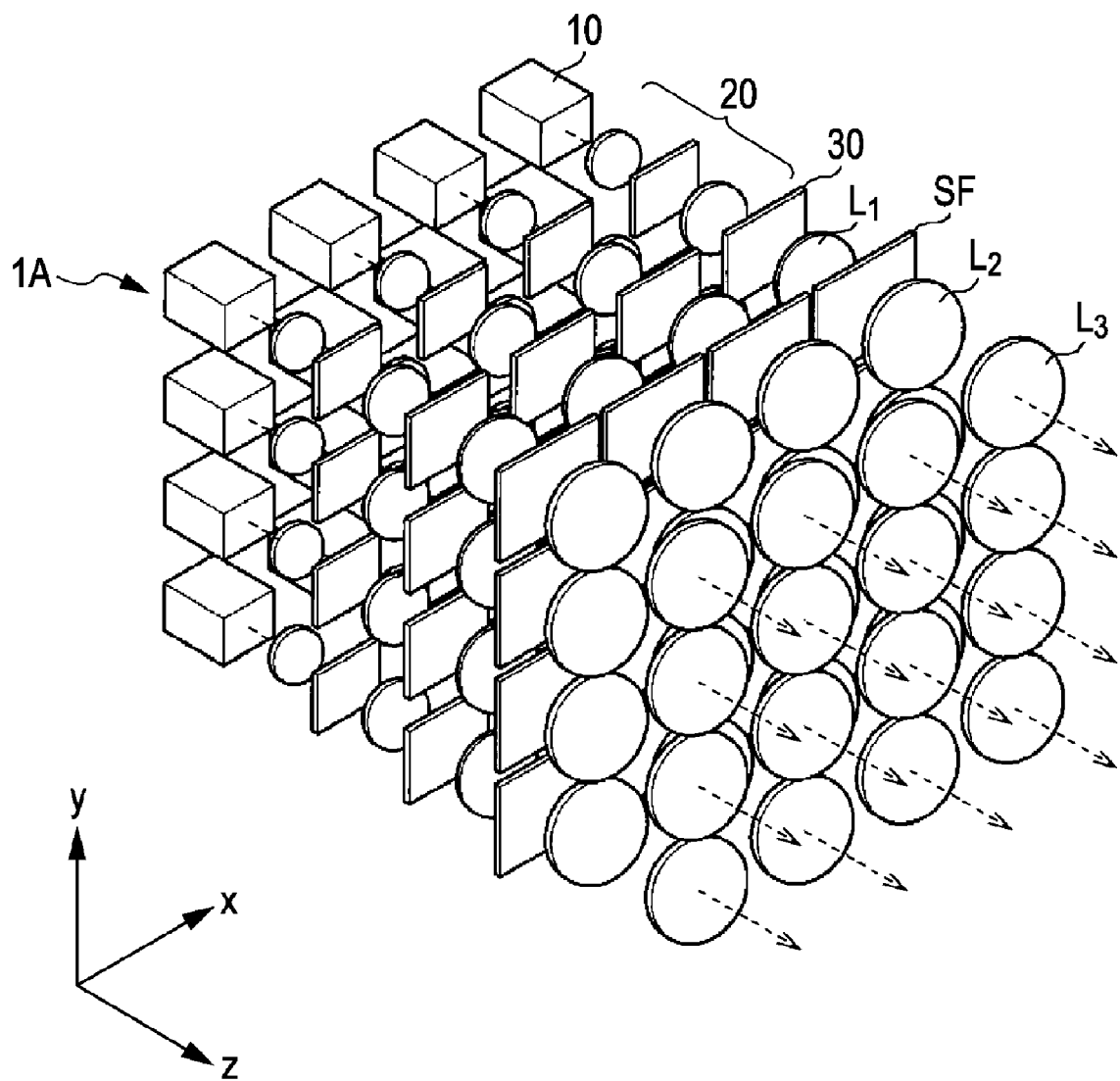
FIG. 51 is a configuration diagram of a three-dimensional image display apparatus of a multi-unit type in which a plurality of the three-dimensional image display apparatuses according to Embodiment 1 are combined one another.

On the other hand, in the three-dimensional image display apparatus 1A according to Embodiment 1, with the stand-alone three-dimensional image display apparatus provided with the components shown in FIGS. 1A, 3, 4, and 5, as compared with the technology in the related art, it is possible to generate and form a larger amount of light ray group also with a spatially higher density. The three-dimensional image display apparatus 1A according to Embodiment 1 is a single three-dimensional image display apparatus and has a function equivalent to an apparatus shown in FIG. 52 in which a large number (M×N pieces) of the projector units 301 are arranged in the horizontal direction and the vertical direction in a parallel manner. It should be noted that in a case where a multi-unit type is adopted, for example, as shown in FIG. 51, by the number of divided three-dimensional images, the three-dimensional image display apparatus 1A according to Embodiment 1 may be provided. In FIG. 51, an apparatus provided with 4×4=16 of the three-dimensional image display apparatuses 1A according to Embodiment 1 is exemplified.

As a description is given by way of the components of the three-dimensional image display apparatus according to the embodiment mode 1A, the three-dimensional image display apparatus 1A according to Embodiment 1 is a three-dimensional image display apparatus 1A provided with a light source 10 and an optical system. Then, this optical system includes (A) light modulation means 30 provided with a plurality of pixels 31 and configured to generate a two-dimensional image by modulating light from the light source by the respective pixels 31 and to emit a spatial frequency in the generated two-dimensional image along diffraction angles corresponding to a plurality of diffraction orders (total M×N) generated from the respective pixels 31, (B) Fourier transform image formation means 40 configured to perform Fourier transform on the spatial frequency in the two-dimensional image emitted from the light modulation means 30 to generate a number of a Fourier transform images corresponding to the plurality of diffraction orders (total M×N), (C) Fourier transform image selection means 50 configured to select a Fourier transform image corresponding to a desired diffraction order among the number of Fourier transform images as generated corresponding to the plurality of diffraction orders, and (D) conjugate image formation means 60 configured to form a conjugate image of the Fourier transform image selected by the Fourier transform image selection means.

Furthermore, the conjugate image formation means 60 includes inverse Fourier transform means (specifically, a second lens $L_2$ which will be described below) configured to generate a real image of the two-dimensional image generated by the light modulation means 30, by performing inverse Fourier transform on the Fourier transform image selected by the Fourier transform image selection means 50. In addition, the Fourier transform image formation means 40 is composed of a lens, the light modulation means 30 is arranged on a front-side focal surface of this lens, and the Fourier transform image selection means 50 is arranged on a rear-side focal surface of this lens. The Fourier transform image selection means 50 has a number of opening/closing controllable opening sections 51 corresponding to a plurality of diffraction orders.

Herein, the spatial frequency in the two-dimensional image is comparable to the image information in which the spatial frequency of the pixel structure is set as a carrier frequency.

Also, as a description is given by way of the components of the three-dimensional image display apparatus according to the embodiment mode 2A, the three-dimensional image display apparatus 1A according to Embodiment 1 is a three-dimensional image display apparatus provided with a light source 10 and an optical system. Then, this optical system includes (A) a two-dimensional image formation apparatus 30 provided with P×Q openings arranged in a two-dimensional matrix manner along an X direction and a Y direction (where P and Q are arbitrary positive integers) and configured to generate a two-dimensional image by controlling passage of the light from the light source 10 for each opening and to generate total M×N sets of diffraction lights on the basis of the two-dimensional image for each opening with M sets from m-th order to m'-th order along the X direction (where m and m' are integers, and M is a positive integer) and N sets from n-th order to n'-th order along the Y direction (where n and n' are integers, and N is a positive integer), (B) a first lens $L_1$ in which the two-dimensional image formation apparatus 30 is arranged on a front-side focal surface (to be more specific, a convex lens according to Embodiment 1), (C) a spatial filter SF arranged on a rear-side focal surface of the first lens $L_1$ and provided with total M×N closing/opening controllable opening sections 51 with M opening sections arranged in the X direction and N opening sections arranged in the Y direction, (D) a second lens $L_2$ in which the spatial filter SF is arranged on a front-side focal surface (to be more specific, a convex lens according to Embodiment 1), and (E) a third lens $L_3$ whose front-side focus is located at a rear-side focus of the second lens $L_2$ (to be more specific, a convex lens according to Embodiment 1).

Figure 1A:
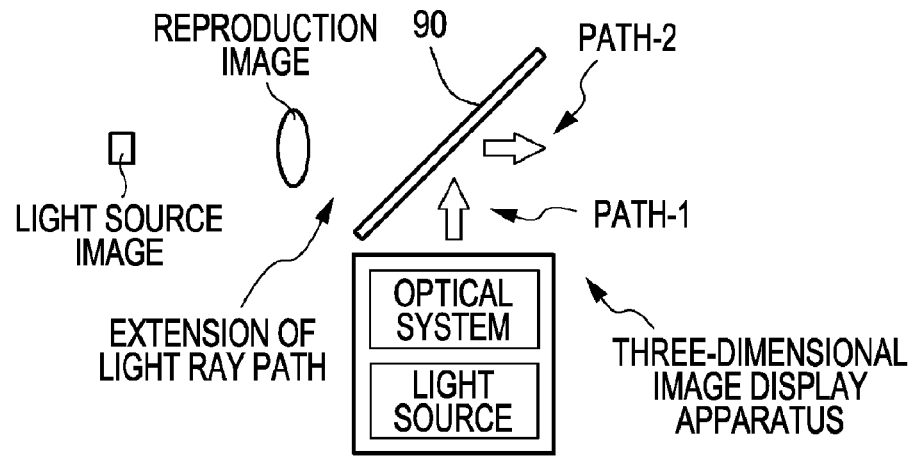
FIGS. 1A, 1B, and 1C schematically show an arrangement of a light source, an optical system, and a semi-transmissive mirror in a three-dimensional image display apparatus according to an embodiment modes 1A to 13A.
Figure 1B:
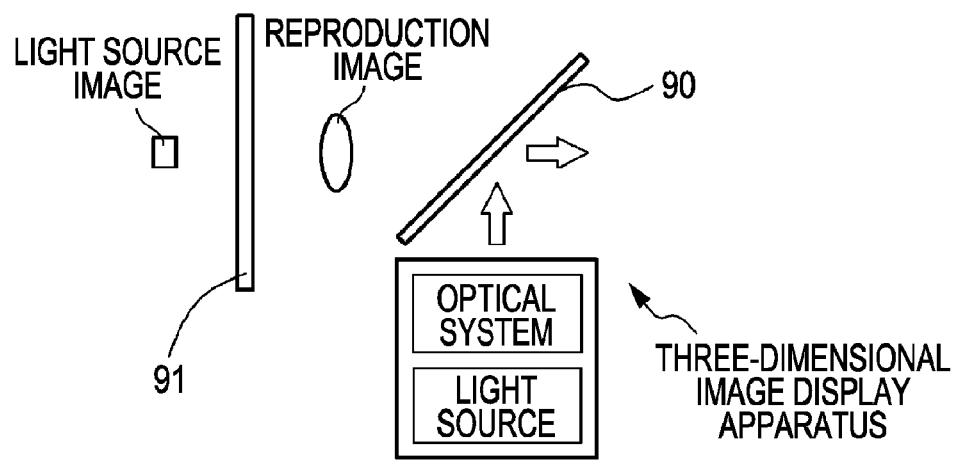
Figure 1C:
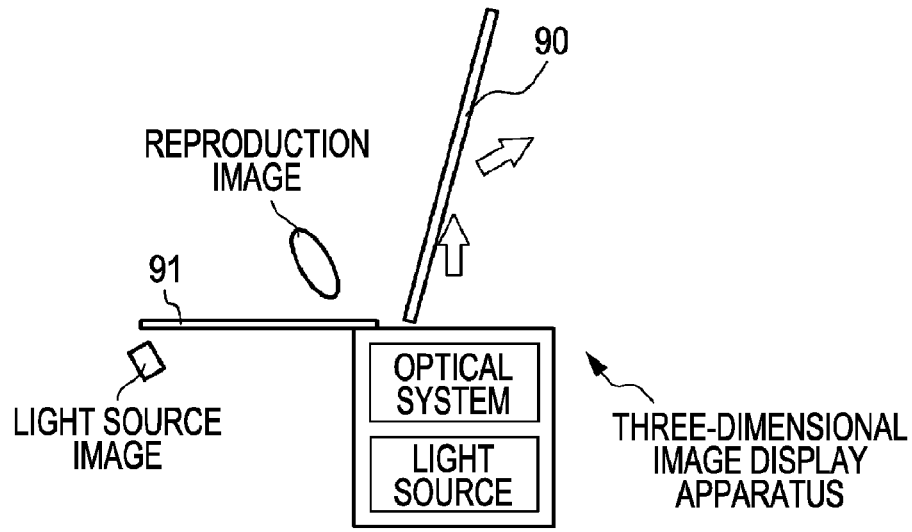
Figure 2A:
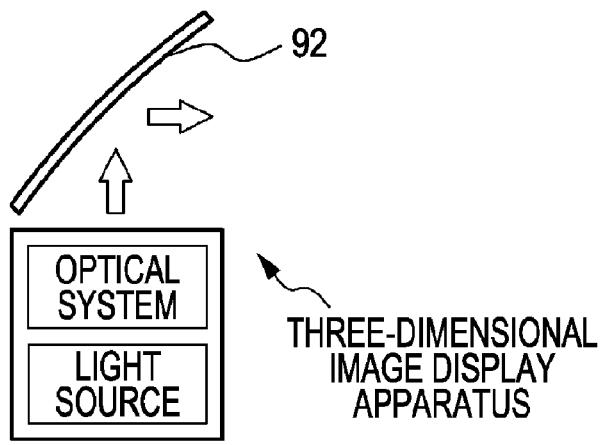
FIG. 2A schematically show an arrangement of the light source, the optical system, and the semi-transmissive mirror in the three-dimensional image display apparatus according to the embodiment modes 1A to 13A, and also, FIGS. 2A, 2B, and 2C schematically show an arrangement of a light source, an optical system, and a semi-transmissive mirror in an three-dimensional image display apparatus according to embodiment modes 1B to 13B.

Then, the three-dimensional image display apparatus 1A according to Embodiment 1 is further provided with a semi-transmissive mirror 90 configured to change (vary) a travelling direction of the light ray emitted from the optical system (specifically, the light ray emitted from the conjugate image formation means 60 or the third lens $L_3$). the semi-transmissive mirror 90 is composed, for example, of a dielectric multilayer film like a partial transmissive (reflective) mirror. It should be noted that as shown in the conceptual diagram in FIG. 1A, the light source and the optical system do not exist on the extension of the path of the light ray whose travelling direction is changed by the semi-transmissive mirror 90. That is, the light source and the optical system do not exist on the extension of the "path-2". In order to achieve such a configuration, the optimization of the arrangement of the semi-transmissive mirror should be realized. Alternatively, as shown in connectional diagrams of FIGS. 1B and 1C, for example, a shielding member 91 composed of an opaque plate or sheet may be arranged on an extension of a light ray path. It should be noted that a picture functioning as a sort of a background of the three-dimensional image may be drawn on the shielding member 91. In the examples shown in FIGS. 1B and 1C, the image of the light source does not exists on the extension of the "path-2". That is, with the shielding member 91, the image of the light source is hidden from the observer. In the example shown in FIG. 1C, to be specific, the shielding member 91 is arranged at the same level (or substantially at the same level) as the upper surface of the three-dimensional image display apparatus 1A in parallel (or substantially in parallel) with the upper surface of the three-dimensional image display apparatus 1A. In addition, the arrangement states of the semi-transmissive mirror 90 are different between FIGS. 1B and 1C. In the example shown in FIG. 1C, the light ray reflected by the semi-transmissive mirror 90 directs upward as compared with the example shown in FIG. 1B. It should be noted that as shown in FIG. 1A, 1B, or 1C, the semi-transmissive mirror 90 may be a planar mirror whose reflection surface is planar. As shown in FIG. 2A, a semi-transmissive mirror 92 may be a concave mirror whose reflection surface is like a concave surface. The semi-transmissive mirrors 90 and 92 and the shielding member 91 described above can also be applied to Embodiments 3 to 12 which will be described below.

Herein, according to Embodiment 1 and Embodiments 2, 3, and 12 described below, P=1024, Q=768, m=−4, m'=4, M=m'−m+1=9, n=−4, n'=4, and N=n'−n+1=9 are established. It should be noted that the values are not limited to these values. When the components of the three-dimensional image display apparatus according to the embodiment mode 1A are compared with the components of the three-dimensional image display apparatus according to the embodiment modes 2A and 3A, the light modulation means 30 corresponds to the two-dimensional image formation apparatus 30, the Fourier transform image formation means 40 corresponds to the first lens $L_1$, the Fourier transform image selection means 50 corresponds to the spatial filter SF, the inverse Fourier transform means corresponds to the second lens $L_1$, and the conjugate image formation means 60 corresponds to the second lens $L_2$ and the third lens $L_3$. Therefore, for the sake of convenience, the following description will be given on the basis of the terms of the two-dimensional image formation apparatus 30, the first lens $L_1$, the spatial filter SF, the second lens $L_1$, and the third lens $L_3$.

An illumination optical system 20 configured to shape the light from the light source 10 is arranged between the light source 10 and the two-dimensional image formation apparatus 30. Then, the light (illumination light) emitted from the light source 10 and passing the illumination optical system 20 illuminates the two-dimensional image formation apparatus 30. As the illumination light, for example, a light obtained by shaping the light from the light source 10 having a high spatial coherence into a parallel light by the illumination optical system 20. It should be noted that a characteristic of the illumination light and a specific configuration example for obtaining such illumination light will be described below.

The two-dimensional image formation apparatus 30 is composed of a two-dimensional spatial light modulator having a plurality of pixels 31 two-dimensionally disposed, and the respective pixels 31 have an opening. To be specific, the two-dimensional image formation apparatus 30 or the two-dimensional spatial light modulator is composed of a transmissive liquid crystal display apparatus having the P×Q pixels 31 which are two-dimensionally disposed, that is, disposed in a two-dimensional matrix manner along the X direction and the Y direction, and the respective pixels 31 have an opening.

One pixel 31 is composed of a region which is an overlapping region of a transparent first electrode and a transparent second electrode and provided with a liquid crystal cell. Then, by causing the liquid crystal cell to function as a type of a light shutter (light valve), that is, by controlling the transmittance of the respective pixels 31, the transmittance of the light (illumination light) emitted from the light source 10 is controlled, and as a whole, it is possible to obtain the two-dimensional image. A rectangular opening is provided in an overlapping region of the transparent first electrode and the transparent second electrode. As a result that Fraunhofer diffraction is generated when the light emitted from the light source 10 passes through the relevant opening, in the respective pixels 31, M×N sets=81 sets of diffraction lights are generated. In other words, as the number of pixels 31 P×Q, it can also be considered that the total (P×Q×M×N) streaks of diffraction lights are generated. In the two-dimensional image formation apparatus 30, the spatial frequency in the two-dimensional image is emitted along diffraction angles corresponding to a plurality of diffraction orders (total M×N) generated from the respective pixels 31 from the two-dimensional image formation apparatus 30. It should be noted that the diffraction angles vary also depending on the spatial frequency in the two-dimensional image.

On the front-side focal surface of the first lens $L_1$ having a focal distance $f_1$ (the focal surface on the light source side), the two-dimensional image formation apparatus 30 is arranged, and on the rear-side focal surface of the first lens $L_1$ (the focal surface on the observer side), the spatial filter SF is arranged. With the first lens $L_1$, M×N=81 Fourier transform images corresponding to the plurality of diffraction orders are generated, and these Fourier transform images are formed on the spatial filter SF. It should be noted that in FIG. 4, for the sake of convenience, 64 Fourier transform images are shown in the form of dots.

The spatial filter SF is, to be specific, a spatial filter capable of performing a temporal opening/closing control for spatial and temporal filtering. To be more specific, the spatial filter SF has a number of opening/closing controllable opening sections 51 corresponding to a plurality (specifically, M×N=81) of diffraction orders. Then, in the spatial filter SF, by setting one desired opening section 51 in an opening state in synchronization with the generation timing of the two-dimensional image by the two-dimensional image formation apparatus 30, one Fourier transform image corresponding to the desired diffraction order is selected. To be more specific, the spatial filter SF can be composed, for example, of a transmissive liquid crystal display apparatus or a reflective liquid crystal display apparatus using ferroelectric liquid crystal and having M×N pixels, or composed of a two-dimensional type MEMS including an apparatus in which the movable mirrors are disposed in a two-dimensional matrix manner. It should be noted that a schematic front view of the spatial filter SF composed of a liquid crystal display apparatus is shown in FIG. 6. In FIG. 6, numerals ($m_0$, $n_0$) indicate the number of the opening sections 51 and also the diffraction order. That is, for example, the Fourier transform image having a diffraction order of $m_0=3$ and $n_0=2$ enters the (3, 2)-th opening section 51.

As described above, the conjugate image formation means 60 is composed, to be specific, of the second lens $L_2$ and the third lens $L_3$. Then, the second lens $L_2$ having the focal distance $f_2$ forms the real image RI of the two-dimensional image generated by the two-dimensional image formation apparatus 30 by performing inverse Fourier transform on the Fourier transform image subjected to the filtering by the spatial filter SF. In addition, the third lens $L_3$ having the focal distance $f_3$ forms the conjugate image CI of the Fourier transform image subjected to the filtering by the spatial filter SF.

The second lens $L_2$ is arranged so that the spatial filter SF is located on the front-side focal surface of the second lens and the real image RI of the two-dimensional image generated by the two-dimensional image formation apparatus 30 is located on the rear-side focal surface of the second lens. The magnification ratio of the real image RI obtained here with respect to the two-dimensional image formation apparatus 30 can be changed by arbitrarily selecting the focal distance $f_2$ of the second lens $L_2$.

On the other hand, the third lens $L_3$ is arranged so that the front-side focal surface of the third lens is matched with the rear-side focal surface of the second lens $L_2$, and the conjugate image CI of the Fourier transform image is formed on the rear-side focal surface. Herein, as the rear-side focal surface of the third lens $L_3$ is the conjugate surface of the spatial filter SF, it is equivalent that the two-dimensional image generated by the two-dimensional image formation apparatus 30 is output from a part comparable to one opening sections 51 on the spatial filter SF. Then, the number of light rays eventually generated and output can be defined by the amount obtained when the light rays by the number of pixels (P×Q) are multiplied by a plurality of diffraction orders transmitted through the optical system (specifically, M×N). In addition, the conjugate image CI of the Fourier transform image is formed on the rear-side focal surface of the third lens $L_3$, but in the rear-side focal surface of the third lens $L_3$, it can be regarded that the light ray groups are arranged in a two-dimensional manner orderly. That is, as a whole, it is equivalent to a state in which the projector units 301 shown in FIG. 52 are arranged on the rear-side focal surface of the third lens $L_3$ by the number of the plurality of diffraction orders (specifically, M×N pieces.

Figure 7:
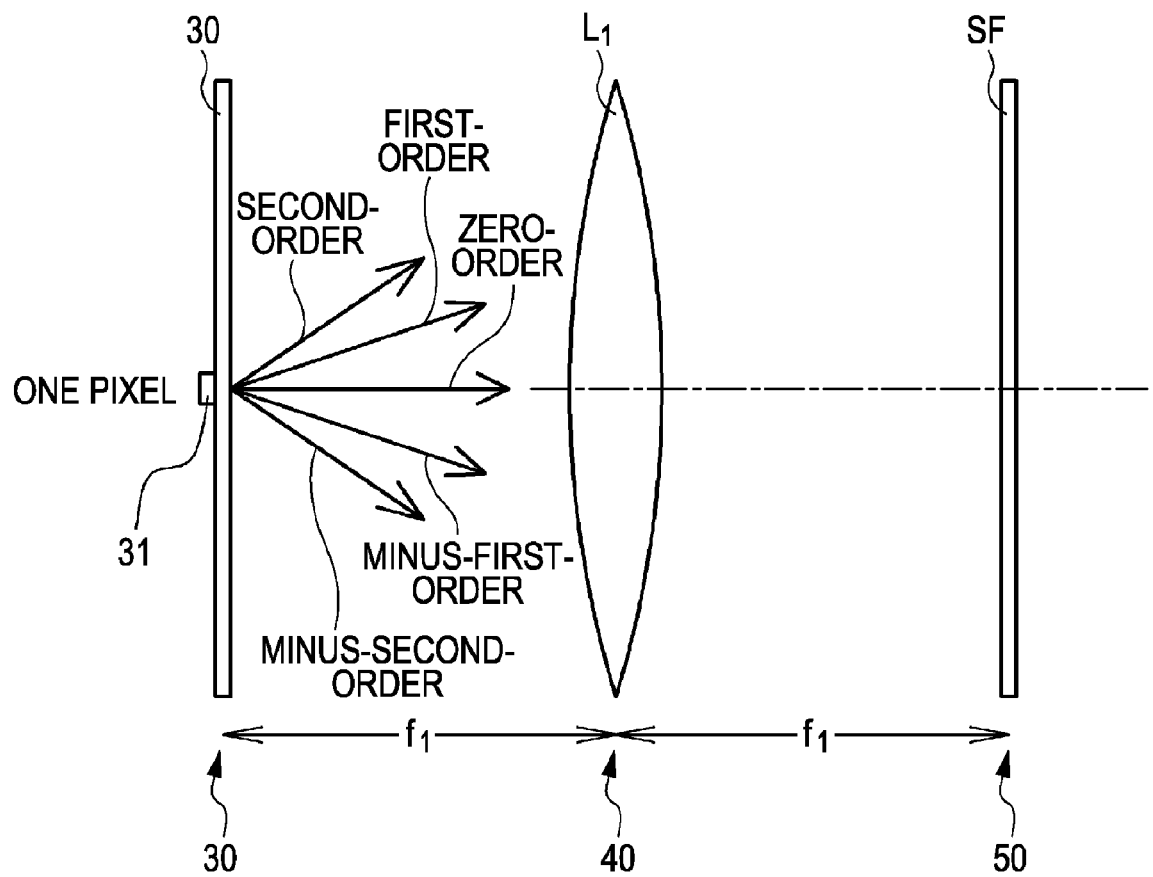
FIG. 7 schematically shows a state in which diffraction lights of a plurality of diffraction orders are generated by light modulation means (a two-dimensional image formation apparatus) according to Embodiment 1.

As schematically shown in FIGS. 4 and 7, with one pixel 31 in the two-dimensional image formation apparatus 30, with nine sets from minus-fourth-order to fourth-order along the X direction and nine sets from minus-fourth-order to fourth'-order along the Y direction, total M×N=81 sets of diffraction lights are generated. It should be noted that in FIG. 7, only diffraction lights of the zero-order light ($n_0=0$), the plus/minus first-order lights ($n_0=\pm 1$), and the plus/minus second-order lights ($n_0=\pm 2$) are represented in the drawing. In actuality, diffraction lights of a still higher-order are generated, and on the basis of these diffraction lights, the three-dimensional image is eventually formed. Herein, in the diffraction lights (light fluxes) of the respective diffraction orders, all image information of the two-dimensional image generated by the two-dimensional image formation apparatus 30 (information on all the pixels) is summarized. a plurality of light ray groups generated by the diffraction from the same pixel on the two-dimensional image formation apparatus 30 (9×9=81 light ray groups) all have the same image information at the same time. In other words, in the two-dimensional image formation apparatus 30 composed of the transmissive liquid crystal display apparatus including P×Q pixels 31, the light from the light source 10 is modulated by the respective pixels 31 to generate the two-dimensional image, and also the spatial frequency in the generated two-dimensional image is emitted along the diffraction angle corresponding to the plurality (total M×N) of diffraction orders generated from the respective pixels 31. That is, sorts of M×N copies of the two-dimensional image are emitted along diffraction angles corresponding to a plurality of diffraction orders (total M×N) from the two-dimensional image formation apparatus 30.

Then, the spatial frequency in the two-dimensional image in which all image information on the two-dimensional image generated by the two-dimensional image formation apparatus 30 is summarized is subjected to Fourier transform by the first lens $L_1$, a number of Fourier transform images corresponding to the plurality of diffraction orders (total M×N) are generated, and the Fourier transform images are formed on the spatial filter SF. In the first lens $L_1$, as the Fourier transform images of the spatial frequency in the two-dimensional image emitted along the diffraction angles corresponding to the plurality of diffraction orders are generated, it is possible to obtain the Fourier transform images at a spatially high density.

Herein, when the wavelength of the light (the illumination light) emitted from the light source 10 is set as λ (mm), the spatial frequency in the two-dimensional image generated by the two-dimensional image formation apparatus 30 is set as ν (lp/mm), and the focal distance of the first lens $L_1$ is set as $f_1$ (mm), the light (Fourier transform image) having the spatial frequency ν appears on the rear-side focal surface of the first lens $L_1$ at a position at a distance $Y_1$ (mm) from the optical axis.

$$Y_1 = f_1 \cdot \lambda \cdot \nu \qquad (A)$$

Figure 8:
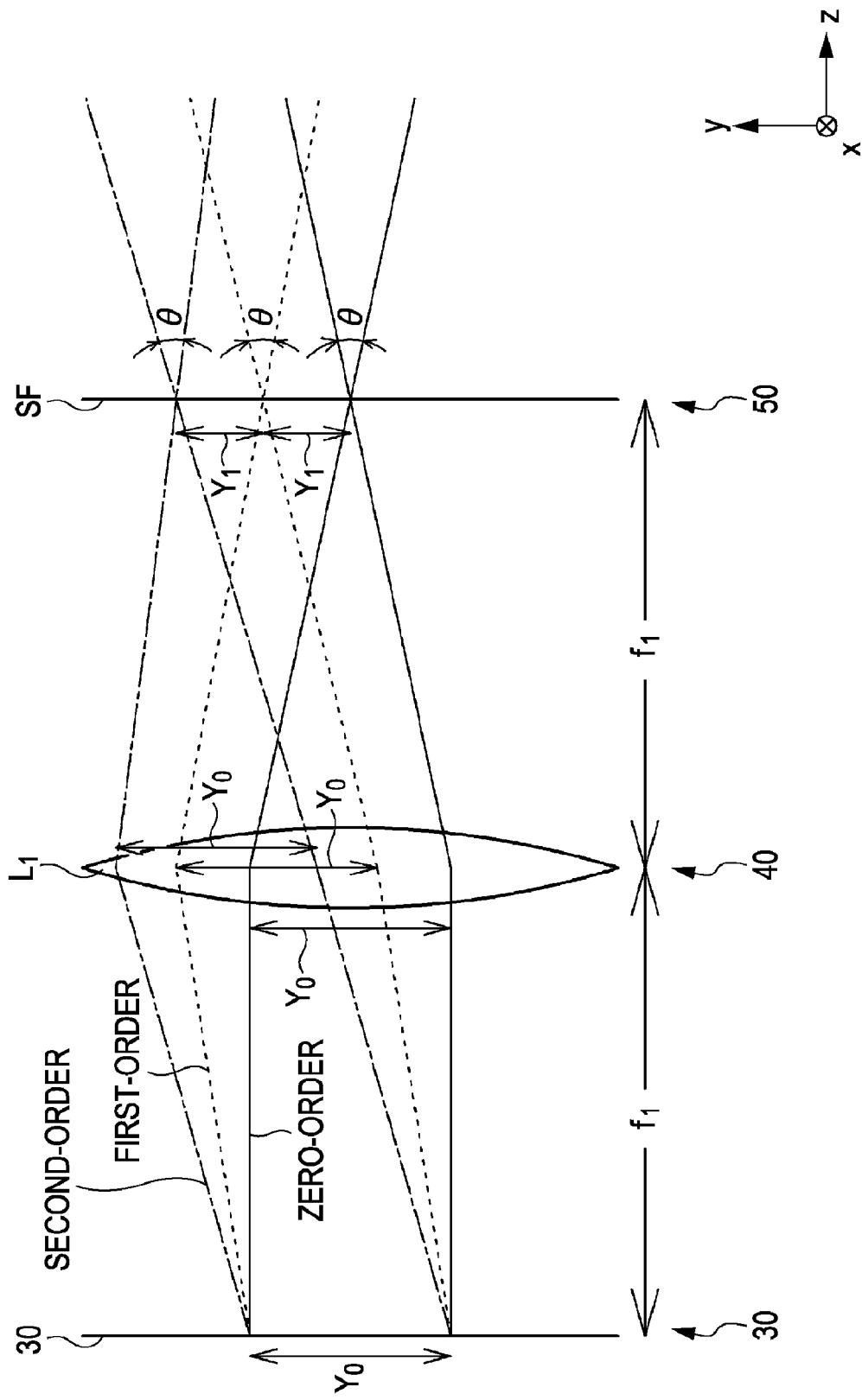
FIG. 8 schematically shows a collecting state in Fourier transform image formation means (a first lens) and an imaging state in the Fourier transform image selection means (the spatial filter) in the three-dimensional image display apparatus according to Embodiment 1.

The collecting state in the first lens $L_1$ is schematically shown in FIG. 8. It should be noted that in FIG. 8, "$Y_0$" represents a length of the two-dimensional image generated by the two-dimensional image formation apparatus 30 in the y axis direction, and "$Y_1$" represents an interval of Fourier transform image in the y axis direction on the spatial filter SF based on the two-dimensional image generated by the two-dimensional image formation apparatus 30. In addition, the zero-order diffraction light is indicated by a solid line, the first-order diffraction light is indicated by a dotted line, and the second-order diffraction light is indicated by a dashed-dotted line. The diffraction lights of the respective diffraction orders, in other words, the number of Fourier transform images generated corresponding to the diffraction orders are converged by the first lens $L_1$ at the different opening sections 51 on the spatial filter SF (see also FIG. 4). As described above, the number of the opening sections 51 is M×N=81. A converging angle to the spatial filter SF (divergence angle emitted from the spatial filter SF) θ is the same in the P×Q pixels 31 in the Fourier transform images in the Fourier transform images (or diffraction lights) of the same diffraction order. On the spatial filter SF, an interval between Fourier transform images of adjacent diffraction orders can be obtained from the expression (A). From the expression (A), by arbitrarily selecting the focal distance $f_1$ of the first lens $L_1$, the position of the Fourier transform image (the imaging position on the spatial filter SF) can be changed.

In the first lens $L_1$, in order to transmit the spatial frequency in the two-dimensional image emitted along the diffraction angles corresponding to the plurality of diffraction orders, in accordance with the diffraction order to be used, a numerical aperture NA of the first lens $L_1$ should be selected, Irrespective of the focal distance, the numerical apertures of all the lenses after the first lens $L_1$ should be equal to or larger than the numerical aperture NA of the first lens $L_1$.

The size of the opening sections 51 may be set as the same value as the value of $Y_1$ in the expression (A). As an example, when the wavelength λ of the illumination light is set as 532 nm, the focal distance $f_1$ of the first lens $L_1$ is set as 50 mm, and the size of one pixel 31 of the two-dimensional image formation apparatus 30 is set as about 13 μm to 14 μm, the value of $Y_1$ is about 2 mm. This means that on the spatial filter SF, it is possible to obtain Fourier transform images corresponding to the respective diffraction orders at a high density of about 2 mm. In other words, on the spatial filter SF, in either direction of the X direction or the Y direction, it is possible to obtain 9×9=81 Fourier transform images at an interval about 2 mm.

Herein, the spatial frequency ν in the two-dimensional image generated by the two-dimensional image formation apparatus 30 is generated by the two-dimensional image formation apparatus 30 in which the two-dimensional image is constructed by the P×Q pixels 31, and at most, the frequency has a cycle composed of the continuous two pixels constituting the two-dimensional image formation apparatus 30.

Figure 9A:
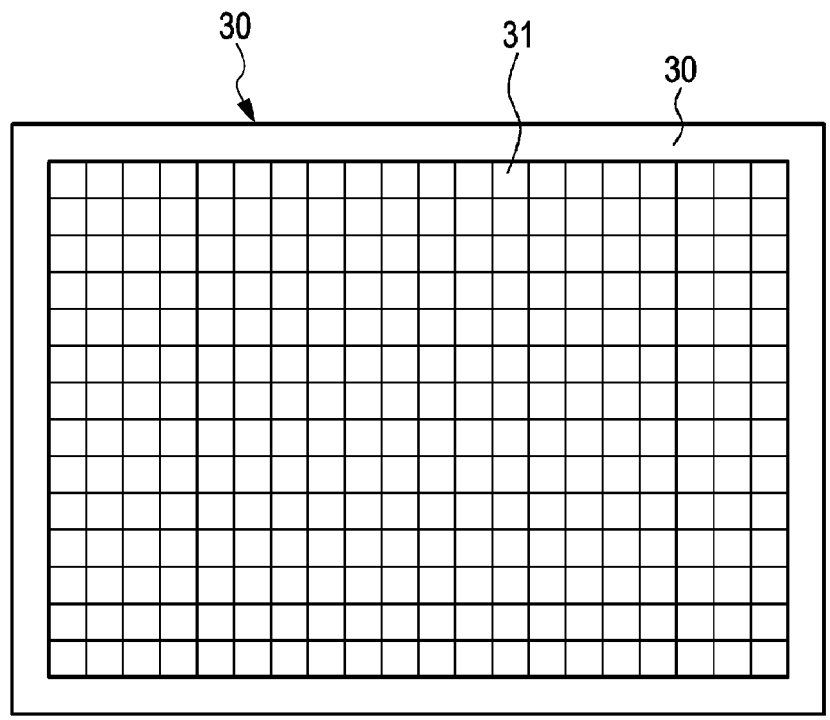
FIGS. 9A and 9B are schematic front views of the light modulation means (the two-dimensional image formation apparatus) respectively showing states in which spatial frequencies in the two-dimensional image generated by the light modulation means (the two-dimensional image formation apparatus) are the lowest and the highest.
Figure 10A:
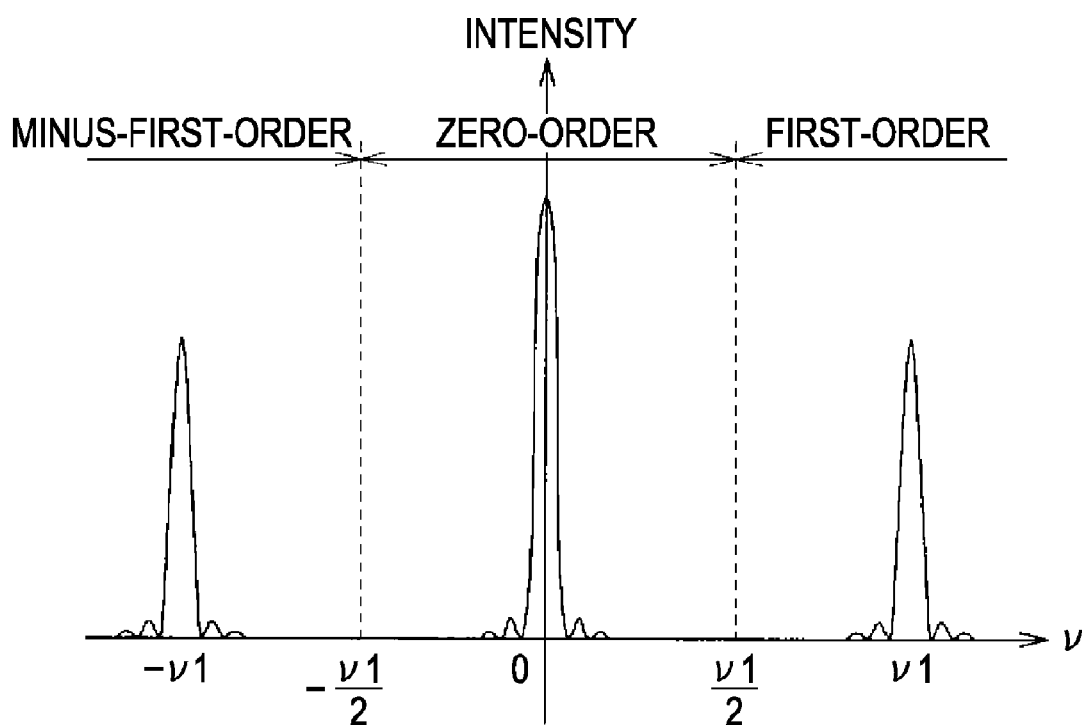
FIGS. 10A and 10B respectively schematically show frequency characteristics of a light intensity of the Fourier transform image in the states in which the spatial frequencies in the two-dimensional image generated by the light modulation means (the two-dimensional image formation apparatus) are the lowest and the highest.

FIG. 9A is a schematic front view of the two-dimensional image formation apparatus 30 in a state in which the spatial frequency in the two-dimensional image generated by the two-dimensional image formation apparatus 30 is the lowest. Herein, the state in which the spatial frequency is the lowest corresponds to a case where all the pixels perform black display or white display. The spatial frequency in the two-dimensional image of this time has only the plane wave component (DC component). It should be noted that FIG. 9A shows a case of the white display. A frequency characteristic of the light intensity of the Fourier transform image formed by the first lens $L_1$ in this case is schematically shown in FIG. 10A. The peak of the light intensity of the Fourier transform image appears at an interval of a frequency $ν_1$.

Figure 9B:
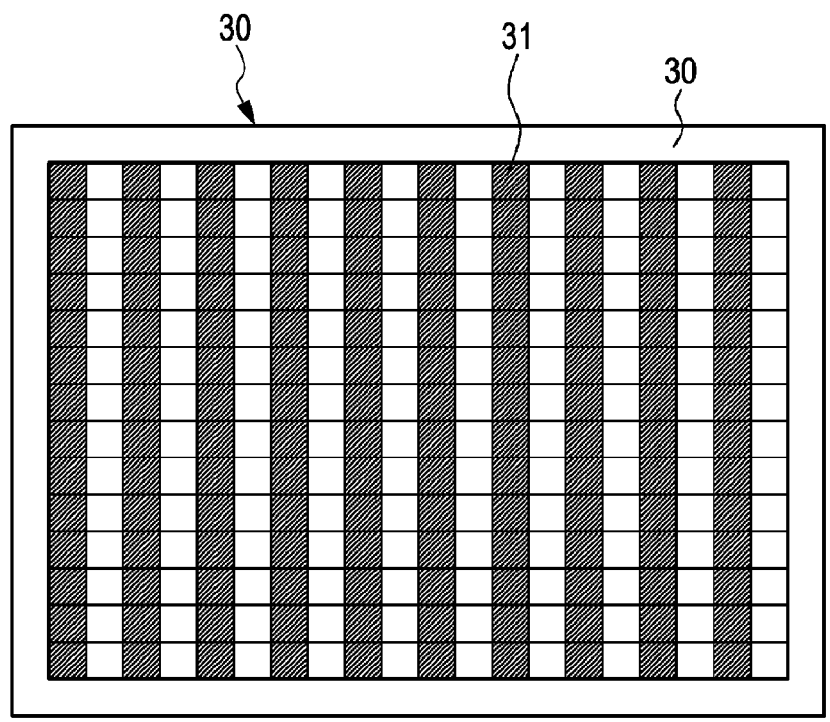
Figure 10B:
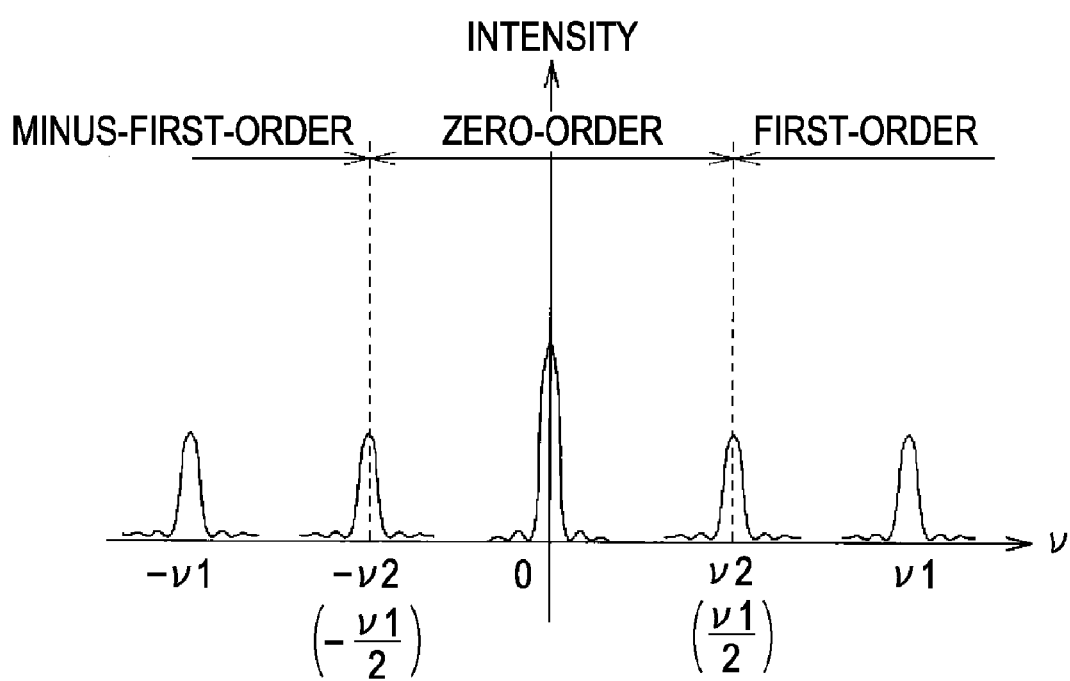
Figure 11A:
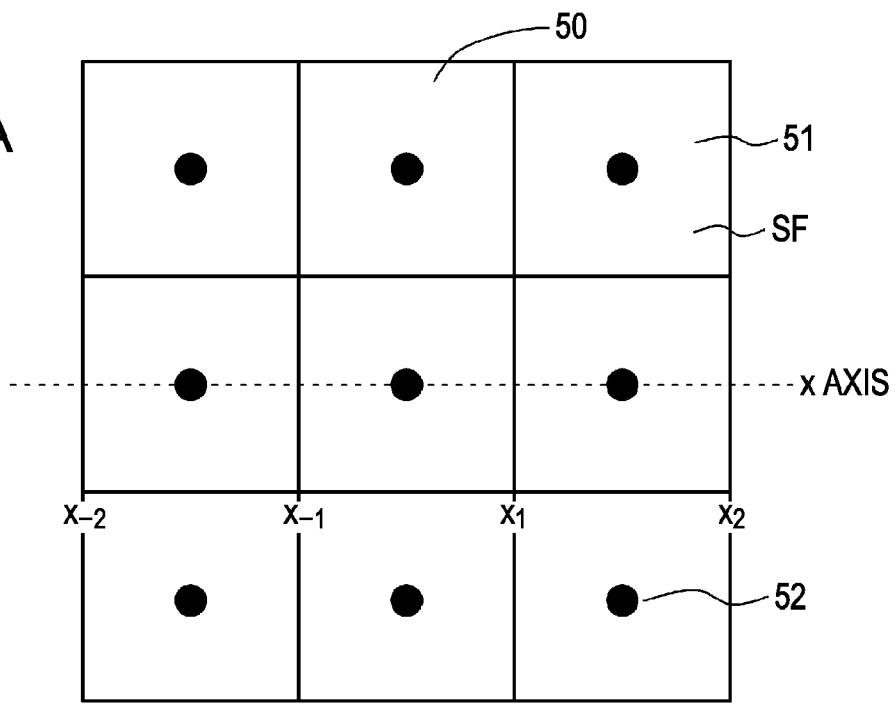
FIG. 11A is a schematic diagram of a distribution of the Fourier transform image on an xy plane of the Fourier transform image selection means (the spatial filter)
Figure 11B:
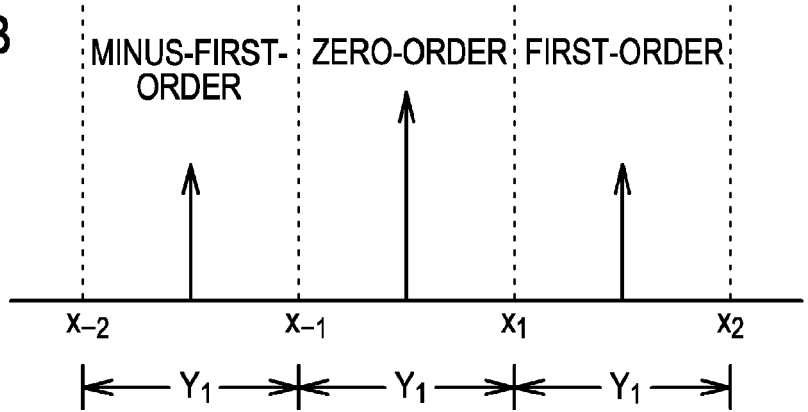
FIGS. 11B and 11C show light intensity distributions of the Fourier transform image on an x axis of FIG. 11A.
Figure 11C:
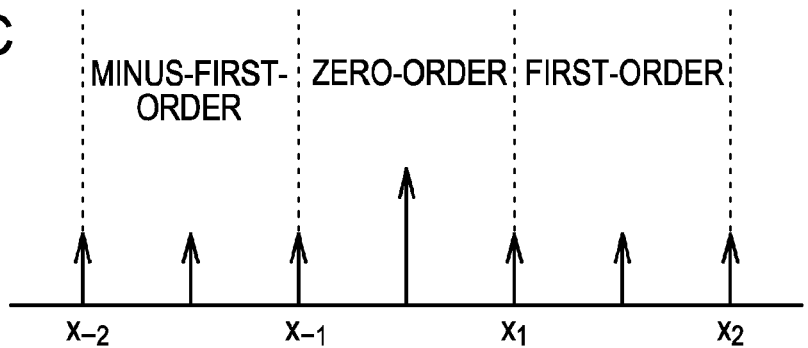

On the other hand, FIG. 9B is a schematic front view of the two-dimensional image formation apparatus 30 in which the spatial frequency in the two-dimensional image generated by the two-dimensional image formation apparatus 30 is the highest. Herein, a state in which the spatial frequency is the highest corresponds to a case where all the pixels alternately perform the black display and the white display. The frequency characteristic of the light intensity of the Fourier transform image formed by the first lens $L_1$ in this case is schematically shown in FIG. 10B. The peak of the light intensity of the Fourier transform image appears at an interval of a frequency $ν_2$ ($=ν_1/2$). FIG. 11A schematically shows the distribution of the Fourier transform images on the spatial filter SF (on the xy plane), and FIGS. 11B and 11C schematically show the light intensity distribution of the Fourier transform image on the x axis (indicated by a dotted line) of FIG. 11A. It should be noted that FIG. 11B shows the lowest spatial frequency component (the plane wave component), and FIG. 11C shows the highest spatial frequency component.

It should be noted that the argument related to the state in which the spatial frequency is the lowest and the state in which the spatial frequency is the highest respectively shown in FIGS. 9A and 9B, the frequency characteristic of the light intensity shown in Figs. The distribution of the Fourier transform image of FIGS. 10A and 10B on the spatial filter SF shown in FIGS. 11A, 11B, and 11C, and the light intensity distribution of the Fourier transform image can also be applied to other embodiments which will be described below.

The planar shape of the opening sections 51 on the spatial filter SF may be decided on the basis of the shape of the Fourier transform image. Furthermore, the opening sections 51 may be provided with respect to the respective diffraction orders so that the peak position of the plane wave component of the Fourier transform image is at the center. With this configuration, at the center positions 52 of the respective opening sections 51, the peak of the light intensity of the Fourier transform image is located. That is, the opening sections 51 may be prepared in which all the plus and minus largest spatial frequencies in the two-dimensional image can be passed while the periodic pattern of the Fourier transform image is at the center in a case where the spatial frequency in the two-dimensional image is the lowest spatial frequency component (the plane wave component).

Incidentally, the state in which the spatial frequency is the highest corresponds to a case where all the pixels alternately perform the black display and the white display as shown in FIG. 9B. In addition, the relation between the spatial frequency of the pixel structure in the two-dimensional image formation apparatus 30 and the spatial frequency in the two-dimensional image is as follows. That is, when it is assumed that the opening occupies all the pixels, the highest spatial frequency in the two-dimensional image is (½) of the spatial frequency in the pixel structure. In addition, in a case where the opening occupies a certain ratio (lower than 1) of the pixels, the highest spatial frequency in the two-dimensional image is lower than (½) of the spatial frequency in the pixel structure. For that reason, up to a position at the half of an interval of periodic patterns derived from the pixel structure appearing on the spatial filter SF, the spatial frequencies in the two-dimensional image all appear. From this point, it is possible to arrange all the opening sections 51 without spatially interfering mutually. That is, for example, the Fourier transform image having the diffraction order $m_0=3$, $n_0=2$ enters the (3, 2)-th opening section 51, and on the other hand, the Fourier transform image having the diffraction order of $m_0=3$, $n_0=2$ does not enter other opening sections 51. With this configuration, on the spatial filter SF having the independent opening sections 51 for each of the Fourier transform images, in the Fourier transform image located at one opening sections 51, the spatial frequency in the two-dimensional image generated by the two-dimensional image formation apparatus 30 exists. On the other hand, due to the spatial restriction of the opening sections 51, the spatial frequency in the two-dimensional image generated by the two-dimensional image formation apparatus 30 is not to be missing. It should be noted that the spatial frequency in the pixel structure can be regarded as the carrier frequency, and the spatial frequency in the two-dimensional image is comparable to the image information in which the spatial frequency of the pixel structure is set as a carrier frequency.

Then, in the spatial filter SF, in order to control passage/non-passage for each of the M×N Fourier transform images, the opening/closing control on the opening sections 51 is performed. When the spatial filter SF is composed, for example, of a liquid crystal display apparatus, it is possible to perform the opening/closing control of the opening section 51 by causing the liquid crystal sell to operate as a type of light shutter (light valve).

It should be noted that in a case where the luminances of the obtained images are different depending on the diffraction orders, while the darkest image is used as a reference, a neutral density filter for dimming the bright image may be arranged on the rear-side focal surface of the third lens $L_3$ (or a lens located in the most posterior position). The same applies to other embodiments which will be described below.

Also, the opening/closing control on the opening sections 51 provided to the spatial filter SF may not be performed on all the opening sections 51. That is, for example, the opening/closing control may be performed on every other opening section 51 or may be performed only on the opening section 51 located at a desired position. The same applies to other embodiments which will be described below.

The timing for the opening/closing control on the opening sections 51 in the spatial filter SF will be described below. In addition, configuration examples of the light source and the illumination optical system will also be described below.

In the three-dimensional image display apparatus according to according to Embodiment 1, or Embodiments 2 to 12 be described below, a control on the operation of the light modulation means or the two-dimensional image formation apparatus is carried out by a personal computer not shown in the drawing.

In the three-dimensional image display apparatus according to Embodiment 1, the semi-transmissive mirrors 90 and 92 configured to change the travelling direction of the light ray emitted from the light ray emitted from the optical system (specifically, the light ray emitted from the conjugate image formation means 60 or the third lens $L_3$) are provided. Therefore, when the image displayed on the semi-transmissive mirrors 90 and 92 is observed, the light source or the optical system constituting the three-dimensional image display apparatus is not located within the view angle of the observer, and a problem that the light source or the optical system is overlapped with the three-dimensional image, and the observation of the three-dimensional image becomes difficult is not caused.

Also, in the three-dimensional image display apparatus 1A according to Embodiment 1, as the light ray reconstruction method is utilized, it is possible to provide the three-dimensional image which satisfies the visual functions such as the focal adjustment, the convergence, and the kinematic parallax. Furthermore, in the three-dimensional image display apparatus 1A according to Embodiment 1, as the high-order diffraction light is efficiently utilized, as compared with an image output method in a related art, it is possible to obtain the light rays which can be controlled by one image output device (the two-dimensional image formation apparatus 30) (sorts of copies of two-dimensional image) by the number of the plurality of diffraction orders (that is, M×N pieces). Furthermore, in the three-dimensional image display apparatus 1A according to Embodiment 1, as the filtering is carried out spatially and also temporally, the temporal characteristic of the three-dimensional image display apparatus can be converted into the spatial characteristic of the three-dimensional image display apparatus. In addition, without using the diffusing screen or the like, it is possible to obtain the three-dimensional image. Furthermore, it is possible to provide the three-dimensional image which is appropriate to the observations from any directions. In addition, as the light ray group (the light ray group having parallax information) can be generated and scattered at the spatially high density, it is possible to provide the fine spatial image which is close to the visual limit.

Embodiment 2

Embodiment 2 relates to a three-dimensional image display apparatus according to embodiment mode 1B and 2B. The three-dimensional image display apparatus according to Embodiment 2 is provided with light ray control means configured to change the travelling direction of the light ray emitted from the optical system and control the collecting state at the observation spot of the light rays emitted from the optical system instead of the semi-transmissive mirror configured to change the travelling direction of the light ray emitted from the optical system, which is different from the three-dimensional image display apparatus described according to Embodiment 1. Other components in the three-dimensional image display apparatus according to Embodiment 2 are the same as those in the three-dimensional image display apparatus described according to Embodiment 1. Therefore, hereinafter, the above-mentioned difference point will be described.

In the three-dimensional image display apparatus according to Embodiment 2, as shown in FIG. 2A, the light ray control means is composed of a concave mirror 92 whose reflection surface is like a concave surface. The collecting state at the observation spot of the light rays emitted from the optical system is controlled on the basis of the curvature of the concave mirror. It should be noted that the concave mirror 92 according to Embodiment 2 may be a total reflection mirror or may also be a semi-transmissive mirror. In this manner, as the light ray control means is composed of the concave mirror 92, the light rays emitted from the optical system and reflected by the concave mirror 92 converge in a certain spatial region.

Figure 2B:
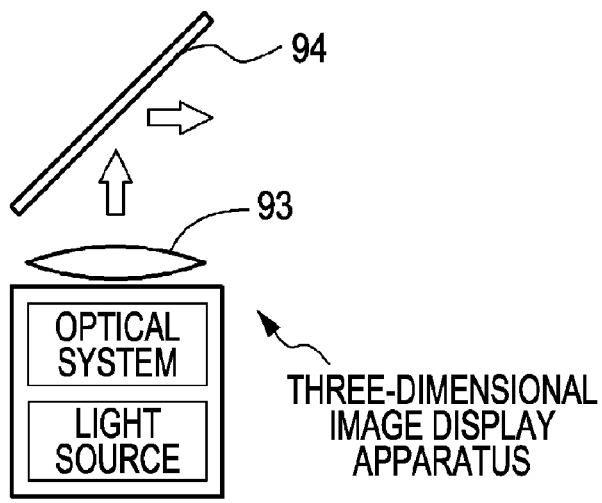

Alternatively, as shown in FIG. 2B, the light ray control means is composed of a lens 93 which the light ray emitted from the optical system enters and a mirror 94 which the light ray emitted from the lens 93 enters (which is composed of a planar mirror or a concave mirror and also a total reflection mirror or a semi-transmissive mirror). In this manner, also with the provision of the lens 93, the light rays reflected by the mirror 94 converge in a certain spatial region. The lens 93 can be composed, for example, of any one of a biconvex lens, a plano-convex lens, and a meniscus convex lens, or may also be composed of a Fresnel lens.

Figure 2C:
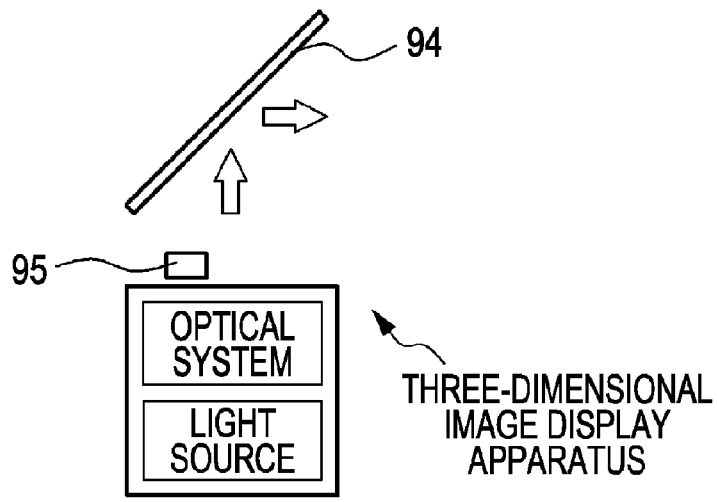

Alternatively, as shown in FIG. 2C, the light ray control means is composed of the mirror 94 (composed of a planar mirror or a concave mirror and also a total reflection mirror or a semi-transmissive mirror). The light ray control means further includes detection means configured to detect an observation spot (specifically, for example, a camera provided with a CCD element) 95 configured to detect the observation spot. On the basis of the observation spot detection result by the detection means 95 (specifically, detection of the face and the eyes of the observer), the light ray control means controls the position of the mirror 94. It should be noted that detection of the face and the eyes of the observer based on the detection means 95 can be carried out by a related art method, and also control on the position of the mirror 94 based on the observation spot detection result by the detection means 95 can be carried out by a related art method and control mechanism. It should be noted that these detection and control are carried out by a personal computer which is not shown in the drawing.

Alternatively, a mode can be adopted that the light ray control means is composed of a lens which the light ray emitted from the optical system enters and a mirror which the light ray emitted from this lens (composed of a planar mirror or a concave mirror and also a total reflection mirror or a semi-transmissive mirror, the light ray control means is further provided with the detection means configured to detect the observation spot, and the collecting state of the lens is controlled on the basis of the observation spot detection result by the detection means (specifically, detection of the face and the eyes of the observer). A control on the collecting state of the lens can be based on a method, for example, of moving the optical axis of the lens and the imaging point by moving the lens, and the moving mechanism of the lens, the lens moving method, and the control on the lens movement can be based on a moving mechanism, a moving method, and a movement control in a related art.

Figure 50A:
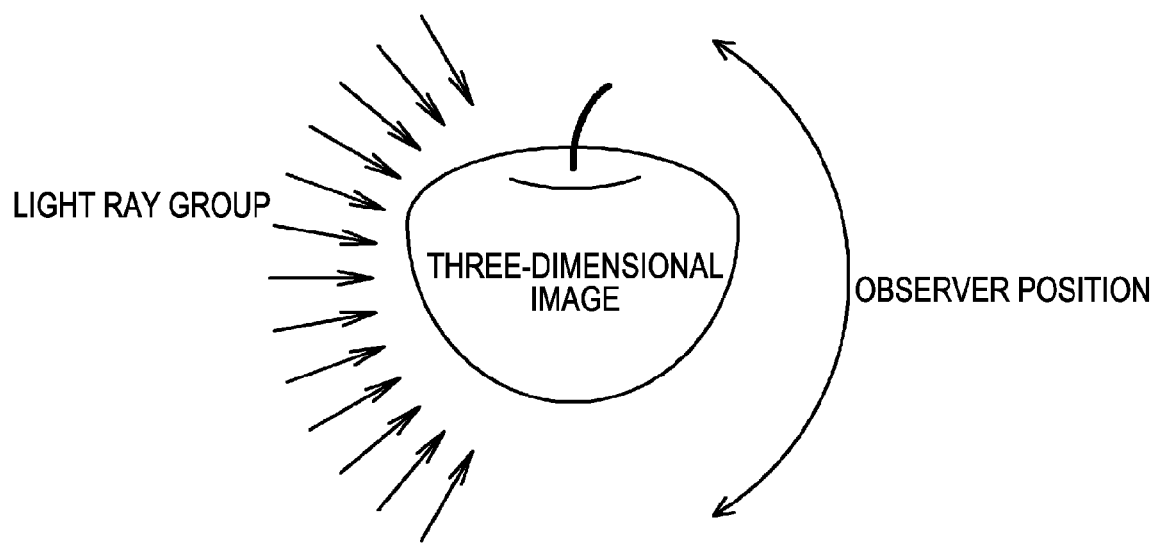
FIGS. 50A and 50B respectively schematically show states in which the light ray group used for the three-dimensional image display is spatially scattered.
Figure 50B:
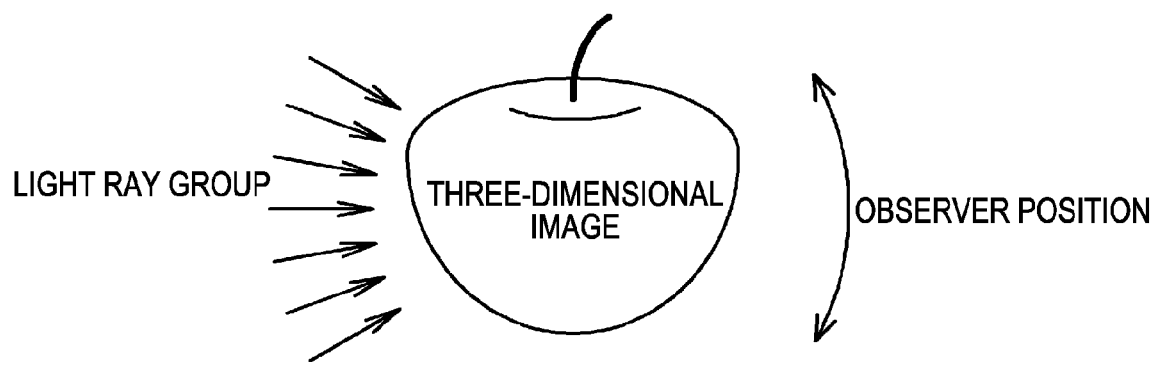

Incidentally, in a state in which the eyes or the face of the observer is located in the spatial region where the light rays converge and the face of the observer is hardly moved (specifically, for example, in a case where the observer sits on a chair or the like), even when the light ray group used for the three-dimensional image display (the light ray group having parallax information) is generated and scattered spatially at a lower density, it is possible to obtain the three-dimensional image based on the light rays having a quality similar to that of the object in the real world, and the loads of the image data processing system in the three-dimensional image display apparatus can be reduced. That is, as shown in the conceptual diagram in FIG. 50A, in a case where the observer observes the three-dimensional image from various positions, the light ray group used for the three-dimensional image display should be generated and scattered spatially at a higher density. On the other hand, as shown in the conceptual diagram in FIG. 50B, in a case where the observer observes the three-dimensional image from a fixed position, the light ray group used for the three-dimensional image display may be generated and scattered spatially at a lower density. Therefore, as the light ray irradiation region is limited, without reducing the light ray density in the vicinity of the observer, it is possible to reduce the number of light rays. As a result, the loads of the image data processing system in the three-dimensional image display apparatus can be reduced.

It should be noted that on the basis of the observation spot detection result by the detection means, the control on the light ray that should be emitted from the optical system may be performed. To be specific, for example, in the spatial filter SF having the M×N opening/closing controllable opening sections 51, on the basis of the observation spot detection result (specifically, detection of the face and the eyes of the observer), the opening sections 51 which should be in the opening state may be restricted. To be more specific, for example, in a case where the eyes of the observer is located at a position where the image emitted from the (3, 3)-th opening section 51 is mainly observed, for example, such a control may be performed that opening/closing is controlled from the (1, 1)-th opening section 51 to the (1, 5)-th opening section 51, from the (2, 1)-th opening section 51 to the (2, 5)-th opening section 51, from the (3, 1)-th opening section 51 to the (3, 5)-th opening section 51, from the (4, 1)-th opening section 51 to the (4, 5)-th opening section 51, and from the (5, 1)-th opening section 51 to the (5, 5)-th opening section 51, and other opening sections 51 are set in the closed state. With this configuration too, the light ray group used for the three-dimensional image display may be generated and scattered spatially at a lower density. Therefore, as the light ray irradiation region is limited, without reducing the light ray density in the vicinity of the observer, it is possible to reduce the number of light rays. As a result, the loads of the image data processing system in the three-dimensional image display apparatus can be reduced.

Embodiment 3

Figure 12:
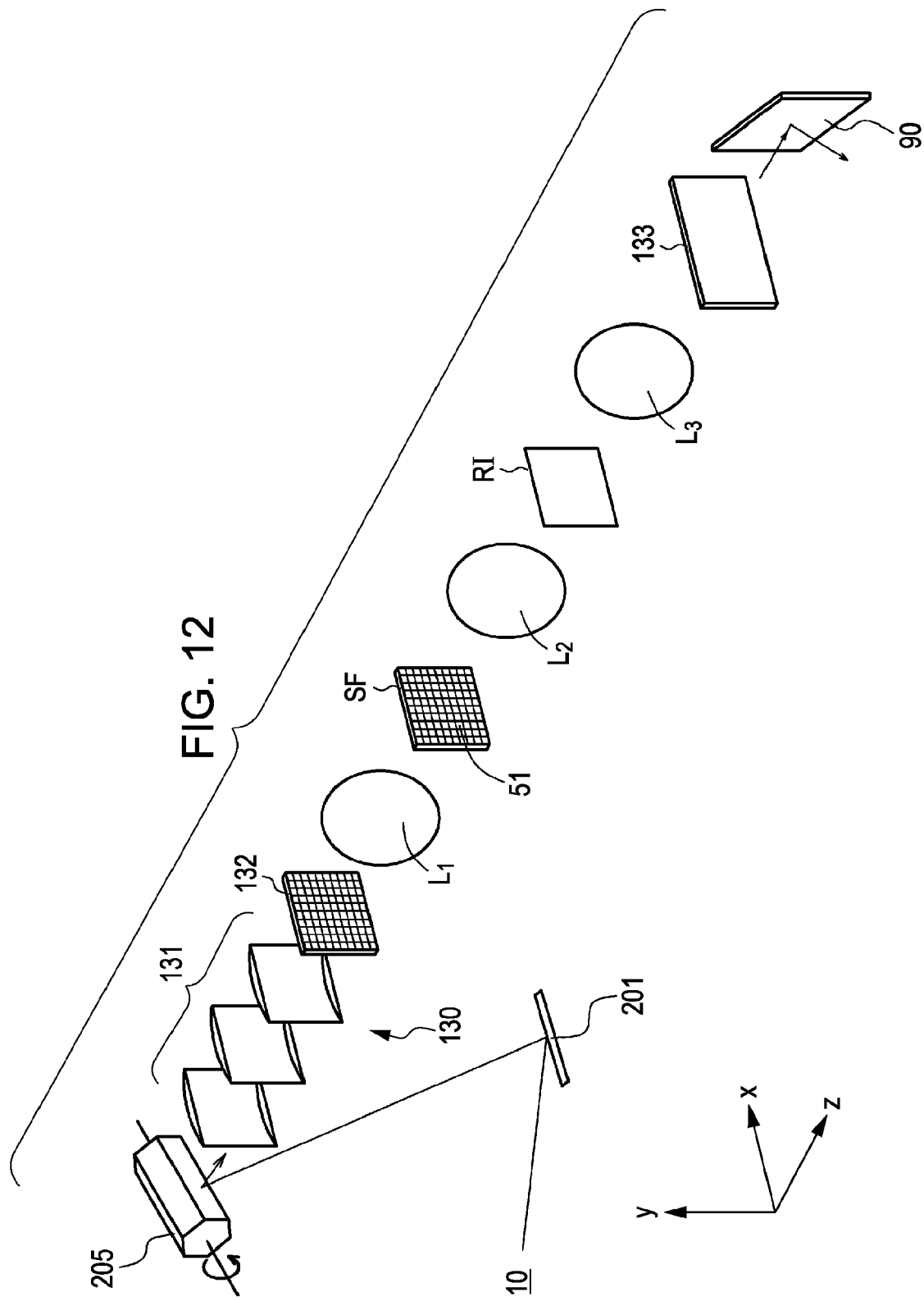
FIG. 12 is a conceptual diagram of a three-dimensional image display apparatus according to Embodiment 3.

Embodiment 3 relates to a three-dimensional image display apparatus according to embodiment modes 1 and 3. A conceptual diagram of the three-dimensional image display apparatus according to Embodiment 3 is shown in FIG. 12. It should be noted that FIG. 12 exemplifies the semi-transmissive mirror 90.

It should be noted that according to Embodiments 3 to 12 which will be described below, basically, the semi-transmissive mirror configured to change the travelling direction of the light ray emitted from the optical system described according to Embodiment 1 is provided, or alternatively, the light ray control means configured to change the travelling direction of the light ray emitted from the optical system and also control the collecting state of the light ray emitted from the optical system at the observation spot described according to Embodiment is provided. Therefore, according to Embodiments 3 to 12 described below, different points in the configuration and construction of the three-dimensional image display apparatuses will be solely described.

The light modulation means 130 according to Embodiment 3 is different from the liquid crystal display apparatus according to Embodiment 1 in that the light modulation means 130 includes a one-dimensional spatial light modulator configured to generate a one-dimensional image sectioned into P pieces (for example, 1920 pieces) (specifically, a diffraction grating-light modulation apparatus 201); a scan optical system configured to two-dimensionally develop (scan) the one-dimensional image generated by the one-dimensional spatial light modulator (the diffraction grating-light modulation apparatus 201) and sectioned into P pieces to form a two-dimensional image sectioned into P×Q (specifically, a scan mirror 205); and a grating filter (diffraction grating filter) 132 configured to emit a spatial frequency in the generated two-dimensional image which is arranged on a generation surface of the two-dimensional image along diffraction angles according to a plurality (specifically, total M×N) of diffraction orders. Herein, for each of the components of the two-dimensional image the scan optical system (the scan mirror 205) and sectioned into P×Q, M×N sets of diffraction lights are generated by the grating filter 132. It should be noted that the grating filter 132 may be composed of an amplitude grating or a phase grating. It should be noted that the configuration and the construction of the light modulation means 130 according to Embodiments 5, 7, and 9 described below may be similar too.

Alternatively, as a description is given by way of the components of the three-dimensional image display apparatus according to the embodiment mode 3, the three-dimensional image display apparatus according to Embodiment 3 is a three-dimensional image display apparatus provided with a light source 10 and an optical system. Then, this optical system includes (A) a two-dimensional image formation apparatus 130 composed of a one-dimensional spatial light modulator configured to generate a one-dimensional image provided with P pixels along the X direction (specifically, the diffraction grating-light modulation apparatus 201); a scan optical system configured to generate a two-dimensional image by developing the one-dimensional image generated by the one-dimensional spatial light modulator (specifically, the scan mirror 205); and diffraction light generation means arranged on a generation surface of the two-dimensional image and configured to generate M sets of diffraction lights from m-th order to m'-th order (where m and m' are integers, and M is a positive integer) for each pixel (specifically, a grating filter 132), (B) a first lens $L_1$ in which the diffraction light generation means is arranged on a front-side focal surface (specifically, a convex lens according to Embodiment 3), (C) a spatial filter SF arranged on a rear-side focal surface of the first lens $L_1$ and provided with total M×N closing/opening controllable opening sections 51 with M opening sections arranged in the X direction and N opening sections (where N is a positive integer) arranged in the Y direction, (D) a second lens $L_2$ in which the spatial filter SF is arranged on a front-side focal surface (specifically, a convex lens according to Embodiment 3), and (E) a third lens $L_3$ whose front-side focus is located at a rear-side focus of the second lens $L_2$ (specifically, a convex lens according to Embodiment 3).

Herein, the one-dimensional image is assumed to extend in the X direction. In addition, the scan direction is the Y direction, the two-dimensional image is generated along the X direction and the Y direction. It should be noted that alternatively, the X direction and the Y direction may be switched. It should be noted that the same applies in Embodiments 5, 7, and 9 described below. In addition, in FIG. 12 or FIGS. 18, 24, and 28 described below, the representation of the illumination optical system 20 is omitted.

Figure 13:
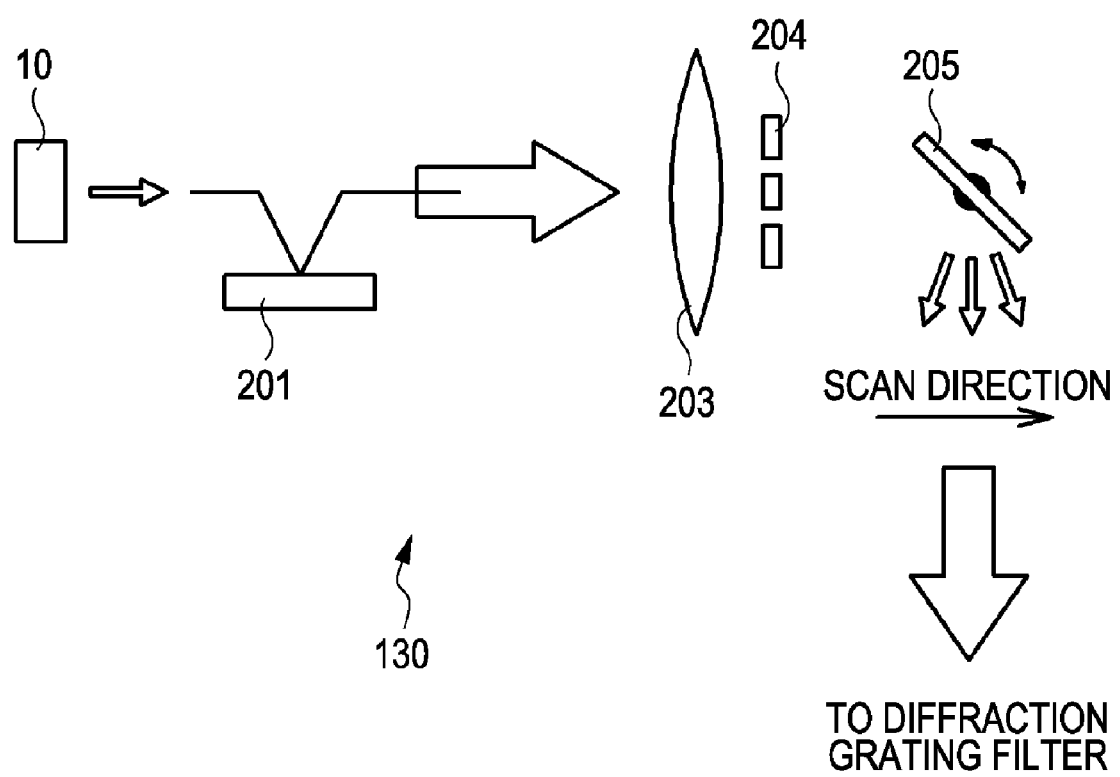
FIG. 13 is a conceptual diagram of a part of the light modulation means (the two-dimensional image formation apparatus) in the three-dimensional image display apparatus and the like according to Embodiment 3.

A conceptual diagram of the light modulation means (the two-dimensional image formation apparatus) 130 including the diffraction grating-light modulation apparatus is shown in FIG. 13. That is, the light modulation means 130 according to Embodiment 3 is composed of the light source 10 configured to emit laser, a collecting lens (not shown) for collecting the light emitted from the light source 10, the diffraction grating-light modulation apparatus 201 which the light passing the collecting lens enters, a lens 203 and a spatial filter 204 through which the light emitted from the diffraction grating-light modulation apparatus 201 transmits, an imaging lens (not shown) for imaging one stream of light flux passing the spatial filter 204, and the scan mirror 205 configured to scan one light flux passing the imaging lens.

The one-dimensional spatial light modulator (one-dimensional image formation apparatus, the diffraction grating-light modulation apparatus 201) generates the one-dimensional image by diffracting the light from the light source 10. To be more specific, the diffraction grating-light modulation apparatus 201 is composed by one-dimensionally disposing diffraction grating-light modulation elements (GLV) 210 in an array manner. The diffraction grating-light modulation element 210 is manufactured by applying a micro machine manufacturing technology. The diffraction grating-light modulation element 210 is composed of a reflective diffraction grating and has a light switching action. By electrically controlling ON/OFF control of the light, the image is displayed. Then, the light modulation means (the two-dimensional image formation apparatus) 130 scans the lights respectively emitted from the diffraction grating-light modulation elements 210 with the scan mirror 205 composed of a Galvano mirror or a polygon mirror to obtain the two-dimensional image. Therefore, in order to display the two-dimensional image composed of P×Q (for example, 1920×1080) pixels, the diffraction grating-light modulation apparatus 201 may be composed of P pieces (=1920 pieces) of diffraction grating-light modulation elements 210.

The diffraction light should be generated on the basis of the two-dimensional image obtained through the scan by the scan mirror 205. For that reason, the diffraction light is generated by arranging the amplitude-type or phase-type filter on the two-dimensionally developed surface. To be specific, the two-dimensional image obtained through the scan by the scan mirror 205 passes through a scan lens 131 and enters a grating filter arranged on the generation surface of the two-dimensional image (diffraction grating filter) 132, and in the grating filter 132, for each of the component of the two-dimensional image sectioned into P×Q, M×N sets of diffraction lights are generated. That is, from the grating filter 132, the spatial frequency in the generated two-dimensional image is emitted along diffraction angles corresponding to a plurality of diffraction orders generated from the respective compartments of the grating filter 132 (equivalent to the pixels). The grating filter 132 is arranged on the front-side focal surface of the first lens $L_1$ having the focal distance $f_1$.

In a case where the one-dimensional spatial light modulator (one-dimensional image formation apparatus) is used, as the image to be generated is one-dimensional, the diffraction is also caused in the one-dimensional space. Therefore, an optical system for diffusing the diffraction light to be obtained in the Y direction should be prepared. In the three-dimensional image display apparatus according to Embodiment 3, a member 133 (an anisotropic diffusion filter, an anisotropic diffusion sheet, or an anisotropic diffusion film) configured to generate anisotropic light diffusion for diffusing the diffraction light generated in a one-dimensional direction in a two-dimensional direction is arranged on downstream of the third lens $L_3$ (the conjugate image formation means 60) (on the observer side).

Except for the above-mentioned points, the configuration and the construction of the three-dimensional image display apparatus according to Embodiment 3 can be set similar to the configuration and the construction of the three-dimensional image display apparatus described according to Embodiment 1, and a detailed description will be omitted. The configuration and the construction of the diffraction grating-light modulation element 210 will be described below.

Embodiment 4

Figure 14:
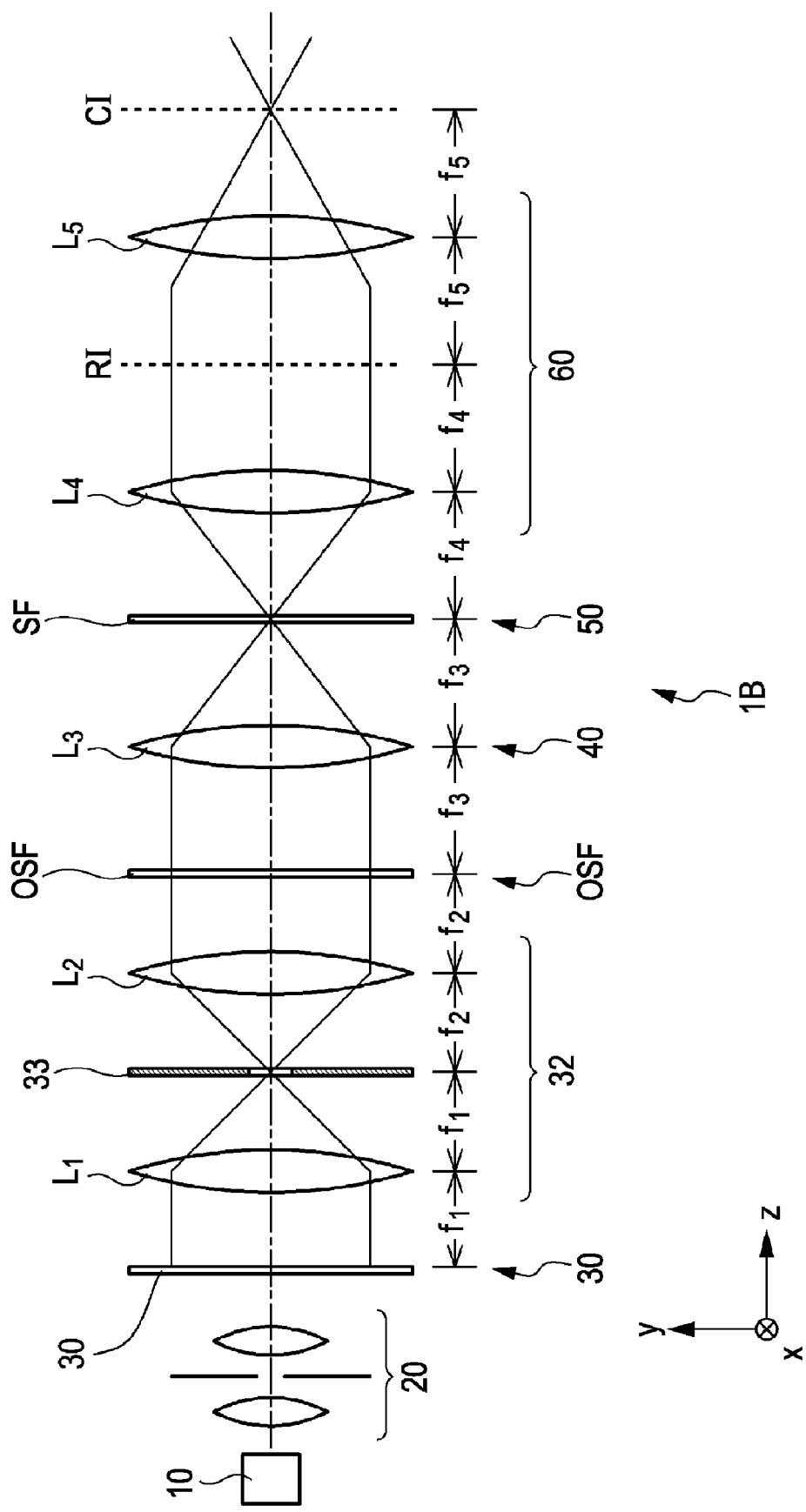
FIG. 14 is a conceptual diagram of a three-dimensional image display apparatus in a yz plane according to Embodiment 4.
Figure 15:
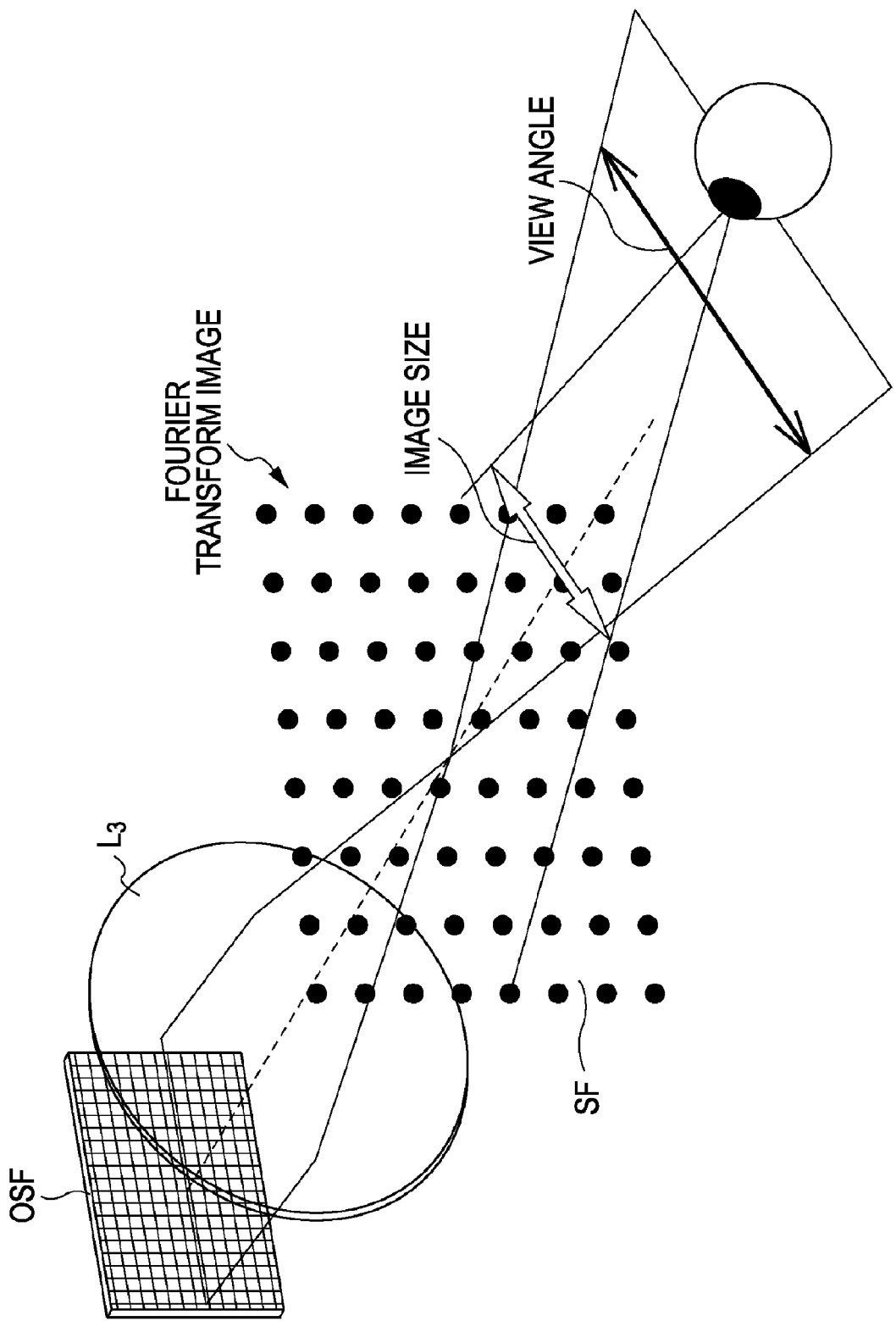
FIG. 15 is a conceptual diagram of the three-dimensional image display apparatus as obliquely viewed according to Embodiment 4.
Figure 16:
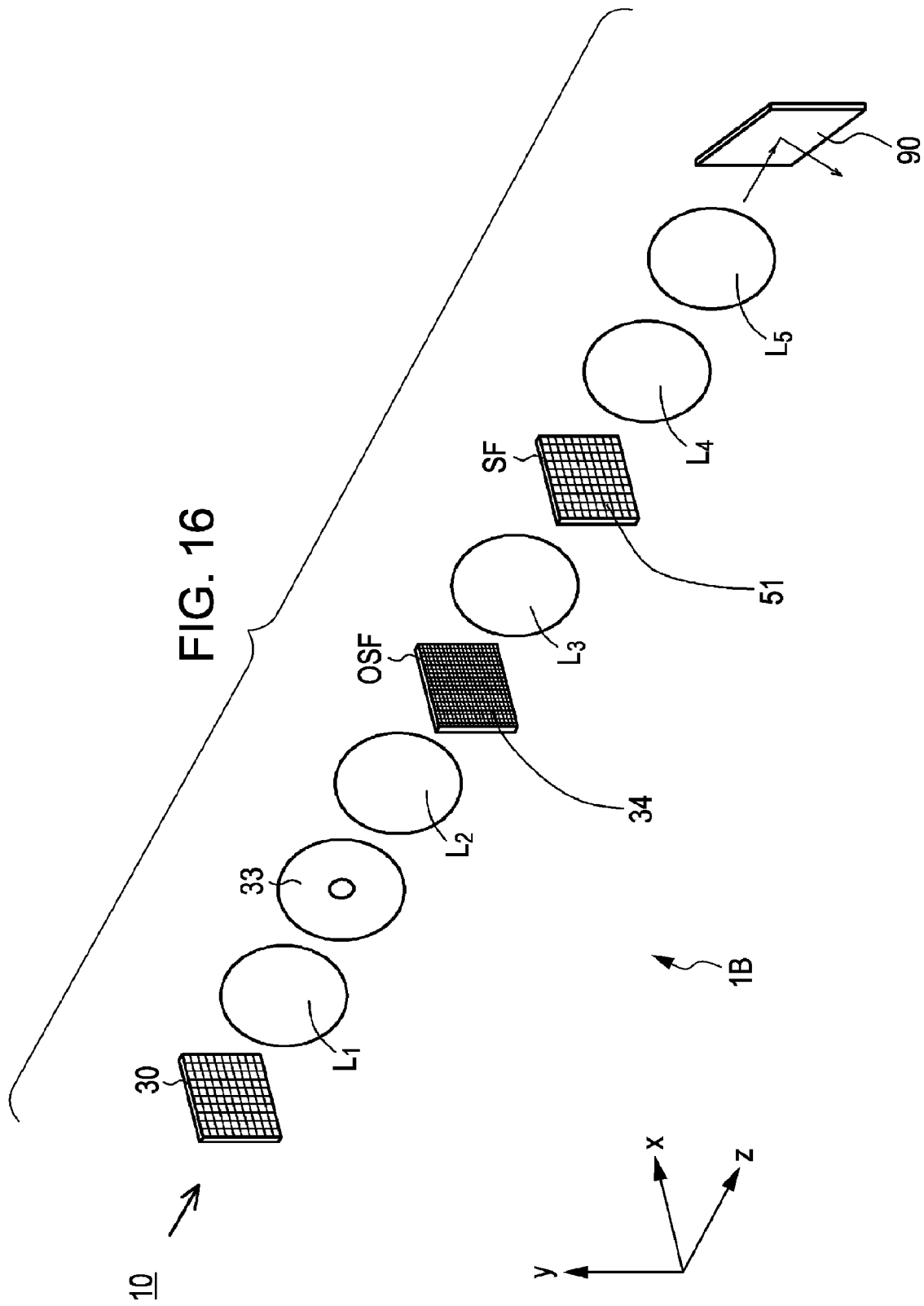
FIG. 16 schematically shows an arrangement state of components of the three-dimensional image display apparatus according to Embodiment 4.

Embodiment 4 relates to a three-dimensional image display apparatus according to embodiment modes 4 and 5. FIGS. 14, 15, and 16 are conceptual diagrams of the monochromatic-display three-dimensional image display apparatus according to Embodiment 4. It should be noted that in FIG. 14, the optical axis is set as the z axis, orthogonal coordinates in a plane orthogonal to the z axis are set as the x axis and the y axis, a direction parallel to the x axis is set as the X direction, and a direction parallel to the y axis is set as the Y direction. The X direction is set, for example, as the horizontal direction in the three-dimensional image display apparatus, and the Y direction is set, for example, as the vertical direction in the three-dimensional image display apparatus. Herein, FIG. 14 is a conceptual diagram of the three-dimensional image display apparatus in the yz plane according to Embodiment 4. A conceptual diagram of the three-dimensional image display apparatus in the xz plane according to Embodiment 4 is substantially similar to FIG. 14. In addition, FIG. 15 is a conceptual diagram of the three-dimensional image display apparatus as viewed obliquely according to Embodiment 4, FIG. 16 schematically shows an arrangement state of components of the three-dimensional image display apparatus according to Embodiment 4, and FIG. 16 exemplifies the semi-transmissive mirror 90.

In a three-dimensional image display apparatus 1B according to Embodiment 4 too, with the stand-alone three-dimensional image display apparatus provided with the components shown in FIGS. 14, 15, and 16, it is possible to generate and form a large number of light ray groups spatially at a high density as compared with a related art technology. The three-dimensional image display apparatus 1B according to Embodiment 4 is a single three-dimensional image display apparatus and has a function equivalent to an apparatus in which a large number (M×N pieces) of projector units 301 are arranged in a parallel manner. It should be noted that for example, in a case where a multi-unit system is adopted, as shown in FIG. 51, by the number of the divided three-dimensional image, the three-dimensional image display apparatuses 1B according to Embodiment 4 may be prepared. In FIG. 51, an apparatus provided with 4×4=16 three-dimensional image display apparatuses 1B according to Embodiment 4 is exemplified.

As a description is given by way of the components of the three-dimensional image display apparatus according to the embodiment mode 4, the three-dimensional image display apparatus 1B according to Embodiment 4 is a three-dimensional image display apparatus provided with a light source 10 and an optical system. Then, this optical system includes (A) light modulation means 30 provided with a plurality of pixels 31 and configured to generate a two-dimensional image by modulating the light from the light source 10 by the respective pixels 31 and to emit the spatial frequency in the generated two-dimensional image along diffraction angles corresponding to a plurality of diffraction orders generated from the respective pixels 31, (B) image restriction and generation means 32 configured to perform Fourier transform on a spatial frequency in the two-dimensional image emitted from the light modulation means 30 to generate a number of Fourier transform images corresponding to the plurality of diffraction orders generated from the respective pixels 31 and only select a predetermined Fourier transform image (for example, a Fourier transform image corresponding to a first-order diffraction where a zero-order of a plane wave component is set as a carrier frequency) among the Fourier transform images, and to perform inverse Fourier transform on the selected Fourier transform image to form a conjugate image of the two-dimensional image (a real image of the two-dimensional image) generated by the light modulation means 30, (C) an oversampling filter (diffraction light generation member) OSF provided with a plurality of opening regions 34 and configured to emit a spatial frequency in the conjugate image of the two-dimensional image along diffraction angles corresponding to a plurality of diffraction orders generated from the respective opening regions 34, (D) Fourier transform image formation means 40 configured to perform Fourier transform on a spatial frequency in the conjugate image of the two-dimensional image emitted from the oversampling filter OSF to generate a number of Fourier transform images corresponding to a plurality of diffraction orders generated from the respective opening regions 34, (E) Fourier transform image selection means 50 configured to select a Fourier transform image corresponding to a desired diffraction order among the number of the Fourier transform images generated corresponding to a plurality of diffraction orders generated from the respective opening regions 34, and (F) conjugate image formation means 60 configured to form a conjugate image of the Fourier transform image selected by the Fourier transform image selection means 50.

Furthermore, the conjugate image formation means 60 includes inverse Fourier transform means (specifically, a fourth lens $L_4$ which will be described below) configured to form a conjugate image of the two-dimensional image generated by the image restriction and generation means 32 by performing inverse Fourier transform on the Fourier transform image selected by the Fourier transform image selection means 50 (hereinafter, which may be simply referred to as "conjugate image of the two-dimensional image" in some cases). In addition, the Fourier transform image formation means 40 is composed of a lens. The oversampling filter OSF is arranged on a front-side focal surface of this lens, and the Fourier transform image selection means 50 is arranged on a rear-side focal surface of this lens. The Fourier transform image selection means 50 has a number of opening/closing controllable opening sections 51 corresponding to a plurality of diffraction orders generated from the respective opening regions 34.

Herein, the spatial frequency in the two-dimensional image is comparable to the image information in which the spatial frequency of the pixel structure is set as a carrier frequency. In addition, the spatial frequency in the conjugate image of the two-dimensional image is a spatial frequency obtained by removing the spatial frequency in the pixel structure from the spatial frequency in the two-dimensional image.

Also, as a description is given by way of the components of the three-dimensional image display apparatus according to the embodiment mode 5, the three-dimensional image display apparatus 1B according to Embodiment 4 is a three-dimensional image display apparatus provided with a light source 10 and an optical system. Then, this optical system includes (A) a two-dimensional image formation apparatus 30 provided with openings arranged in a two-dimensional matrix manner in an X direction and a Y direction (the number of pieces: P×Q) and configured to generate a two-dimensional image by controlling passage, reflection, or diffraction of the light from the light source 10 for each opening and to generate diffraction lights of a plurality of diffraction orders for each opening on the basis of the two-dimensional image, (B) a first lens $L_1$ in which the two-dimensional image formation apparatus 30 is arranged on a front-side focal surface (C) a scattering diffraction restricting opening section 33 arranged on a rear-side focal surface of the first lens $L_1$ and configured to allow only diffraction light of a predetermined diffraction order to pass (for example, a Fourier transform image corresponding to a first-order diffraction where a zero-order of a plane wave component is set as a carrier frequency), (D) a second lens $L_2$ in which the scattering diffraction restriction opening section 33 is arranged on a front-side focal surface, (E) an oversampling filter (diffraction light generation member) OSF arranged on a rear-side focal surface of the second lens $L_2$, provided with $P_{OSF} \times Q_{OSF}$ opening regions 34 (where $P_{OSF}$ and $Q_{OSF}$ are arbitrary positive integers) which are disposed in a two-dimensional matrix manner along the X direction and the Y direction, and configured to generate M×N sets of diffraction lights with M sets from an m-th order to an m'-th order along the X direction (where m and m' are integers, and M is a positive integer) and N sets from an n-th order to an n'-th order along the Y direction (where n and n' are integers, and N is a positive integer) on the basis of a conjugate image of the two-dimensional image generated by the second lens $L_2$ for each opening region 34, (F) a third lens $L_3$ in which the oversampling filter OSF is arranged on a front-side focal surface, (G) a spatial filter SF arranged on a rear-side focal surface of the third lens $L_3$ and provided with total M×N closing/ opening controllable opening sections 51 with M opening sections arranged in the X direction and N opening sections arranged in the Y direction, (H) a fourth lens $L_4$ in which the spatial filter SF is arranged on a front-side focal surface, and (I) a fifth lens $L_5$ whose front-side focus is located on a rear-side focus of the fourth lens $L_4$.

It should be noted that to be specific, according to Embodiment 4, the first lens $L_1$, the second lens $L_2$, the third lens $L_3$, the fourth lens $L_4$, and the fifth lens $L_5$ are composed of a convex lens. In addition, the image restriction and generation means 32 is composed of two lenses (the first lens $L_1$ and the second lens $L_2$) and a scattering diffraction restricting opening section 33 arranged between these two lenses (the first lens $L_1$ and the second lens $L_2$) and configured to allow only a predetermined Fourier transform image to pass (for example, a Fourier transform image corresponding to a first-order diffraction where a zero-order of a plane wave component is set as a carrier frequency). Furthermore, the oversampling filter (diffraction light generation member) OSF is composed of a grating filter (diffraction grating filter), and to be more specific, has a configuration in which $P_{OSF} \times Q_{OSF}$ concave sections (which are equivalent to opening regions and whose planar shape is rectangular) are formed on planar glass in a two-dimensional matrix manner. That is, the oversampling filter (diffraction light generation member) OSF is composed of a phase grating. The same applies in Embodiments 5 and 12 described below.

Herein, according to Embodiment 4 or Embodiments 5 and 12 described below, $P_{OSF}=2048$, $Q_{OSF}=1536$, $P=1024$, $Q=768$, $m=-4$, $m'=4$, $M=m'-m+1=9$, $n=-4$, $n'=4$, and $N=n-n+1=9$ are established. However, the values are not limited to the above-mentioned values. When the components of the three-dimensional image display apparatus according to the embodiment mode 4 is compared with the components of the three-dimensional image display apparatus according to the embodiment mode 5 or 6, the light modulation means 30 corresponds to the two-dimensional image formation apparatus 30, the image restriction and generation means 32 corresponds to the first lens $L_1$, the scattering diffraction restricting opening section 33 and the second lens $L_2$, the Fourier transform image formation means 40 corresponds to the third lens $L_3$, the Fourier transform image selection means 50 corresponds to the spatial filter SF, the inverse Fourier transform means corresponds to the fourth lens $L_4$, and the conjugate image formation means 60 corresponds to the fourth lens $L_4$ and the fifth lens $L_5$. Accordingly, for the sake of convenience, on the basis of the terms of the two-dimensional image formation apparatus 30, the first lens $L_1$, the scattering diffraction restricting opening section 33, the second lens $L_2$, the third lens $L_3$, the spatial filter SF, the fourth lens $L_4$, and the fifth lens $L_5$, a description will be given hereinafter.

Similarly to Embodiment 1, an illumination optical system 20 configured to shape the light from the light source 10 is arranged between the light source 10 and the two-dimensional image formation apparatus 30. Then, the light (illumination light) emitted from the light source 10 and passing the illumination optical system 20 illuminates the two-dimensional image formation apparatus 30. The illumination optical system 20 will be described below.

The two-dimensional image formation apparatus 30 is composed of a two-dimensional spatial light modulator having a plurality of pixels 31 two-dimensionally disposed, and the respective pixels 31 have an opening. To be specific, the two-dimensional image formation apparatus 30 or the two-dimensional spatial light modulator is composed of a transmissive liquid crystal display apparatus having the P×Q pixels 31 which are two-dimensionally disposed, that is, disposed in a two-dimensional matrix manner along the X direction and the Y direction, and the respective pixels 31 have an opening.

Similar to Embodiment 1, one pixel 31 is composed of a region which is an overlapping region of a transparent first electrode and a transparent second electrode and provided with a liquid crystal cell. Then, by causing the liquid crystal cell to function as a type of a light shutter (light valve), that is, by controlling the transmittance of the respective pixels 31, the transmittance of the light (illumination light) emitted from the light source 10 is controlled, and as a whole, it is possible to obtain the two-dimensional image. A rectangular opening is provided in an overlapping region of the transparent first electrode and the transparent second electrode. As a result that Fraunhofer diffraction is generated when the light emitted from the light source 10 passes through the relevant opening, in the respective pixels 31, $M_0 \times N_0$ diffraction lights are generated. In other words, as the number of pixels 31 is $P \times Q$, it can also be considered that the total $(P \times Q \times M_0 \times N_0)$ streaks of diffraction lights are generated. In the two-dimensional image formation apparatus 30, the spatial frequency in the two-dimensional image is emitted along diffraction angles corresponding to a plurality of diffraction orders (total $M_0 \times N_0$) generated from the respective pixels 31 from the two-dimensional image formation apparatus 30. It should be noted that the diffraction angles vary also depending on the spatial frequency in the two-dimensional image.

On the front-side focal surface of the first lens $L_1$ having the focal distance $f_1$ (the focal surface on the light source side), the two-dimensional image formation apparatus 30 is arranged, and on the rear-side focal surface of the first lens $L_1$ (the focal surface on the observer side), the scattering diffraction restricting opening section 33 is arranged. With the first lens $L_1$, the number of the Fourier transform images corresponding to the diffraction orders are generated, and these Fourier transform images are formed in the plane where the scattering diffraction restricting opening section 33 is located. Then, only a diffraction light of a predetermined diffraction order (for example, a Fourier transform image corresponding to a first-order diffraction where a zero-order of a plane wave component is set as a carrier frequency) passes through the scattering diffraction restricting opening section 33. In addition, on the front-side focal surface of the second lens $L_2$ having the focal distance $f_2$, the scattering diffraction restricting opening section 33 is arranged, and on the rear-side focal surface of the second lens $L_2$, the oversampling filter OSF is arranged. Furthermore, on the front-side focal surface of the third lens $L_3$ having the focal distance $f_3$, the oversampling filter OSF is arranged, and on the rear-side focal surface of the third lens $L_3$, the spatial filter SF is arranged. With the third lens $L_3$, M×N=81 Fourier transform images corresponding to a plurality of diffraction orders generated from the respective opening regions 34 are generated, and these Fourier transform images are formed on the spatial filter SF. It should be noted that in FIG. 15, for the sake of convenience, 64 Fourier transform images are shown in the form of dots.

To be specific, the spatial filter SF is a spatial filter capable of performing a temporal opening/closing control for spatial and temporal filtering. To be more specific, the spatial filter SF has a number (specifically, M×N=81) of opening/closing controllable opening sections 51 corresponding to a plurality of diffraction orders generated from the respective opening regions 34. Then, in the spatial filter SF, by setting one desired opening section 51 in an opening state in synchronization with the generation timing of the tow-dimensional image by the two-dimensional image formation apparatus 30, one Fourier transform image corresponding to the desired diffraction order is selected. To be more specific, the spatial filter SF can be composed, for example, of a transmissive liquid crystal display apparatus or a reflective liquid crystal display apparatus using ferroelectric liquid crystal and having M×N pixels, or composed of a two-dimensional type MEMS including an apparatus in which the movable mirrors are disposed in a two-dimensional matrix manner. It should be noted that a schematic front view of the spatial filter SF composed of a liquid crystal display apparatus is similar to that shown in FIG. 6.

As described above, the conjugate image formation means 60 is composed, to be specific, of the fourth lens $L_4$ and the fifth lens $L_5$. Then, the fourth lens $L_4$ having the focal distance $f_4$ forms the conjugate image RI of the two-dimensional image generated by the second lens $L_2$ by performing inverse Fourier transform on the Fourier transform image subjected to the filtering by the spatial filter SF. In addition, the fifth lens $L_5$ having the focal distance $f_5$ forms the conjugate image CI of the Fourier transform image subjected to the filtering by the spatial filter SF.

The fourth lens $L_4$ is arranged so that the spatial filter SF is located on a front-side focal surface thereof, and a real image RI of the conjugate image of the two-dimensional image generated by the second lens $L_2$ is formed on a rear-side focal surface thereof. The magnification ratio of the real image RI obtained here to the real image formed by the second lens $L_2$ can be changed by arbitrarily selecting the focal distance $f_4$ of the fourth lens $L_4$.

On the other hand, the fifth lens $L_5$ is arranged so that a front-side focal surface thereof is matched with the rear-side focal surface of the fourth lens $L_4$, and the conjugate image CI of the Fourier transform image is formed on a rear-side focal surface thereof. Herein, as the rear-side focal surface of the fifth lens $L_5$ is the conjugate surface of the spatial filter SF, it is equivalent that the conjugate image of the two-dimensional image is output from a part comparable to one opening sections 51 on the spatial filter SF. Then, the number of light rays eventually generated and output is the number of pixels (P×Q), which can be defined by multiplying the light rays passing the scattering diffraction restricting opening section 33 by a plurality of diffraction orders transmitted through the optical system (specifically, M×N). In addition, the conjugate image CI of the Fourier transform image is formed on the rear-side focal surface the fifth lens $L_5$, but on the rear-side focal surface of the fifth lens $L_5$, it can be regarded that the light ray groups are arranged in a two-dimensional manner orderly. That is, as a whole, it is equivalent to a state in which the projector units 301 shown in FIG. 52 are arranged by the number of the plurality of diffraction orders (specifically, M×N pieces) on the rear-side focal surface of the fifth lens $L_5$.

Similarly, as schematically shown in FIG. 7, with one pixel 31 in the two-dimensional image formation apparatus 30, total $M_0 \times N_0$ sets of diffraction lights are generated along the X direction and the Y direction. It should be noted that in FIG. 7, only diffraction lights of the zero-order light ($n_0=0$), the plus/minus first-order lights ($n_0=\pm 1$), and the plus/minus second-order lights ($n_0=\pm 2$) are represented in the drawing, but in actuality, diffraction lights of a higher-order are generated, and on the basis of a part of these diffraction lights, the three-dimensional image is eventually formed. Herein, in the diffraction lights (light fluxes) of the respective diffraction orders, all image information of the two-dimensional image generated by the two-dimensional image formation apparatus 30 (information on all the pixels) is summarized. a plurality of light ray groups generated by the diffraction from the same pixel on the two-dimensional image formation apparatus 30 all have the same image information at the same time. In other words, in the two-dimensional image formation apparatus 30 composed of the transmissive liquid crystal display apparatus including P×Q pixels 31, the light from the light source 10 is modulated by the respective pixels 31 to generate the two-dimensional image, and also the spatial frequency in the generated two-dimensional image is emitted along diffraction angles corresponding to a plurality of diffraction orders (total $M_0 \times N_0$) generated from the respective pixels 31. That is, sorts of $M_0 \times N_0$ copies of the two-dimensional image are emitted along diffraction angles corresponding to a plurality of diffraction orders (total $M_0 \times N_0$) from the two-dimensional image formation apparatus 30.

Then, the spatial frequency in the two-dimensional image emitted from the two-dimensional image formation apparatus 30 is subjected to Fourier transform by the first lens $L_1$, and the number of the Fourier transform images corresponding to the diffraction orders generated from the respective pixels 31 are generated. Then, among these Fourier transform images, only a predetermined Fourier transform image (for example, a Fourier transform image corresponding to a first-order diffraction where a zero-order of a plane wave component is set as a carrier frequency) passes through the scattering diffraction restricting opening section 33. Furthermore, this selected Fourier transform image is subjected to inverse Fourier transform by the second lens $L_2$, a conjugate image of the two-dimensional image generated by the two-dimensional image formation apparatus 30 is formed, and this conjugate image of the two-dimensional image is formed on the oversampling filter OSF. It should be noted that the spatial frequency in the two-dimensional image is comparable to the image information in which the spatial frequency of the pixel structure is set as a carrier frequency, but only the region of the image information in which the zero-order plane wave is set as the carrier wave (that is, up to maximum ½ of the spatial frequency of the spatial frequency in the pixel structure) is, in other words, obtained as the first-order diffraction in which the zero-order diffraction of the plane wave component is set as the carrier frequency, and the spatial frequency equal to or less than the half of the spatial frequency of the pixel structure (opening structure) for the light modulation means passes through the scattering diffraction restricting opening section 33. In this manner, the conjugate image of the two-dimensional image formed on the oversampling filter OSF does not include the pixel structure of the two-dimensional image formation apparatus 30, and includes, on the other hand, all the spatial frequencies in the two-dimensional image generated by the two-dimensional image formation apparatus 30.

The spatial frequency in the conjugate image of the two-dimensional image in which all the image information of the two-dimensional image generated by the two-dimensional image formation apparatus 30 is summarized is emitted along diffraction angles corresponding to a plurality of diffraction orders generated from the respective opening regions 34 in the oversampling filter OSF, subjected to Fourier transform by the third lens $L_3$, a number of Fourier transform images corresponding to the plurality of diffraction orders (total M×N) are generated, and the Fourier transform images are formed on the spatial filter SF. In the third lens $L_3$, as the Fourier transform images of the spatial frequency in the conjugate image of the two-dimensional image emitted along the diffraction angles corresponding to the plurality of diffraction orders are generated, it is possible to obtain the Fourier transform images at a spatially high density.

Herein, when the wavelength of the light (the illumination light) emitted from the light source 10 is set as λ (mm), the spatial frequency in the conjugate image of the two-dimensional image generated by the second lens $L_2$ is set as ν (lp/mm), and the focal distance of the third lens $L_3$ is set as $f_3$ (mm), the light (Fourier transform image) having the spatial frequency ν appears on the rear-side focal surface of the third lens $L_3$ at a position at a distance $Y_1$ (mm) from the optical axis represented by the following expression (B).

Figure 17:
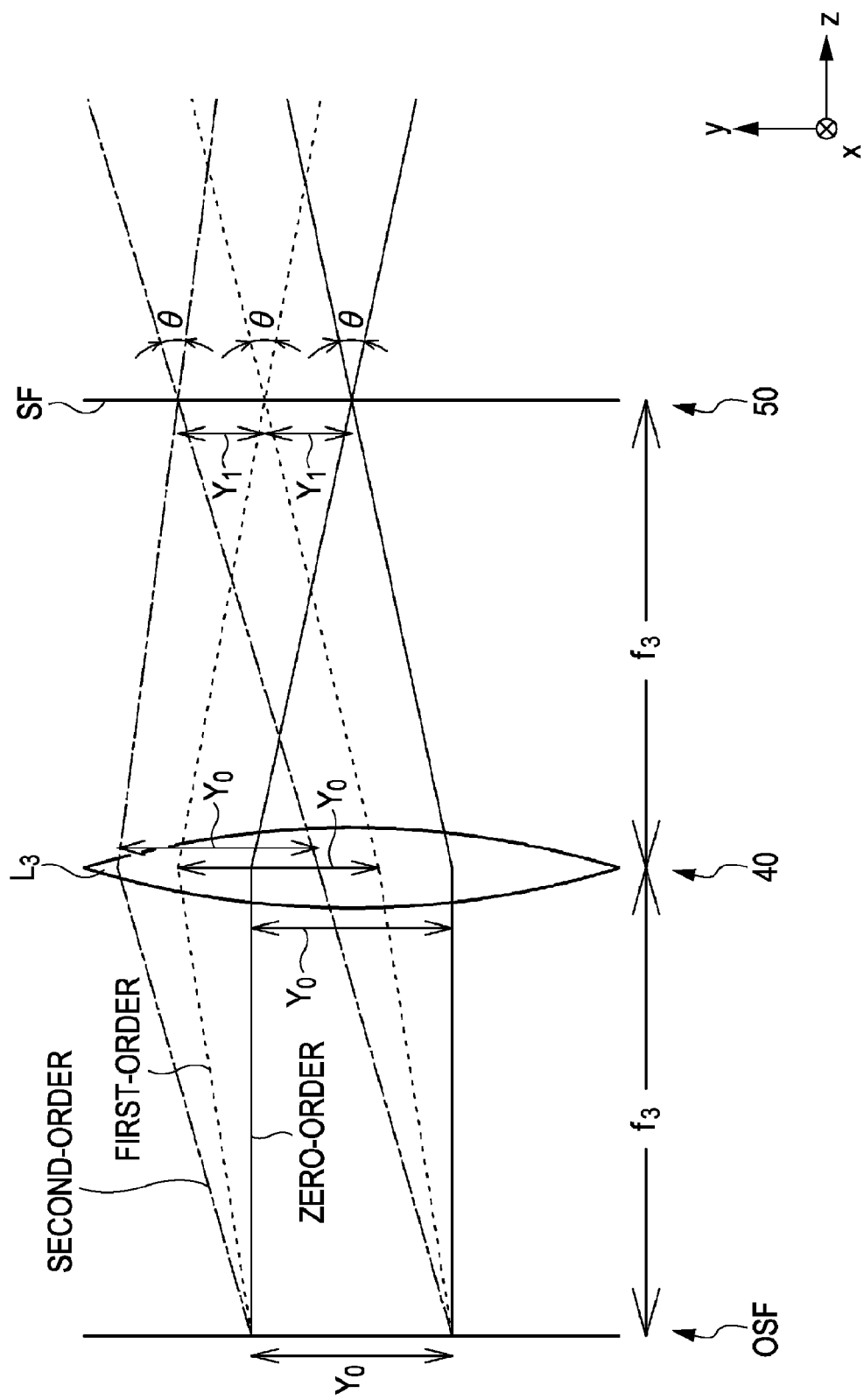
FIG. 17 schematically shows a collecting state in Fourier transform image formation means (a third lens) and an imaging state in the Fourier transform image selection means (the spatial filter) in the three-dimensional image display apparatus according to Embodiment 4.

The collecting state in the third lens $L_3$ is schematically shown in FIG. 17. It should be noted that in FIG. 17, "$Y_0$" denotes a length of the conjugate image of the two-dimensional image generated by the second lens $L_2$ in the y axis direction, and "$Y_1$" denotes an interval of the Fourier transform images in the y axis direction on the spatial filter SF on the basis of the conjugate image of the two-dimensional image generated by the second lens $L_2$. In addition, the zero-order diffraction light is indicated by a solid line, the first-order diffraction light is indicated by a dotted line, and the second-order diffraction light is indicated by a dashed-dotted line. The diffraction lights of the respective diffraction orders, in other words, the number of Fourier transform images generated corresponding to the diffraction orders are converged by the third lens $L_3$ onto the different opening sections 51 on the spatial filter SF (see also FIG. 15). As described above, the number of the opening sections 51 is M×N=81. A converging angle θ to the spatial filter SF (which is an divergence angle emitted from the spatial filter SF and also a view angle) is the same in the $P_{OSF} \times Q_{OSF}$ opening regions 34 in the Fourier transform images in the Fourier transform images (or diffraction lights) of the same diffraction order, and can be obtained from the following expression (C). On the spatial filter SF, an interval between Fourier transform images of adjacent diffraction orders can be obtained from the expression (B). From the expression (B), by arbitrarily selecting the focal distance $f_3$ of the third lens $L_3$, the position of the Fourier transform image (the imaging position on the spatial filter SF) can be changed. It should be noted that in the expression (C), "w" is a length of the conjugate image of the two-dimensional image projected on the oversampling filter OSF in the Y direction, and the focal distance $f_2$ of the second lens $L_2$ can be changed by arbitrarily selecting.

$$Y_1 = f_3 \cdot \lambda \cdot \nu \quad (B)$$

$$\theta = 2 \times \arctan(w/2f_3) \quad (C)$$

In the third lens $L_3$, in order to transmit the spatial frequency in the conjugate image of the two-dimensional image emitted along the diffraction angles corresponding to the plurality of diffraction orders generated from the respective opening regions 34, in accordance with the diffraction order to be used, a numerical aperture NA of the third lens $L_3$ should be selected. Irrespective of the focal distance, numerical apertures of all the lenses after the third lens $L_3$ should be equal to or larger than the numerical aperture NA of the third lens $L_3$.

The size of the opening sections 51 may be set as the same value as the value of $Y_1$ in the expression (B). As an example, when the wavelength λ of the illumination light is set as 532 nm, the focal distance $f_3$ of the third lens $L_3$ is set as 50 mm, and the size of the opening region 34 in the oversampling filter OSF is set as about 13 μm to 14 μm, the value of $Y_1$ is about 2 mm. This means that on the spatial filter SF, it is possible to obtain Fourier transform images corresponding to the respective diffraction orders at a high density of about 2 mm. In other words, on the spatial filter SF, in either direction of the X direction or the Y direction, it is possible to obtain 9×9=81 Fourier transform images at an interval about 2 mm.

Herein, as the oversampling filter OSF is composed of $P_{OSF} \times Q_{OSF}$ opening regions 34, at maximum, the spatial frequency ν in the conjugate image of the two-dimensional image is a frequency having a cycle composed of two continuous opening regions 34 constituting the oversampling filter OSF.

A schematic front view of the two-dimensional image formation apparatus 30 in a state where the spatial frequency in the conjugate image of the two-dimensional image is the lowest is similar as shown in FIG. 9A. The frequency characteristic of the light intensity of the Fourier transform image formed by the third lens $L_3$ in this case is similar as shown in FIG. 10A. On the other hand, a schematic front view of the two-dimensional image formation apparatus 30 in a state in which the spatial frequency in the conjugate image of the two-dimensional image is the highest is similar as shown in FIG. 9B. The frequency characteristic of the light intensity of the Fourier transform image formed by the third lens $L_3$ in this case is similar as shown in FIG. 10B. Furthermore, the distribution of the Fourier transform images on the spatial filter SF (on the xy plane) and the like are similar as shown in FIGS. 11A, 11B, and 11C. In addition, the planar shape of the opening sections 51 on the spatial filter SF may be set similar to Embodiment 1.

Incidentally, the state in which the spatial frequency is the highest corresponds to a case where all the pixels alternately perform the black display and the white display as shown in FIG. 9B. In addition, the relation between the spatial frequency of the opening region structure in the oversampling filter OSF and the spatial frequency in the conjugate image of the two-dimensional image is as follows. That is, when it is assumed that the numerical aperture of the opening region 34 is 100%, the highest spatial frequency in the conjugate image of the two-dimensional image is half of the spatial frequency in the opening region structure. In addition, in a case where the numerical aperture of the opening region 34 occupies a certain percentage (lower than 100%), the highest spatial frequency in the conjugate image of the two-dimensional image is lower than (½) of the spatial frequency in the opening region structure. For that reason, up to a position at the half of an interval of periodic pattern derived from the opening region structure appearing on the spatial filter SF, the spatial frequencies in the conjugate image of the two-dimensional image all appear. From this point, it is possible to arrange all the opening sections 51 without spatially interfering mutually. That is, for example, the Fourier transform image having the diffraction order of $m_0=3$, $n_0=2$ enters the (3, 2)-th opening section 51, but on the other hand, the Fourier transform image having the diffraction order of $m_0=3$, $n_0=2$ does not enter other opening sections 51. With this configuration, on the spatial filter SF having the independent opening sections 51 for each of the Fourier transform images, the spatial frequency in the conjugate image of the two-dimensional image exists in the Fourier transform image located at one opening sections 51, and on the other hand due to the spatial restriction of the opening sections 51, the spatial frequency in the conjugate image of the two-dimensional image is not to be missing. It should be noted that the spatial frequency in the opening region structure can be regarded as the carrier frequency, and the spatial frequency in the conjugate image of the two-dimensional image is comparable to the image information in which the spatial frequency in the opening region structure is set as the carrier frequency.

Then, in the spatial filter SF, in order to control passage/non-passage for each of M×N Fourier transform images, the opening/closing control on the opening sections 51 is performed. When the spatial filter SF is composed, for example, of a liquid crystal display apparatus, it is possible to perform the opening/closing control of the opening section 51 by causing the liquid crystal sell to operate as a type of light shutter (light valve).

In a case where the luminances of the obtained images are different depending on the diffraction orders generated from the opening regions 34, as described above, while the darkest image is used as a reference, a neutral density filter for dimming the bright image may be arranged on the rear-side focal surface of the fifth lens $L_5$.

In the three-dimensional image display apparatus according to Embodiment 4, a three-dimensional image display apparatus from which the oversampling filter OSF is removed is supposed for the comparison. It should be noted that such a three-dimensional image display apparatus is referred to as a comparison three-dimensional image display apparatus for the sake of convenience. As compared with the three-dimensional image display apparatus according to Embodiment 4, a description will be given hereinafter.

It should be noted that when the wavelength of the light (the illumination light) emitted from the light source 10 is set as $\lambda$ (mm), and the spatial frequency in the two-dimensional image generated by the two-dimensional image formation apparatus 30 is set as $v_0$ (lp/mm).

Incidentally, the projection angle (the view angle) $\theta$ is an important parameter for deciding the region of the three-dimensional image to be observed. On the other hand, the position and the interval ($Y_1$) of the Fourier transform image on the spatial filter SF are important parameters for deciding the continuity of the three-dimensional image to be displayed and the kinematic parallax, and the scale (size) of the three-dimensional image to be displayed. Then, it is more preferable as the value of the projection angle (the view angle) $\theta$ and the value $Y_1$ of equivalent to the position and the interval of the Fourier transform image on the spatial filter SF are larger.

Incidentally, from the above-mentioned expression (B), variables for controlling $Y_1$ include the wavelength $\lambda$ of the light (the illumination light), the focal distance $f_3$ of the third lens $L_3$, and further, the spatial frequency $v_0$ in the two-dimensional image generated by the two-dimensional image formation apparatus 30 which is the base for the spatial frequency $v$. Herein, the wavelength $\lambda$ of the light (the illumination light) hardly takes an arbitrary value in actuality as the hue of the image is changed. Furthermore, the wavelength of the visible light is about 400 nm to about 700 nm, the change amount is at most 1.75-fold, and the operation region is narrow. In addition, in order to increase the value of the spatial frequency $v_0$, the pixel pitch in the two-dimensional image formation apparatus 30 should be set small, but setting the small pixel pitch in the two-dimensional image formation apparatus 30 is difficult in actuality. Therefore, in order to increase the value of $Y_1$ in the expression (B), it is most realistic that the focal distance $f_3$ of the third lens $L_3$ is increased. Thus, when the focal distance $f_3$ is increased, from the expression (C), in a case where a length w of the conjugate image of the two-dimensional image projected on the oversampling filter OSF in the Y direction is fixed, that is, in a case where the focal distance $f_2$ of the second lens $L_2$ is fixed, the value of the projection angle (the view angle) $\theta$ is decreased. That is, the expression (B) and the expression (C) do not have an independent relation, and the value of $Y_1$ and the value of the projection angle (the view angle) $\theta$ are in a so-called trade-off relation.

Incidentally, in the three-dimensional image display apparatus 1B according to Embodiment 4, the two-dimensional image is generated by the light modulation means or the two-dimensional image formation apparatus 30. The spatial frequency $v_0$ in this two-dimensional image is a value depending on the opening structure of the openings constituting the two-dimensional image formation apparatus. On the other hand, the spatial frequency $v$ in this conjugate image of the two-dimensional image depends on the opening region structure of the opening regions 34 in the oversampling filter OSF. As $P_{OSF} > P$ and $Q_{OSF} > Q$ are established, the spatial frequency in the opening region structure (the carrier frequency) in the oversampling filter OSF is higher than the spatial frequency (the carrier frequency) in the pixel structure (the opening structure) in the two-dimensional image formation apparatus 30, and $v > v_0$ is established. It should be noted that the oversampling filter OSF can be manufactured, for example, by directly forming a grating pattern on the planar glass, and when the pitch of the grating pattern is set small, the carrier frequency can be increased. Thus, the value of the spatial frequency $v$ generated by the oversampling filter OSF in the conjugate image of the two-dimensional image can be easily increased. Therefore, the value of the spatial frequency $v$ can be easily increased, and it is therefore possible to increase the value of $Y_1$ obtained from the expression (B). It should be noted that even when the focal distance $f_3$ of the third lens $L_3$ is set short, it is possible to increase the value of $Y_1$ obtained from the expression (B). On the other hand, as the focal distance $f_3$ of the third lens $L_3$ can be set short, it is possible to increase the value of the view angle $\theta$ obtained from the expression (C). Alternatively, by appropriately setting the focal distance $f_2$ of the second lens $L_2$, the value of w can be increased, and as a result, it is possible to increase the value of the view angle $\theta$ obtained from the expression (C).

In this manner, in the three-dimensional image display apparatus 1B according to Embodiment 4, the value of $Y_1$ and the value of the projection angle (the view angle) $\theta$ can be independently controlled. Therefore, while the region of the three-dimensional image to be observed is enlarged, it is possible to increase the scale (size) of the three-dimensional image to be observed. Furthermore, for that reason, the wavelength of the light from the light source is not changed, and the hue change due to the wavelength variation is not caused. In addition, in principle, the focal distance $f_3$ of the third lens $L_3$ may not be changed.

For example, in the comparison three-dimensional image formation apparatus, the size of the two-dimensional image formation apparatus 30 is 0.7 at the opposing corner and has (P×Q=1024×768) openings whose planar shape is square. In addition, in a case where an interval of the openings is set as 14 μm, the wavelength $\lambda$ of the light emitted from the light source 10 is set as 532 nm, and $f_2=f_3=f_4=f_5=50$ mm is set, an interval of the conjugate image in the conjugate surface of the spatial filter SF having transmitted through the fifth lens $L_5$ is set as 1.9 mm, the view angle $\theta_Y$ in the two-dimensional image formation apparatus 30 corresponding to the Y direction is set as 16.1 degrees, the view angle $\theta_X$ of the two-dimensional image formation apparatus 30 corresponding to the X direction is set as 12.1 degrees.

Also, in the comparison three-dimensional image formation apparatus, in order to increase the size of the conjugate image of the two-dimensional image formed by the second lens $L_2$, in a case where the focal distance $f_2$ of the second lens $L_2$ is set as 100 mm, the view angle $\theta_Y$ becomes 31.5 degrees, and the view angle $\theta_X$ becomes 23.9 degrees. Thus, the view angle can be increased. Accordingly, as the size of the conjugate image of the two-dimensional image is doubled, the value of $v$ in the expression (B) is halved. Therefore, the interval of the conjugate images in the conjugate surface of the spatial filter SF having transmitted through the fifth lens $L_5$ is 0.95 mm. In this case, the light ray group spatially at a higher density as compared with a normal case is generated, but the generation area per one light ray group becomes ¼. Thus, the size of the observation image becomes ¼.

In view of the above, when the oversampling filter OSF composed of a diffraction filter provided with a square grating with an interval of 14 μm (=$Y_0$) is arranged, spatial sampling for the conjugate image of the two-dimensional image expanded twice larger is carried out with the spatial frequency similar to the pixel interval of the original two-dimensional image formation apparatus 30. Thus, the view angle $\theta_Y$ becomes 31.5 degrees, and the view angle $\theta_X$ becomes 23.9. Thus, the view angle can be set large, and also the interval of the conjugate images in the conjugate surface of the spatial filter SF having transmitted through the fifth lens $L_5$ can be set as 1.9 mm. That is, in this case, the light ray group spatially at a higher density as compared with a normal case is generated. Furthermore, the generation area per one light ray group is not changed, and also the size of the observation image is not changed. The oversampling filter OSF may be manufactured by drawing a grating with a pitch of 14 μm disposed in a two-dimensional matrix manner on planar glass.

As described above, the three-dimensional image display apparatus 1B according to Embodiment 4 has the configuration in which the spatial frequency in the two-dimensional image generated by the light modulation means (the two-dimensional image formation apparatus) 30 is emitted along diffraction angles corresponding to a plurality of diffraction orders, only the Fourier transform image corresponding to a predetermined diffraction order is selected by the image restriction and generation means 32, the Fourier transform image obtaining by subjecting the conjugate image of the two-dimensional image generated by the second lens $L_2$ by the Fourier transform image formation means 40 (the third lens $L_3$) to Fourier transform is subjected to filtering spatially and temporally by the Fourier transform image selection means 50 (the spatial filter SF), and the conjugate image CI of the Fourier transform image subjected to the filtering is formed. Thus, without increasing the size of the three-dimensional image display apparatus as a whole, it is possible to generate and scatter the light ray group at a high density in terms of space and further in a state of being distributed in a plurality of directions. In addition, with the provision of the two-dimensional image formation apparatus 30 and the oversampling filter OSF, while the region of the three-dimensional image to be observed is enlarged, it is possible to increase the scale (size) of the three-dimensional image to be observed. Furthermore, it is possible to independently control the respective light rays which are the components of the light ray group in terms of time and space. With this configuration, it is possible to obtain the three-dimensional image based on the light rays having a quality similar to that of the object in the real world.

Also, in the three-dimensional image display apparatus 1B according to Embodiment 4, as the light ray reconstruction method is utilized, it is possible to provide the three-dimensional image which satisfies the visual functions such as the focal adjustment, the convergence, and the kinematic parallax. Furthermore, in the three-dimensional image display apparatus 1B according to Embodiment 4, as the high-order diffraction light is efficiently utilized, as compared with an image output method in a related art, it is possible to obtain the light rays which can be controlled by one image output device (the two-dimensional image formation apparatus 30) (sorts of copies of two-dimensional image) by the number of the plurality of diffraction orders (that is, M×N pieces) by the oversampling filter OSF. Furthermore, in the three-dimensional image display apparatus 1B according to Embodiment 4, as the filtering is carried out spatially and also temporally, the temporal characteristic of the three-dimensional image display apparatus can be converted into the spatial characteristic of the three-dimensional image display apparatus. In addition, without using the diffusing screen or the like, it is possible to obtain the three-dimensional image. Furthermore, it is possible to provide the three-dimensional image which is appropriate to the observations from any directions. In addition, as the light ray group can be generated and scattered at the spatially high density, it is possible to provide the fine spatial image which is close to the visual limit.

Furthermore, in the three-dimensional image display apparatus 1B according to Embodiment 4, the size of the conjugate image in the conjugate surface of the spatial filter SF having transmitted through the fifth lens and the projection angle (the view angle) can be independently controlled. Therefore, while the region of the three-dimensional image to be observed is enlarged, it is possible to increase the scale (size) of the three-dimensional image to be observed.

Embodiment 5

Figure 18:
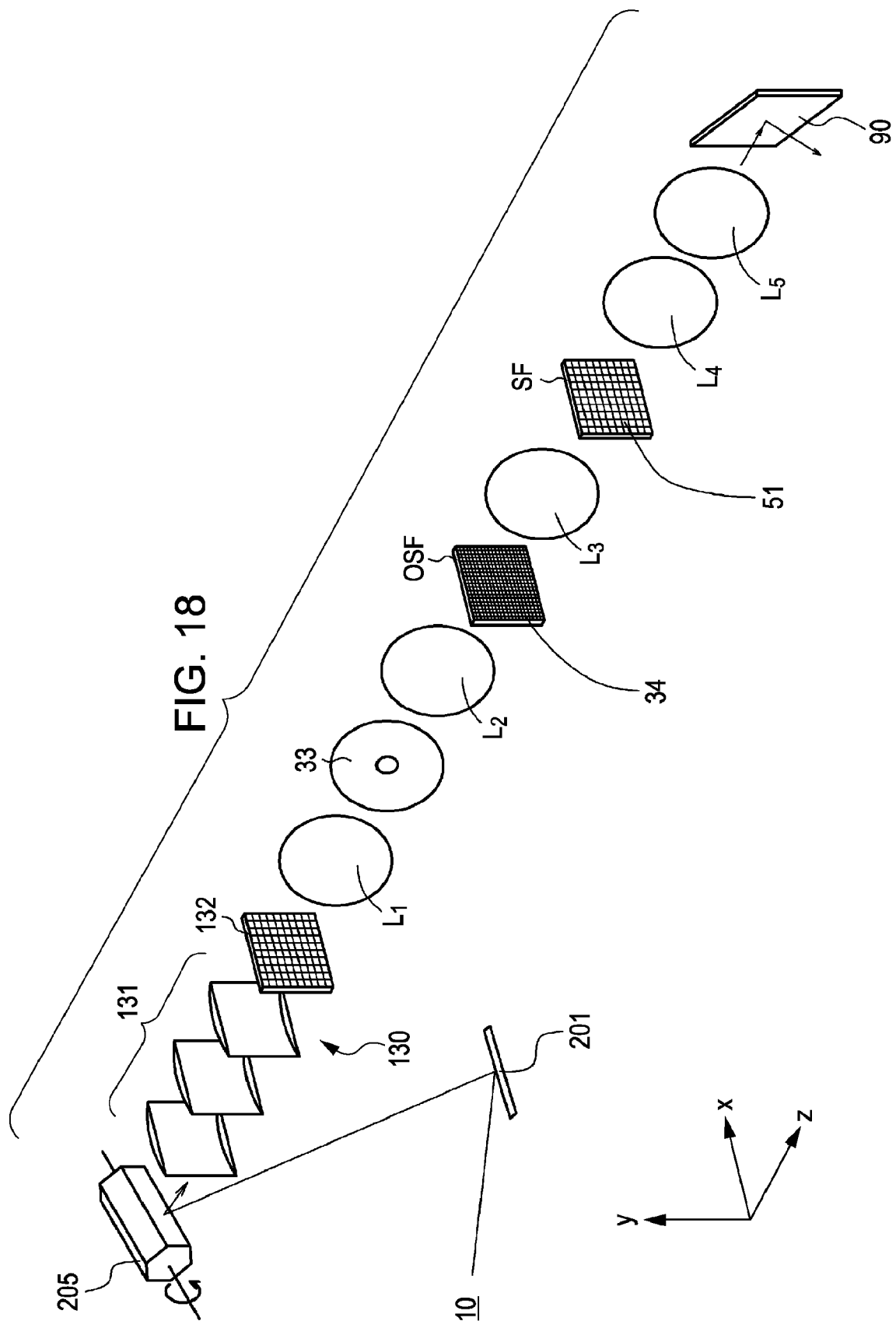
FIG. 18 is a conceptual diagram of a three-dimensional image display apparatus according to Embodiment 5.

Embodiment 5 relates to a three-dimensional image display apparatus according to embodiment modes 4 and 6. A conceptual diagram of the three-dimensional image display apparatus according to Embodiment 5 is shown in FIG. 18. It should be noted that FIG. 18 exemplifies the semi-transmissive mirror 90.

As being different from the liquid crystal display apparatus according to Embodiment 4, the light modulation means 130 according to Embodiment 5 includes a one-dimensional spatial light modulator configured to generate a one-dimensional image sectioned into P pieces (for example, 1920 pieces) (specifically, the diffraction grating-light modulation apparatus 201); a scan optical system configured to two-dimensionally develop (scan) the one-dimensional image generated by the one-dimensional spatial light modulator (the diffraction grating-light modulation apparatus 201) and sectioned into P pieces to form a two-dimensional image sectioned into P×Q (specifically, a scan mirror 205); and a grating filter (diffraction grating filter) 132 configured to emit a spatial frequency in the generated two-dimensional image which is arranged on a generation surface of the two-dimensional image along diffraction angles according to a plurality (specifically, total M×N) of diffraction orders. Herein, for each of the components of the two-dimensional image formed by the scan optical system (the scan mirror 205) and sectioned into P×Q, $M_0 \times N_0$ sets of diffraction lights are generated by the grating filter 132. It should be noted that the grating filter 132 may be composed of an amplitude grating or a phase grating.

Alternatively, as a description is given by way of the components of the three-dimensional image display apparatus according to the embodiment mode 6, the three-dimensional image display apparatus according to Embodiment 5 is a three-dimensional image display apparatus provided with a light source 10 and an optical system. Then, this optical system includes (A) a two-dimensional image formation apparatus 130 composed of a one-dimensional spatial light modulator configured to generate a one-dimensional image (specifically, the diffraction grating-light modulation apparatus 201); a scan optical system configured to generate a two-dimensional image by developing the one-dimensional image generated by the one-dimensional spatial light modulator (specifically, the scan mirror 205); and diffraction light generation means arranged on a generation surface of the two-dimensional image and configured to generate diffraction lights of a plurality of diffraction orders for each pixel (specifically, a grating filter 132), (B) a first lens $L_1$ in which the diffraction light generation means (the grating filter 132) is arranged on a front-side focal surface, (C) a scattering diffraction restricting opening section 33 arranged on a rear-side focal surface of the first lens $L_1$ and configured to allow only diffraction light of a predetermined diffraction order to pass (for example, a Fourier transform image corresponding to a first-order diffraction where a zero-order of a plane wave component is set as a carrier frequency), (D) a second lens $L_2$ in which the scattering diffraction restriction opening section 33 is arranged on a front-side focal surface, (E) an oversampling filter OSF arranged on a rear-side focal surface of the second lens $L_2$, provided with $P_{OSF} \times Q_{OSF}$ opening regions (where $P_{OSF}$ and $Q_{OSF}$ are arbitrary positive integers, and $P_{OSF} > P$)) which are disposed in a two-dimensional matrix manner along the X direction and the Y direction, and configured to generate M×N sets of diffraction lights with M sets from an m-th order to an m'-th order along the X direction (where m and m' are integers, and M is a positive integer) and N sets from an n-th order to an n'-th order along the Y direction (where n and n' are integers, and N is a positive integer) on the basis of a conjugate image of the two-dimensional image generated by the second lens $L_2$ for each opening region, (F) a third lens $L_3$ in which the oversampling filter OSF is arranged on a front-side focal surface, (G) a spatial filter SF arranged on a rear-side focal surface of the third lens $L_3$ and provided with total M×N closing/opening controllable opening sections 51 with M opening sections arranged in the X direction and N opening sections arranged in the Y direction, (H) a fourth lens $L_4$ in which the spatial filter SF is arranged on a front-side focal surface, and (I) a fifth lens $L_5$ whose front-side focus is located on a rear-side focus of the fourth lens $L_4$.

A conceptual diagram of the light modulation means (the two-dimensional image formation apparatus) 130 including the diffraction grating-light modulation apparatus is similar as shown in the light modulation means 130 according to Embodiment 3 shown in FIG. 13, and a detailed description will be omitted. However, in the grating filter 132, and for each of the components of the two-dimensional image sectioned into P×Q, $M_0 \times N_0$ sets of diffraction lights are generated.

The one-dimensional spatial light modulator (the diffraction grating-light modulation apparatus 201) and the diffraction grating-light modulation element 210 will be described below.

Except for the above-mentioned points, the configuration and the construction of the three-dimensional image display apparatus according to Embodiment 5 can be set similar to the configuration and the construction of the three-dimensional image display apparatus described according to Embodiment 4, and a detailed description will be omitted.

Embodiment 6

Figure 19:
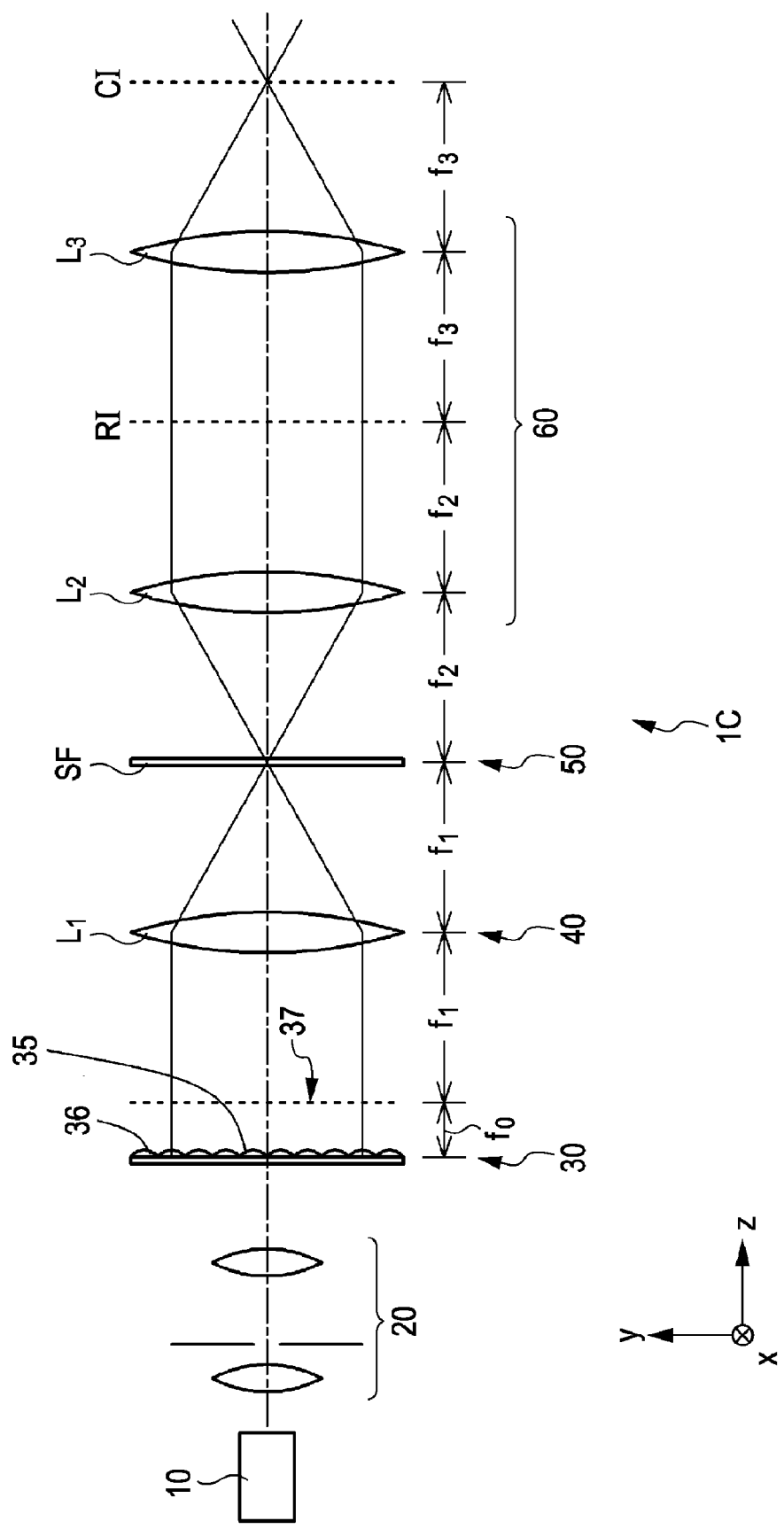
FIG. 19 is a conceptual diagram of a three-dimensional image display apparatus in a yz plane according to Embodiment 6.
Figure 20:
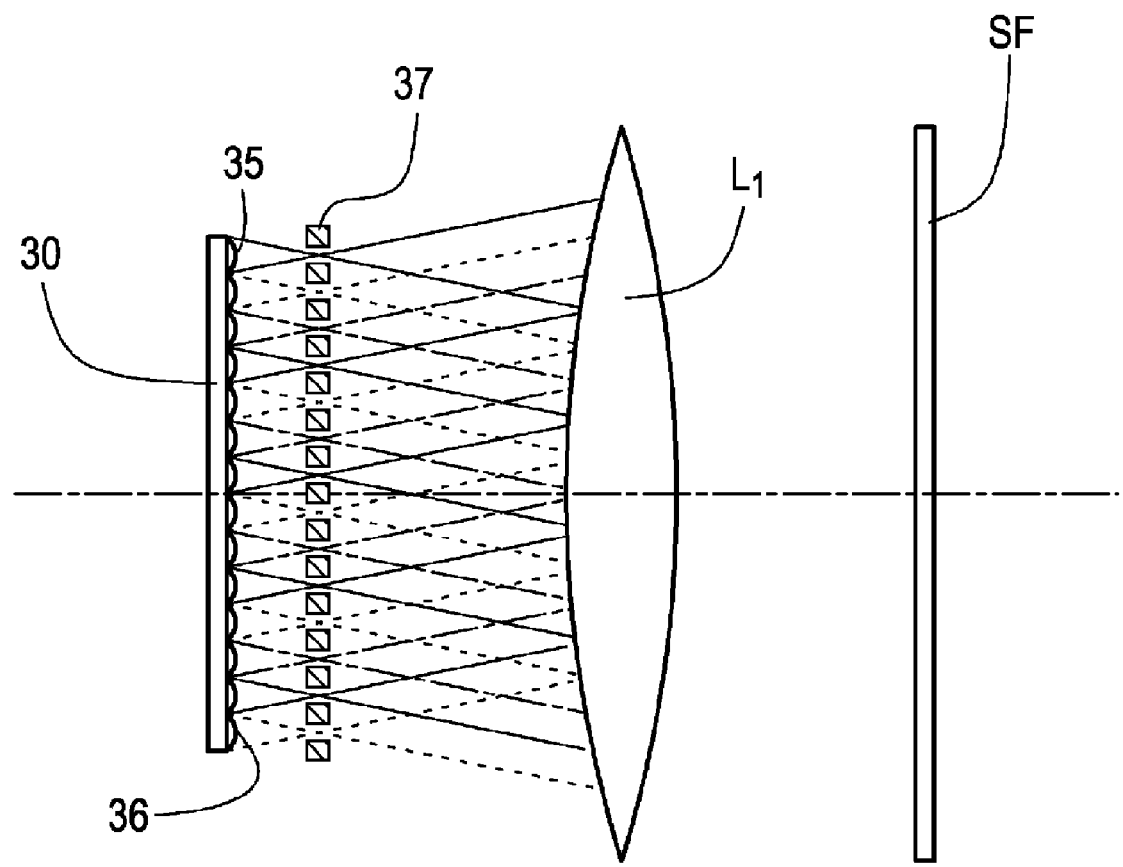
FIG. 20 is a conceptual diagram for describing an operation and an action of an optical apparatus in the three-dimensional image display apparatus according to Embodiment 6.
Figure 21:
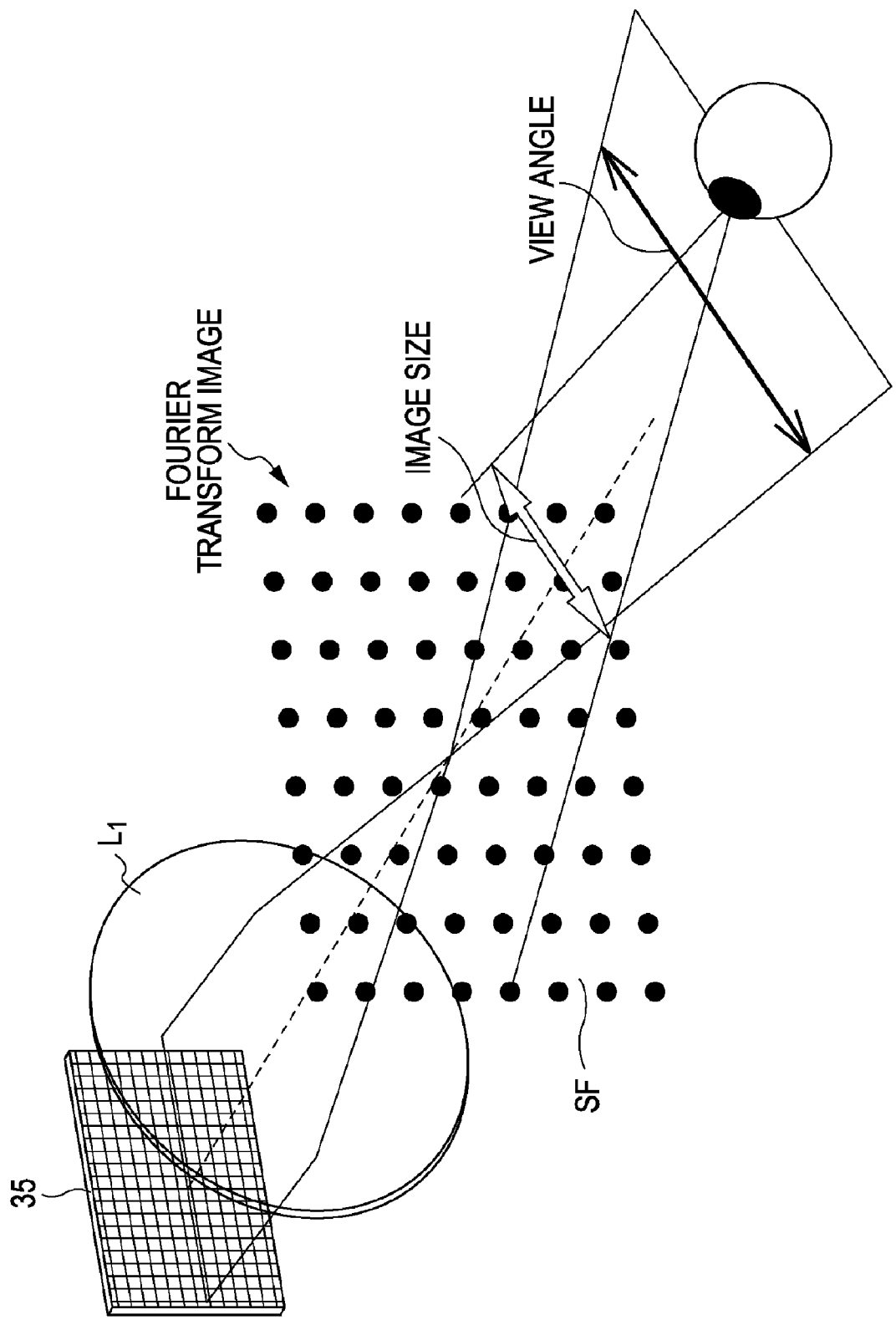
FIG. 21 is a conceptual diagram of the three-dimensional image display apparatus as obliquely viewed according to Embodiment 6.
Figure 22:
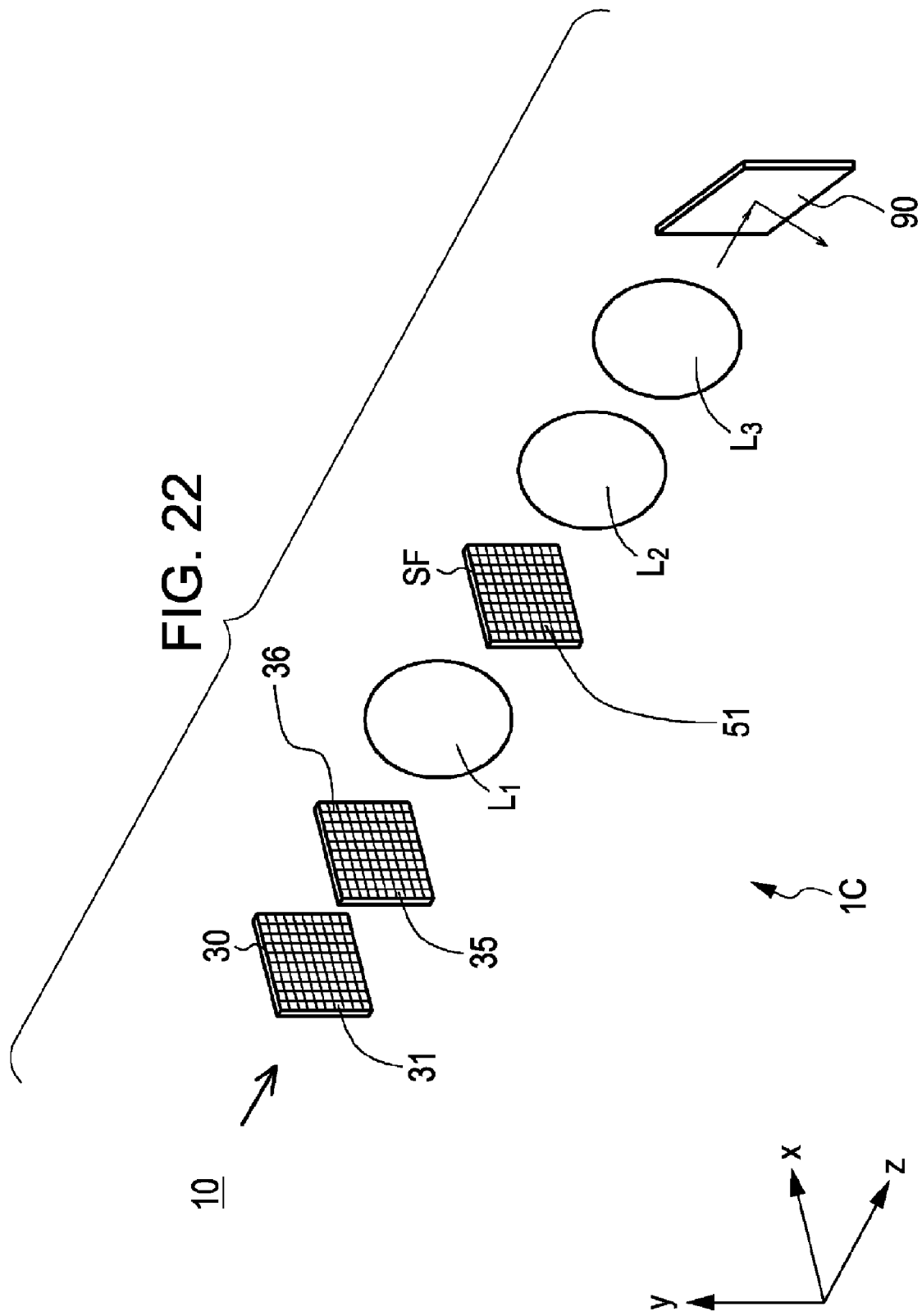
FIG. 22 schematically shows an arrangement state of components of the three-dimensional image display apparatus according to Embodiment 6.

Embodiment 6 relates to a three-dimensional image display apparatus according to embodiment modes 7 and 8. A conceptual diagram of the monochromatic-display three-dimensional image display apparatus according to Embodiment 6 is shown in FIGS. 19, 20, 21 and 22. It should be noted that in FIG. 19, the optical axis is set as the z axis, orthogonal coordinates in a plane orthogonal to the z axis are set as the x axis and the y axis, a direction parallel to the x axis is set as the X direction, and a direction parallel to the y axis is set as the Y direction. The X direction is set, for example, as the horizontal direction in the three-dimensional image display apparatus, and the Y direction is set, for example, as the vertical direction in the three-dimensional image display apparatus. Herein, FIG. 19 is a conceptual diagram of the three-dimensional image display apparatus in the yz plane according to Embodiment 6. A conceptual diagram of the three-dimensional image display apparatus in the xz plane according to Embodiment 6 is substantially similar to FIG. 19. In addition, FIG. 21 is a conceptual diagram of the three-dimensional image display apparatus as viewed obliquely according to Embodiment 6, FIG. 22 schematically shows an arrangement state of components of the three-dimensional image display apparatus according to Embodiment 6, and FIG. 22 exemplifies the semi-transmissive mirror 90.

In a three-dimensional image display apparatus 1C according to Embodiment 6 too, with the stand-alone three-dimensional image display apparatus provided with the components shown in FIGS. 19, 20, 21 and 22, it is possible to generate and form a large number of light ray groups spatially at a high density as compared with a related art technology. The three-dimensional image display apparatus 1C according to Embodiment 6 is a single three-dimensional image display apparatus and has a function equivalent to an apparatus in which a large number (M×N pieces) of projector units 301 are arranged in a parallel manner. It should be noted that for example, in a case where a multi-unit system is adopted, as shown in FIG. 51, by the number of the divided three-dimensional image, the three-dimensional image display apparatuses 1C according to Embodiment 6 may be prepared. In FIG. 51, an apparatus provided with 4×4=16 three-dimensional image display apparatuses 1C according to Embodiment 6 is exemplified.

As a description is given by way of the components of the three-dimensional image display apparatus according to the embodiment mode 7, the three-dimensional image display apparatus 1C according to Embodiment 6 is a three-dimensional image display apparatus provided with a light source 10 and an optical system. Then, this optical system includes (A) a two-dimensional image formation apparatus 30 provided with a plurality of pixels 31 and configured to form a two-dimensional image on the basis of light from the light source 10, (B) an optical apparatus 35 composed by disposing optical elements 36 having optical power for refracting incident light to converge substantially at one point in a two-dimensional matrix manner, provided with a function as a phase grating for modulating a phase of transmitting light, and configured to emit a spatial frequency in an incident two-dimensional image from the two-dimensional image formation apparatus 30 at diffraction angles corresponding to a plurality of diffraction orders (total M×N), (C) Fourier transform image formation means 40 configured to perform Fourier transform on the spatial frequency in the two-dimensional image emitted from the optical apparatus 35 to generate a number of Fourier transform images corresponding to the plurality of diffraction orders (total M×N), (D) Fourier transform image selection means 50 configured to select a Fourier transform image corresponding to a desired diffraction order among the number of the Fourier transform images generated corresponding to (total M×N) diffraction orders, and (E) conjugate image formation means 60 configured to form a conjugate image of the Fourier transform image selected by the Fourier transform image selection means 50.

Furthermore, the conjugate image formation means 60 includes inverse Fourier transform means (specifically, a second lens $L_2$ which will be described below) configured to form a real image of the two-dimensional image generated by the two-dimensional image formation apparatus 30 by performing inverse Fourier transform on the Fourier transform image selected by the Fourier transform image selection means 50. In addition, the Fourier transform image formation means 40 is composed of a lens. A focus of the optical element constituting the optical apparatus 35 (a rear-side focus according to Embodiment 6) is located on a front-side focal surface of this lens, and the Fourier transform image selection means 50 is arranged on a rear-side focal surface of this lens. The Fourier transform image selection means 50 has a number of opening/closing controllable opening sections 51 corresponding to a plurality (total M×N) of diffraction orders.

Herein, the spatial frequency in the two-dimensional image is comparable to the image information in which the spatial frequency in the pixel structure in the two-dimensional image formation apparatus 30 is set as the carrier frequency.

Also, as a description is given by way of the components of the three-dimensional image display apparatus according to the embodiment mode 8, the three-dimensional image display apparatus 1C according to Embodiment 6 is a three-dimensional image display apparatus provided with a light source 10 and an optical system. Then, this optical system includes (A) a two-dimensional image formation apparatus 30 provided with a plurality (P×Q pieces) of pixels 31 and configured to generate a two-dimensional image on the basis of light from the light source 10, (B) an optical apparatus 35 composed by disposing optical elements 36 (where, $P_{OD}$ and $Q_{OD}$ are arbitrary positive integers) having optical power for refracting incident light to converge substantially at one point in a two-dimensional matrix manner along an X direction and a Y direction, provided with a function as a phase grating for modulating a phase of transmitting light, and configured to emit a spatial frequency in an incident two-dimensional image at diffraction angles corresponding to a plurality of diffraction orders (total M×N), (C) a first lens (to be more specific, a convex lens according to Embodiment 6) $L_1$ in which a focus of an optical element 36 constituting the optical apparatus 35 is located on a front-side focal surface (a rear-side focus according to Embodiment 6), (D) a spatial filter SF arranged on a rear-side focal surface of the first lens $L_1$ and provided with total M×N closing/opening controllable opening sections 51 with M opening sections arranged in the X direction and N opening sections arranged in the Y direction, (E) a second lens $L_2$ in which the spatial filter SF is arranged on a front-side focal surface (to be more specific, a convex lens according to Embodiment 6), and (F) a third lens $L_3$ whose front-side focus is located at a rear-side focus of the second lens $L_2$ (to be more specific, a convex lens according to Embodiment 6).

Herein, according to Embodiment 6 or Embodiments 7 and 12 described below, in the optical apparatus 35, total M×N sets of diffraction lights are generated with M sets from m-th order to m'-th order along the X direction (where m and m' are integers, and M is a positive integer) and N sets from n-th order to n'-th order along the Y direction (where n and n' are integers, and N is a positive integer). Herein, $P_{OD}$=P=1024, $Q_{OD}$=Q=768, m=−4, m'=4, M=m'−m+1=9, n=−4, n'=4, and N=n−n+1=9 are established. However, the values are not limited to the above-mentioned values. When the components of the three-dimensional image display apparatus according to the embodiment mode 7 is compared with the components of the three-dimensional image display apparatus according to the embodiment mode 8, the Fourier transform image formation means 40 corresponds to the first lens $L_1$, the Fourier transform image selection means 50 corresponds to the spatial filter SF, the inverse Fourier transform means corresponds to the second lens $L_1$, and the conjugate image formation means 60 corresponds to the second lens $L_2$ and the third lens $L_3$. Accordingly, for the sake of convenience, a description will be given hereinafter on the basis of terms of the two-dimensional image formation apparatus 30, the first lens $L_1$, the spatial filter SF, the second lens $L_1$, and the third lens $L_3$.

Similarly to Embodiment 1, an illumination optical system 20 configured to shape the light from the light source 10 is arranged between the light source 10 and the two-dimensional image formation apparatus 30. Then, the light (illumination light) emitted from the light source 10 and passing the illumination optical system 20 illuminates the two-dimensional image formation apparatus 30. The illumination optical system 20 will be described below.

The two-dimensional image formation apparatus 30 is composed of a two-dimensional spatial light modulator having a plurality of pixels 31 two-dimensional dimensionally disposed, and the respective pixels 31 have an opening. To be specific, the two-dimensional image formation apparatus 30 is composed of a transmissive liquid crystal display apparatus having the P×Q pixels 31 which are two-dimensionally disposed, that is, disposed in a two-dimensional matrix manner along the X direction and the Y direction, and the respective pixels 31 have an opening.

Similar to Embodiment 1, one pixel 31 is composed of a region which is an overlapping region of a transparent first electrode and a transparent second electrode and provided with a liquid crystal cell. Then, by causing the liquid crystal cell to function as a type of a light shutter (light valve), that is, by controlling the transmittance of the respective pixels 31, the transmittance of the light (illumination light) emitted from the light source 10 is controlled, and as a whole, it is possible to obtain the two-dimensional image. A rectangular opening is provided in an overlapping region of the transparent first electrode and the transparent second electrode. When the light emitted from the light source 10 passes through the relevant opening, the two-dimensional image is generated.

The optical apparatus 35 is arranged adjacent to a rear part of the two-dimensional image formation apparatus 30 (for example, in contact with the two-dimensional image formation apparatus 30 or with a slight gap). It should be noted that by arranging the optical apparatus 35 adjacent to the two-dimensional image formation apparatus 30, the influence of the diffraction phenomenon derived from the light passing the opening of the pixel 31 constituting the two-dimensional image formation apparatus 30 can be ignored. Herein, according to Embodiment 6, the planar shape of the optical element 36 constituting the optical apparatus 35 has a rectangular shape similar to the planar shape of the opening of the corresponding pixel 31, and the respective optical elements 36 are composed of refractive grating-like elements, to be specific, convex lenses (the focal distance $f_0$) having a positive optical power. Then, the optical apparatus 35 is composed of a type of a micro lens array and manufactured from glass on the basis of a method of manufacturing the micro lens array in a related art.

The optical apparatus 35 functions as a phase grating. That is, in the two-dimensional image generated by the two-dimensional image formation apparatus 30, the light emitted from the respective pixels 31 (this light can be regarded as parallel light) enters the optical element 36 corresponding to the optical apparatus 35 arranged adjacent to the two-dimensional image formation apparatus 30. Then, the light entering the optical element 36 is refracted to converge substantially at one point at the focal distance $f_0$, and further, the light travels backward from the point. By seeing such a state from another point of view, as shown in the conceptual diagram in FIG. 20, as if a rectangular opening region 37 corresponding to the optical element 36 (a type of a pin hole) exists at the distance $f_0$ behind the optical apparatus 35, and the light emitted from the optical element 36 can be regarded to pass the virtual opening region 37. As a result, a phenomenon equal to the generation of Fraunhofer diffraction is caused, and in the optical element 36 corresponding to the respective pixels 31 (to be more specific, in the virtual opening region 37 corresponding to the optical element 36), M×N sets=81 sets of diffraction lights are generated. In other words, the numbers of the pixels 31 and the optical elements 36 are P×Q=$P_{OD}$×$Q_{OD}$. Thus, it can also be conceived that the total ($P_{OD}$×$Q_{OD}$×M×N) diffraction lights are generated in the optical apparatus 35. Then, the spatial frequency in the two-dimensional image is emitted along diffraction angles corresponding to a plurality of diffraction orders (total M×N) generated from the respective optical elements 36 from the optical apparatus 35. It should be noted that the diffraction angles vary also depending on the spatial frequency in the two-dimensional image. The value of the focal distance $f_0$ can basically be set as an arbitrary value, but a large number of the optical elements 36 constituting the optical apparatus 35 have the same focal distance $f_0$. The light emitted from the optical element 36 is propagated, as shown in FIG. 20, at an angle decided on the basis of the number of the openings of the optical element 36, but the propagating light is broaden, and further, a state without almost no light amount loss can be obtained. Herein, when the disposal pitch or size of the optical element 36 is set as do, a width of the like in which the parallel light of the wavelength $\lambda$ is collected by the optical element 36 with the size $d_0$ and the focal distance $f_0$ can be represented by the following expression $$D=2.44\lambda/\sin(\arctan(d_0/2f_0))$$

From the above, by using the optical element 36, the optical numerical aperture can be represented by ($D^2/d_0^2$), but the light amount loss accompanying the decrease in numerical aperture is not caused.

Furthermore, a rear-side focus of the optical element 36 constructing the optical apparatus 35 (the focal distance $f_0$) is located on the front-side focal surface of the first lens $L_1$ having the focal distance $f_1$ (the focal surface on the light source side), and the spatial filter SF is arranged on the rear-side focal surface of the first lens $L_1$ (the focal surface on the observer side). With the first lens $L_1$, M×N=81 Fourier transform images corresponding to a plurality of diffraction orders are generated, and these Fourier transform images are formed on the spatial filter SF. It should be noted that in FIG. 21, for the sake of convenience, 64 Fourier transform images are shown in the form of dots.

Similarly as described in Embodiment 1 with reference to FIG. 6, to be specific, the spatial filter SF is a spatial filter capable of performing a temporal opening/closing control for spatial and temporal filtering. To be more specific, the spatial filter SF has a number (specifically, M×N=81) of opening/closing controllable opening sections 51 corresponding to a plurality of diffraction orders. Then, in the spatial filter SF, by setting one desired opening section 51 in an opening state in synchronization with the generation timing of the tow-dimensional image by the two-dimensional image formation apparatus 30, one Fourier transform image corresponding to the desired diffraction order is selected. To be more specific, the spatial filter SF can be composed, for example, of a transmissive liquid crystal display apparatus or a reflective liquid crystal display apparatus using ferroelectric liquid crystal and having M×N pixels, or composed of a two-dimensional type MEMS including an apparatus in which the movable mirrors are disposed in a two-dimensional matrix manner.

As described above, to be specific, the conjugate image formation means 60 is composed of the second lens $L_2$ and the third lens $L_3$. Then, the second lens $L_2$ having the focal distance $f_2$ forms the real image RI of the two-dimensional image generated by the two-dimensional image formation apparatus 30 by performing inverse Fourier transform on the Fourier transform image subjected to the filtering by the spatial filter SF. In addition, the third lens $L_3$ having the focal distance $f_3$ forms the conjugate image CI of the Fourier transform image subjected to the filtering by the spatial filter SF.

The second lens $L_2$ is arranged so that the spatial filter SF is located on a front-side focal surface thereof, and the real image RI of the two-dimensional image generated by the two-dimensional image formation apparatus 30 is formed on a rear-side focal surface thereof. The magnification ratio of the real image RI obtained here with respect to the two-dimensional image formation apparatus 30 can be changed by arbitrarily selecting the focal distance $f_2$ of the second lens $L_2$.

On the other hand, the third lens $L_3$ is arranged so that the rear-side focal surface of the second lens $L_2$ is matched with a front-side focal surface thereof, and the conjugate image CI of the Fourier transform image is formed on a rear-side focal surface thereof. Herein, as the rear-side focal surface of the third lens $L_3$ is the conjugate surface of the spatial filter SF, it is equivalent that the two-dimensional image generated by the two-dimensional image formation apparatus 30 is output from a part comparable to one opening sections 51 on the spatial filter SF. Then, the number of light rays eventually generated and output can be defined by multiplying the light rays corresponding to the number of pixels (P×Q) by a plurality of diffraction orders transmitted through the optical system (specifically, M×N). In addition, the conjugate image CI of the Fourier transform image is formed on the rear-side focal surface of the third lens $L_3$, but in the rear-side focal surface of the third lens $L_3$, it can be regarded that the light ray groups are arranged in a two-dimensional manner orderly. That is, as a whole, it is equivalent to a state in which the projector units 301 shown in FIG. 52 are arranged by the number of the plurality of diffraction orders (specifically, M×N pieces) on the rear-side focal surface of the third lens $L_3$.

Figure 23:
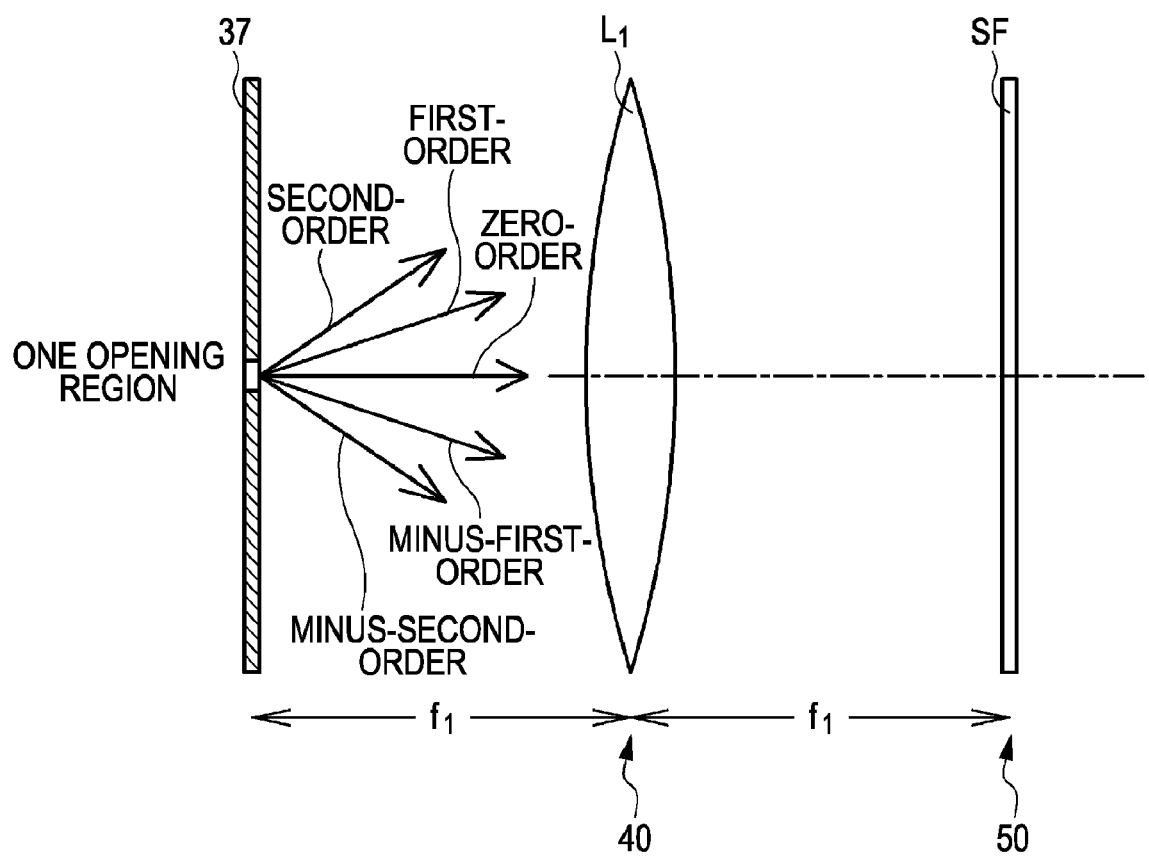
FIG. 23 schematically shows a state in which diffraction lights of a plurality of diffraction orders are generated by the two-dimensional image formation apparatus in Embodiment 6.

As schematically shown in FIGS. 21 and 23, with one optical element 36 in the optical apparatus 35 (to be more specific, in the virtual opening region 37 located at the rear-side focus of the optical element 36), with nine sets from minus-fourth-order to fourth-order along the X direction and nine sets from minus-fourth-order to fourth'-order along the Y direction, total M×N=81 sets of diffraction lights are generated. It should be noted that in FIG. 23, only diffraction lights of the zero-order light ($n_0$=0), the plus/minus first-order lights ($n_0$=±1), and the plus/minus second-order lights ($n_0$=±2) are represented in the drawing. In actuality, diffraction lights of a still higher-order are generated, and on the basis of these diffraction lights, the three-dimensional image is eventually formed. Herein, in the diffraction lights (light fluxes) of the respective diffraction orders, all image information of the two-dimensional image generated by the two-dimensional image formation apparatus 30 (information on all the pixels) is summarized. a plurality of light ray groups generated by the diffraction from the same pixel on the two-dimensional image formation apparatus 30 (9×9=81 light ray groups) all have the same image information at the same time. In other words, in the two-dimensional image formation apparatus 30 composed of the transmissive liquid crystal display apparatus including P×Q pixels 31, the two-dimensional image is generated on the basis of the light from the light source 10, and also the spatial frequency in the generated two-dimensional image is emitted along diffraction angles corresponding to a plurality of diffraction orders (total M×N) generated from the respective optical elements 36 from the optical apparatus 35. That is, sorts of M×N copies of the two-dimensional image are emitted along diffraction angles corresponding to a plurality of diffraction orders (total M×N) from the two-dimensional image formation apparatus 30.

Then, the spatial frequency in the two-dimensional image in which all image information on the two-dimensional image generated by the two-dimensional image formation apparatus 30 is summarized is subjected to Fourier transform by the first lens $L_1$, a number of Fourier transform images corresponding to the plurality of diffraction orders (total M×N) are generated, and the Fourier transform images are formed on the spatial filter SF. In the first lens $L_1$, as the Fourier transform images of the spatial frequency in the two-dimensional image emitted along the diffraction angles corresponding to the plurality of diffraction orders are generated, it is possible to obtain the Fourier transform images at a spatially high density.

Herein, when the wavelength of the light (the illumination light) emitted from the light source 10 is set as $\lambda$ (mm), the spatial frequency in the two-dimensional image generated by the two-dimensional image formation apparatus 30 is set as $\nu$ (lp/mm), and the focal distance of the first lens $L_1$ is set as $f_1$ (mm), the light (Fourier transform image) having the spatial frequency $\nu$ appears on the rear-side focal surface of the first lens $L_1$ at a position at a distance $Y_1$ (mm) from the optical axis on the basis of the above-mentioned expression (A).

The collecting state in the first lens $L_1$ is similar as shown in that schematically shown in FIG. 8, and a detailed description will be omitted.

In the first lens $L_1$, in order to transmit the spatial frequency in the two-dimensional image emitted along the diffraction angles corresponding to the plurality of diffraction orders, in accordance with the diffraction order to be used, the numerical aperture NA of the first lens $L_1$ should be selected. Irrespective of the focal distance, numerical apertures of all the lenses after the first lens $L_1$ should be equal to or larger than the numerical aperture NA of the first lens $L_1$.

The size of the opening sections 51 may be set as the same value as the value of $Y_1$ in the expression (A) similarly as described in Embodiment 1. As an example, when the wavelength $\lambda$ of the illumination light is set as 532 nm, the focal distance $f_1$ of the first lens $L_1$ is set as 50 mm, the size of one pixel 31 in the two-dimensional image formation apparatus 30 is set as about 13 μm to 14 μm, the value of $Y_1$ is about 2 mm. This means that on the spatial filter SF, it is possible to obtain Fourier transform images corresponding to the respective diffraction orders at a high density of about 2 mm. In other words, on the spatial filter SF, in either direction of the X direction or the Y direction, it is possible to obtain 9×9=81 Fourier transform images at an interval about 2 mm.

Herein, the spatial frequency $\nu$ in the two-dimensional image generated by the two-dimensional image formation apparatus 30 is generated by the two-dimensional image formation apparatus 30 in which the two-dimensional image is constructed from P×Q pixels 31, and at most, the spatial frequency is a frequency having a cycle composed of two continuous pixels 31 constituting the two-dimensional image formation apparatus 30.

A schematic front view of the two-dimensional image formation apparatus 30 in which the spatial frequency in the two-dimensional image generated by the two-dimensional image formation apparatus 30 is the lowest is similar as shown in FIG. 9A. The frequency characteristic of the light intensity of the Fourier transform image formed by the first lens $L_1$ in this case is similar as shown in FIG. 10A. On the other hand, a schematic front view of the two-dimensional image formation apparatus 30 in which the spatial frequency in the conjugate image of the two-dimensional image is the highest is similar as shown in FIG. 9B. The frequency characteristic of the light intensity of the Fourier transform image formed by the first lens $L_1$ in this case is similar as shown in FIG. 10B. Furthermore, the distribution of the Fourier transform images on the spatial filter SF (on the xy plane) and the like are similar as shown in FIGS. 11A, 11B, and 11C. In addition, the planar shape of the opening sections 51 on the spatial filter SF may be set similar to Embodiment 1.

Incidentally, the state in which the spatial frequency is the highest corresponds to a case where all the pixels alternately perform the black display and the white display as shown in FIG. 9B. In addition, the relation between the spatial frequency of the pixel structure in the two-dimensional image formation apparatus 30 and the spatial frequency in the two-dimensional image is as follows. That is, when it is assumed that the opening occupies all the pixels (that is, numerical aperture 100%), the highest spatial frequency in the two-dimensional image is ($\frac{1}{2}$) of the spatial frequency in the pixel structure. In addition, in a case where the opening occupies a certain percentage (lower than 100%) of the pixels, the highest spatial frequency in the two-dimensional image is lower than ($\frac{1}{2}$) of the spatial frequency in the pixel structure. For that reason, up to a position at the half of an interval of periodic patterns derived from the pixel structure appearing on the spatial filter SF, the spatial frequencies in the two-dimensional image all appear. From this point, it is possible to arrange all the opening sections 51 without spatially interfering mutually. That is, for example, the Fourier transform image having the diffraction order of $m_0=3$, $n_0=2$ enters the (3, 2)-th opening section 51, but on the other hand, the Fourier transform image having the diffraction order of $m_0=3$, $n_0=2$ does not enter other opening sections 51. With this configuration, on the spatial filter SF having the independent opening sections 51 for each of the Fourier transform images, in the Fourier transform image located at one opening sections 51, the spatial frequency in the two-dimensional image generated by the two-dimensional image formation apparatus 30 exists. On the other hand, due to the spatial restriction of the opening sections 51, the spatial frequency in the two-dimensional image generated by the two-dimensional image formation apparatus 30 is not to be missing. It should be noted that the spatial frequency in the pixel structure can be regarded as the carrier frequency, and the spatial frequency in the two-dimensional image is comparable to the image information in which the spatial frequency of the pixel structure is set as a carrier frequency.

Then, in the spatial filter SF, in order to control passage/non-passage for each of M×N Fourier transform images, the opening/closing control on the opening sections 51 is performed. When the spatial filter SF is composed, for example, of a liquid crystal display apparatus, it is possible to perform the opening/closing control of the opening section 51 by causing the liquid crystal sell to operate as a type of light shutter (light valve).

It should be noted that in a case where the luminances of the obtained images are different depending on the diffraction orders, as described above, while the darkest image is used as a reference, a neutral density filter for dimming the bright image may be arranged on the rear-side focal surface of the third lens $L_3$. The same applies to Embodiments 7 and 12 which will be described below.

As described above, the three-dimensional image display apparatus 1C according to Embodiment 6 has the following configuration that the spatial frequency in the two-dimensional image generated by the two-dimensional image formation apparatus 30 is emitted along diffraction angles corresponding to a plurality of diffraction orders, the Fourier transform image obtained by the Fourier transform carried out by the Fourier transform image formation means 40 (the first lens $L_1$) is subjected to filtering spatially and also temporally by the Fourier transform image selection means 50 (the spatial filter SF), the conjugate image CI of the Fourier transform image subjected to the filtering is formed. Thus, without increasing the size of the three-dimensional image display apparatus as a whole, at a high density in terms of space and further in a state of being distributed in a plurality of directions, the light ray group can be generated and scattered. In addition, it is possible to independently control the respective light rays which are the components of the light ray group in terms of time and space. With this configuration, it is possible to obtain the three-dimensional image based on the light rays having a quality similar to that of the object in the real world.

Also, in the three-dimensional image display apparatus 1C according to Embodiment 6, as the light ray reconstruction method is utilized, it is possible to provide the three-dimensional image which satisfies the visual functions such as the focal adjustment, the convergence, and the kinematic parallax. Furthermore, in the three-dimensional image display apparatus 1C according to Embodiment 6, as the high-order diffraction light is efficiently utilized, as compared with an image output method in a related art, it is possible to obtain the light rays which can be controlled by one image output device (the two-dimensional image formation apparatus 30 and the optical apparatus 35) (sorts of copies of two-dimensional image) by the number of the plurality of diffraction orders (that is, M×N pieces). Furthermore, in the three-dimensional image display apparatus 1C according to Embodiment 6, as the filtering is carried out spatially and also temporally, the temporal characteristic of the three-dimensional image display apparatus can be converted into the spatial characteristic of the three-dimensional image display apparatus. In addition, without using the diffusing screen or the like, it is possible to obtain the three-dimensional image. Furthermore, it is possible to provide the three-dimensional image which is appropriate to the observations from any directions. In addition, as the light ray group can be generated and scattered at the spatially high density, it is possible to provide the fine spatial image which is close to the visual limit.

Embodiment 7

Figure 24:
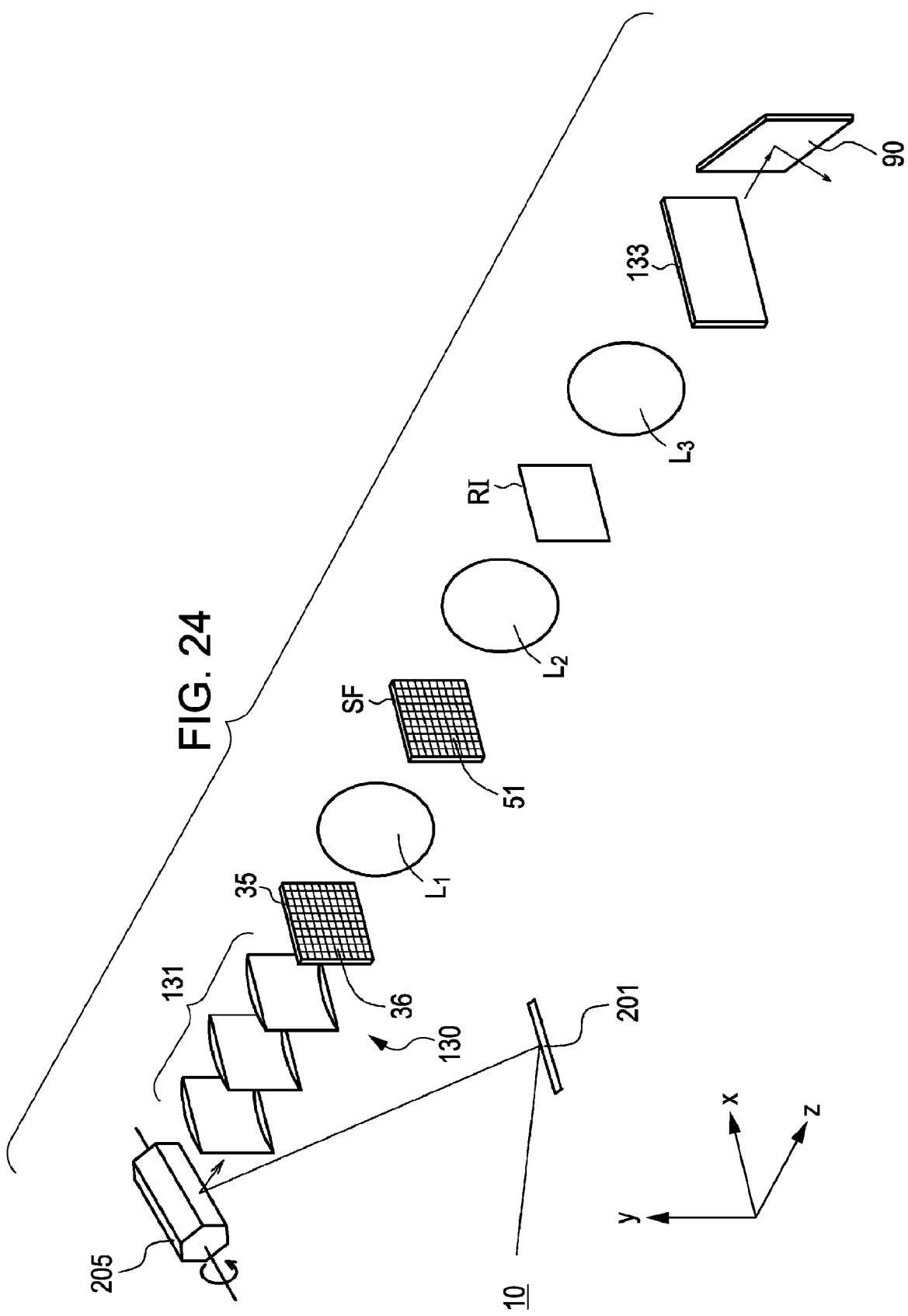
FIG. 24 is a conceptual diagram of a three-dimensional image display apparatus according to Embodiment 7.

Embodiment 7 is a modification of Embodiment 6. A conceptual diagram of a three-dimensional image display apparatus according to Embodiment 7 is shown in FIG. 24. It should be noted that FIG. 24 exemplifies the semi-transmissive mirror 90.

As being different from the liquid crystal display apparatus according to Embodiment 6, a two-dimensional image formation apparatus 130 according to Embodiment 7 includes a one-dimensional image formation apparatus configured to generate a one-dimensional image sectioned into P pieces (for example, 1920 pieces) (specifically, the diffraction grating-light modulation apparatus 201); and a scan optical system configured to two-dimensionally develop (scan) the one-dimensional image generated by the one-dimensional image formation apparatus (the diffraction grating-light modulation apparatus 201) and sectioned into P pieces to generate a two-dimensional image sectioned into P×Q (specifically, the scan mirror 205). Then, the optical apparatus 35 is arranged behind the scan optical system. The spatial frequency in the generated two-dimensional image which is arranged on a generation surface of the two-dimensional image is emitted by the optical apparatus 35 along diffraction angles corresponding to a plurality of diffraction orders (specifically, total $M_0 \times N_0$).

The conceptual diagram of the two-dimensional image formation apparatus including the diffraction grating-light modulation apparatus is similar to the light modulation means 130 according to Embodiment 3 shown in FIG. 13, and a detailed description will be omitted. However, the two-dimensional image obtained through the scan by the scan mirror 205 passes through the scan lens 131 and enters the optical apparatus 35 arranged on the generation surface of the two-dimensional image. In the optical apparatus 35, M×N sets of diffraction lights are generated for each of the components of the two-dimensional image sectioned into P×Q. To be specific, from the optical apparatus 35, the spatial frequency in the generated two-dimensional image is emitted along diffraction angles corresponding to a plurality of diffraction orders generated from the respective optical elements 36 of the optical apparatus 35. A rear-side focus of the optical apparatus 35 is arranged on the front-side focal surface of the first lens $L_1$ having the focal distance $f_1$. It should be noted that the one-dimensional spatial light modulator (the diffraction grating-light modulation apparatus 201) and the diffraction grating-light modulation element 210 will be described below.

Except for the above-mentioned points, the configuration and the construction of the three-dimensional image display apparatus according to Embodiment 7 can be set similar to the configuration and the construction of the three-dimensional image display apparatus described according to Embodiment 6, and a detailed description will be omitted.

Embodiment 8

Figure 25:
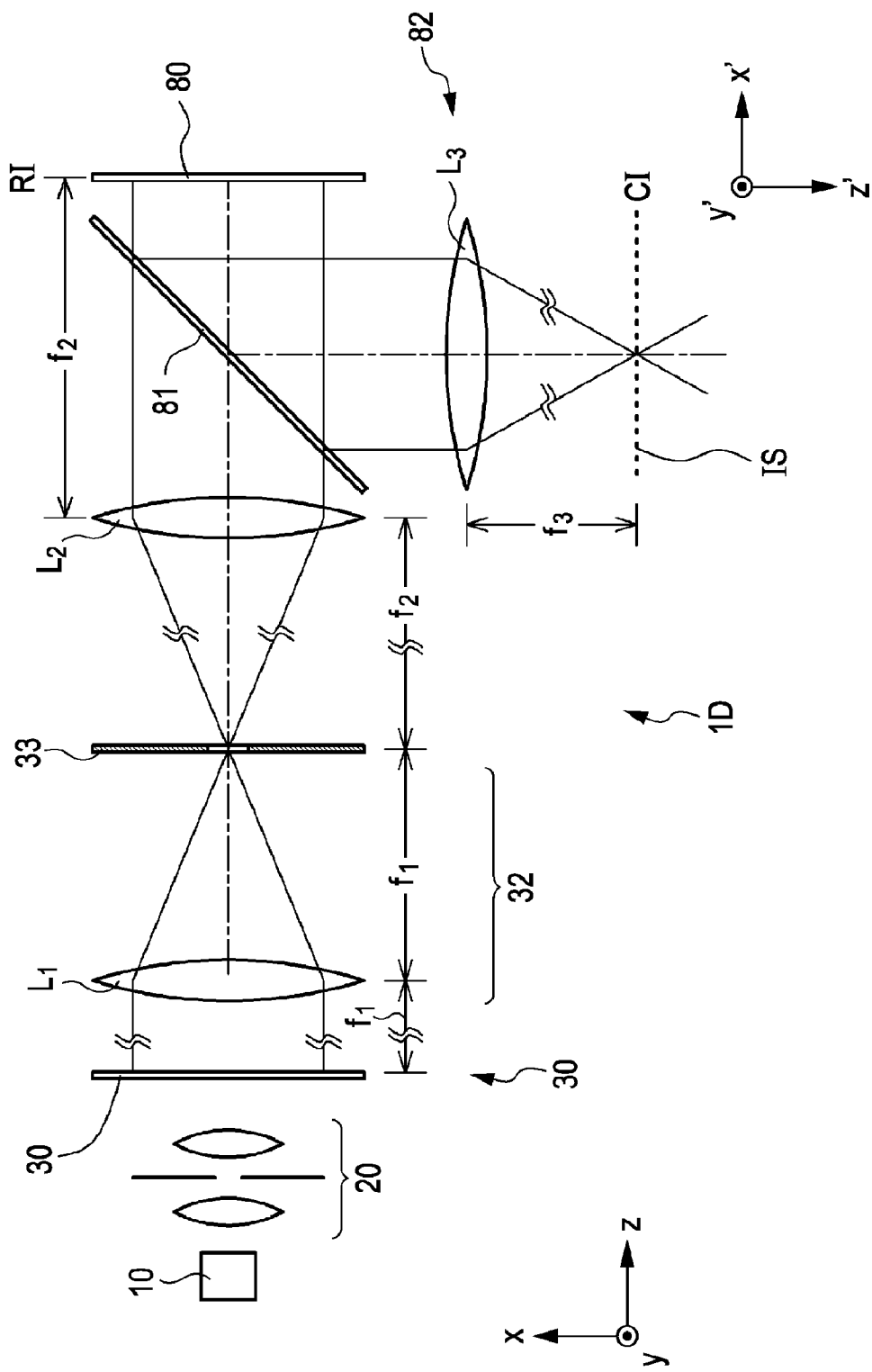
FIG. 25 is a conceptual diagram of a three-dimensional image display apparatus in a yz plane according to Embodiment 8.
Figure 26:
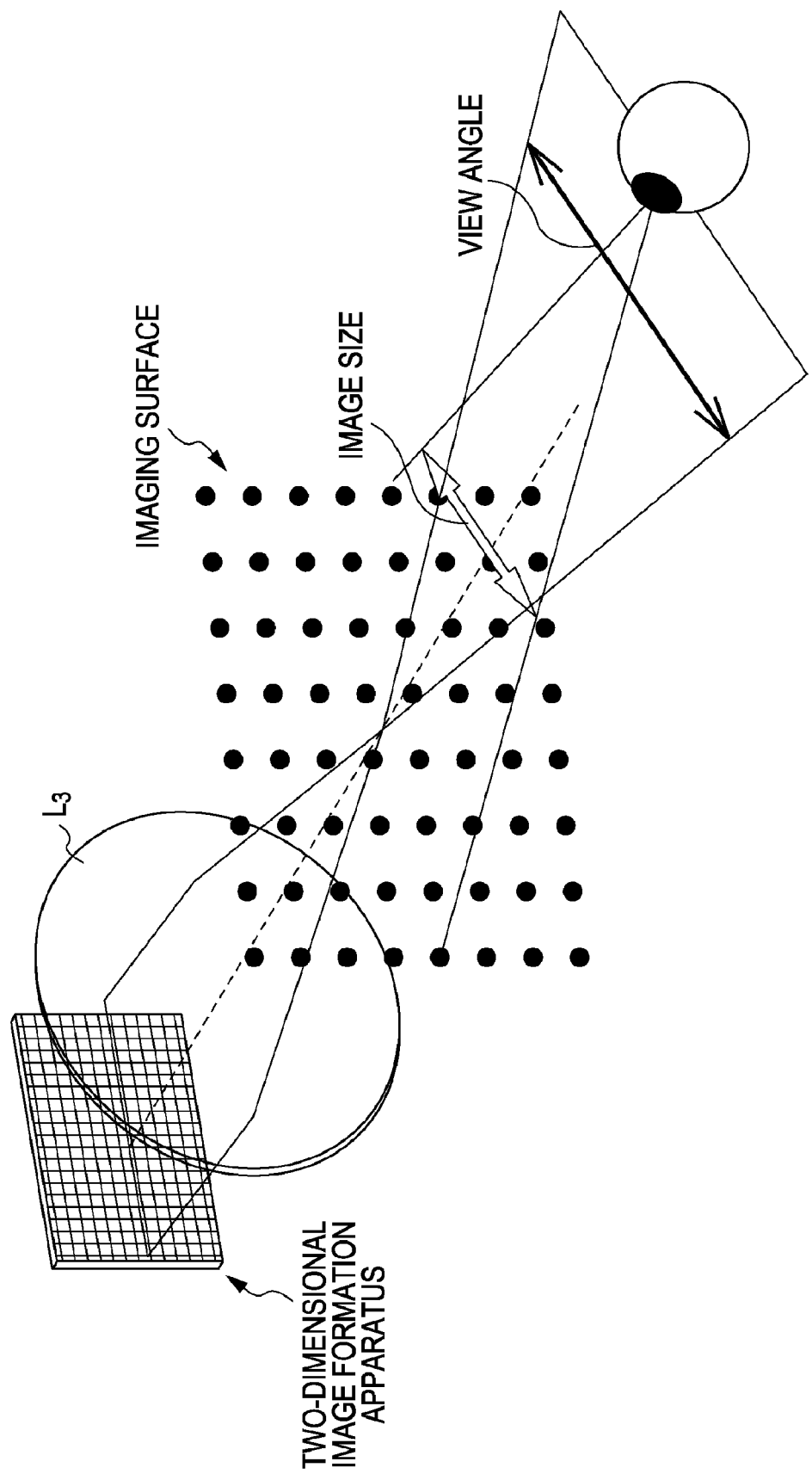
FIG. 26 is a conceptual diagram of the three-dimensional image display apparatus as obliquely viewed according to Embodiment 8.
Figure 27:
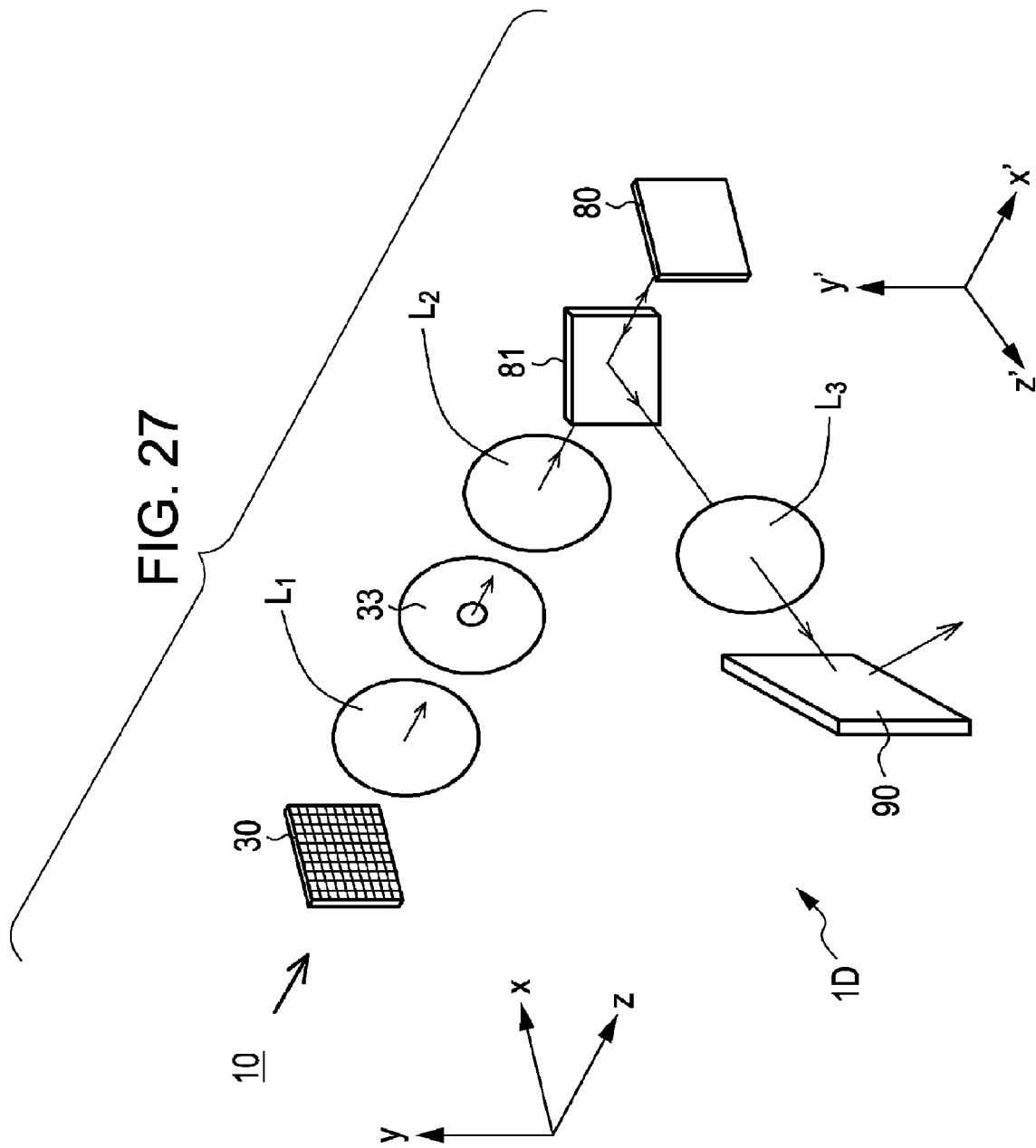
FIG. 27 schematically shows an arrangement state of components of the three-dimensional image display apparatus according to Embodiment 8.

Embodiment 8 relates to a three-dimensional image display apparatus according to embodiment modes 9 and 10. A conceptual diagram of the monochromatic-display three-dimensional image display apparatus according to Embodiment 8 is shown in FIGS. 25, 26, and 27. Herein, FIG. 25 is a conceptual diagram of a three-dimensional image display apparatus on an xz plane and an x'z' plane according to Embodiment 8. A conceptual diagram of the three-dimensional image display apparatus on a yz plane and a y'z' plane according to Embodiment 8 is substantially similar to FIG. 25 except for the arrangement of imaging means 82 (the third lens $L_3$) and a beam splitter 81 which will be described below. In addition, FIG. 26 is a conceptual diagram of the three-dimensional image display apparatus as viewed obliquely according to Embodiment 8, FIG. 27 schematically shows an arrangement state of components of the three-dimensional image display apparatus according to Embodiment 8, and FIG. 27 exemplifies the semi-transmissive mirror 90. It should be noted that in FIG. 26, a large part of components of the three-dimensional image display apparatus are omitted, and the representation of the light ray in the drawing is also simplified. Thus, FIG. 26 is different from FIGS. 25 and 27. Furthermore, in FIG. 26, only a part of light rays emitted from the two-dimensional image formation apparatus is represented in the drawing.

In a three-dimensional image display apparatus 1D according to Embodiment 8 too, with the stand-alone three-dimensional image display apparatus provided with the components shown in FIGS. 25, 26, and 27, it is possible to generate and form a large number of light ray groups spatially at a high density as compared with a related art technology. The three-dimensional image display apparatus 1D according to Embodiment 8 is a single three-dimensional image display apparatus and has a function equivalent to an apparatus in which a large number ($S_0 \times T_0$ pieces) of projector units 301 are arranged in a parallel manner. It should be noted that for example, in a case where a multi-unit system is adopted, by the number of the divided three-dimensional image (for example, 4×4=16), the three-dimensional image display apparatuses 1D according to Embodiment 8 may be prepared.

As a description is given by way of the components of the three-dimensional image display apparatus according to the embodiment mode 9, the three-dimensional image display apparatus 1D according to Embodiment 8 is a three-dimensional image display apparatus provided with a light source 10 and an optical system.

Then, this optical system includes (A) light modulation means 30 provided with a plurality of pixels 31 and configured to generate a two-dimensional image by modulating the light from the light source 10 by the respective pixels 31 and to emit the spatial frequency in the generated two-dimensional image along diffraction angles corresponding to a plurality of diffraction orders generated from the respective pixels 31, (B) image restriction and generation means 32 configured to perform Fourier transform on a spatial frequency in the two-dimensional image emitted from the light modulation means 30 to generate a number of Fourier transform images corresponding to the plurality of diffraction orders generated from the respective pixels 31 and only select a predetermined Fourier transform image (for example, a Fourier transform image corresponding to a first-order diffraction where a zero-order of a plane wave component is set as a carrier frequency) among the Fourier transform images, and to perform inverse Fourier transform on the selected Fourier transform image to form a conjugate image (a real image of the two-dimensional image) of the two-dimensional image generated by the light modulation means 30, (C) light ray travelling direction change means 80 configured to change (vary) a travelling direction of a light ray emitted from the image restriction and generation means, and (D) imaging means 82 configured to form an image of a light ray emitted from the light ray travelling direction change means 80.

Herein, the spatial frequency in the two-dimensional image is comparable to the image information in which the spatial frequency of the pixel structure is set as a carrier frequency. In addition, the spatial frequency in the conjugate image of the two-dimensional image is a spatial frequency obtained by removing the spatial frequency in the pixel structure from the spatial frequency in the two-dimensional image.

Then, the image restriction and generation means 32 is composed by including (B-1) a first lens $L_1$ configured to perform Fourier transform on the spatial frequency in the two-dimensional image emitted from the light modulation means 30 to generate a number of the Fourier transform images corresponding to a plurality of diffraction orders generated from the respective opening regions, (B-2) a scattering diffraction restricting opening section (image restricting opening section) 33 arranged on a side of the light ray travelling direction change means than the first lens $L_1$ and configured to select only a predetermined Fourier transform image among these Fourier transform images (for example, a Fourier transform image corresponding to a first-order diffraction where a zero-order of a plane wave component is set as a carrier frequency), and (B-3) a second lens $L_2$ arranged on a side of the light ray travelling direction change means than a the scattering diffraction restricting opening section 33 and configured to perform inverse Fourier transform on this selected Fourier transform image to form a conjugate image of the two-dimensional image generated by the light modulation means 30. Then, the scattering diffraction restricting opening section 33 is arranged on the front-side focal surface of the second lens $L_2$ which is also the rear-side focal surface of the first lens $L_1$. The same applies to Embodiments 9 and 12 which will be described below.

Also, as a description is given by way of the components of the three-dimensional image display apparatus according to the embodiment mode 10, the three-dimensional image display apparatus 1D according to Embodiment 8 is a three-dimensional image display apparatus provided with a light source 10 and an optical system. Then, this optical system includes (A) a two-dimensional image formation apparatus 30 provided with openings arranged in a two-dimensional matrix manner in an X direction and a Y direction (the number of pieces: $P_0 \times Q_0$) and configured to generate a two-dimensional image by controlling passage, reflection, or diffraction of the light from the light source 10 for each opening and to generate diffraction lights of a plurality of diffraction orders for each opening on the basis of the two-dimensional image, (B) a first lens $L_1$ in which the two-dimensional image formation apparatus 30 is arranged on a front-side focal surface, (C) a scattering diffraction restricting opening section (image restricting opening section) 33 arranged on a rear-side focal surface of the first lens $L_1$ and configured to allow only diffraction light of a predetermined diffraction order to pass (for example, a Fourier transform image corresponding to a first-order diffraction where a zero-order of a plane wave component is set as a carrier frequency), (D) a second lens $L_2$ in which the scattering diffraction restriction opening section 33 is arranged on a front-side focal surface, (E) light ray travelling direction change means 80 arranged behind the second lens $L_2$ (rear-side focal surface) and configured to change (vary) a travelling direction of a light ray emitted from the second lens $L_2$, and (F) a third lens $L_3$ configured to form an image of a light ray emitted from the light ray travelling direction change means 80.

It should be noted that according to Embodiment 8, the first lens $L_1$, the second lens $L_2$, the third lens $L_3$ are composed, to be specific, of a concave lens.

Herein, according to Embodiment 8 or Embodiments 9 and 12 which will be described below, $P_0=1024$, $Q_0=768$, $S_0=8$, and $T_0=8$ are established. However, the values are not limited to the above-mentioned values. In addition, the z axis which is a part of the optical axis up to the light ray travelling direction change means 80 passes through the center of the respective components up to the light ray travelling direction change means 80 constituting the three-dimensional image display apparatus 1D according to Embodiment 8 or Embodiments 9 and 12 to be described below. Furthermore, the z axis is orthogonal to these components constituting the three-dimensional image display apparatus 1D. When the components of the three-dimensional image display apparatus according to the embodiment mode 9 is compared with the components of the three-dimensional image display apparatus according to the embodiment mode 10 or 11, the light modulation means 30 corresponds to the two-dimensional image formation apparatus 30, the image restriction and generation means 32 corresponds to the first lens $L_1$, the scattering diffraction restricting opening section (image restricting opening section) 33, and the second lens $L_2$, and the imaging means 82 corresponds to the third lens $L_3$. Accordingly, for the sake of convenience, on the basis of terms of the two-dimensional image formation apparatus 30, the first lens $L_1$, the scattering diffraction restricting opening section 33, the second lens $L_2$, and the third lens $L_3$, a description will be given hereinafter.

Similarly to Embodiment 1, an illumination optical system 20 configured to shape the light from the light source 10 is arranged between the light source 10 and the two-dimensional image formation apparatus 30. Then, the light (illumination light) emitted from the light source 10 and passing the illumination optical system 20 illuminates the two-dimensional image formation apparatus 30. The illumination optical system 20 will be described below.

The two-dimensional image formation apparatus 30 is composed of a two-dimensional spatial light modulator having a plurality of pixels 31 two-dimensionally disposed, and the respective pixels 31 have an opening. To be specific, the two-dimensional image formation apparatus 30 or the two-dimensional spatial light modulator is composed of a transmissive liquid crystal display apparatus having the $P_0 \times Q_0$ pixels 31 which are two-dimensionally disposed, that is, disposed in a two-dimensional matrix manner along the X direction and the Y direction, and the respective pixels 31 have an opening.

Similar to Embodiment 1, one pixel 31 is composed of a region which is an overlapping region of a transparent first electrode and a transparent second electrode and provided with a liquid crystal cell. Then, by causing the liquid crystal cell to function as a type of a light shutter (light valve), that is, by controlling the transmittance of the respective pixels 31, the transmittance of the light (illumination light) emitted from the light source 10 is controlled, and as a whole, it is possible to obtain the two-dimensional image. A rectangular opening is provided in an overlapping region of the transparent first electrode and the transparent second electrode. As a result that Fraunhofer diffraction is generated when the light emitted from the light source 10 passes through the relevant opening, in the respective pixels 31, $M_0 \times N_0$ diffraction lights are generated. In other words, as the number of pixels 31 is $P_0 \times Q_0$, it can also be considered that the total ($P_0 \times Q_0 \times M_0 \times N_0$) streaks of diffraction lights are generated. In the two-dimensional image formation apparatus 30, the spatial frequency in the two-dimensional image is emitted along diffraction angles corresponding to a plurality of diffraction orders (total $M_0 \times N_0$) generated from the respective pixels 31 from the two-dimensional image formation apparatus 30. It should be noted that the diffraction angles vary also depending on the spatial frequency in the two-dimensional image.

On the front-side focal surface of the first lens $L_1$ having the focal distance $f_1$ (the focal surface on the light source side), the two-dimensional image formation apparatus 30 is arranged. On the rear-side focal surface of the first lens $L_1$ (the focal surface on the observer side), the scattering diffraction restricting opening section 33 is arranged. With the first lens $L_1$, the number of the Fourier transform images corresponding to the diffraction orders are generated, and these Fourier transform images are formed in the plane where the scattering diffraction restricting opening section 33 is located. Then, only a diffraction light of a predetermined diffraction order (for example, a Fourier transform image corresponding to a first-order diffraction where a zero-order of a plane wave component is set as a carrier frequency) passes through the scattering diffraction restricting opening section 33. In addition, the scattering diffraction restricting opening section 33 is arranged on the front-side focal surface of the second lens $L_2$ having the focal distance $f_2$. Furthermore, the light ray travelling direction change means 80 is arranged on the front-side focal surface of the third lens $L_3$ having the focal distance $f_3$ which is also the rear-side focal surface of the second lens $L_2$. The rear-side focal surface of the third lens $L_3$ is comparable to the imaging surface IS. It should be noted that the beam splitter 81 is arranged between the second lens $L_2$ and the light ray travelling direction change means 80, and the light ray from the second lens $L_2$ passes through the beam splitter 81 and enters the light ray travelling direction change means 80.

The light ray travelling direction change means 80 is composed of reflectance optical means capable of changing (varying) an angle of the emitted light ray with respect to the incident light ray, to be specific, for example, a mirror. To be more specific, the mirror is composed of a polygon mirror. By controlling the inclination angle of the rotation angle while the polygon mirror is rotated about the rotational axis, in the imaging surface IS, a position where the image is formed can be set as a positions disposed in a two-dimensional matrix manner of $S_0 \times T_0$ spots.

It should be noted that a configuration can be adopted that the light ray travelling direction change means 80 is composed of transmissive optical means capable of changing (varying) an angle of the emitted light ray with respect to the incident light ray, to be specific, for example, a prism. Then, in this case, for example, a mechanism may be provided for rotating (changing) the prism in a desired direction about the z axis.

The third lens $L_3$ is arranged so that a front-side focal surface thereof is matched with the rear-side focal surface of the second lens $L_2$, and the conjugate image CI of the Fourier transform image is formed on a rear-side focal surface (imaging surface IS) thereof. The light ray reflected by the light ray travelling direction change means 80 is reflected by the beam splitter 81 to enter the third lens $L_3$. Herein, as the rear-side focal surface of the third lens $L_3$ is a conjugate surface of the scattering diffraction restricting opening section 33, it is equivalent that the conjugate image of the two-dimensional image is output from the scattering diffraction restricting opening section 33 (where the final direction component of this conjugate image of the two-dimensional image is regulated by the light ray travelling direction change means 80). Then, the number of light rays eventually generated and output is the number of pixels ($P_0 \times Q_0$), and the light rays are light rays having passed the scattering diffraction restricting opening section 33. That is, the reduction in light amount passing the scattering diffraction restricting opening section 33 substantially hardly occurs due to a subsequent state of passing and being reflected by the components of the three-dimensional image display apparatus. In addition, the conjugate image CI of the Fourier transform image is formed on the rear-side focal surface of the third lens $L_2$, but the directional component of the conjugate image of the two-dimensional image is regulated by the light ray travelling direction change means 80. Thus, on the rear-side focal surface of the third lens $L_3$, it can be regarded that the light ray groups are arranged in a two-dimensional manner orderly. That is, as a whole, it is equivalent to a state in which the projector units 301 shown in FIG. 52 are arranged by the plural numbers (specifically, $S_0 \times T_0$ pieces) on the rear-side focal surface of the third lens $L_3$ (the imaging surface IS). It should be noted that in the following description, when the light ray emitted from the light ray travelling direction change means 80 is imaged at the (m, n)-th position on the rear-side focal surface of the third lens $L_3$ (the imaging surface IS), the imaging may be called (m, n)-th imaging in some cases. It should be noted that in FIG. 26, for the sake of convenience, 64 pieces of imaging are represented in the drawing by way of dots.

Similarly, as schematically shown in FIG. 7, with one pixel 31 in the two-dimensional image formation apparatus 30, total $M_0 \times N_0$ sets of diffraction lights are generated along the X direction and the Y direction. It should be noted that in FIG. 7, only diffraction lights of the zero-order light ($n_0=0$), the plus/minus first-order lights ($n_0=\pm 1$), and the plus/minus second-order lights ($n_0=\pm 2$) are represented in the drawing. In actuality, diffraction lights of a still higher-order are generated, and on the basis of a part of these diffraction lights, the three-dimensional image is eventually formed. Herein, in the diffraction lights (light fluxes) of the respective diffraction orders, all image information of the two-dimensional image generated by the two-dimensional image formation apparatus 30 (information on all the pixels) is summarized. a plurality of light ray groups generated by the diffraction from the same pixel on the two-dimensional image formation apparatus 30 all have the same image information at the same time. In other words, in the two-dimensional image formation apparatus 30 composed of the transmissive liquid crystal display apparatus including $P_0 \times Q_0$ pixels 31, the light from the light source 10 is modulated by the respective pixels 31 to generate the two-dimensional image, and also the spatial frequency in the generated two-dimensional image is emitted along diffraction angles corresponding to a plurality of diffraction orders (total $M_0 \times N_0$) generated from the respective pixels 31. That is, sorts of copies of the two-dimensional image are emitted along diffraction angles corresponding to a plurality of diffraction orders (total $M_0 \times N_0$) from the two-dimensional image formation apparatus 30.

Then, the spatial frequency in the two-dimensional image emitted from the two-dimensional image formation apparatus 30 is subjected to Fourier transform by the first lens $L_1$, and the number of the Fourier transform images corresponding to the diffraction orders generated from the respective pixels 31 are generated. Then, only a predetermined Fourier transform image among these Fourier transform images (for example, a Fourier transform image corresponding to a first-order diffraction where a zero-order of a plane wave component is set as a carrier frequency) passes through the scattering diffraction restricting opening section 33. Furthermore, this selected Fourier transform image is subjected to inverse Fourier transform by the second lens $L_2$, a conjugate image of the two-dimensional image generated by the two-dimensional image formation apparatus 30 is formed, and this conjugate image of the two-dimensional image enters the light ray travelling direction change means 80. It should be noted that the spatial frequency in the two-dimensional image is comparable to the image information in which the spatial frequency of the pixel structure is set as a carrier frequency. However, only the region of the image information in which the zero-order plane wave is set as the carrier wave (that is, up to maximum ½ of the spatial frequency of the spatial frequency in the pixel structure) is, in other words, obtained as the first-order diffraction in which the zero-order diffraction of the plane wave component is set as the carrier frequency, and the spatial frequency equal to or less than the half of the spatial frequency of the pixel structure (opening structure) for the light modulation means passes through the scattering diffraction restricting opening section 33. In this manner, the conjugate image of the two-dimensional image formed on the light ray travelling direction change means 80 does not include the pixel structure of the two-dimensional image formation apparatus 30, and on the other hand, includes all the spatial frequencies in the two-dimensional image generated by the two-dimensional image formation apparatus 30.

The spatial frequency in the conjugate image of the two-dimensional image in which all the image information of the two-dimensional image generated by the two-dimensional image formation apparatus 30 is summarized is emitted while the directional component is changed by the light ray travelling direction change means 80 and formed by the third lens $L_3$ on the imaging surface IS. In the third lens $L_3$, the Fourier transform image of the spatial frequency in the conjugate image of the two-dimensional image emitted from the light ray travelling direction change means 80 is generated, and it is possible to obtain the Fourier transform images at a spatially high density.

As described above, the three-dimensional image display apparatus 1D according to Embodiment 8 has the following configuration that the spatial frequency in the two-dimensional image generated by the light modulation means (the two-dimensional image formation apparatus) 30 is emitted along a predetermined angle from the light ray travelling direction change means 80, and the conjugate image CI is formed on the imaging surface IS. Thus, without increasing the size of the three-dimensional image display apparatus as a whole, at a high density in terms of space and further in a state of being distributed in a plurality of directions, the light ray group can be generated and scattered. In addition, with the provision of the light ray travelling direction change means 80, the decrease in the contrast of the image to be obtained is not caused, and it is possible to observe the clear three-dimensional image without blurring. Furthermore, it is possible to independently control the respective light rays which are the components of the light ray group in terms of time and space. With this configuration, it is possible to obtain the three-dimensional image based on the light rays having a quality similar to that of the object in the real world.

Also, in the three-dimensional image display apparatus 1D according to Embodiment 8, as the light ray reconstruction method is utilized, it is possible to provide the three-dimensional image which satisfies the visual functions such as the focal adjustment, the convergence, and the kinematic parallax. Furthermore, in the three-dimensional image display apparatus 1D according to Embodiment 8, the directional component of the image is controlled by the light ray travelling direction change means 80. Furthermore, in the three-dimensional image display apparatus 1D according to Embodiment 8, the type of filtering is carried out by the light ray travelling direction change means 80 spatially and also temporally. It is possible to convert the temporal characteristic of the three-dimensional image display apparatus into the spatial characteristic of the three-dimensional image display apparatus. In addition, without using the diffusing screen or the like, it is possible to obtain the three-dimensional image.

Furthermore, it is possible to provide the three-dimensional image which is appropriate to the observations from any directions. In addition, as the light ray group can be generated and scattered at the spatially high density, it is possible to provide the fine spatial image which is close to the visual limit.

Embodiment 9

Figure 28:
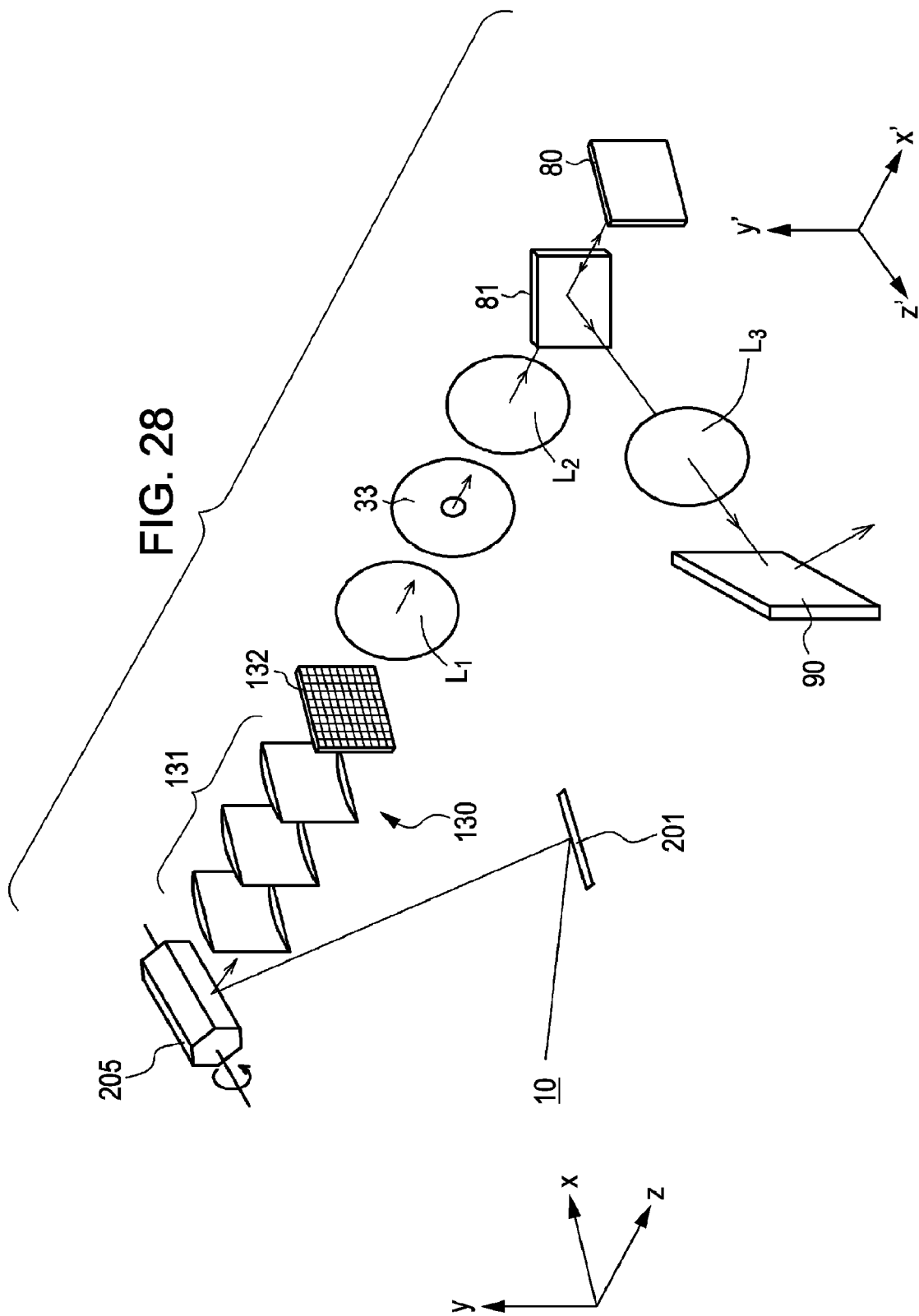
FIG. 28 is a conceptual diagram of a three-dimensional image display apparatus according to Embodiment 9.

Embodiment 9 relates to a three-dimensional image display apparatus according to embodiment modes 9 and 11. A conceptual diagram of the three-dimensional image display apparatus according to Embodiment 9 is shown in FIG. 28. It should be noted that FIG. 28 exemplifies the semi-transmissive mirror 90.

As being different from the liquid crystal display apparatus according to Embodiment 8, the light modulation means 130 according to Embodiment 9 includes a one-dimensional spatial light modulator (specifically, a diffraction grating-light modulation apparatus 201) configured to generate a one-dimensional image sectioned into $P_0$ pieces (for example, 1920 pieces); a scan optical system configured to two-dimensionally developing (scanning) the one-dimensional image generated by the one-dimensional spatial light modulator (the diffraction grating-light modulation apparatus 201) and sectioned into $P_0$ pieces to generate a two-dimensional image sectioned into $P_0 \times Q_0$ pieces (specifically, the scan mirror 205); and a grating filter (diffraction grating filter) 132 configured to emit the spatial frequency in the generated two-dimensional image which is arranged on a generation surface of the two-dimensional image along a diffraction angle corresponding to a plurality (specifically, total $M_0 \times N_0$) of diffraction orders. Herein, for each of the compartments of the two-dimensional image sectioned into $P_0 \times Q_0$ pieces formed by the scan optical system (the scan mirror 205), $M_0 \times N_0$ sets of diffraction lights are generated by the grating filter 132. It should be noted that the grating filter 132 may be composed of an amplitude grating or a phase grating.

Alternatively, as a description is given by way of the components of the three-dimensional image display apparatus according to the embodiment mode 11, the three-dimensional image display apparatus according to Embodiment 9 is a three-dimensional image display apparatus provided with a light source 10 and an optical system. Then, this optical system includes (A) a two-dimensional image formation apparatus 130 composed of a one-dimensional spatial light modulator configured to generate a one-dimensional image (specifically, the diffraction grating-light modulation apparatus 201); a scan optical system configured to generate a two-dimensional image by developing the one-dimensional image generated by the one-dimensional spatial light modulator (specifically, the scan mirror 205); and diffraction light generation means arranged on a generation surface of the two-dimensional image and configured to generate diffraction lights of a plurality of diffraction orders for each pixel (specifically, a grating filter 132), (B) a first lens $L_1$ in which the diffraction light generation means (the grating filter 132) is arranged on a front-side focal surface, (C) a scattering diffraction restricting opening section 33 arranged on a rear-side focal surface of the first lens $L_1$ and configured to allow only diffraction light of a predetermined diffraction order to pass (for example, a Fourier transform image corresponding to a first-order diffraction where a zero-order of a plane wave component is set as a carrier frequency), (D) a second lens $L_2$ in which the scattering diffraction restriction opening section 33 is arranged on a front-side focal surface, (E) light ray travelling direction change means 80 arranged behind the second lens $L_2$ and configured to change (vary) a travelling direction of a light ray emitted from the second lens $L_2$, and (F) a third lens $L_3$ configured to form an image of a light ray emitted from the light ray travelling direction change means 80.

The conceptual diagram of the two-dimensional image formation apparatus including the diffraction grating-light modulation apparatus is similar to the light modulation means 130 according to Embodiment 3 shown in FIG. 13, and a detailed description will be omitted. However, in the grating filter 132, and for each of the components of the two-dimensional image sectioned into $P_0 \times Q_0$, $M_0 \times N_0$ sets of diffraction lights are generated.

Except for the above-mentioned points, the configuration and the construction of the three-dimensional image display apparatus according to Embodiment 9 can be set similar to the configuration and the construction of the three-dimensional image display apparatus described according to Embodiment 8, and a detailed description will be omitted.

Embodiment 10

Figure 29:
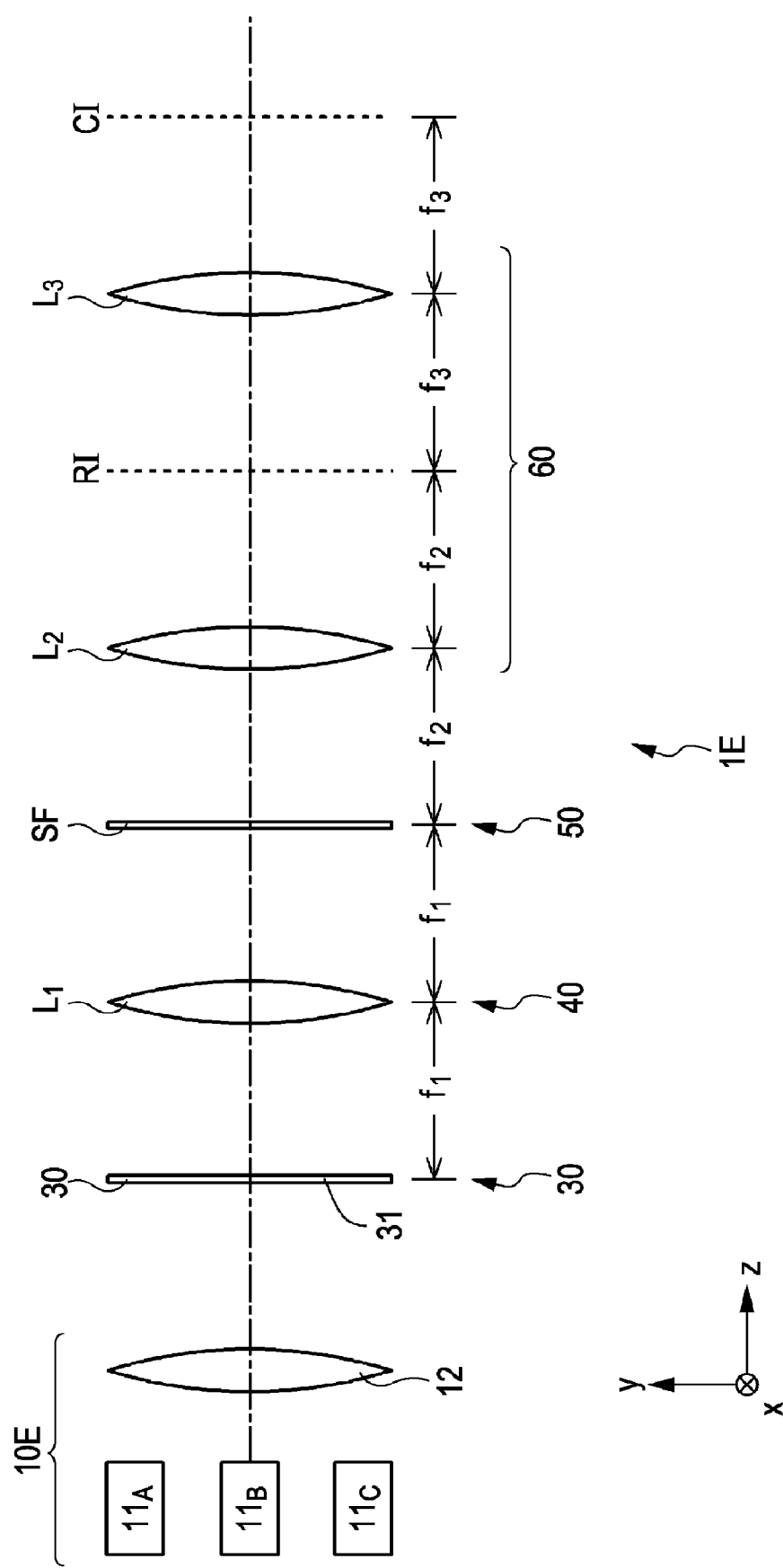
FIG. 29 is a conceptual diagram of a three-dimensional image display apparatus in a yz plane according to Embodiment 10.
Figure 30:
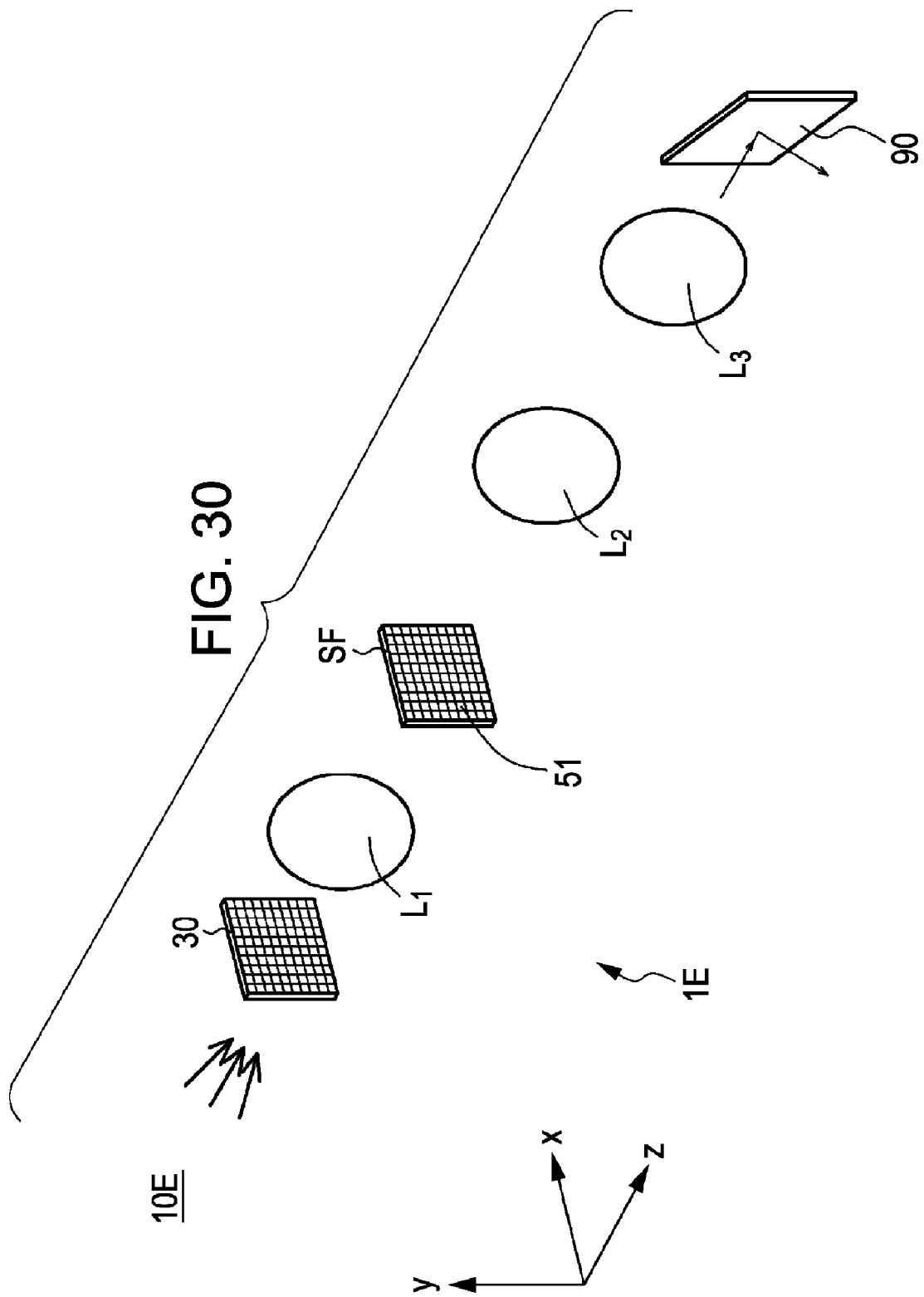
FIG. 30 schematically shows an arrangement state of components of the three-dimensional image display apparatus according to Embodiment 10.
Figure 31:
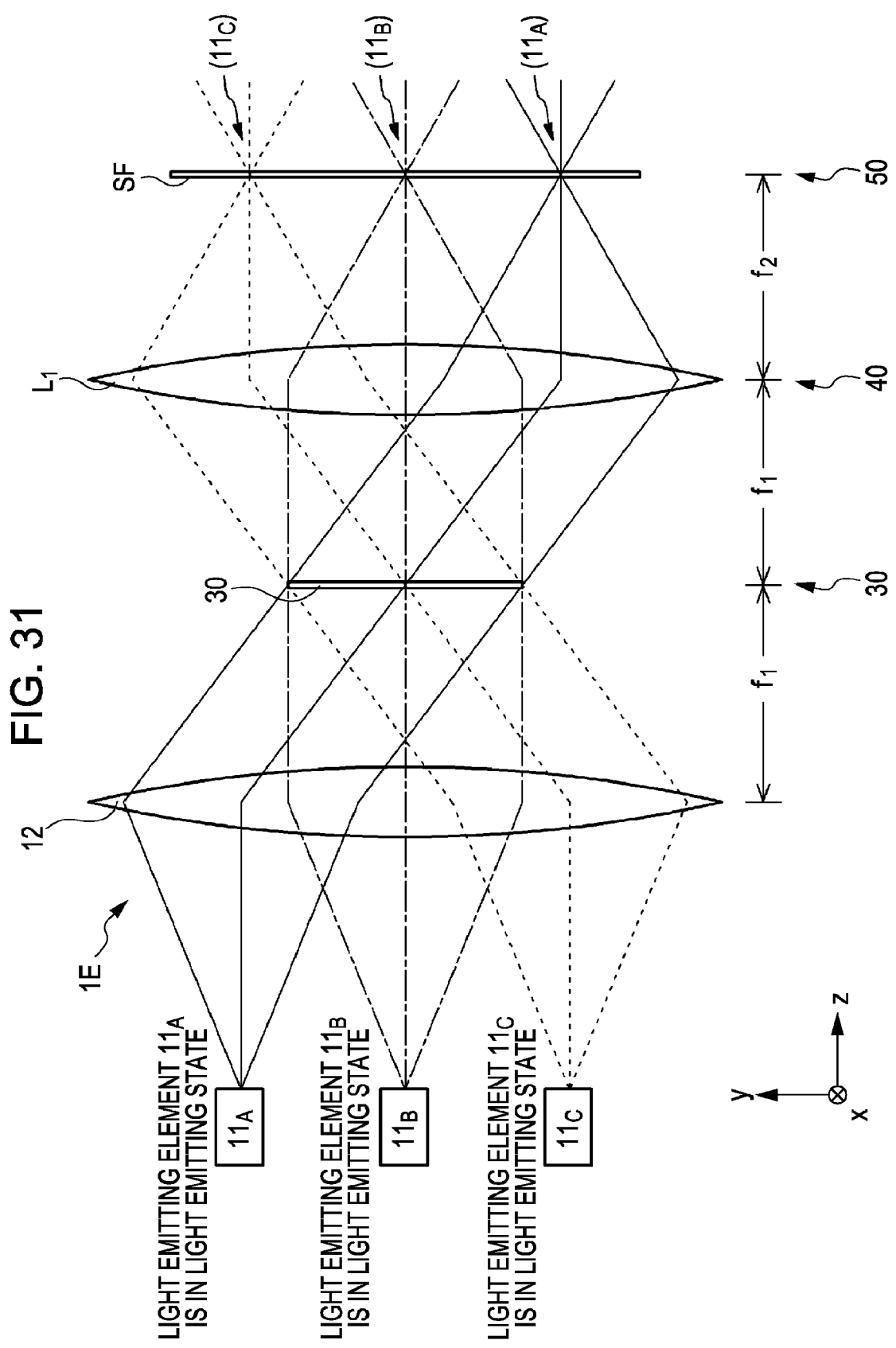
FIG. 31 is a conceptual diagram expanding a part of the three-dimensional image display apparatus according to Embodiment 10.
Figure 32A:
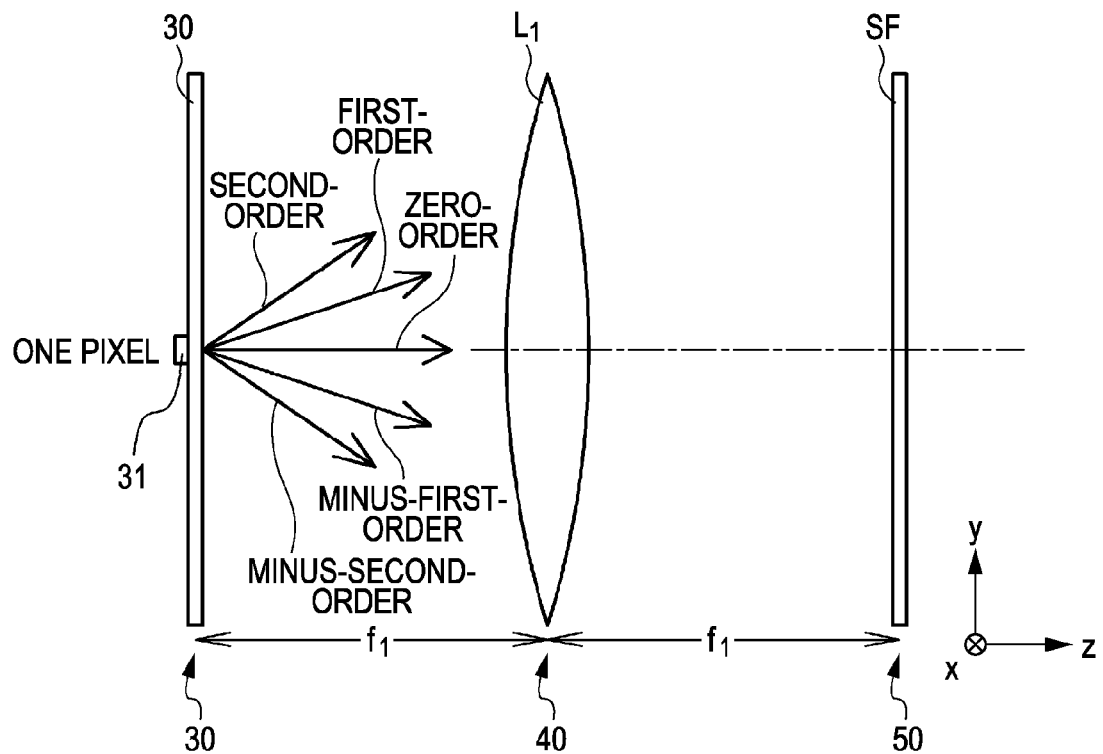
FIGS. 32A and 32B schematically show states in which diffraction lights of a plurality of diffraction orders are generated by the light modulation means (the two-dimensional image formation apparatus) in the three-dimensional image display apparatus according to Embodiment 10.
Figure 32B:
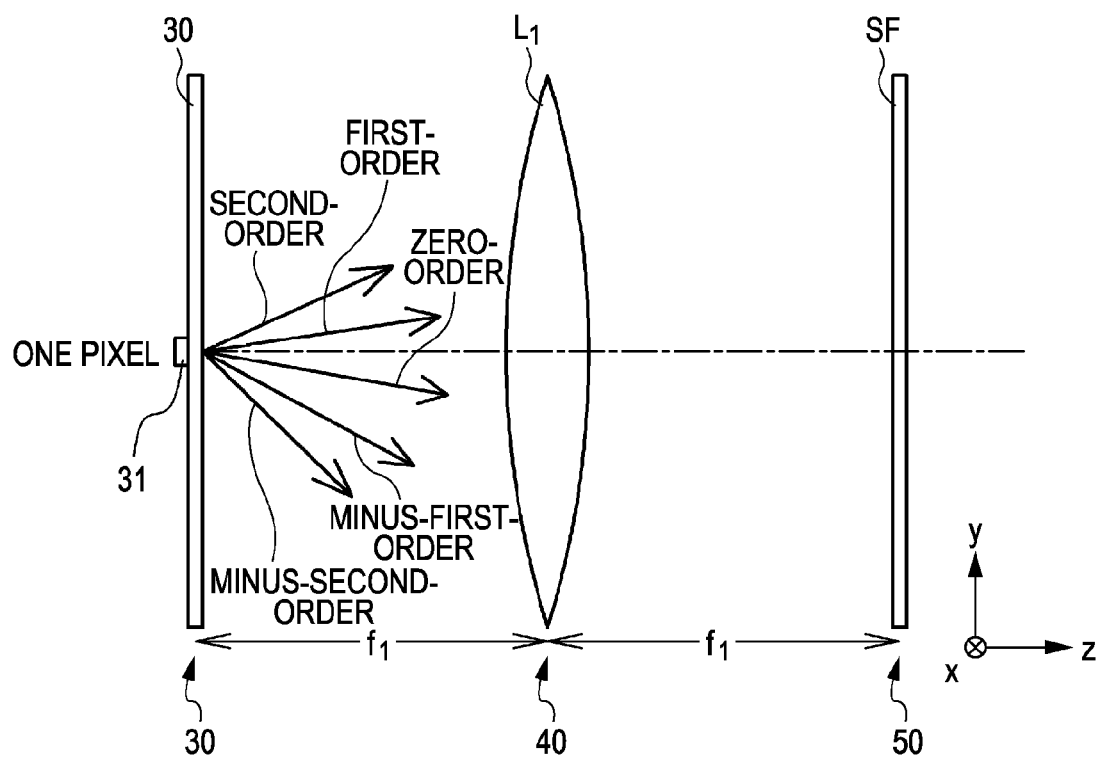
Figure 33:
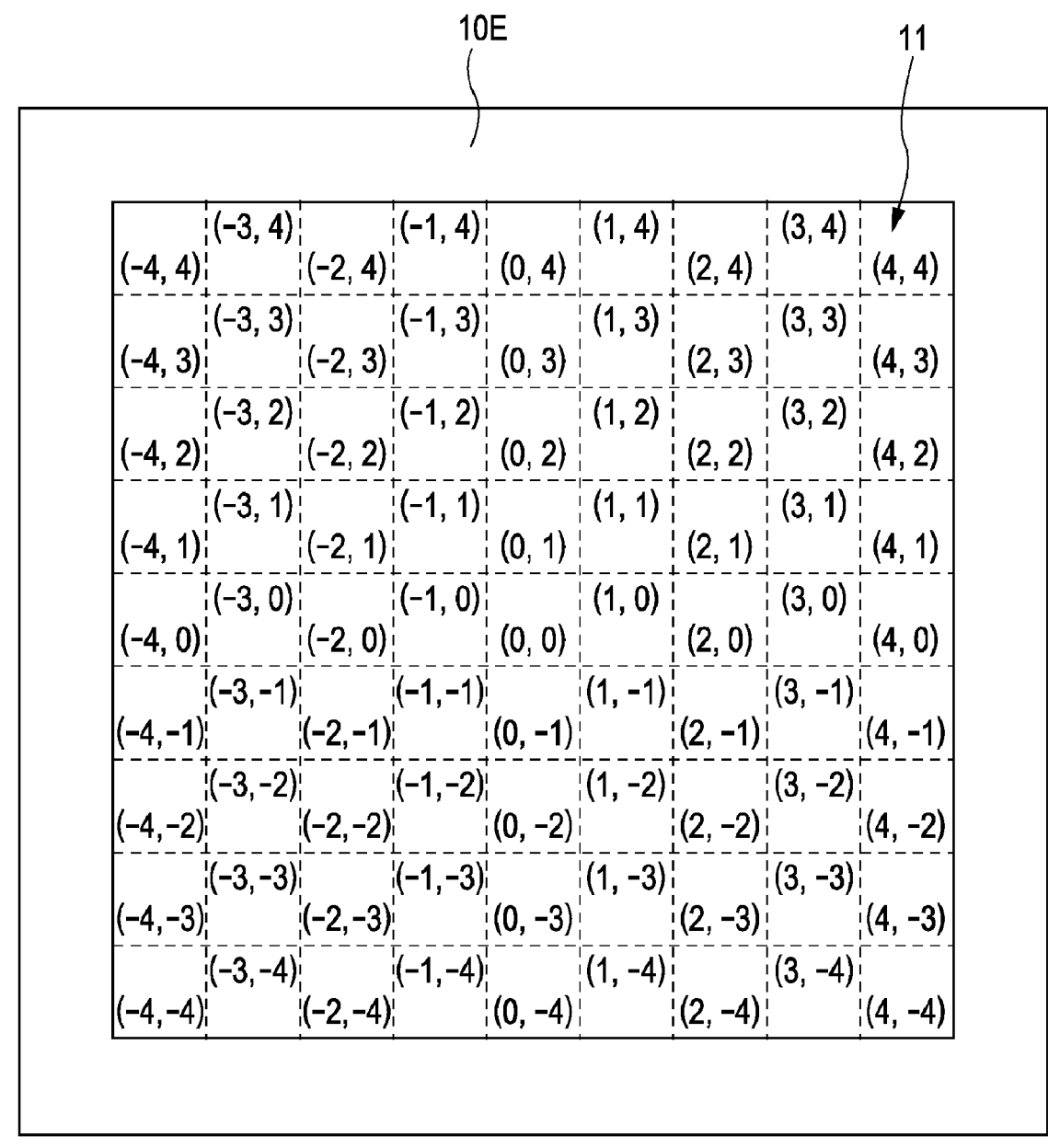

Embodiment 10 relates to a three-dimensional image display apparatus according to embodiment modes 12 and 13. A conceptual diagram of the monochromatic-display three-dimensional image display apparatus according to Embodiment 10 is shown in FIG. 29. It should be noted that in FIG. 29, the optical axis is set as the z axis, orthogonal coordinates in a plane orthogonal to the z axis are set as the x axis and the y axis, a direction parallel to the x axis is set as the X direction, and a direction parallel to the y axis is set as the Y direction. The X direction is set, for example, as the horizontal direction in the three-dimensional image display apparatus, and the Y direction is set, for example, as the vertical direction in the three-dimensional image display apparatus. Herein, FIG. 29 is a conceptual diagram of the three-dimensional image display apparatus in the yz plane according to Embodiment 10. A conceptual diagram of the three-dimensional image display apparatus in the xz plane according to Embodiment 10 is substantially similar to FIG. 29. In addition, a conceptual diagram of the three-dimensional image display apparatus as viewed obliquely according to Embodiment 10 is similar to that shown in FIG. 4, FIG. 30 schematically shows an arrangement state of components of the three-dimensional image display apparatus according to Embodiment 10, and FIG. 30 exemplifies the semi-transmissive mirror 90. In addition, a conceptual diagram expanding a part in the vicinity of the light modulation means (the two-dimensional image formation apparatus), the Fourier transform image formation means (the first lens), and the Fourier transform image selection means (the spatial filter) is shown in FIG. 31, and FIGS. 32A and 32B. Furthermore, a schematic front view of the light source is shown in FIG. 33, and a schematic front view of the spatial filter is shown in FIG. 34.

In a three-dimensional image display apparatus 1E according to Embodiment 10 too, with the stand-alone three-dimensional image display apparatus provided with the components shown in FIG. 29 and the like, it is possible to generate and form a large number of light ray groups spatially at a high density as compared with a related art technology. The three-dimensional image display apparatus 1E according to Embodiment 10 is a single three-dimensional image display apparatus and has a function equivalent to an apparatus in which a large number ($U_0 \times V_0$ pieces) of projector units 301 are arranged in a parallel manner. It should be noted that for example, in a case where a multi-unit system is adopted, as shown in the conceptual diagram in FIG. 51, by the number of the divided three-dimensional image (for example, 4×4=16), the three-dimensional image display apparatuses 1E according to Embodiment 10 may be prepared.

As a description is given by way of the components of the three-dimensional image display apparatus according to the embodiment mode 12, the three-dimensional image display apparatus 1E according to Embodiment 10 is a three-dimensional image display apparatus provided with a light source 10E configured to emit light from a plurality of discretely arranged light emitting positions and an optical system. Then, this optical system includes (A) light modulation means 30 provided with a plurality of pixels (the number of pixels: P×Q) 31 and configured to generate a two-dimensional image by modulating lights (illumination lights) which are sequentially emitted from different light emitting positions of the light source by the respective pixels 31 and are different in incident directions and to emit the spatial frequency in the generated two-dimensional image along a diffraction angle corresponding to a plurality (total M×N) of diffraction orders generated from the respective pixels 31, and (B) Fourier transform image formation means 40 configured to perform Fourier transform on the spatial frequency in the two-dimensional image emitted from the light modulation means 30 to generate a number of Fourier transform images corresponding to a plurality (total M×N) of the diffraction orders and to form the Fourier transform image, and further (C) conjugate image formation means 60 configured to form a conjugate image of the Fourier transform image selected by the Fourier transform image selection means 40.

Alternatively, as a description is given by way of the components of the three-dimensional image display apparatus according to the embodiment mode 13, the three-dimensional image display apparatus 1E according to Embodiment 10 is a three-dimensional image display apparatus provided with a light source 10E configured to emit light from a plurality of discretely arranged light emitting positions and an optical system. Then, this optical system includes (A) a two-dimensional image formation apparatus 30 provided with openings arranged in a two-dimensional matrix manner in an X direction and a Y direction (the number of pieces: P×Q) and configured to generate a two-dimensional image by controlling passage of the lights (the illumination lights) which are sequentially emitted from different light emitting positions of the light source 10E and are different in incident directions for each opening the light source 10E and to generate diffraction lights of a plurality of diffraction orders (total M×N) for each opening on the basis of the two-dimensional image, (B) a first lens $L_1$ in which the two-dimensional image formation apparatus 30 is arranged on a front-side focal surface (a focal surface on the light source side), (C) a second lens $L_2$ whose front-side focal surface (a focal surface on the light source side) is located on the rear-side focal surface of the first lens $L_1$ (the focal surface on the observer side), and (D) a third lens $L_3$ whose front-side focal surface is located on the rear-side focal surface of the second lens $L_2$.

Herein, the spatial frequency in the two-dimensional image is comparable to the image information in which the spatial frequency of the pixel structure is set as a carrier frequency.

In the three-dimensional image display apparatus 1E according to Embodiment 10, the light source 10E is provided with a light emitting element 11 and light ray travelling direction change means configured to change an incident direction of light which is emitted from the light emitting element 11 and enters the light modulation means or the two-dimensional image formation apparatus 30. Herein, the plurality of light emitting elements 11 (specifically, light emitting diodes) are provided, and the plurality of light emitting elements 11 are disposed in a two-dimensional matrix manner. It should be noted that the number of the plurality of light emitting elements 11 disposed in a two-dimensional matrix manner is $U_0' \times V_0'$. The number of discretely arranged light emitting positions in the light source 10E is $U_0 \times V_0$ (where $U_0=U_0'$ and $V_0=V_0'$). According to Embodiment 10, P=1024, Q=768, $U_0=9$, and $V_0=9$ are established. However, the values are not limited to the above-mentioned values. In addition, the light ray travelling direction change means is composed of refractive optical means, to be specific, a lens, to be more specific, a collimator lens 12. Herein, a plurality of light emitting elements 11 are arranged in the vicinity of the front-side focal surface of the collimator lens 12. An emitting direction of the light emitted from the respective light emitting elements 11 to enter the collimator lens 12 and then emitted from the collimator lens 12 (parallel light) can be three-dimensionally changed by the collimator lens 12. As a result, an incident direction of the light (the illumination light) entering the light modulation means or the two-dimensional image formation apparatus 30 can be three-dimensionally changed (see FIG. 31). It should be noted that the emitting direction of the light emitted from the respective light emitting elements 11 is set the same as that according to Embodiment 10 (specifically, parallel to the optical axis), but the emitting directions may be different. Alternatively, in other words, the lens (specifically, the collimator lens 12) is arranged between the plurality of light emitting elements 11 functioning as the light source and the light modulation means or the two-dimensional image formation apparatus 30, and the plurality of light emitting elements 11 are located in the vicinity of the front-side focal surface of the collimator lens 12 or the front-side focal surface.

When the components of the three-dimensional image display apparatus according to the embodiment mode 12 is compared with the components of the three-dimensional image display apparatus according to the embodiment mode 13, the light modulation means 30 corresponds to the two-dimensional image formation apparatus 30, the Fourier transform image formation means 40 corresponds to the first lens $L_1$, Fourier transform image selection means 50 which will be described below corresponds to the spatial filter SF, the inverse Fourier transform means corresponds to the second lens $L_2$, and the conjugate image formation means 60 corresponds to the second lens $L_2$ and the third lens $L_3$. Accordingly, for the sake of convenience, on the basis of the terms of the two-dimensional image formation apparatus 30, the first lens $L_1$, the spatial filter SF, the second lens $L_2$, and the third lens $L_3$, a description will be given hereinafter.

A state in which light fluxes emitted from light emitting elements $11_A$, $11_B$, and $11_C$ constituting the light source 10E pass the two-dimensional image formation apparatus 30, the first lens $L_1$, and the spatial filter SF is schematically shown in FIG. 31. In FIG. 31, the light flux emitted from the light emitting element $11_A$ constituting the light source 10E is indicated by a solid line, the light flux emitted from the light emitting element $11_B$ is indicated by a dashed-dotted line, and the light flux emitted from the light emitting element $11_C$ is indicated by a dotted line. In addition, positions of the images formed by the illumination lights emitted from the light emitting elements $11_A$, $11_B$, and $11_C$ on the spatial filter SF are respectively denoted by symbols ($11_A$), ($11_B$), and ($11_C$). It should be noted that respective position numbers (which will be described below) of the light emitting elements $11_A$, $11_B$, and $11_C$ constituting the light source 10E are, for example, the (4, 0)-th section, the (0, 0)-th section, and the (−4, 0)-th section. Herein, when a certain light emitting element is in a light emitting state, all the other light emitting elements are in a turn off state.

The collimator lens 12 is arranged between the light emitting elements 11 and the two-dimensional image formation apparatus 30 as described above. Then, the illumination light emitted from the light emitting elements 11 and passing the collimator lens 12 illuminates the two-dimensional image formation apparatus 30. As described above, the incident directions of the illumination light to the two-dimensional image formation apparatus 30 depend on the two-dimensional position of the light emitting elements 11 (the light emitting position) and are different in a three-dimensional manner.

The light modulation means 30 is composed of a two-dimensional spatial light modulator having a plurality of pixels 31 two-dimensionally disposed, and the respective pixels 31 have an opening. Herein, to be specific, the two-dimensional spatial light modulator or the two-dimensional image formation apparatus 30 is composed of a transmissive liquid crystal display apparatus having the P×Q pixels 31 which are two-dimensionally disposed, that is, disposed in a two-dimensional matrix manner along the X direction and the Y direction, and the respective pixels have an opening. It should be noted that the planar shape of the opening is rectangle. When the planar shape of the opening is set as rectangle, Fraunhofer diffraction is generated, and M×N sets of diffraction lights are generated. That is, with the openings, the amplitude grating is formed with which the amplitude (intensity) of the incident light wave is periodically modulated, and the light amount distribution matching with the light transmission distribution of the grating can be obtained.

Similar to Embodiment 1, one pixel 31 is composed of a region which is an overlapping region of a transparent first electrode and a transparent second electrode and provided with a liquid crystal cell. Then, by causing the liquid crystal cell to function as a type of a light shutter (light valve), that is, by controlling the transmittance of the respective pixels 31, the transmittance of the light (illumination light) emitted from the light source 10E is controlled, and as a whole, it is possible to obtain the two-dimensional image. A rectangular opening is provided in an overlapping region of the transparent first electrode and the transparent second electrode. As a result that Fraunhofer diffraction is generated when the light emitted from the light source 10 passes through the relevant opening, in the respective pixels 31, M×N diffraction lights are generated. In other words, as the number of pixels 31 is P×Q, it can also be considered that the total (P×Q×M×N) streaks of diffraction lights are generated. In the two-dimensional image formation apparatus 30, the spatial frequency in the two-dimensional image is emitted along diffraction angles corresponding to a plurality of diffraction orders (total M×N) generated from the respective pixels 31 from the two-dimensional image formation apparatus 30. It should be noted that the diffraction angles vary also depending on the spatial frequency in the two-dimensional image.

In the three-dimensional image display apparatus 1E according to Embodiment 10, the Fourier transform image formation means 40 is composed of a lens (first lens $L_1$), and the light modulation means 30 is arranged on a front-side focal surface (the focal surface on the light source side) of this lens (the first lens $L_1$).

The three-dimensional image display apparatus 1E according to Embodiment 10 includes Fourier transform image selection means 50 configured to select a Fourier transform image corresponding to a desired diffraction order among the number of the Fourier transform images generated corresponding to a plurality of diffraction orders. Herein, the Fourier transform image selection means 50 is arranged at a position where the Fourier transform image is formed (an XY plane where the Fourier transform image is formed by the Fourier transform image formation means 40, an imaging surface). To be specific, the Fourier transform image selection means 50 is arranged on the rear-side focal surface (the focal surface on the observer side) of the lens constituting the Fourier transform image formation means 40 (the first lens $L_1$). Alternatively, in other words, the three-dimensional image display apparatus 1E according to Embodiment 10 includes a spatial filter SF located at a rear-side focal surface of the first lens $L_1$ and provided with a number of opening/closing controllable opening sections 51 corresponding to the number of light emitting positions of the light source 10E. That is, the Fourier transform image selection means 50 (the spatial filter SF) has a number ($U_0 \times V_0 = LEP_{Total}$) of the opening sections 51 corresponding to the number of discretely arranged light emitting positions ($U_0 \times V_0 = LEP_{Total}$) of the light source 10E.

Herein, to be more specific, the Fourier transform image selection means 50 (or the spatial filter SF) can be composed, for example, of a transmissive liquid crystal display apparatus or a reflective liquid crystal display apparatus using ferroelectric liquid crystal and having $U_0 \times V_0$ pixels or composed of a two-dimensional type MEMS including an apparatus in which the movable mirrors are disposed in a two-dimensional matrix manner. Herein, for example, it is possible to perform the opening/closing control of the opening section 51 by causing the liquid crystal sell to operate as a type of light shutter (light valve), and the opening/closing control on the opening sections 51 can be performed by movement/standstill of the movable mirror. In the Fourier transform image selection means 50 (the spatial filter SF), a desired opening sections 51 (specifically, the opening sections 51 for allowing the zero-order diffraction light to pass) is set in an opened state in synchronization with the generation timing of the two-dimensional image by the light modulation means 30, and the Fourier transform image corresponding to the desired diffraction order (zero-order) can be selected.

Furthermore, the three-dimensional image display apparatus 1E further includes inverse Fourier transform means (specifically, a second lens $L_2$ which will be described below) configured to form a real image RI of the two-dimensional image generated by the two-dimensional image formation apparatus 30 by performing inverse Fourier transform on the Fourier transform image imaged by Fourier transform image formation means 40.

According to Embodiment 10, to be specific, the first lens $L_1$, the second lens $L_2$, and the third lens $L_3$ are composed of a convex lens.

As described above, on the front-side focal surface of the first lens $L_1$ having the focal distance $f_1$ (the focal surface on the light source side), the two-dimensional image formation apparatus 30 is arranged, and on the rear-side focal surface of the first lens $L_1$ (the focal surface on the observer side), the spatial filter SF capable of performing the temporal opening/closing control for filtering the Fourier transform image spatially and also temporally is arranged. Then, the number of the Fourier transform images corresponding to the diffraction orders are generated by the first lens $L_1$, and these Fourier transform images are formed on the spatial filter SF.

A front view of the light source 10E composed of a plurality of light emitting elements disposed in a two-dimensional matrix manner is shown in FIG. 33, and a schematic front view of the spatial filter SF composed of a liquid crystal display apparatus is shown in FIG. 34. In FIGS. 33 and 34, numerals (u, v) denote position numbers of the light emitting element constituting the light source 10E or the opening sections 51 constituting the spatial filter SF. That is, for example, only a desired Fourier transform image of the two-dimensional image (for example, the Fourier transform image corresponding to the zero-diffraction) by the light emitting element located at the (3, 2)-th section enters the (3, 2)-th opening section 51 and passes the (3, 2)-th opening section 51. The Fourier transform images other than the desired Fourier transform image of the two-dimensional image by the light emitting element located at the (3, 2)-th section are interrupted by the spatial filter SF. The spatial filter SF is arranged on the front-side focal surface of the second lens $L_2$ having the focal distance $f_2$. Furthermore, the second lens $L_2$ and the third lens $L_3$ are arranged so that the rear-side focal surface of the second lens $L_2$ and the front-side focal surface of the third lens $L_3$ having the focal distance $f_3$ are matched. The planar shape of the opening sections 51 on the spatial filter SF may be set similar to Embodiment 1.

As described above, to be specific, the conjugate image formation means 60 is composed of the second lens $L_2$ and the third lens $L_3$. Then, the second lens $L_2$ having the focal distance $f_2$ forms the real image RI of the two-dimensional image generated by the two-dimensional image formation apparatus 30 by performing inverse Fourier transform on the Fourier transform image subjected to the filtering by the spatial filter SF. That is, the arranged is made so that the real image RI of the two-dimensional image formed by the two-dimensional image formation apparatus 30 is formed on the rear-side focal surface of the second lens $L_2$. The magnification ratio of the real image RI obtained here with respect to the two-dimensional image formation apparatus 30 can be changed by arbitrarily selecting the focal distance $f_2$ of the second lens $L_2$. In addition, the third lens $L_3$ having the focal distance $f_3$ forms the conjugate image CI of the Fourier transform image subjected to the filtering by the spatial filter SF.

Herein, as the rear-side focal surface of the third lens $L_3$ is the conjugate surface of the spatial filter SF, it is equivalent that the two-dimensional image generated by the two-dimensional image formation apparatus 30 is output from a part comparable to one opening sections 51 on the spatial filter SF. Then, the number of light rays eventually generated and output is the number of pixels ($P \times Q$), and the light ray is a light ray passing the spatial filter SF. That is, no light amount of the light ray passing the spatial filter SF is reduced substantially as passing or reflected by the subsequent components of the three-dimensional image display apparatus. In addition, the conjugate image CI of the Fourier transform image is formed on the rear-side focal surface of the third lens $L_3$, but the directional component of the conjugate image of the two-dimensional image are regulated by the directional component of the illumination light emitted from the light source 10E and entering the two-dimensional image formation apparatus 30. Thus, on the rear-side focal surface of the third lens $L_3$, it can be regarded that the light ray groups are arranged in a two-dimensional manner orderly. That is, as a whole, it is equivalent to a state in which the projector units 301 shown in FIG. 52 by the plural numbers (specifically, $U_0 \times V_0$ pieces) are arranged on the rear-side focal surface of the third lens $L_3$ (the surface on which the conjugate image CI is formed).

As schematically shown in FIGS. 32A and 32B, with one pixel 31 in the two-dimensional image formation apparatus 30, along the X direction and the Y direction, total M×N sets of diffraction lights are generated. It should be noted that in FIGS. 32A and 32B, only diffraction lights of the zero-order light ($n_0=0$), the plus/minus first-order lights ($n_0=\pm 1$), and the plus/minus second-order lights ($n_0=\pm 2$) are represented in the drawing. In actuality, diffraction lights of a still higher-order (for example, plus/minus fifth-order) are generated, and on the basis of a part of these diffraction lights (specifically, for example, the zero-order light), the three-dimensional image is eventually formed. It should be noted that FIG. 32A schematically shows a diffraction light formed by a light ray emitted from the light emitting element $11_B$, and FIG. 32B schematically shows a diffraction light formed by a light ray emitted from the light emitting element $11_A$. Herein, in the diffraction lights (light fluxes) of the respective diffraction orders, all image information of the two-dimensional image generated by the two-dimensional image formation apparatus 30 (information on all the pixels) is summarized. a plurality of light ray groups generated by the diffraction from the same pixel on the two-dimensional image formation apparatus 30 all have the same image information at the same time. In other words, in the two-dimensional image formation apparatus 30 composed of the transmissive liquid crystal display apparatus including P×Q pixels 31, the illumination light from the light source 10E is modulated by the respective pixels 31 to generate the two-dimensional image, and also the spatial frequency in the generated two-dimensional image is emitted along diffraction angles corresponding to a plurality of diffraction orders (total M×N) generated from the respective pixels 31. That is, M×N sorts of copies of the two-dimensional image are emitted along diffraction angles corresponding to a plurality of diffraction orders (total M×N) from the two-dimensional image formation apparatus 30.

Then, the spatial frequency in the two-dimensional image in which all image information on the two-dimensional image generated by the two-dimensional image formation apparatus 30 is summarized is subjected to Fourier transform by the first lens $L_1$, and the number of the Fourier transform images corresponding to the diffraction orders generated from the respective pixels 31 are generated. Then, only a predetermined Fourier transform image among these Fourier transform images (for example, the Fourier transform image corresponding to the zero-diffraction) is allowed to pass the spatial filter SF. Furthermore, this selected Fourier transform image is subjected to inverse Fourier transform by the second lens $L_2$, a conjugate image of the two-dimensional image generated by the two-dimensional image formation apparatus 30 is formed, and this conjugate image of the two-dimensional image enters the third lens $L_3$ so that the third lens $L_3$ forms the conjugate image CI. It should be noted that the spatial frequency in the two-dimensional image is comparable to the image information in which the spatial frequency of the pixel structure is set as a carrier frequency, but only the region of the image information in which the zero-order plane wave is set as the carrier wave (that is, up to maximum ½ of the spatial frequency of the spatial frequency in the pixel structure) is, in other words, obtained as the first-order diffraction in which the zero-order diffraction of the plane wave component is set as the carrier frequency the spatial frequency equal to or less than the half of the spatial frequency of the pixel structure (opening structure) for the light modulation means passes the spatial filter SF. In this manner, in the conjugate image of the two-dimensional image formed by the third lens $L_3$, the pixel structure of the two-dimensional image formation apparatus 30 is not included, and on the other hand, all the spatial frequencies in the two-dimensional image generated by the two-dimensional image formation apparatus 30 are included. Then, in the third lens $L_3$, the Fourier transform image of the spatial frequency in the conjugate image of the two-dimensional image is generated, and it is thus possible to obtain the Fourier transform images at a spatially high density.

As described above, the three-dimensional image display apparatus 1E according to Embodiment 10 has the following configuration that the predetermined light emitting elements 11 is allowed to emit the light, and the desired opening section 51 is opened in the Fourier transform image selection means 50 (the spatial filter SF), the spatial frequency in the two-dimensional image generated by the light modulation means (the two-dimensional image formation apparatus) 30 is emitted along diffraction angles corresponding to a plurality of diffraction orders, the Fourier transform image obtained through the Fourier transform by the Fourier transform image formation means 40 (the first lens $L_1$) is subjected to the filtering spatially and also temporally by the Fourier transform image selection means 50 (the spatial filter SF), and the conjugate image CI of the Fourier transform image subjected to the filtering is formed. Thus, without increasing the size of the three-dimensional image display apparatus as a whole, at a high density in terms of space and further in a state of being distributed in a plurality of directions, the light ray group can be generated and scattered. In addition, it is possible to independently control the respective light rays which are the components of the light ray group in terms of time and space. With this configuration, it is possible to obtain the three-dimensional image based on the light rays having a quality similar to that of the object in the real world.

Also, in the three-dimensional image display apparatus 1E according to Embodiment 10, as the light ray reconstruction method is utilized, it is possible to provide the three-dimensional image which satisfies the visual functions such as the focal adjustment, the convergence, and the kinematic parallax. Furthermore, in the three-dimensional image display apparatus 1E according to Embodiment 10, as the illumination lights different in incident directions to the two-dimensional image formation apparatus 30 are efficiently utilized depending on the plurality of discretely arranged light emitting positions, as compared to an image output method in a related art, it is possible to obtain the light rays which can be controlled by one image output device (the two-dimensional image formation apparatus 30) by the number of discretely arranged light emitting positions (that is, $U_0 \times V_0$ pieces). Furthermore, in the three-dimensional image display apparatus 1E according to Embodiment 10, as the filtering is carried out spatially and also temporally, the temporal characteristic of the three-dimensional image display apparatus can be converted into the spatial characteristic of the three-dimensional image display apparatus. In addition, without using the diffusing screen or the like, it is possible to obtain the three-dimensional image. Furthermore, it is possible to provide the three-dimensional image which is appropriate to the observations from any directions. In addition, as the light ray group can be generated and scattered at the spatially high density, it is possible to provide the fine spatial image which is close to the visual limit.

Embodiment 11

Figure 35:
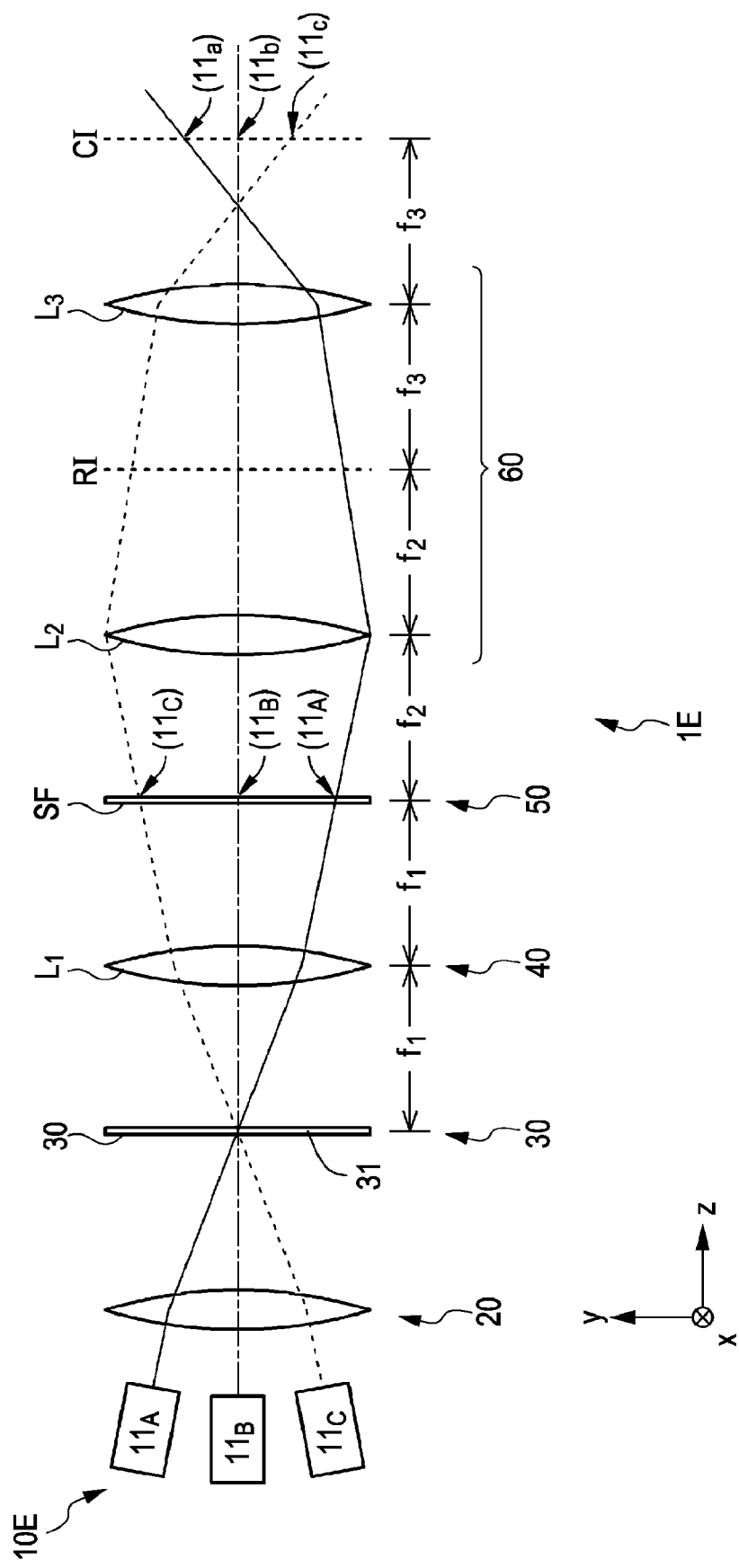
FIG. 35 is a conceptual diagram of a three-dimensional image display apparatus in a yz plane according to Embodiment 11.
Figure 36:
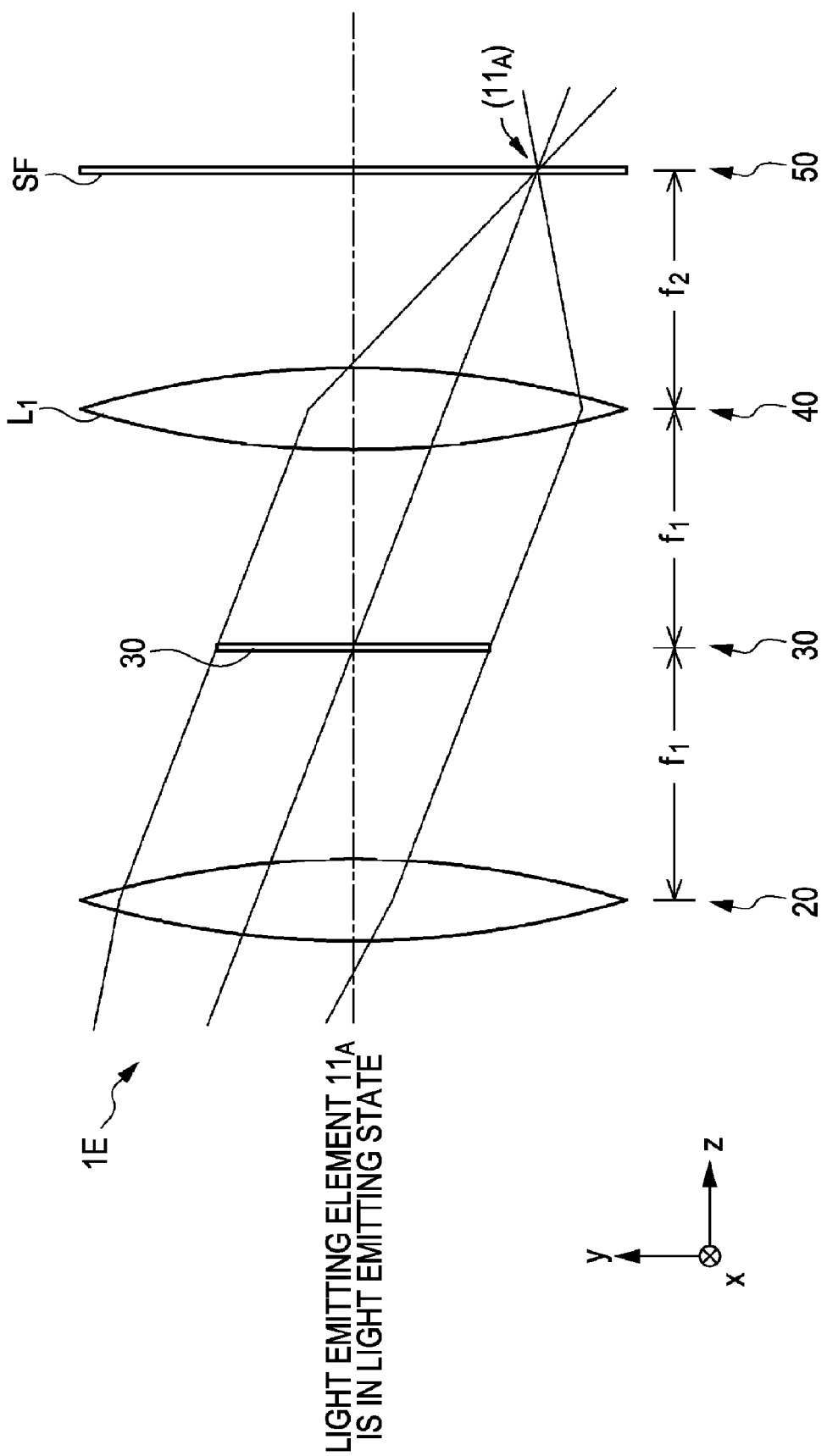
FIG. 36 is a conceptual diagram expanding a part of the three-dimensional image display apparatus according to Embodiment 11 (where a certain light emitting element is in a light emitting state)
Figure 37:
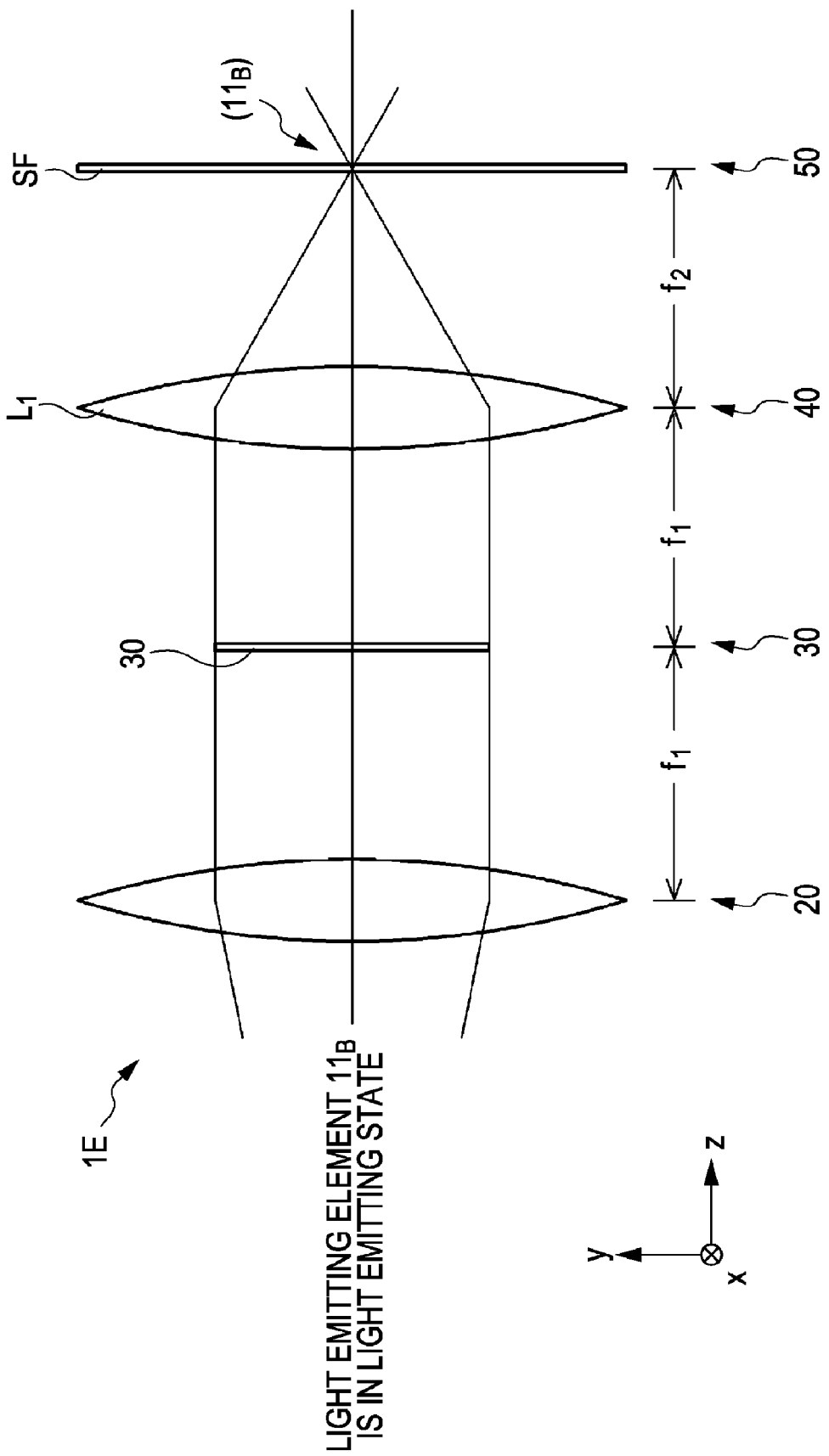
FIG. 37 is a conceptual diagram expanding a part of the three-dimensional image display apparatus according to Embodiment 11 (where another light emitting element is in a light emitting state)
Figure 38:
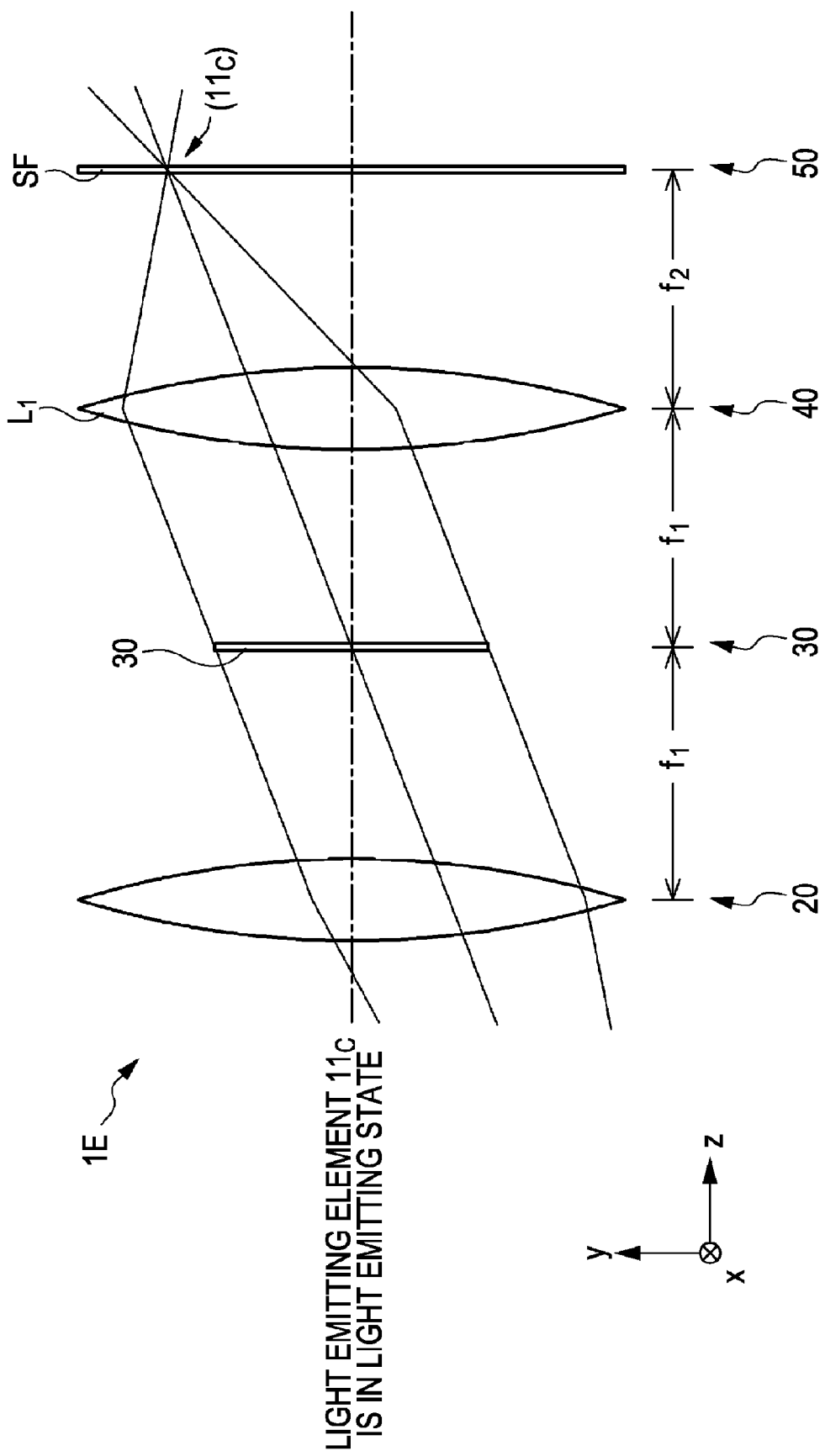
FIG. 38 is a conceptual diagram expanding a part of the three-dimensional image display apparatus according to Embodiment 11 (where still another light emitting element is in a light emitting state)

Embodiment 11 is a modification of Embodiment 10. According to Embodiment 11, the light source 10E is provided with a plurality of light emitting elements 11 disposed in a two-dimensional matrix manner, and the respective light emitting elements 11 are arranged so that the emitting directions of the lights emitted from the respective light emitting elements 11 are varied. With this configuration, on the basis of the illumination lights sequentially emitted from the light emitting positions of different light sources which are different in incident directions, the light modulation means or the two-dimensional image formation apparatus can be illuminated. In the three-dimensional image display apparatus according to Embodiment 11, a conceptual diagram of the three-dimensional image display apparatus when the light source having such a configuration is adopted is shown in FIG. 35. It should be noted that in FIG. 35, one light flux emitted from the light emitting element $11_A$ constituting the light source 10E is indicated by a solid line, one light flux emitted from the light emitting element $11_B$ is indicated by a dashed-dotted line, and one light flux emitted from the light emitting element $11_C$ is indicated by a dotted line. In addition, positions of the images on the spatial filter SF formed by the illumination lights emitted from the light emitting elements $11_A$, $11_B$, and $11_C$ are respectively denoted by symbols $(11_A)$, $(11_B)$, and $(11_C)$, and positions of the images formed by the illumination lights emitted from the light emitting elements $11_A$, $11_B$, and $11_C$ on the rear-side focal surface of the third lens $L_3$ are respectively denoted by symbols $(11_a)$, $(11_b)$, and $(11_c)$. In addition, FIGS. 36, 37, and 38 are conceptual diagrams in which the vicinity of the light modulation means (the two-dimensional image formation apparatus) 30, the Fourier transform image formation means 40 (the first lens $L_1$), and the Fourier transform image selection means 50 (the spatial filter SF) are expanded, and schematically show light fluxes emitted from the light emitting elements $11_A$, $11_B$, and $11_C$ constituting the light source 10E pass the two-dimensional image formation apparatus 30, the first lens $L_1$, and the spatial filter SF. It should be noted that the respective position numbers of the light emitting elements $11_A$, $11_B$, and $11_C$ constituting the light source 10E are, for example, the (5, 0)-th section, the (0, 0)-th section, and the (−5, 0)-th section. Herein, when a certain light emitting element is in a light emitting state, all the other light emitting elements are in a turn off state. It should be noted that in FIG. 35, reference numeral 20 denotes an illumination optical system composed of a lens for shaping the illumination light.

According to Embodiment 10 or Embodiment 11, it is also possible to adopt a configuration in which the light source includes a light emitting element and light ray travelling direction change means configured to change a travelling direction of light emitted from the light emitting element. To be specific, for example, the inclination angle of the rotation axis is controlled while the polygon mirror is rotated about the rotational axis. Alternatively, the light ray travelling direction change means may be composed of a convex mirror composed of a curved surface, a concave mirror composed of a curved surface, a convex mirror composed of a polyhedron, or a concave mirror composed of a polyhedron), and the light emitting position of the illumination light when being emitted from the mirror may be changed (varied) by controlling the mirror position or the like.

According to Embodiment 10 or 11, also, instead of the spatial filter SF (the Fourier transform image selection means 50), it is possible to adopt a configuration in which a scattering diffraction restricting member provided with a number of opening sections corresponding to the number of light emitting positions and located at the rear-side focal surface of the first lens $L_1$. This scattering diffraction restricting member can be manufactured, for example, by providing an opening section (for example, a pin hole) on a plate-like member which blocks light. Herein, a position of the opening section may be set at a position where a desired Fourier transform image (or diffraction light) (for example, having the zero-order diffraction order) among the Fourier transform images (or the diffraction lights) obtained by the Fourier transform image selection means or the first lens is formed. The position of the opening section may correspond to the discretely arranged light emitting positions.

Embodiment 12

Figure 39:
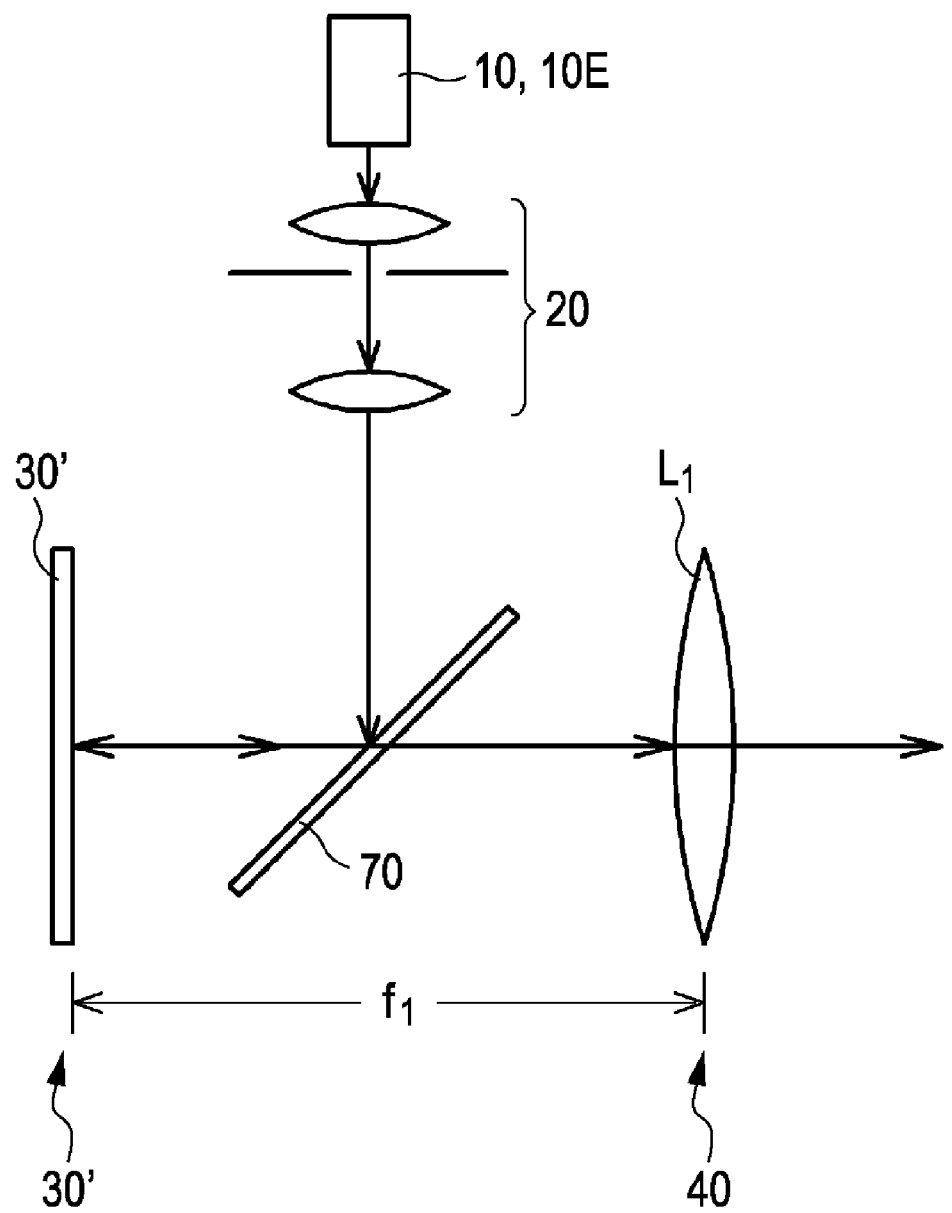
FIG. 39 is a conceptual diagram of a three-dimensional image display apparatus in a yz plane according to Embodiment 12.

Embodiment 12 is a modification of the above-mentioned various embodiments. A conceptual diagram of the three-dimensional image display apparatus according to Embodiment 12 is shown in FIG. 39. In the three-dimensional image display apparatus according to Embodiments 1 to 11, the light-transmissive two-dimensional image formation apparatus 30 is used. On the other hand, in the three-dimensional image display apparatus according to Embodiment 12, a reflective light modulation means (two-dimensional image formation apparatus) 30' is used. As the reflective light modulation means (the two-dimensional image formation apparatus) 30', for example, a reflective liquid crystal display apparatus can be exemplified.

In the three-dimensional image display apparatus according to Embodiment 12, a beam splitter 70 is provided on a z axis (optical axis). The beam splitter 70 has a function of transmitting or reflecting the light depending on a difference in polarization components. The beam splitter 70 reflects the light (illumination light) emitted from the light source 10, 10E towards the reflective light modulation means (the two-dimensional image formation apparatus) 30'. In addition, the reflection light from the light modulation means (the two-dimensional image formation apparatus) 30' is transmitted. Except for this point, the configuration and the construction of the three-dimensional image display apparatus according to Embodiment 12 can be set similar to the configuration and the construction of the three-dimensional image display apparatus according to Embodiments 1 to 11, and a detailed description will be omitted.

It should be noted that as the reflective light modulation means (the two-dimensional image formation apparatus), depending on a mode of the embodiments, a configuration in which a movable mirror is alternatively provided in the respective opening sections (a configuration composed of a two-dimensional type MEMS in which the movable mirrors are disposed in a two-dimensional matrix manner) can also be adopted. In this case, the two-dimensional image is generated by movement/stand-still of the movable mirror. Further, Fraunhofer diffraction is generated by the opening. It should be noted that in a case where the two-dimensional type MEMS is adopted, a beam splitter is not used, and the illumination light may enter from an oblique direction with respect to the two-dimensional type MEMS.

Hereinafter, the timing of the opening/closing control on the opening sections 51 in the spatial filter SF according to Embodiments 1 to 7, 10 and 11 will be described.

In the spatial filter SF, in order to select a Fourier transform image corresponding to a desired diffraction order, in synchronization with the image output of the two-dimensional image formation apparatus 30, the opening/closing control of the opening section 51 is performed. This operation will be described with reference to FIGS. 40 to 42. It should be noted that the uppermost stage of FIG. 40 shows a timing of an image output in the two-dimensional image formation apparatus 30, a middle stage of FIG. 40 shows opening/closing timings of the (3, 2)-th opening section 51 on the spatial filter SF, and the lower stage of FIG. 40 shows opening/closing timings of the (3, 3)-th opening section 51.

Figure 40:
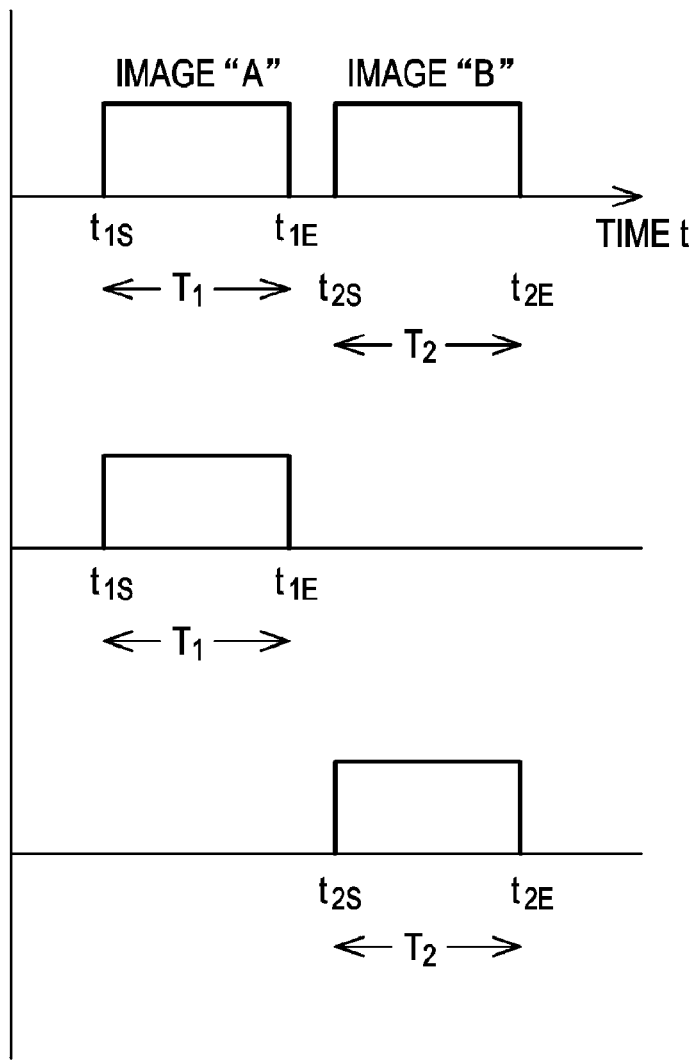
FIG. 40 shows a timing of forming a two-dimensional image in the light modulation means (the two-dimensional image formation apparatus) and an opening/closing timing of an opening section of the Fourier transform image selection means (the spatial filter), in which an upper stage shows the timing of forming the two-dimensional image in the light modulation means (the two-dimensional image formation apparatus), and a middle stage and a lower stage show the opening/closing timing of the opening section of the Fourier transform image selection means (the spatial filter).

As shown in FIG. 40, in the two-dimensional image formation apparatus 30, for example, in a period between times $T_{1S}$ to $T_{1E}$ (time period $TM_1$), an image "A" is displayed, and between times $T_{2S}$ to $T_{2E}$ (time period $TM_2$), an image "B" is displayed. At this time, according to Embodiments 1 to 7, on the spatial filter SF, as shown in FIG. 40, in the time period $TM_1$, the (3, 2)-th opening section 51 is set in the opened state, and in the time period $TM_2$, the (3, 3)-th opening section 51 is set in the opened state. In this manner, it is possible to add different image information to the Fourier transform image generated as a different diffraction order in the same pixel 31 in the two-dimensional image formation apparatus 30 (alternatively, the same opening region 34 on the oversampling filter OSF, or alternatively, the same optical element 36 constituting the optical apparatus 35) and generated by the first lens $L_1$ or the third lens $L_3$. In other words, in the time period $TM_1$, the Fourier transform image having the diffraction order of $m_0=3$, $n_0=2$ obtained in a certain pixel 31 in the two-dimensional image formation apparatus 30 (alternatively, a certain opening region 34 on the oversampling filter OSF, or alternatively, the optical element 36 constituting the optical apparatus 35) includes image information related to the image "A". On the other hand, in the time period $TM_2$, the Fourier transform image having the diffraction order of $m_0=3$, $n_0=3$ obtained in the same certain pixel 31 in the two-dimensional image formation apparatus 30 (alternatively, the same certain opening region 34 on the oversampling filter OSF, or alternatively, the same certain optical element 36 constituting the optical apparatus 35) includes image information related to the image "B".

Also, according to Embodiment 10, as shown in FIG. 40, in the two-dimensional image formation apparatus 30, for example, the image "A" is displayed during the times $T_{1S}$ to $T_{1E}$ (the time period $TM_1$), and the image "B" is displayed during the times $T_{2S}$ to $T_{2E}$ (the time period $TM_2$). At this time, in the light source 10E, in the time period $TM_1$, only the (3, 2)-th light emitting element is set in the light emitting state, and in the time period $TM_2$, only the (3, 3)-th light emitting element is set in the light emitting state. In this manner, the illumination lights which are sequentially emitted from the plurality of discretely arranged light emitting positions and are different in the incident directions to the two-dimensional image formation apparatus 30 are used, and further, the illumination light is modulated by the respective pixels 31. On the other hand, in the spatial filter SF, as shown in FIG. 40, in the time period $TM_1$, the (3, 2)-th opening section 51 is set in the opened state, and in the time period $TM_2$, the (3, 3)-th opening section 51 is set in the opened state. In this manner, it is possible to add different image information to the Fourier transform image generated as a different diffraction order in the same pixel 31 in the two-dimensional image formation apparatus 30 and generated by the first lens $L_1$. In other words, in the time period $TM_1$, as the (3, 2)-th light emitting element is set in the light emitting state, the Fourier transform image having the zero-order diffraction order obtained in a certain pixel 31 in the two-dimensional image formation apparatus 30 includes the image information related to the image "A" and the incident direction information to the two-dimensional image formation apparatus 30 of the illumination light. On the other hand, in the time period $TM_2$, as the (3, 3)-th light emitting element is set in the light emitting state, the Fourier transform image having the zero-order diffraction order obtained in the same certain pixel in the two-dimensional image formation apparatus 30 includes the image information related to the image "B" and the incident direction information to the two-dimensional image formation apparatus 30 of the illumination light.

Figure 41:
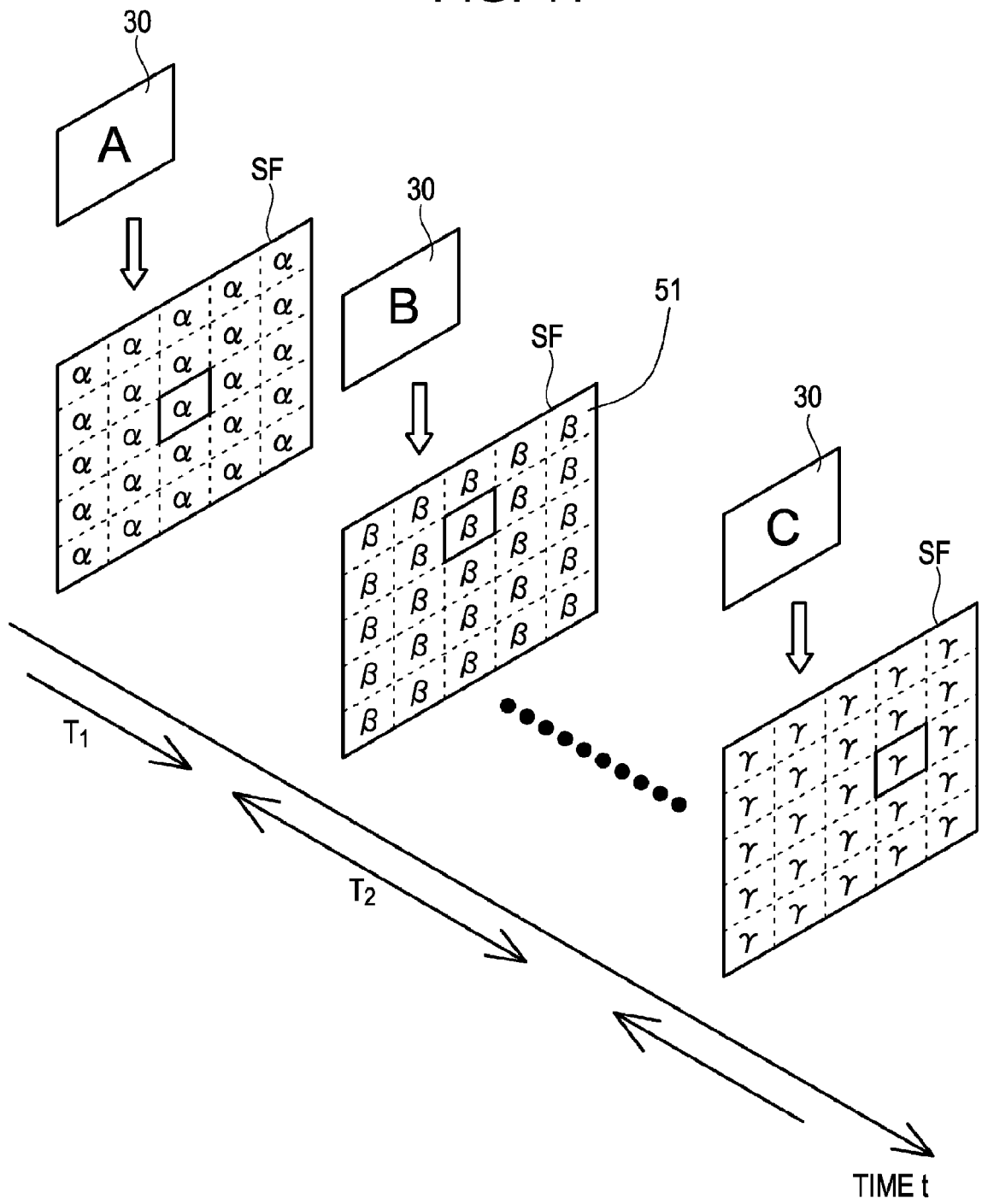
FIG. 41 schematically shows a concept of a spatial filtering by the Fourier transform image selection means (the spatial filter) in a time series manner.

FIG. 41 schematically shows a timing for the image formation in the two-dimensional image formation apparatus 30 and a control timing for the opening sections 51. In the time period $TM_1$, in the two-dimensional image formation apparatus 30, the image "A" is displayed, and M×N Fourier transform images converge on the (3, 2)-th opening section 51 corresponding to the spatial filter SF as a Fourier transform image "α". In the time period $TM_1$, only the (3, 2)-th opening section 51 is opened, and only the Fourier transform image "α" having the diffraction order of $m_0$=3, $n_0$=2 (according to Embodiment 10, only the Fourier transform image "α" having the zero-order diffraction order) passes the spatial filter SF. In the next time period $TM_2$, in the two-dimensional image formation apparatus 30, the image "B" is displayed, and similarly, M×N Fourier transform images converge on the (3, 3)-th opening section 51 corresponding to the spatial filter SF as the Fourier transform image "β". In the time period $TM_2$, only the (3, 3)-th opening section 51 is opened, only the Fourier transform image "β" having the diffraction order of $m_0$=3, $n_0$=3 (according to Embodiment 10, only the Fourier transform image "β" having the zero-order diffraction order) passes the spatial filter SF. Hereinafter, sequentially, in synchronization with the image formation timing of the two-dimensional image formation apparatus 30, the opening/closing control of the opening section 51 in the spatial filter SF is performed. It should be noted that in FIG. 41, the opening sections 51 in an opening state is surrounded by a solid line, and the opening sections 51 in a closed line is surrounded by a dotted line. Herein, according to Embodiment 10, when a space occupied by the spatial filter SF is seen in terms of a certain time length, it may be observed that $U_0 \times V_0$ bright points (Fourier transform images) are arranged in a two-dimensional matrix manner (a state similar to that shown in FIG. 4).

Figure 42:
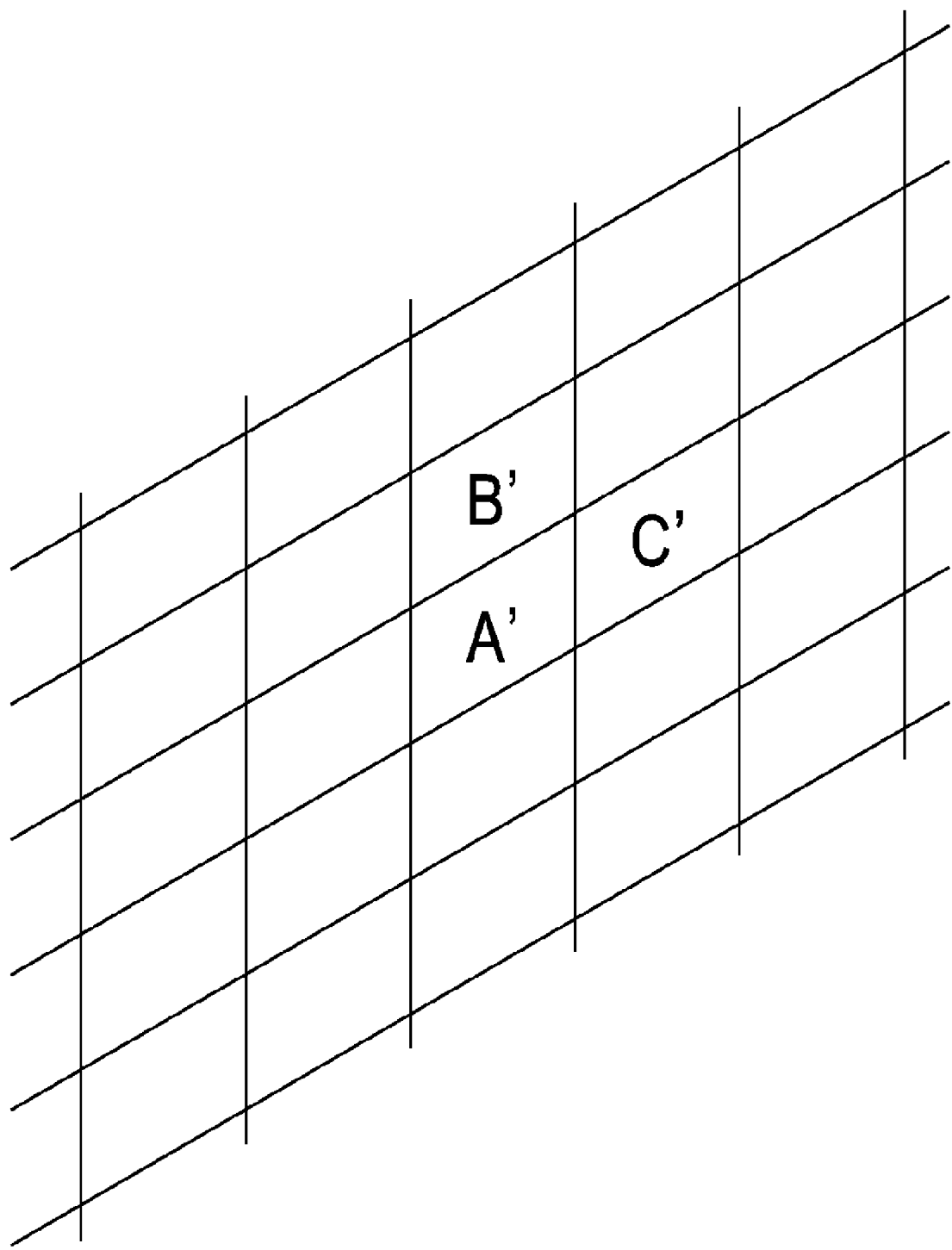
FIG. 42 schematically shows an image obtained as a result of the spatial filtering shown in FIG. 41.
Figure 43:
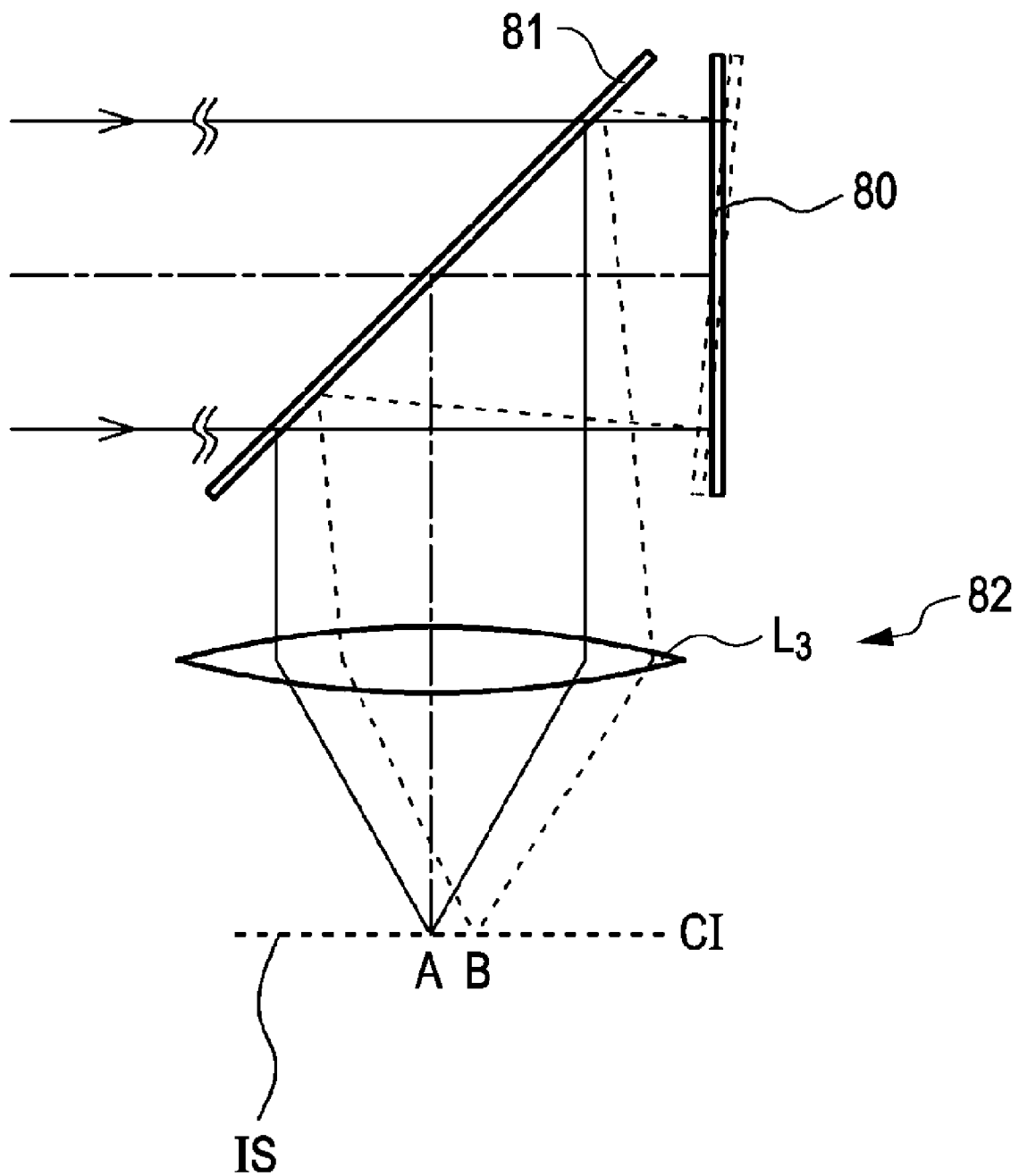
FIG. 43 schematically shows at which position an image is formed on an imaging surface by carrying out a position control of light ray travelling direction change means.

In a case where the image formation in the two-dimensional image formation apparatus 30 and the opening/closing control on the opening sections 51 are carried out at such a timing, an image obtained as a final output of the three-dimensional image display apparatus is schematically shown in FIG. 42. In FIG. 42, as only the (3, 2)-th opening section 51 is opened, an image "A'" is an image obtained as a result that only the Fourier transform image "α" having the diffraction order of $m_0$=3, $n_0$=2 (according to Embodiment 10, the (3, 2)-th light emitting element only the Fourier transform image "α" having the zero-order diffraction order when is in the light emitting state) passes the spatial filter SF. In addition, as only the (3, 3)-th opening section 51 is opened, an image "B'" is an image obtained as a result that only the Fourier transform image "β" having the diffraction order of $m_0$=3, $n_0$=3 (according to Embodiment 10, only the Fourier transform image "β" having the zero-order diffraction order when only the (3, 3)-th light emitting element is in the light emitting state) passes the spatial filter SF. Furthermore, as only the (4, 2)-th opening section 51 is opened, an image "C'" is an image obtained as a result that only the Fourier transform image "γ" having the diffraction order of $m_0$=4, $n_0$=2 (according to Embodiment 10, only the Fourier transform image "γ" having the zero-order diffraction order when only the (4, 2)-th light emitting element is in the light emitting state) passes the spatial filter SF. It should be noted that images shown in FIG. 42 are images observed by the observer. In FIG. 42, for the sake of convenience, the images are segmented by the solid line, but this solid line is a virtual solid line. In addition, to be precise, the images shown in FIG. 42 are not obtained at the same time, but a switching period for the images is extremely short, and for the eyes of the observer, the images are observed as if the images are simultaneously displayed. For example, in a display period of one frame, the image formation by all the orders (M×N) in the two-dimensional image formation apparatus 30 (or the oversampling filter OSF) and the selection of one image in the spatial filter SF are performed. According to Embodiment 10, in a display period of one frame, the selection of ($U_0 \times V_0$) images is performed on the basis of all the discretely arranged light emitting positions. In addition, although the images are presented in a planar manner in FIG. 42, the observer actually observes the three-dimensional image.

That is, according to Embodiments 1 to 7, 10, and 11, as described above, from the rear-side focal surface of the third lens $L_3$ or the fifth lens $L_5$, the two-dimensional images generated by the two-dimensional image formation apparatus 30, or alternatively, the conjugate image of the two-dimensional image generated by the second lens $L_2$ (for example, the image "A'", the image "B'" ... the image "C'" in a time series manner) are output. That is, as a whole, on the rear-side focal surface of the third lens $L_3$ or the fifth lens $L_5$, the projector units 301 shown in FIG. 52 are arranged by the number of the plurality of diffraction orders (specifically, M×N pieces), or alternatively, the number of plural discretely arranged light emitting positions (specifically, $U_0 \times V_0$ pieces) are arranged, and it is equivalent that in a time series manner, the image "A'" is output from a certain projector unit 301, the image "B'" is output from another projector unit 301, and the image "C'" is output from still another projector unit 301. Then, for example, on the basis of data on a large number of images (or images created by a computer) obtained by picking up image of a certain object from various positions (angles), when the images are reproduced in a time series manner in the two-dimensional image formation apparatus 30, it is possible to obtain the three-dimensional image based on these images.

Next, a timing and the like for the position control of the light ray travelling direction change means 80 according to Embodiment 8 or 9 will be described.

In order to form an image having a directional component on the third lens $L_3$, in synchronization with the image output of the two-dimensional image formation apparatus 30, the position control of the light ray travelling direction change means 80 is performed. This operation will be described with reference to FIGS. 40, 41, 42, and 43. It should be noted that the uppermost stage of FIG. 40 shows a timing of an image output in the two-dimensional image formation apparatus 30, a middle stage of FIG. 40 shows a timing of a position control for the (3, 2)-imaging in the light ray travelling direction change means 80, and a lower stage of FIG. 40 shows a timing of a position control for the (3, 3) imaging.

As shown in FIG. 40, in the two-dimensional image formation apparatus 30, for example, the image "A" is displayed between the times $T_{1S}$ to $T_{1E}$ (the time period $TM_1$), and the image "B" is displayed between the times $T_{2S}$ to $T_{2E}$ (the time period $TM_2$). At this time, in the light ray travelling direction change means 80, as shown in FIG. 40, in the time period $TM_1$, the position control is performed so as to obtain the (3, 2)-th imaging, and in the time period $TM_2$, the position control is performed so as to obtain the (3, 3)-th imaging. It should be noted that in FIG. 43, the light ray travelling direction change means 80 in the state of the position control capable of obtaining the (3, 2)-th imaging is indicated by a dotted line, an image obtained on the imaging surface IS is conceptually represented by "A". The light ray travelling direction change means 80 in the state of the position control capable of obtaining the (3, 3)-th imaging is indicated by a solid line, and an image obtained on the imaging surface IS is conceptually represented by "B". In this manner, it is possible to add different image information (directional component) to the Fourier transform image generated by the first lens $L_1$. In other words, in the time period $TM_1$, the Fourier transform image includes the image information related to the image "A". On the other hand, in the time period $TM_2$, the Fourier transform image includes the image information related to the image "B".

FIG. 41 schematically shows a timing for the image formation in the two-dimensional image formation apparatus 30 and a timing for the position control of the light ray travelling direction change means 80. In the time period $TM_1$, the image "A" is displayed in the two-dimensional image formation apparatus 30 and is collected by the light ray travelling direction change means 80 as the Fourier transform image "α". Then, in the time period $TM_1$, the (3, 2)-th imaging is obtained. In the next time period $TM_2$, the image "B" is displayed in the two-dimensional image formation apparatus 30, and similarly collected by the light ray travelling direction change means 80 as the Fourier transform image "β". Then, in the time period $TM_2$, the (3, 3)-th imaging is obtained. Hereinafter, sequentially, in synchronization with the image formation timing of the two-dimensional image formation apparatus 30, the position control of the light ray travelling direction change means 80 is performed. It should be noted that in FIG. 41, the imaging position on the imaging surface IS is surrounded by a solid line, and the imaging position at other timing for the position control of the light ray travelling direction change means 80 is surrounded by a dotted line.

It should be noted that the change in the travelling direction of the light ray by the light ray travelling direction change means 80 should be in synchronization with the generation of the two-dimensional image based on the two-dimensional image formation apparatus 30. However, after a certain image is formed by the light ray travelling direction change means 80 on the imaging surface IS (for example, "α"), the position of the light ray travelling direction change means 80 is changed (varied). Until a next image (for example, "β") is formed on the imaging surface IS by the light ray travelling direction change means 80, an operation of the light source 10 is interrupted, and the two-dimensional image is not generated by the two-dimensional image formation apparatus 30.

In a case where the image formation in the two-dimensional image formation apparatus 30 and the position control of the light ray travelling direction change means 80 are carried out at such a timing, an image obtained as a final output of the three-dimensional image display apparatus is schematically shown in FIG. 42. In FIG. 42, the image "A'" is an image obtained as the result of the (3, 2)-th imaging, the image "B'" is an image obtained as the result of the (3, 3)-th imaging, and the image "C'" is an image obtained as the result of the (4, 2)-th imaging. For example, in a display period of one frame, the generation of the two-dimensional images by $(S_0 \times T_0)$ times and the position control of the light ray travelling direction change means 80 are performed.

That is, according to Embodiment 8 or Embodiment 9, as described above, the conjugate image of the two-dimensional images (for example, in a time series manner, the image "A'", the image "B'" . . . the image "C'") generated by the second lens $L_2$ are output from the rear-side focal surface of the third lens $L_3$ (the imaging surface IS). That is, as a whole, a plurality (specifically, $S_0 \times T_0$ pieces) of the projector units 301 shown in FIG. 52 are arranged on the rear-side focal surface of the third lens $L_3$, and it is equivalent that in a time series manner, the image "A'" is output from a certain projector unit 301, the image "B'" is output from another projector unit 301, and the image "C'" is output from still another projector unit 301. Then, for example, on the basis of data on a large number of images (or images created by a computer) obtained by picking up image of a certain object from various positions (angles), when the images are reproduced in a time series manner in the two-dimensional image formation apparatus 30, it is possible to obtain the three-dimensional image based on these images.

Next, the configuration and the construction of the diffraction grating-light modulation element 210 will be described.

Figure 44:
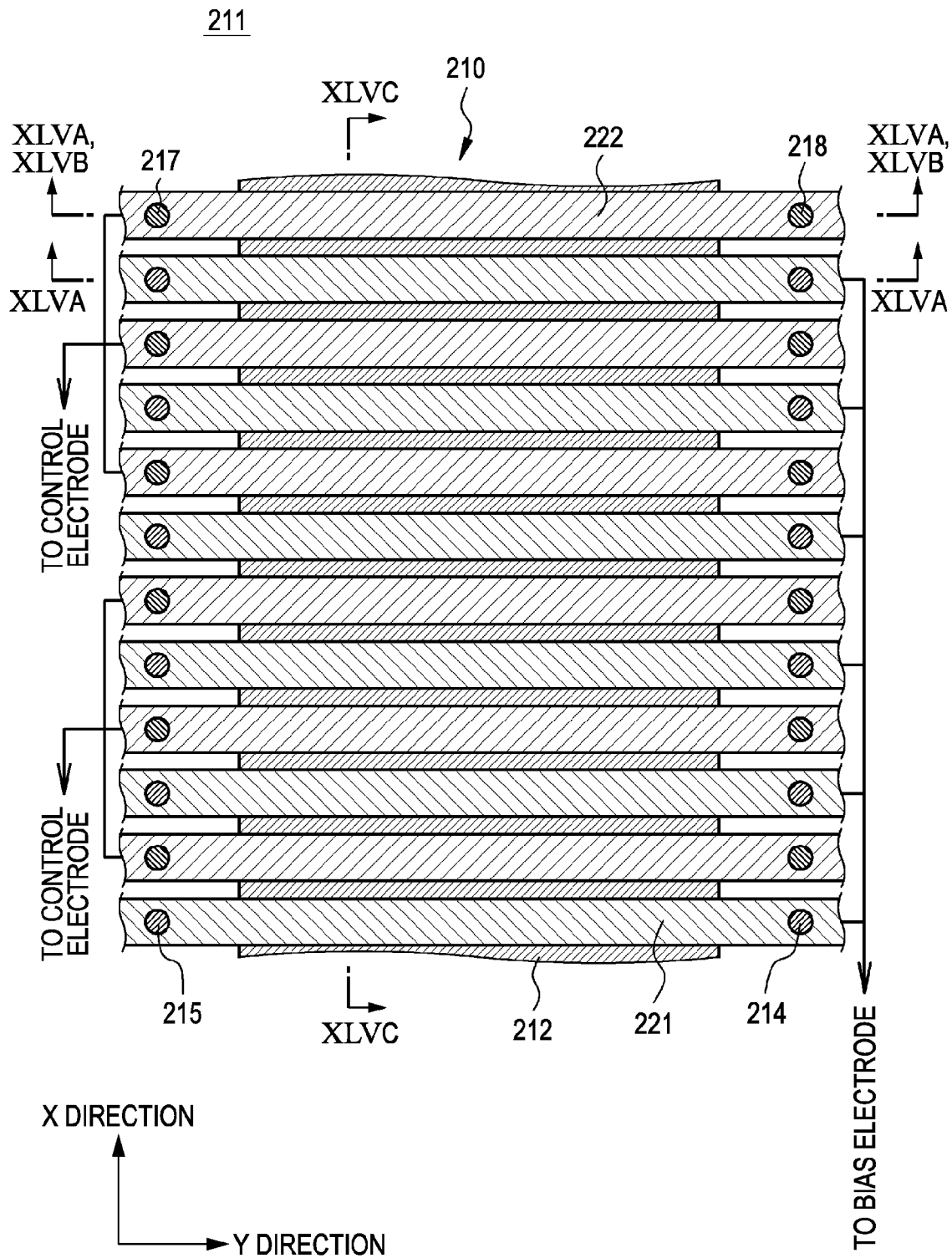
FIG. 44 schematically shows an arrangement of a lower electrode, a fixed electrode, and a movable electrode constituting a diffraction grating-light modulation element.

The arrangement of a lower electrode 212, a fixed electrode 221, a movable electrode 222, and the like which constitute the diffraction grating-light modulation element 210 is schematically shown in FIG. 44. It should be noted that in FIG. 44, oblique lines are applied on the lower electrode 212, the fixed electrode 221, the movable electrode 222, and supporting members 214, 215, 217, and 218 for clear indication.

The diffraction grating-light modulation element 210 is composed of the lower electrode 212, the band-like (ribbon-like) fixed electrode 221, and the band-like (ribbon-like) movable electrode 222. The lower electrode 212 is formed on a base 211. In addition, the fixed electrode 221 is supported to the supporting members 214 and 215 and supported and expended to an upper part of the lower electrode 212. Furthermore, the movable electrode 222 is supported to the supporting members 217 and 218, supported and expended to the upper part of the lower electrode 212, and arranged in parallel to the fixed electrode 221. In the represented example, one diffraction grating-light modulation element 210 is composed of the three of the fixed electrodes 221 and the three of the movable electrodes 222. The three of the movable electrodes 222 are collectively connected to a control electrode, and the control electrode is connected to a connection terminal unit not shown in the drawing. On the other hand, the three of the fixed electrodes 221 are collectively connected to a bias electrode. The bias electrode is set common in a plurality of diffraction grating-light modulation elements 210 and is grounded via a bias electrode terminal unit not shown in the drawing. The lower electrode 212 is also set common in the plurality of diffraction grating-light modulation elements 210 and is grounded via a lower electrode terminal unit not shown in the drawing.

Figure 45A:
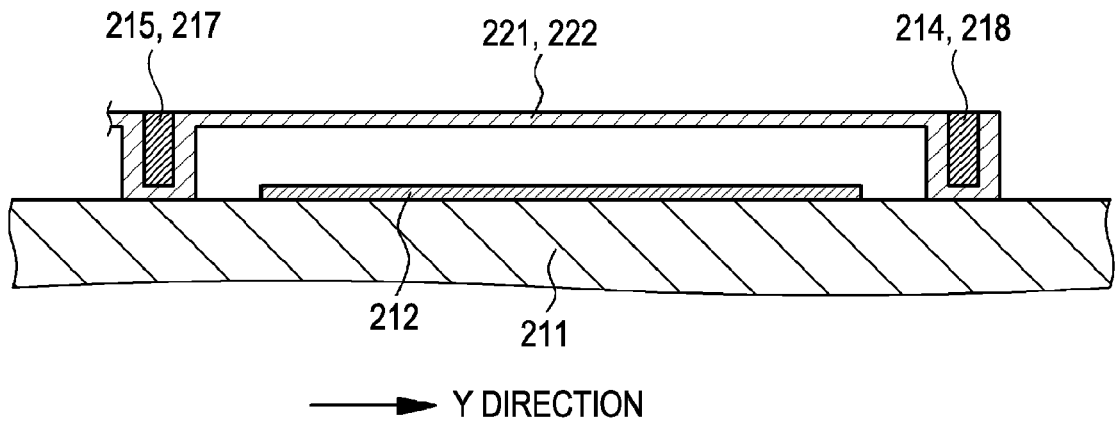
FIG. 45A is a schematic cross sectional of the fixed electrode and the like along an arrow B-B of FIG. 44, and a schematic cross sectional of the movable electrode and the like along an arrow A-A of FIG. 44 (in a state where the diffraction grating-light modulation element is not operated)
Figure 45B:
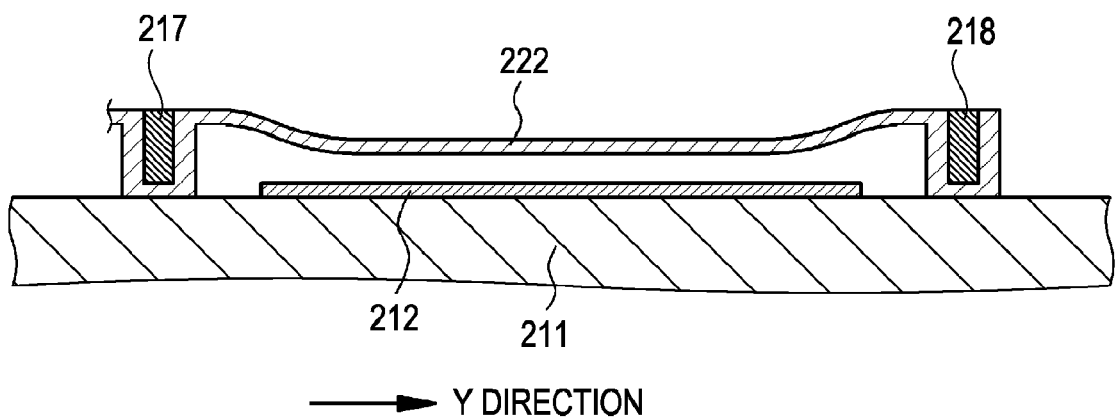
FIG. 45B is a schematic cross sectional of the movable electrode and the like along the arrow A-A of FIG. 44 (in a state where the diffraction grating-light modulation element is operated)
Figure 45C:
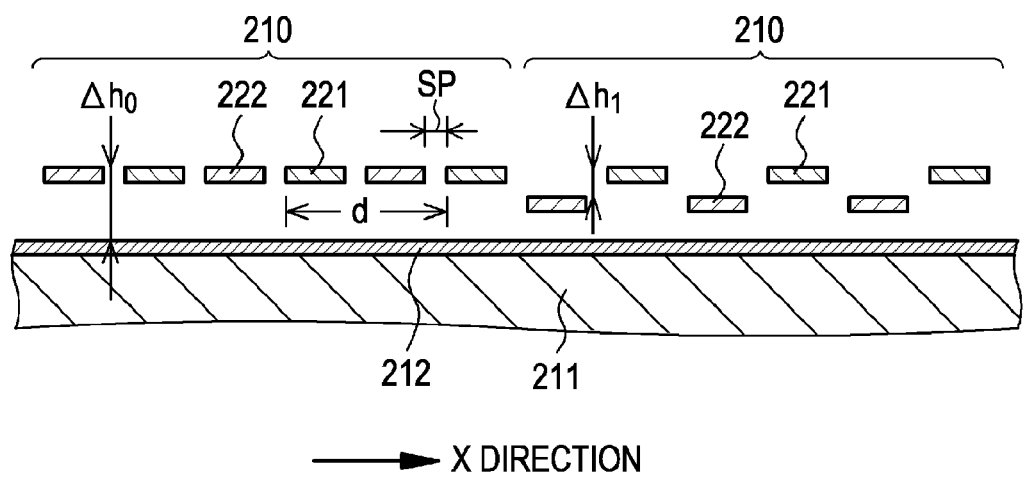
FIG. 45C is a schematic cross sectional of the fixed electrode, the movable electrode, and the like along an arrow C-C of FIG. 44.

When a voltage is applied via the connection terminal unit and the control electrode to the movable electrode 222 and also to the lower electrode 212 (in actuality, the lower electrode 212 is grounded), electrostatic force (coulomb force) is generated between the movable electrode 222 and the lower electrode 212. Then, by this electrostatic force, toward the lower electrode 212, the movable electrode 222 is displaced downward. It should be noted that the state of the movable electrode 222 before the displacement is shown on the left side of FIGS. 45A and 45C, and the state after the displacement is shown on the right side of FIGS. 45B and 45C. Then, on the basis of such a displacement of the movable electrode 222, a reflective diffraction grating is formed by the movable electrode 222 and the fixed electrode 221. Herein, FIG. 45A is a schematic cross sectional of the fixed electrode and the like along an arrow B-B of FIG. 44 and a schematic cross sectional of the movable electrode and the like along an arrow A-A of FIG. 44 (where the diffraction grating-light modulation element is not operated). FIG. 45B is a schematic cross sectional of the movable electrode and the like along the A-A of FIG. 44 (where the diffraction grating-light modulation element is operated). FIG. 45C is a schematic cross sectional of the fixed electrode, the movable electrode, and the like along an arrow of FIG. 44.

When a distance between adjacent fixed electrodes 221 is set as d (see FIG. 45C), a wavelength of the light incident to the movable electrode 222 and the fixed electrode 221 (incident angle: $\theta_i$) is set as $\lambda$, and a diffraction angle is set as $\theta_m$, $d[\sin(\theta_i)-\sin(\theta_m)]=m_{Dif}\lambda$ can be established. Herein, $m_{Dif}$ is an order, which takes a value of 0, ±1, ±2 . . . .

Then, when a difference in height $\Delta h_1$ between a top surface of the movable electrode 222 and a top surface of the fixed electrode 221 is (see FIG. 45C) is ($\lambda/4$), the light intensity of the diffraction light takes a maximum value.

In the light modulation means, at the time of non-operation of the diffraction grating-light modulation element 210 when the movable electrode 222 is in the state shown on the left side of FIGS. 45A and 45C, the light reflected by the top surfaces of the movable electrode 222 and the fixed electrode 221 is interrupted by the spatial filter 204. On the other hand, at the time of operation of the diffraction grating-light modulation element 210 when the movable electrode 222 is in the state shown on the right side of FIGS. 45B and 45C, the diffraction light of plus/minus first-order ($m_{Dif}=\pm 1$) diffracted by the movable electrode 222, and the fixed electrode 221 passes the spatial filter 204. With the above-mentioned configuration, it is possible to control the ON/OFF control of the light. In addition, by changing the voltage applied to the movable electrode 222, the difference in height $\Delta h_1$ between the top surface of the movable electrode 222 and the top surface of the fixed electrode 221 can be changed. As a result, by changing the intensity of the diffraction light, gradation control can be performed.

Next, the configuration examples of the light source and the illumination optical system according to Embodiments 1 to 9 are shown in FIGS. 46A to 46C and FIGS. 47A and 47B. Herein, a characteristic of the light (the illumination light) emitted from the light source, shaped by the illumination optical system, and irradiating the two-dimensional image formation apparatus 30 will be hereinafter described by using spatial coherence.

The spatial coherence represents coherency of light caused at a cross section in an arbitrary space, and a degree thereof can be represented by contrast of the generated interference fringe. In a generation procedure of the interference fringe, the interference fringe with the highest contrast is generated by interference of planar waves or spherical waves which can be optically replaced by th planar waves. From the above, it can be understood that the light having the highest spatial coherence is the planar wave (or the spherical wave). For example, the planar wave only having a component in one travelling direction has the highest spatial coherence. As the degree of the spatial coherence is lower, a plurality of components in the travelling direction exist. In addition, the distribution of the components in the light travelling direction is equivalent to discussing on the spatial size of the light emission origin or the second-order light emission point. From the above, the spatial coherence can be discussed on the basis of the spatial side of the light emission origin or the second-order light emission point. The spatial coherence, that is, the spatial size of the light source is a factor for deciding the spatial frequency characteristic of the image in the three-dimensional image display apparatus. When light other than light having the complete spatial coherence is used for the illumination light, decrease in contrast is caused from the high frequency components in order. The spatial frequency characteristic of the image to be obtained has different demands depending on a specific application, and herein, without mentioning specific numeric values, various configuration method for coping with different demands will be described.

In the three-dimensional image display apparatuses 1A to 1D according to Embodiments 1 to 9, configuration methods for the light source and the illumination optical system vary depending on a case where light with high spatial coherence is used for the illumination light and a case where other light is used for the illumination light. In addition, depending on a characteristic of the light source, configuration for the illumination optical system vary. Hereinafter, combination of the configuration methods for the light source and the illumination optical system will be described. It should be noted that in all the cases, the light source is assumed to be a monochromatic light source or a near-monochromatic light source.

Figure 46A:
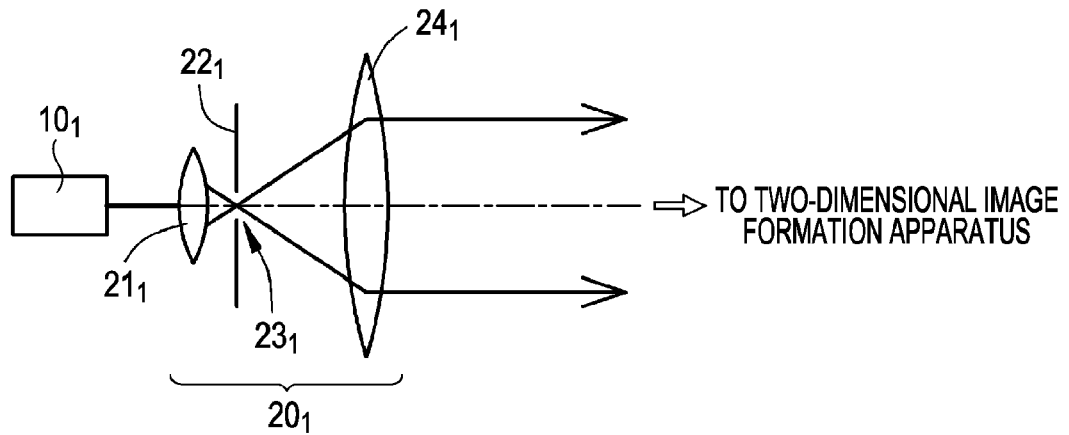
FIGS. 46A, 46B, and 46C are schematic diagrams respectively showing a first configuration example, a second configuration example, and a third configuration example of the light source and the illumination optical system in the three-dimensional image display apparatus according to Embodiments 1 to 9.

FIG. 46A shows an example in which the illumination optical system $20_1$ having high spatial coherence as a whole is configured by using the light source $10_1$ having high spatial coherence as a first configuration example. the light source $10_1$ is composed, for example, of a laser. The illumination optical system $20_1$ is composed of a lens $21_1$, a circular opening plate $22_1$, and a lens $24_1$ from the light source side in order. On the circular opening plate $22_1$, a circular aperture $23_1$ is provided at the center. The aperture $23_1$ is arranged at a collection position of the lens $24_1$. The lens $24_1$ functions as a collimator lens.

Figure 46B:
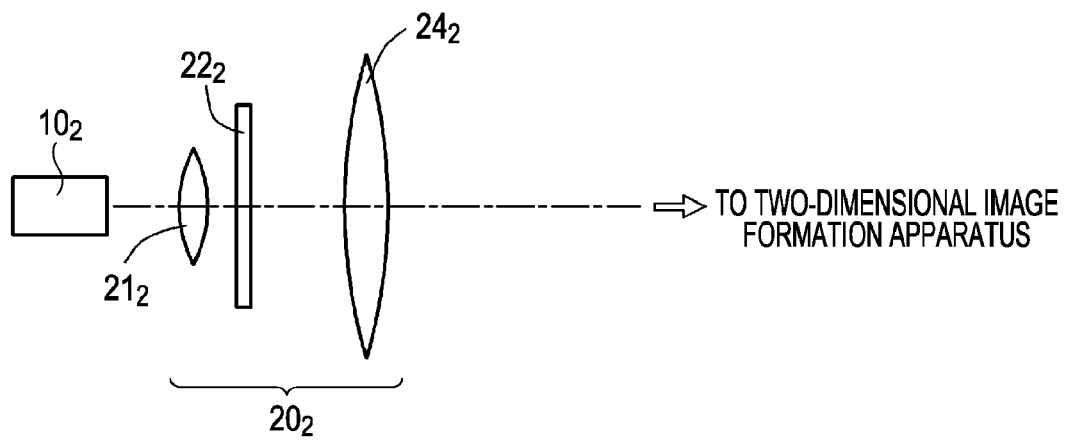

FIG. 46B shows an example in which the illumination optical system $20_2$ having not so high spatial coherence as a whole is configured by using the light source $10_2$ having high spatial coherence as a second configuration example. The light source $10_2$ is composed, for example, of a laser. The illumination optical system $20_2$ is composed of a lens $21_2$, a diffusion plate $22_2$, and a lens $24_2$ from the light source side in order. The diffusion plate $22_2$ may be a movable diffraction plate.

Figure 46C:
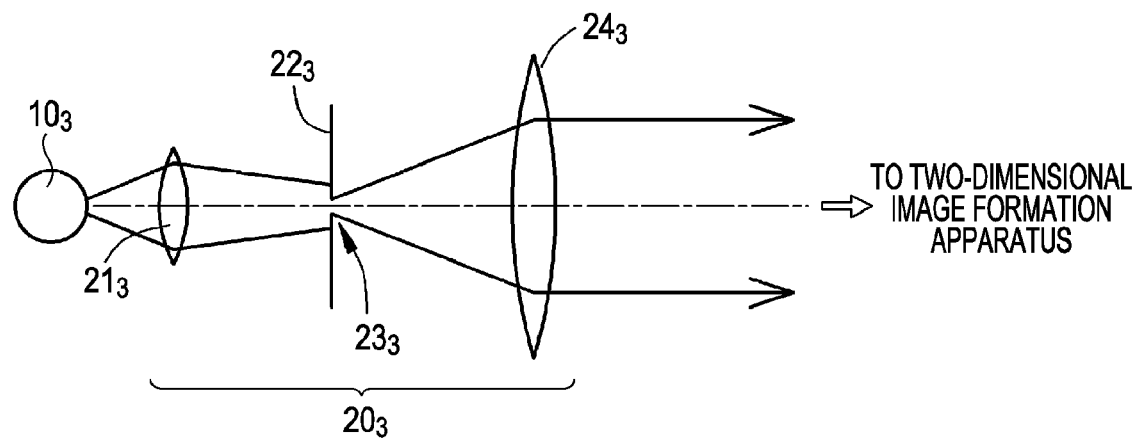
Figure 47A:
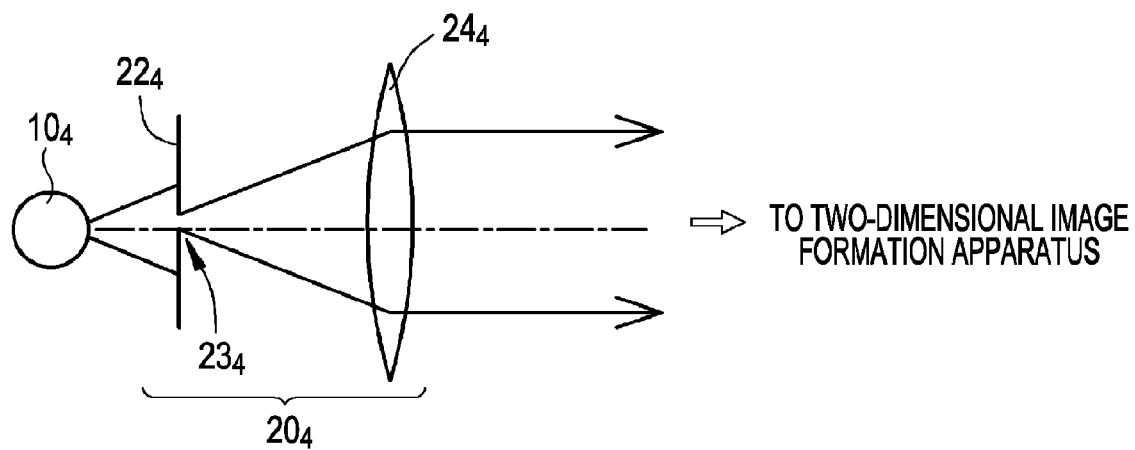
FIGS. 47A and 47B are schematic diagrams respectively showing a fourth configuration example and a fifth configuration example of the light source and the illumination optical system in the three-dimensional image display apparatus according to Embodiments 1 to 9.

FIGS. 46C and 47A show examples in which the illumination optical systems $20_3$ and $20_4$ having high spatial coherence as a whole are composed by using the light sources $10_3$ and $10_4$ having not so high spatial coherence as third and fourth configuration examples. For the light sources $10_3$ and $10_4$, for example, a light emitting diode (LED) or a white light source is used. The illumination optical system $20_3$ of FIG. 46C is composed of a lens $21_3$, a circular opening plate $22_3$, and a lens $24_3$ from the light source side in order. On the circular opening plate $22_3$, a circular aperture $23_3$ is provided at the center. An aperture $23_3$ is arranged at a collecting position of the lens $24_3$. The lens $24_3$ functions as a collimator lens. On the other hand, as compared with the illumination optical system $20_3$ of FIG. 46C, in the illumination optical system $20_4$ of FIG. 47A, the lens $21_3$ is omitted, and the illumination optical system $20_4$ is composed of a circular opening plate $22_4$, an aperture $23_4$, and a lens $24_4$ from the light source side in order.

Figure 47B:

FIG. 47B shows a configuration example in which the illumination optical system $20_5$ having not so high spatial coherence as a whole is composed by using light source $10_5$ having not so high spatial coherence as a fifth configuration example. Components other than the light source $10_5$ is composed of only a lens $24_5$.

In the respective configuration examples, in a case where the illumination optical system having the high spatial coherence as a whole is constructed, the second-order light emission point is set small without depending on the light source. In addition, in a case where the illumination optical system having the not so high spatial coherence as a whole is constructed, the second-order light emission point is set large without depending on the light source.

In the above, the three-dimensional image display apparatus has been described by way of preferred embodiments, but the present application is not limited to these embodiments.

According to Embodiments 4 and 5, the grating filter constituting the oversampling filter is composed of the phase grating, but may be alternatively composed of am amplitude grating.

Also, according to Embodiment 6, a configuration can also be adopted that two convex lenses are arranged between the two-dimensional image formation apparatus 30 and the optical apparatus 35, for example, the two-dimensional image formation apparatus 30 is arranged on the front-side focal surface of one of the convex lenses, a front-side focus is located at the other convex lens is located on a rear-side focus of the one convex lens, and the optical apparatus 35 is arranged on the rear-side focal surface of the other convex lens. In addition, the optical element 36 constructing the optical apparatus 35 can also alternatively be composed of a concave lens. In this case, the virtual opening region 37 is located on a front side of the two-dimensional image formation apparatus 30 (on the light source side). Furthermore, the optical element 36 may also be composed of a Fresnel lens instead of a normal lens.

According to Embodiment 10, the collimator lens 12 is arranged between the light source 10E and the light modulation means (the two-dimensional image formation apparatus) 30, but instead, a micro lens array in which micro lenses are arranged in a two-dimensional matrix manner can also be used.

According to Embodiments 1 and 3, the following configuration is adopted that the light modulation means (the two-dimensional image formation apparatus) 30 or the diffraction light generation means is arranged on the front-side focal surface of the lens constituting the Fourier transform image formation means 40 (the first lens $L_1$), and the Fourier transform image selection means is arranged on the rear-side focal surface. Depending on some cases, as a result that cross talk is generated in the spatial frequency in the two-dimensional image, degradation is caused in the finally obtained three-dimensional image, but the degradation is permissible, the light modulation means (the two-dimensional image formation apparatus) 30 or the diffraction light generation means may be arranged at a position shifted from the front-side focal surface of the lens constituting the Fourier transform image formation means 40 (the first lens $L_1$), the Fourier transform image selection means and may be arranged at a position shifted from the rear-side focal surface. In addition, the first lens $L_1$, the second lens $L_2$, and the third lens $L_3$ are not limited to the convex lens, and an appropriate lens may be selected for these lenses.

According to Embodiments 4 and 5 too, the following configuration is adopted that the oversampling filter OSF is arranged on the front-side focal surface of the lens constituting the Fourier transform image formation means 40 (the third lens $L_3$), and the Fourier transform image selection means 50 (the spatial filter SF) is arranged on the rear-side focal surface. Depending on some cases, as a result that cross talk is caused in the spatial frequency in the conjugate image of the two-dimensional image, degradation of the finally obtained three-dimensional image is caused. However, if the degradation is permissible, the oversampling filter OSF may be arranged at a position shifted from the front-side focal surface of the lens constituting the Fourier transform image formation means 40 (the third lens $L_3$), or the Fourier transform image selection means 50 (the spatial filter SF) may be arranged at a position shifted from the rear-side focal surface. In addition, the first lens $L_1$, the second lens $L_2$, the third lens $L_3$, the fourth lens $L_4$, and the fifth lens $L_5$ are not limited to the convex lens, and an appropriate lens may be selected for these lenses.

Also, according to Embodiments 6 and 7, the following configuration is adopted that the focus of the optical element 36 constructing the optical apparatus 35 is arranged on the front-side focal surface of the lens constituting the Fourier transform image formation means 40 (the first lens $L_1$), and the Fourier transform image selection means is arranged on the rear-side focal surface. Depending on some cases, as a result that cross talk is caused in the spatial frequency in the two-dimensional image, degradation in the finally obtained three-dimensional image is caused. However, if the degradation is permissible, the focus of the optical element 36 constructing the optical apparatus 35 may be arranged at a position shifted from the front-side focal surface of the lens constituting the Fourier transform image formation means 40 (the first lens $L_1$), and the Fourier transform image selection means may be arranged at a position shifted from the rear-side focal surface. In addition, the first lens $L_1$, the second lens $L_2$, and the third lens $L_3$ are not limited to the convex lens, and an appropriate lens may be selected for these lenses.

Furthermore, according to Embodiment, the light ray travelling direction change means 80 is arranged on the rear-side focal surface of the second lens $L_3$ and on the front-side focal surface of the third lens $L_2$. Depending on some cases, the light ray travelling direction change means 80 may be arranged at a position shifted from these focal surfaces. In addition, the first lens $L_1$, the second lens $L_2$, and the third lens $L_3$ are not limited to the convex lens, and an appropriate lens may be selected for these lenses.

Furthermore, according to Embodiments 10 and 11, the following configuration is adopted that the light modulation means (the two-dimensional image formation apparatus) 30 and the diffraction light generation means are arranged on the front-side focal surface of the lens constituting the Fourier transform image formation means 40 (the first lens $L_1$), and the Fourier transform image selection means is arranged on the rear-side focal surface. Depending on some cases, degradation in the finally obtained three-dimensional image is caused. However, if the degradation is permissible, the light modulation means (the two-dimensional image formation apparatus) 30 and the diffraction light generation means may be arranged at a position shifted from the front-side focal surface of the lens constituting the Fourier transform image formation means 40 (the first lens $L_1$), and the spatial filter SF (the Fourier transform image selection means 50) may be arranged at a position shifted from the rear-side focal surface. In addition, the first lens $L_1$, the second lens $L_2$, and the third lens $L_3$ are not limited to the convex lens, and an appropriate lens may be selected for these lenses.

Figure 48A:
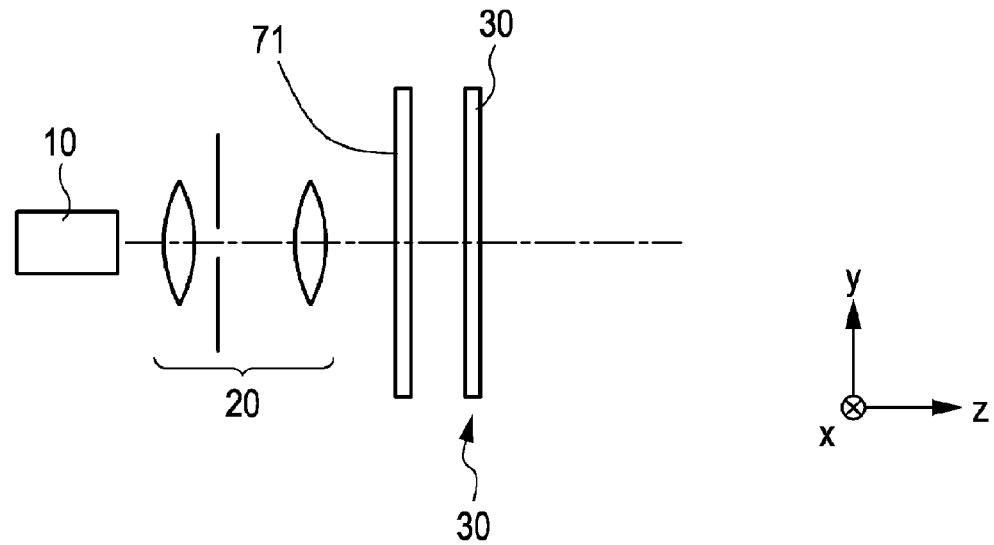
FIGS. 48A and 48B are conceptual diagrams of a part of a modified example of the three-dimensional image display apparatus according to Embodiment 1 in the yz plane.

According to the embodiments, the light source is assumed to be a monochromatic light source or a near-monochromatic light source in all the cases, but the light source is not limited to the above-mentioned configuration. The light source wavelength band may range in a plurality of bands. It should be noted that, in this case, for example, when a description will be given while taking the three-dimensional image display apparatus 1A according to Embodiment 1 as an example, as shown in FIG. 48A, a narrowband filter 71 configured to perform wavelength selection may be preferably arranged between the illumination optical system 20 and the light modulation means (the two-dimensional image formation apparatus) 30. Alternatively, when a description will be given while taking the three-dimensional image display apparatus 1E according to Embodiment 10 as an example, a narrowband filter 71 configured to perform wavelength selection may be preferably arranged between the collimator lens 12 and the light modulation means (the two-dimensional image formation apparatus) 30. With this configuration, the wavelength band is segregated and selected, and the monochromatic light can be extracted.

Figure 48B:
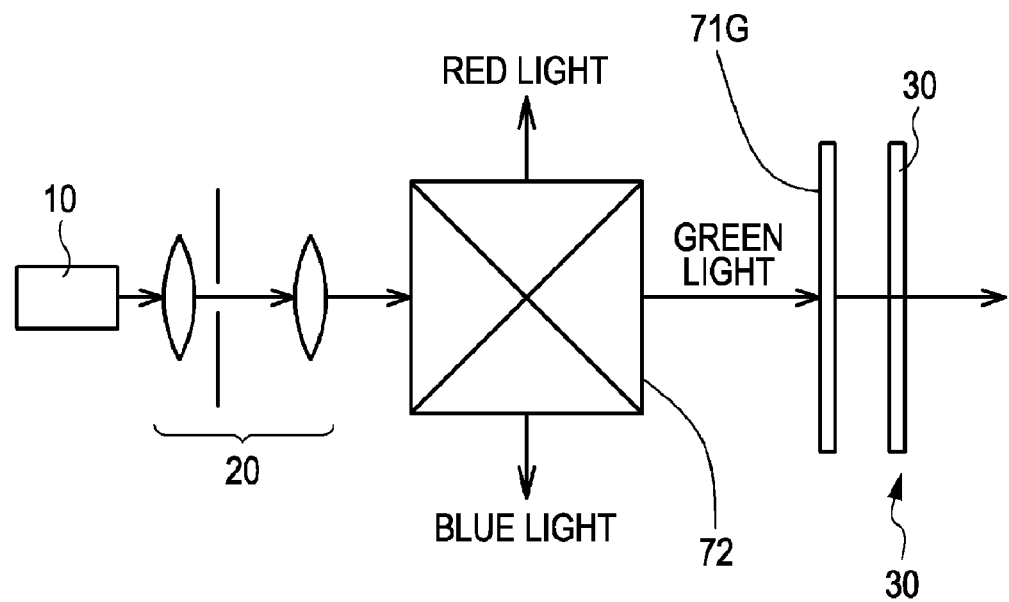

Alternatively, the wavelength band of the light source 10 may range in a wide band. It should be noted that, in this case, as shown in FIG. 48B, a dichroic prism 72 and a narrowband filter 71G configured to perform wavelength selection may preferably be arranged between the illumination optical system 20 and the light modulation means (the two-dimensional image formation apparatus) 30, or alternatively, between the collimator lens 12 and the light modulation means (the two-dimensional image formation apparatus) 30. To be specific, the dichroic prism 72 reflects, for example, red light and blue light in different directions and also transmits light ray including green light. The narrowband filter 71G configured to segregate and select the green light is arranged on an emitting side of the light ray including the green light in the dichroic prism 72.

Figure 49:
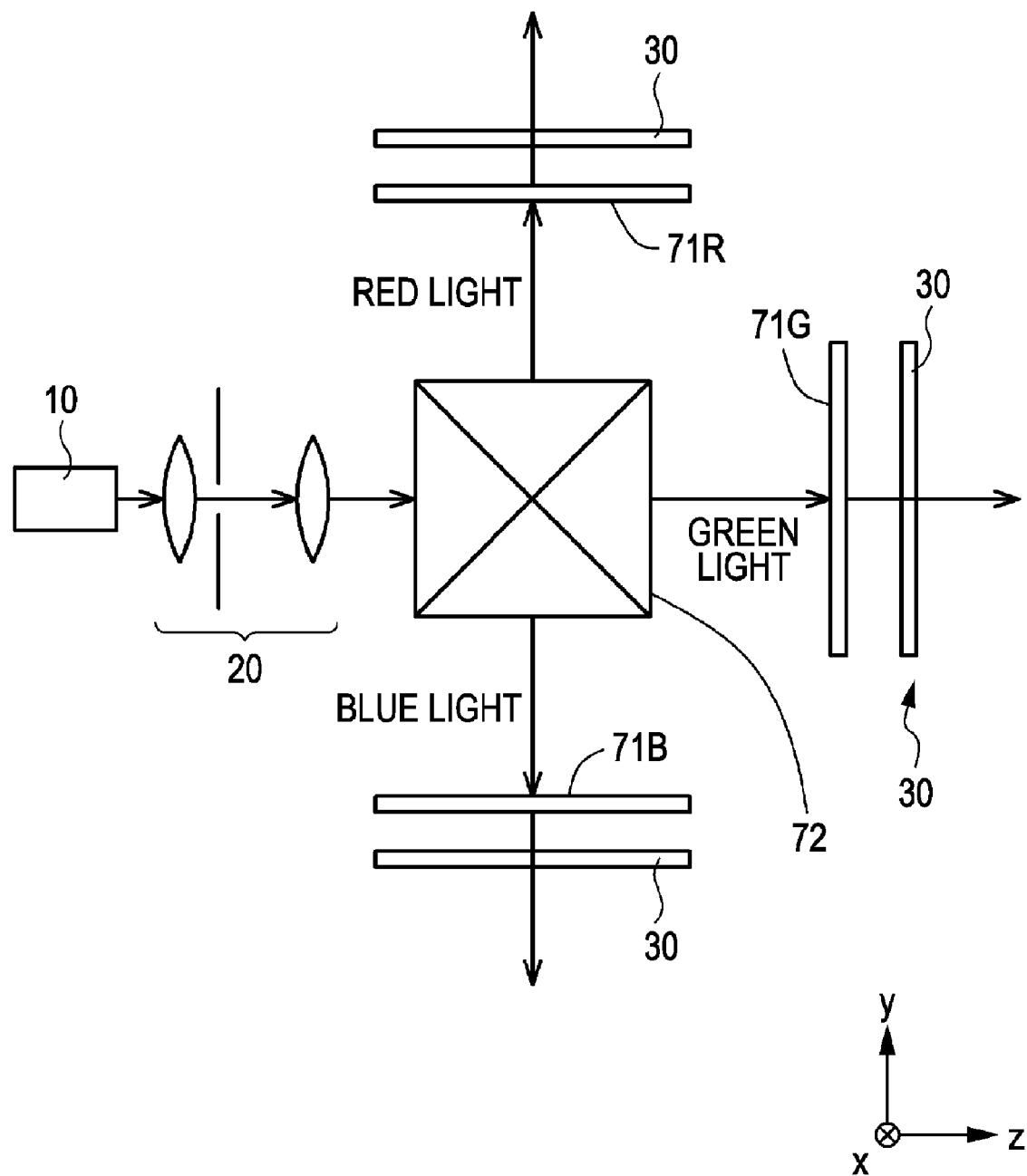
FIG. 49 is a conceptual diagram of a part of another modified example of the three-dimensional image display apparatus according to Embodiment 1.

Also, as shown in FIG. 49, when the narrowband filter 71G configured to segregate and select the green light is arranged on the emitting side of the light ray including the green light in the dichroic prism 72, a narrowband filter 71R configured to segregate and select the red light is arranged on the emitting side of the light ray including the red light, and a narrowband filter 71B configured to segregate and select the blue light is arranged on the emitting side of the light ray including the blue light, it is possible to construct a light source for three of the three-dimensional image display apparatuses configured to display three primary colors. By using the three three-dimensional image display apparatuses of the above-mentioned configuration, or alternatively, by utilizing, for example, a photosynthetic prism to synthesize the images from the respective three-dimensional image display apparatuses by using combinations of the light source for emitting the red light and the three-dimensional image display apparatus, the light source for emitting the green light and the three-dimensional image display apparatus, and the light source for emitting the blue light and the three-dimensional image display apparatus, it is possible to perform color display. It should be noted that instead of the dichroic prism, a dichroic mirror can also be used. Alternatively, the light source is composed of a red light emitting element, a green light emitting element, and a blue light emitting element. By sequentially setting the red light emitting element, the green light emitting element, and the blue light emitting element in a light emitting state, it is also possible to perform the color display. It should be noted that the modification examples of these three-dimensional image display apparatuses described above can of course be applied to other embodiments.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The invention claimed is:

1. A three-dimensional image display apparatus comprising a light source and an optical system, the optical system including means for providing a plurality of pixels and generating a two-dimensional image by modulating light from the light source by the respective pixels and emitting a spatial frequency in the generated two-dimensional image along diffraction angles corresponding to a plurality of diffraction orders generated from the respective pixels, means for performing a Fourier transform on the spatial frequency in the two-dimensional image to generate a number of a Fourier transform images corresponding to the plurality of diffraction orders, means for selecting a Fourier transform image corresponding to a desired diffraction order among the number of Fourier transform images as generated corresponding to the plurality of diffraction orders, and means for forming a conjugate image of the Fourier transform image, the three-dimensional image display apparatus further comprising a semi-transmissive mirror configured to change a travelling direction of a light ray emitted from the optical system, and wherein the optical system is positioned outside a view angle of an observer.

2. The three-dimensional image display apparatus according to claim 1, wherein the light source and the optical system do not exist on an extension of a path of the light ray whose travelling direction is changed by the semi-transmissive mirror.

3. The three-dimensional image display apparatus according to claim 1, wherein an image of the light source does not exist on an extension of a path of the light ray whose travelling direction is changed by the semi-transmissive mirror.

4. A three-dimensional image display apparatus comprising a light source and an optical system, the optical system including light modulation means provided with a plurality of pixels and configured to generate a two-dimensional image by modulating light from the light source by the respective pixels and to emit a spatial frequency in the generated two-dimensional image along diffraction angles corresponding to a plurality of diffraction orders generated from the respective pixels, Fourier transform image formation means configured to perform Fourier transform on the spatial frequency in the two-dimensional image emitted from the light modulation means to generate a number of a Fourier transform images corresponding to the plurality of diffraction orders, Fourier transform image selection means configured to select a Fourier transform image corresponding to a desired diffraction order among the number of Fourier transform images as generated corresponding to the plurality of diffraction orders, and conjugate image formation means configured to form a conjugate image of the Fourier transform image selected by the Fourier transform image selection means, the three-dimensional image display apparatus further comprising light ray control means configured to change the travelling direction of the light ray emitted from the optical system and control a collecting state of the light ray emitted from the optical system at an observation spot and wherein the light modulation means, the Fourier transform image formation means, the Fourier transform image selection means, and the conjugate image formation means are positioned outside a view angle of an observer.

5. The three-dimensional image display apparatus according to claim 4 wherein the light ray control means is composed of a concave mirror.

6. The three-dimensional image display apparatus according to claim 4 wherein the light ray control means is composed of a lens which the light ray emitted from the optical system enters and a minor which a light ray emitted from the lens enters.

7. The three-dimensional image display apparatus according to claim 4, wherein the light ray control means is composed of a mirror, wherein the light ray control means further includes detection means configured to detect the observation spot, and wherein the light ray control means controls a position of the mirror on the basis of a detection result on the observation spot by the detection means.

8. The three-dimensional image display apparatus according to claim 4,
wherein the light ray control means is composed of a lens which the light ray emitted from the optical system enters and a mirror which a light ray emitted from the lens enters,
wherein the light ray control means the light ray control means further includes detection means configured to detect the observation spot, and
wherein the light ray control means controls a collecting state of the lens on the basis of a detection result on the observation spot by the detection means.

9. A three-dimensional image display apparatus comprising a light source and an optical system,
the optical system including
a light modulation unit provided with a plurality of pixels and configured to generate a two-dimensional image by modulating light from the light source by the respective pixels and to emit a spatial frequency in the generated two-dimensional image along diffraction angles corresponding to a plurality of diffraction orders generated from the respective pixels,
a Fourier transform image formation unit configured to perform Fourier transform on the spatial frequency in the two-dimensional image emitted from the light modulation unit to generate a number of a Fourier transform images corresponding to the plurality of diffraction orders,
a Fourier transform image selection unit configured to select a Fourier transform image corresponding to a desired diffraction order among the number of Fourier transform images as generated corresponding to the plurality of diffraction orders, and
a conjugate image formation unit configured to form a conjugate image of the Fourier transform image selected by the Fourier transform image selection unit, and
the three-dimensional image display apparatus further comprising a semi-transmissive mirror configured to change a travelling direction of a light ray emitted from the optical system, and
wherein the light modulation unit, the Fourier transform image formation unit, the Fourier transform image selection unit, and the conjugate image formation unit are positioned outside a view angle of an observer.

10. The three-dimensional image display apparatus according to claim 1, wherein the semi-transmissive mirror includes a dielectric multilayer film.

11. The three-dimensional image display apparatus according to claim 1, wherein the semi-transmissive mirror changes a traveling direction of the conjugate image formed by the conjugate image formation means.

* * * * *